United States Patent
McDannald et al.

(10) Patent No.: US 11,775,132 B1
(45) Date of Patent: Oct. 3, 2023

(54) SYSTEM AND METHOD FOR THE MANAGEMENT AND USE OF BUILDING SYSTEMS, FACILITIES, AND AMENITIES USING INTERNET OF THINGS DEVICES AND A METAVERSE REPRESENTATION

(71) Applicant: Environments by LE, Inc., Baltimore, MD (US)

(72) Inventors: Erin McDannald, Baltimore, MD (US); Thomas C. Albert, Baltimore, MD (US); Timothy A. Gunther, Baltimore, MD (US); Victoria Fields, Baltimore, MD (US); Josef A. Plakinger, Baltimore, MD (US); Frank YJ Cho, Baltimore, MD (US)

(73) Assignee: ENVIRONMENTS BY LE, INC., Baltimore, MD (US)

( * ) Notice: Subject to any disclaimer, the term of this patent is extended or adjusted under 35 U.S.C. 154(b) by 0 days.

(21) Appl. No.: 17/747,283

(22) Filed: May 18, 2022

(51) Int. Cl.
G06F 3/04815 (2022.01)
G06T 13/40 (2011.01)
(Continued)

(52) U.S. Cl.
CPC ....... *G06F 3/04815* (2013.01); *G05B 19/042* (2013.01); *G06F 3/0484* (2013.01);
(Continued)

(58) Field of Classification Search
CPC .................................................. G06F 3/04815
See application file for complete search history.

(56) References Cited

U.S. PATENT DOCUMENTS 4,969,508 A 11/1990 Tate et al.
7,302,313 B2 11/2007 Sharp et al.
(Continued)

FOREIGN PATENT DOCUMENTS

AU 2016244190 A1 5/2017
CN 104819785 A 8/2015
(Continued)

OTHER PUBLICATIONS

"Building Automation Systems—SAR1615." Sathyabama Institute of Science and Technology School of Building and Environment Department of Architecture. pp. 2, 4, 5, 7, 10-12, 65-66.
(Continued)

*Primary Examiner* — Roland J Casillas
(74) *Attorney, Agent, or Firm* — MILES & STOCKBRIDGE P.C.

(57) ABSTRACT

An integrated building and office automation control system and method includes outputting using said GUI a floor map of each of said plurality of interior regions, each said floor map comprising indications of each said avatar representation of each said one or more physical occupants at said on premise location within said floor map, and each of said one or more remote virtual occupants at said virtual location within said floor map, and each of said one or more remote virtual occupants located within said interior region; and generating and outputting a three-dimensional simulated representation of at least one of said interior regions including each said avatar representation of each said one or more physical occupants at said on premise location within said three-dimensional simulated representation, and each of said one or more remote virtual occupants at said virtual location within said three-dimensional simulated representation.

30 Claims, 72 Drawing Sheets

(51) Int. Cl.
*G06F 3/0484* (2022.01)
*G16Y 10/80* (2020.01)
*G06Q 10/10* (2023.01)
*G05B 19/042* (2006.01)
*G06F 3/0482* (2013.01)
*H04L 67/02* (2022.01)

(52) U.S. Cl.
CPC ............ *G06Q 10/10* (2013.01); *G06T 13/40* (2013.01); *G16Y 10/80* (2020.01); *G05B 2219/25011* (2013.01); *G06F 3/0482* (2013.01); *G06F 2203/04803* (2013.01); *G06T 2200/24* (2013.01); *H04L 67/02* (2013.01)

(56) References Cited

U.S. PATENT DOCUMENTS

| | | | |
|---|---|---|---|
| 7,651,266 B2 | 1/2010 | Bellifemine | |
| 8,276,829 B2 | 10/2012 | Stoner et al. | |
| 8,907,570 B2* | 12/2014 | Kwag | H05B 47/19 315/130 |
| 9,245,196 B2 | 1/2016 | Marks et al. | |
| 9,520,057 B2 | 12/2016 | Tsai et al. | |
| 9,557,750 B2 | 1/2017 | Gust et al. | |
| 9,843,772 B2 | 12/2017 | Lee et al. | |
| 9,879,875 B2 | 1/2018 | Quam et al. | |
| 9,920,942 B2 | 3/2018 | Jan | |
| 10,031,494 B2* | 7/2018 | Holaso | G05B 15/02 |
| 10,049,500 B2 | 8/2018 | Morrison | |
| 10,156,378 B2 | 12/2018 | Alsaleem | |
| 10,172,213 B2* | 1/2019 | Platner | H05B 47/175 |
| 10,228,773 B2 | 3/2019 | Lyons | |
| 10,473,351 B2 | 11/2019 | Anderson et al. | |
| 10,508,822 B1 | 12/2019 | Sheikh et al. | |
| 10,746,430 B2 | 8/2020 | Park | |
| 10,771,868 B2 | 9/2020 | Fadell et al. | |
| 10,852,838 B2 | 12/2020 | Bradski et al. | |
| 10,973,094 B2 | 4/2021 | Ivey et al. | |
| 11,372,383 B1* | 6/2022 | Hughley | G06F 3/0482 |
| 2003/0025599 A1* | 2/2003 | Monroe | G08B 13/19691 709/200 |
| 2012/0293506 A1 | 11/2012 | Vertucci et al. | |
| 2013/0091432 A1* | 4/2013 | Shet | G06F 16/532 715/719 |
| 2018/0018508 A1* | 1/2018 | Tusch | G06V 40/20 |
| 2020/0266252 A1 | 8/2020 | Cancel Olmo et al. | |
| 2020/0375014 A1 | 11/2020 | Alexander et al. | |
| 2021/0074068 A1 | 3/2021 | Spivack et al. | |
| 2021/0117693 A1* | 4/2021 | Martin | G06T 7/246 |
| 2021/0158630 A1 | 5/2021 | Muhammad et al. | |
| 2021/0264505 A1* | 8/2021 | Poulin | G06Q 30/0601 |
| 2021/0368137 A1* | 11/2021 | Alcantara | H04N 21/47 |
| 2022/0067851 A1* | 3/2022 | Sinha | G06Q 50/06 |

FOREIGN PATENT DOCUMENTS

| | | | |
|---|---|---|---|
| CN | 208873278 U | 5/2019 | |
| CN | 112232153 A | 1/2021 | |
| CN | 112748793 A | 5/2021 | |
| EP | 3258326 A1 | 12/2017 | |
| EP | 3360024 A1 | 8/2018 | |
| EP | 3635518 A1 | 4/2020 | |
| KR | 101162703 B1 | 7/2012 | |
| KR | 20150068895 A | 6/2015 | |
| KR | 20170125618 A | 11/2017 | |
| KR | 20210070005 A | 6/2021 | |
| WO | 2020122514 A1 | 6/2020 | |
| WO | 2020213799 A1 | 10/2020 | |
| WO | 2021026078 A1 | 2/2021 | |

OTHER PUBLICATIONS

Costa, Ricardo J., Alves, Gustavo R. and Santos, Domingos S., "Adopting Building Automation in Weblabs—Analysis of Requirements and Solutions" Conference: WEBIST 2008, Proceedings of the Fourth International Conference on Web Information Systems and Technologies, vol. 2, Funchal, Madeira, Portugal, May 4-7, 2008. pp. 2-4, 8-9.

Stomberg, G., Sturm, T., Gsottberger, Y. and Shi, X. (2005). "Low-Cost Wireless Control-Networks in Smart Environments." In: Weber, W., Rabaey, J.M., Aarts, E. (eds) Ambient Intelligence. Springer, Berlin, Heidelberg.

Floris, A., Porcu, S., Girau, R. and Atzori, L. "An IoT-Based Smart Building Solution for Indoor Environment Management and Occupants Prediction." Energies 2021, 14, 2959. Pages pp. 1, 3, 7 -12.

Lestari, Uning, Fatkhiyah, Erfanti and Prakoso, Andung Febi. "Application of Home Light Control System Using Arduino With Mobile Based Wifi Media." Published Jan. 10, 2019 International Journal Information System and Computer Science (IJISCS). pp. 67-75.

Minchev, Zlatogor and Boyanov, Luben. "Interactive Virtual Avatars. Design & Application Challenges for Future Smart Homes." 4th International Conference on Application of Information and Communication Technology and Statistics in Economy and Education, Oct. 24-25, 2014, UNWE < Sofia, Bulgaria. pp. 553-560.

Hasan Nazmul, Khan, Abdullah Al Manum, Uddin, Nezam and Mitul, Abu Farzan. "Design and Implementation of Touchscreen and Remote Control Based Home Automation System." Proceedings of 2013 2nd International Conference on Advances in Electrical Engineering (ICAEE 2013). Dec. 19-21, 2013, Dhanka, Bangladesh. pp. 347-352.

Sfikas, Giorgos, Akasiadis, Charilaos and Spyrou, Evaggelos. "Creating a Smart Room using an IoT approach." Institute of Informatics and Telecommunications NCSR—Demokritos, Athens, Greece. (2016). pp. 2-7.

Statsenko, D., Zlotenko, B., Natroshvili, S., Kulik, T., Demishonkova, S. "Computer System for Controlling Indoor Lighting." Published May 1, 2021 Computer Science, Herald of Khmelnytskyi National University. p. 1.

\* cited by examiner

1500

1550

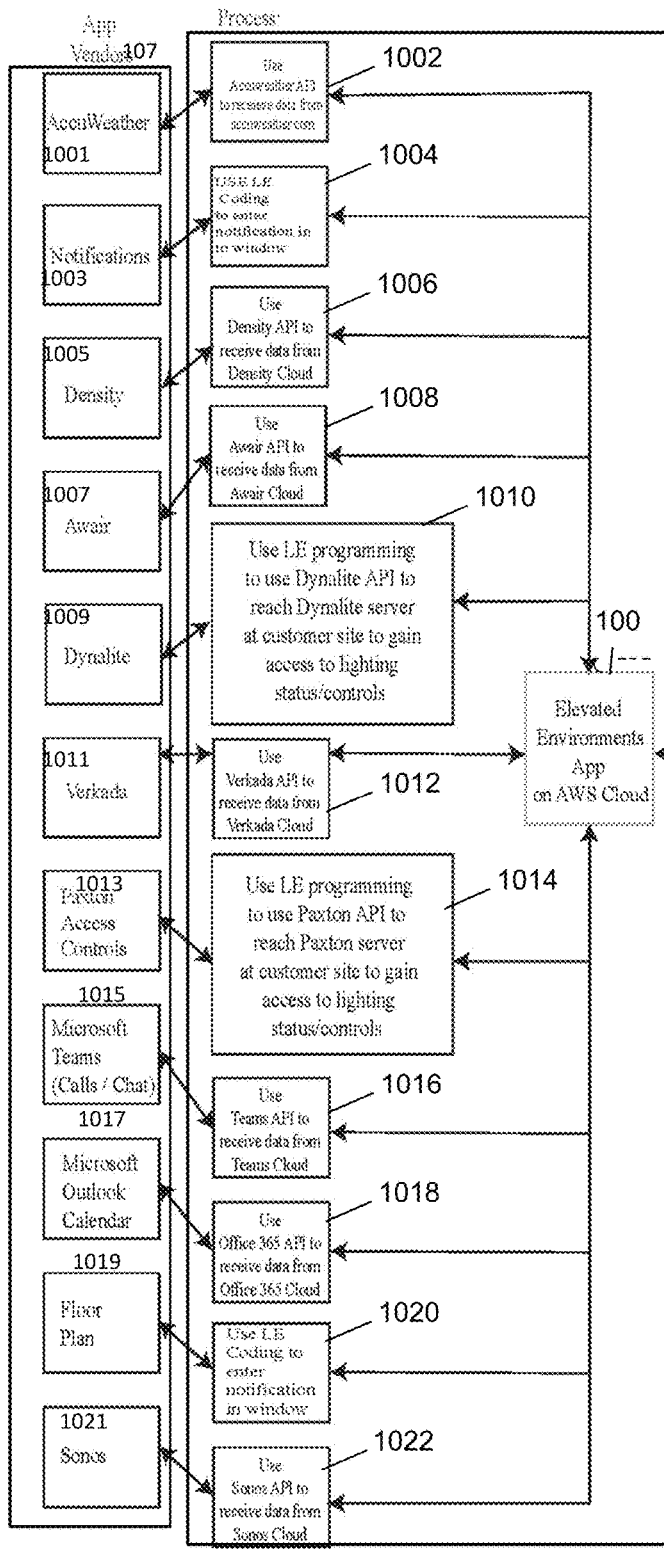
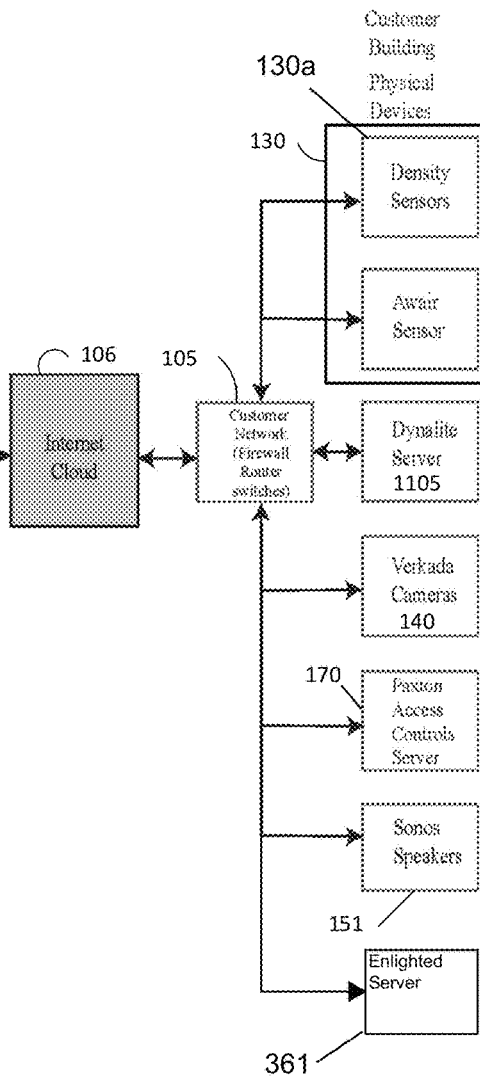
FIG. 2D

2310

2320

2330

2340

SYSTEM AND METHOD FOR THE MANAGEMENT AND USE OF BUILDING SYSTEMS, FACILITIES, AND AMENITIES USING INTERNET OF THINGS DEVICES AND A METAVERSE REPRESENTATION

TECHNICAL AREA

The method and system relate generally to monitoring, controlling, and accessing building systems, facilities, and amenities, including, but not limited to, environmental, security, and physical access systems, and available amenities using an interactive control dashboard and user interface, Internet of Things (IOT) devices, and metaverse representations.

BACKGROUND

Building owners, tenants, and facilities managers need to be able to more easily control, access, use, and experience their physical environments from a variety of locations. For example, they need to be able to have access to and use smart building systems, ideally through a single, integrated access system and method of use.

However, existing systems for managing, controlling, and monitoring physical spaces for buildings are typically stand-alone, thus presenting building managers and occupants with a large number of increasingly complex and disparate systems to train for, use, and maintain to effectively control lighting, access, and environmental characteristics such as heating, cooling, humidity, and air quality. Furthermore, the need for lighting and environmental features are affected by the number of occupants and their individual and collective proximity and concentration with respect to one another, as well as the type of activity being performed in an area or room within the space.

Accordingly, there is a need for an integrated control and access system and method that streamlines the number of systems needed for such control and that integrates the operation of previously separate systems, and that can include features such as an integrated Internet of Things (IoT) application that controls, through a single dedicated and easy to use user interface, in real-time all of the systems in a building, including sensors, operating components, and controls for each system.

SUMMARY

To address the above-described problems, the present inventors have created an integrated building and office automation control system and method of operation which includes an integrated, on-line computer and physical sensor-based system to monitor and control building and office space environmental conditions via both cameras and a separate immersive extended reality (XR) metaverse, for example, an immersive augmented reality (AR) metaverse or an immersive virtual reality (VR) metaverse or an immersive mixed reality (MR) metaverse, with generic or specially programmed avatars for personnel within the building and office space. Specially programmed avatars can be created from an image of a person using one or more programs including, for example, but not limited to, the Ready Player Me platform from Ready Player Me of Tallinn, Estonia. In general, the person's avatar in a metaverse office space can be displayed in approximately the same location as the person is in the real office space, thus creating a "digital twin" of the user in the metaverse office space. As a result, as the person moves about the real office space the person's avatar simultaneously moves about the equivalent locations in the metaverse office space. In addition, the person's avatar in the metaverse office space can be decoupled from the person's actual position in the real office space to enable the user to take control of the user's avatar, move the user's avatar through, interact with other user avatars in, and interact with, use, and control elements within the metaverse office space. The controlling of the elements within the metaverse office space by the user's avatar can include, for example, but not limited to, turning on or off a light or changing the temperature in a given space, can cause the same actions to occur in the same spaces in the real office space. Of course, the capabilities of each person's avatar to control or influence the real office space as well as the metaverse office space can be limited by a system administrator. For example, employees, authorized individuals, frequent guests, and their avatars can have individual and unique predefined levels of access and control over both the real office space and the metaverse office space. The levels of control can be identical in both the real office space and the metaverse office space, so the user can control the real office space environmental characteristics using the user's avatar in the metaverse office space. Conversely, the levels of control can be different, so the user can control the lighting level in the real office space from within the real office space, but cannot control the lighting level in the real office space through the user's avatar in the metaverse office space.

General guest avatars for unknown guests and visitors can also be created and configured so they can be assigned to or selected by guests and visitors when they visit the real and/or metaverse office spaces. It is also possible for guests to bring their own personal avatars and have them imported into the system for use while the guest is in the real office space, although the level of access and control for each guest's personal avatar will still be set by the system administrator.

In various embodiments, the integrated, on-line computer and physical sensor-based system includes a central server on which the computer program platform resides and that is used to monitor and control designated building and office spaces to provide for monitoring and control of environmental conditions including, but not limited to, temperature, humidity, lighting, sound, air quality, water quality, etc.; position tracking of assets, including equipment and personnel affixed with sensors, for example, Bluetooth®, within the building and office spaces, but not collecting or tracking Personally Identifying Information (PII) unless informed written consent of each individual has been obtained and the collecting and tracking occurs in accordance with all data privacy laws of each jurisdiction in which the building and office spaces are located; remotely controlling physical access to the building and office spaces; communication with personnel; a community user environment; concierge services; and analytics. The system integrates multiple existing sensor and software systems to provide a unified control panel, embodiments of which are shown in the images below.

In various embodiments, the method and system provides a graphical user interface (GUI) through a content server platform, which can be hardware or a combination of both hardware and software and can be integrated with or independent from the content server platform. A user, for example, but not limited to, a building manager, tenant, or occupant, is given a user-specific level of access to the platform through the GUI to enter, view or update information about multiple building access and control aspects associated with the building or interior space, using a local device (for example, but not limited to, a personal computer, laptop, tablet, smart phone, or other wireless handheld device) based on the user's specific level of access. The access can either be from a local location, that is, in an adjacent or relatively close physical location, or a remote location, that is, in a different, relatively distant physical location with respect to the location of the platform. In addition, users can simultaneously change the lighting and other environmental settings in both the real world office space and in the virtual metaverse office space using either the GUI or through their avatar as implemented in the metaverse. Further, users can decouple the real world office space and the virtual metaverse office space and change the lighting and other environmental settings in each individually without affecting the other office space. For example, but not limited to, this can be used to illustrate the different lighting results that can be achieved by varying the style, intensity, number/type of bulbs, color/warmth, etc. of a lighting fixture in a given room or space in the metaverse office space. This permits a user to virtually review and test multiple different lighting fixtures in the virtual office space to determine which would be best suited for the user's needs in the actual office space.

The system is able to monitor multiple locations simultaneously, which saves time and expense and significantly improves response and remediation times when problems arise. By integrating the numerous disparate building environmental, control, security, and access systems into a single application/system, the application/system of the presently disclosed subject matter provides a single monitoring and control platform that is able to access, control, and manage all aspects of a given building or physical space.

Embodiments can include features/functions/capabilities of the application/system of the presently disclosed subject matter such as, but are not limited to: networked lighting controls; wireless lighting controls; fire/life safety detection; touchless office spaces; germicidal Ultra Violet (UV) light systems; occupant mapping; cameras & other IoT devices (for example, speakers, receivers, heat sensors, etc.) integration; biometrics; energy monitoring and measuring; access controls (for example, physical and virtual); wayfinding (for example, directions); security systems (for example, active shooter response, physical perimeter breach, electronic breach, remote controlled and/or autonomous security robots, etc.); shade controls; energy metering; daylight harvesting; temperature control (for example, thermostats, fans, HVAC, etc.); air characteristic and quality monitoring and control; water quality monitoring and control; electrical power grid management; geofencing; asset tracking; space optimization; workspace utilization; remote building and space management and control; communication systems integration (for example, phones, Internet, audio/visual); room scheduling (for example, office, conference, room, etc. reservations and scheduling); predictive maintenance; and real-time analytics. Combining and integrating access to these different systems in embodiments of the presently disclosed subject matter, results in better, timelier, and more accurate information sharing, which reduces the time for the system to react/respond to changing conditions in the building/space. As a result, this increases the overall performance and effectiveness of embodiments of the presently disclosed subject matter's management, control, and operation of buildings and spaces.

The access, control, and flexibility provided by embodiments of the system enables facilities management personnel, as needed, to be able to adjust the building/space systems under their control to optimize conditions for increased efficiency. In addition, when a problem with a building/space system does arise, the facilities management personnel are quickly able to locate, identify, and take steps to remediate the problem.

Still further, because the embodiments of the presently disclosed subject matter are constantly monitoring the status and conditions of the environment as well as the multiple building systems, the system is able to immediately detect and alert on developing issues occurring in the environment and/or with specific building systems in real time before they become serious issues.

As one, but not the only, example, if the system detects a temperature increase or decrease to a level above a desired, that is, predefined, temperature is occurring in a specific space, which is due to the afternoon sun shining or not shining through windows in the space including, for example, smart windows, the system can either alert an operator of the need to close or open shades in the windows or, if enabled with smart windows, the system can close or open the shades automatically in the windows. For example, the shades and their controls can include, but are not limited to, smart, motorized shade systems from Somfy Systems Inc. of Dayton, N.J. In addition, depending on the sensed and desired temperature for the space, it may be necessary to engage the HVAC system to provide cooling and/or heating into the space to get to and/or maintain the desired temperature.

Thus, embodiments of the system of the presently disclosed subject matter can include (that is, comprise) an integrated building and office automation control system and method of operation that can be customized, controlled, and/or adjusted to optimize efficient use of resources and meet desired usage or economic operation goals. In various embodiments, the integrated building and office automation control system and method can enable a user to monitor and troubleshoot multiple building system settings individually and collectively and in real time, from one single device, without the user being present in the facility being monitored. As a result, maintenance and repair of building systems can be improved by providing the capability to pinpoint exactly when systems need recalibration instead of relying on scheduled maintenance. Furthermore, embodiments can be effective to protect building personnel and occupants using intelligent cleaning systems, contactless meeting features, and emergency response deployment systems.

Accordingly, embodiments can include a facility command-and-control center with real-time analytics, heat mapping data, an internal social networking center, and live video streams, that provides event information with escalation alerts, team collaboration tools, as well as portals to company and local community information, so that employees and visitors have a place to get real-time information about their environment and can tap into a command and control center for collaboration and information. In various embodiments, the integrated building and office automation control system and method can convert efficiencies into savings by, for example, without limitation, assessing real-time data to optimize productivity and expand services, determining maintenance needs before they become a costly failure, improving energy management and avoiding downtime, optimizing space in a manner beneficial for workers and machines, and building technologies with an IoT backbone to support the ability to scale in the future. For example, embodiments of the system can track and quantify business productivity including, but not limited to, measuring and tracking employee attitudes regarding happiness, job satisfaction, system use, and home/work balance. In addition, the collected and measured information can be used to measure a business' ecosystem related to money, personnel productivity, customers, orders, and inventory. The collected information can be correlated to, for example, but not limited to, tracking employee metaverse use or lack or use to individual employee and/or company income.

BRIEF DESCRIPTION OF THE DRAWINGS

Non-limiting and non-exhaustive embodiments of the presently disclosed subject matter are described with reference to the following figures, wherein like reference numerals and/or indicia refer to like parts throughout the various views unless otherwise precisely specified.

FIGS. 2A-1 and 2A-2 illustrate detailed Graphical User Interface (GUI) interactive display screen output elements showing interactive displays of the interactive building comfort dashboard according to at least one embodiment of the disclosed subject matter;

FIG. 2A-3 is an example mobile application screenshot embodiment of a settings panel of the comfort dashboard according to at least one embodiment of the disclosed subject matter;

FIG. 2A-3A is an example mobile application screenshot embodiment of an applications settings panel of the comfort dashboard according to at least one embodiment of the disclosed subject matter;

FIG. 2A-4 is an example mobile application screenshot embodiment of an occupant density display panel of the comfort dashboard according to various embodiments of the disclosed subject matter;

FIG. 2A-5 is an example mobile application screenshot embodiment of a lighting control panel of comfort dashboard according to various embodiments of the disclosed subject matter;

FIG. 2A-5A is an example mobile application embodiment of a pre-defined lighting settings panel according to various embodiments of the disclosed subject matter;

FIG. 2A-6 is an example mobile application screenshot embodiment of an air quality display panel of the comfort dashboard according to various embodiments of the disclosed subject matter;

FIG. 2A-6A is an example mobile application embodiment of air quality detailed display panel according to various embodiments of the disclosed subject matter;

FIG. 2A-7 is an example mobile application screenshot embodiment of thermostat control panel of the comfort dashboard according to various embodiments of the disclosed subject matter;

FIG. 2A-7A is an example mobile application embodiment of a detailed thermostat control panel according to various embodiments of the disclosed subject matter;

FIG. 2A-8 is an example mobile application screenshot embodiment of a security control panel of the comfort dashboard according to various embodiments of the disclosed subject matter;

FIG. 2A-8A is an example mobile application embodiment of a detailed safety control panel 1750 according to various embodiments of the disclosed subject matter;

FIG. 2A-9 is an example mobile application embodiment of a desk booking panel 1800 according to various embodiments of the disclosed subject matter;

FIG. 2A-9A is an example mobile application embodiment of a detailed desk booking panel 1850 according to various embodiments of the disclosed subject matter;

FIG. 2A-10 is an example mobile application embodiment of a room booking panel 1900 according to various embodiments of the disclosed subject matter;

FIG. 2A-10A is an example mobile application embodiment of a detailed room booking panel 1950 according to various embodiments of the disclosed subject matter;

FIG. 2D is a functional block diagram showing application and server interfaces in connection with the interactive building comfort dashboard according to at least one embodiment of the disclosed subject matter;

FIG. 3A illustrates a Graphical User Interface (GUI) interactive display screen output showing an interactive building control center screen detailing all sensor positions within a monitored space according to at least one embodiment of the disclosed subject matter;

FIG. 3A-1 illustrates the GUI interactive display screen output of FIG. 3A showing the interactive building control center screen detailing all air quality sensor positions within the monitored space according to at least one embodiment of the disclosed subject matter;

FIG. 3A-2 illustrates individual control elements of the GUI interactive display screen output of FIG. 3A showing an air quality control menu and resulting alternative display details based on selecting different options within the air quality control menu according to at least one embodiment of the disclosed subject matter;

FIG. 3A-3 illustrates further individual control elements of the GUI interactive display screen output of FIG. 3A showing an air quality control menu and resulting alternative display details based on selecting different options within the air quality control menu according to at least one embodiment of the disclosed subject matter;

FIG. 3A-4 illustrates still further individual control elements of the GUI interactive display screen output of FIG. 3A showing an air quality control menu and resulting alternative display details based on selecting different options within the air quality control menu according to at least one embodiment of the disclosed subject matter;

FIG. 3I illustrates the GUI interactive display screen output showing the interactive building control center access log screen of FIG. 3A configured for managing the access to the monitored space according to at least one embodiment of the disclosed subject matter;

FIG. 4A-1 is an example mobile application embodiment of a news article display panel according to various embodiments of the disclosed subject matter;

FIG. 4A-1A is an example mobile application embodiment of an article viewing panel according to various embodiments of the disclosed subject matter;

FIG. 4A-2 is an example mobile application embodiment of a resources display panel according to various embodiments of the disclosed subject matter;

FIG. 4A-2A is an example mobile application embodiment of detailed resources display panel according to various embodiments of the disclosed subject matter;

FIG. 5A illustrates a Graphical User Interface (GUI) interactive display screen output showing an interactive building concierge services according to at least one embodiment of the disclosed subject matter;

FIG. 5A-1 is an example mobile application embodiment of a hotel selection control panel according to various embodiments of the disclosed subject matter;

FIG. 5A-2 is an example mobile application embodiment of a hotel location display according to various embodiments of the disclosed subject matter;

FIG. 5A-3 is an example mobile application embodiment of a restaurant selection control panel according to various embodiments of the disclosed subject matter;

FIG. 5A-4 is an example mobile application embodiment of a restaurant location display according to various embodiments of the disclosed subject matter;

FIG. 6A illustrates a Graphical User Interface (GUI) interactive display screen output showing an interactive building analytics page with multiple analytic windows of building metrics according to at least one embodiment of the disclosed subject matter;

FIG. 6A-1 is an example mobile application embodiment of an insights control panel according to various embodiments of the disclosed subject matter;

FIG. 6A-1A is an example mobile application embodiment of detailed insights control panel according to various embodiments of the disclosed subject matter;

FIGS. 7A to 7F are flowcharts illustrating an integrated building control method in accordance with various embodiments of the disclosed subject matter;

FIG. 8 is a flowchart illustrating a metaverse method step in accordance with various embodiments of the disclosed subject matter;

FIGS. 9A to 9F show images from an executable software program, which, when executed by a processor, operates to provide a metaverse or virtual implementation of a building, facility, and/or office space along with an integrated building control system to control and manage the building, in accordance with various embodiments of the disclosed subject matter; and FIG. 10 is an alternative resolution representation of the high-resolution metaverse office space representation of FIG. 9A, which here is shown as a wireframe representation of the office space, in accordance with various embodiments of the disclosed subject matter.

DETAILED DESCRIPTION

The presently disclosed subject matter pertains to an integrated building and office automation control system and method. The system and method are implemented in an integrated software program that, when executed, configures a special purpose computer monitoring and control system to use and control a variety of disparate hardware systems, sensors, application programming interfaces (APIs), and controllers to monitor and control a building and/or office space.

In particular, some embodiments can comprise a graphical user interface (GUI) accessible through a content server platform, which can be hardware or a combination of both hardware and software and can be integrated with or independent from the content server platform. In addition, other embodiments can comprise a virtual reality implementation of the building and/or office space and the integrated building and office automation control system and method in a so-called "metaverse" implementation. Specifically, the virtual reality implementation models the building and/or office space physical, environmental characteristics, and the occupants.

Figure 1:
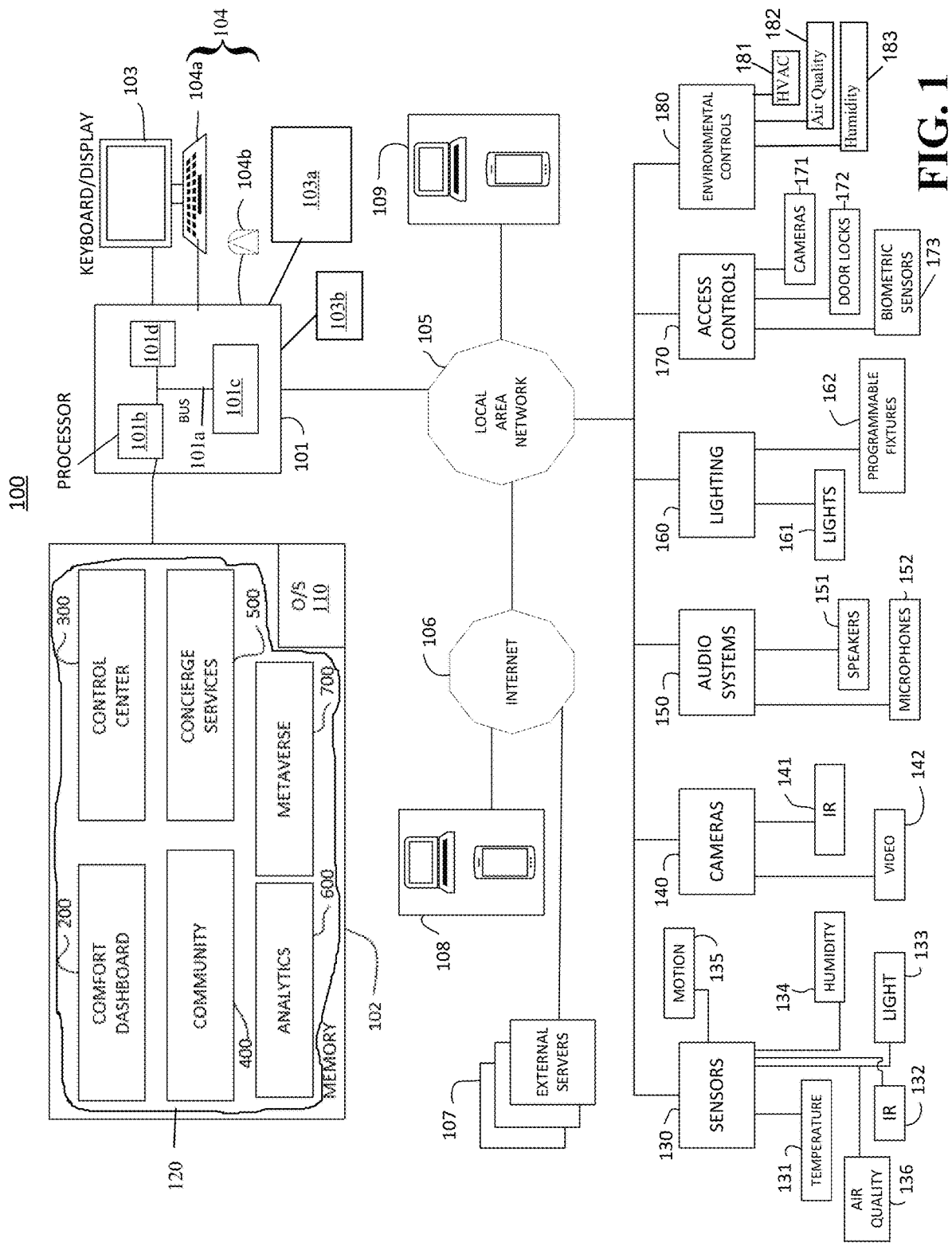
FIG. 1 is a system-level block diagram showing an integrated building control system, in accordance with various embodiments of the disclosed subject matter.

FIG. 1 is a system-level block diagram showing an integrated building control system, in accordance with various embodiments of the disclosed subject matter. For example, FIG. 1 shows a system-level block diagram of an integrated building and office automation control system in accordance with various embodiments. Referring now to FIG. 1, an integrated building and office automation control system 100 can include a processor 101 operatively coupled to a memory 102 as well as to a display 103 and a user input device 104 such as, for example, a keyboard 104a and a mouse 104b. The processor 101 includes a bus 101a to which are connected a microprocessor 101b, a memory 101c, and an input/output 101d and which are used to communicatively connect the processor 101 to the memory 102, the display 103 and the user input device 104. While the above-described elements are shown in FIG. 1 as single elements, each of the integrated building and office automation control system 100 elements can be implemented as multiple elements in other embodiments.

Although shown in FIG. 1 as being physically connected to the processor, the user input device(s) can also be wirelessly connected to the processor 101. In addition, although not shown in the drawing for clarity, the user input device 104 can further include, a joy stick, a light pen, a track ball, a microphone, a camera, an extended reality (XR) input devices such as, an augmented reality (AR) or a virtual reality (VR) or a mixed reality (MR) input device including smart/VR glasses, smart/VR goggles, and gesture/motion controls. The display 103 can be an interactive display, which not only outputs display information including graphical, photographic, video, and text information and that accepts user input via the keyboard 104a and a pointing device, such as the mouse 104b, but also, can be a touchscreen or other interactive display screen that can accept user inputs through a physical contact, for example, by the user's finger or a stylus, or an interaction, for example, by a light pen. The integrated building and office automation control system and method 100 can be configured to provide the operations described herein independently or in combination within one or more interior regions of the building or office being controlled, for example, without limitation, a lighting level within a particular interior region, or temperature, humidity, access control, or audio at independent individual settings within each of the one or more interior regions. Conversely, the integrated building and office automation control system and method 100 can be configured to provide the operations described herein collectively, that is, with common settings, within a group of two or more interior regions of the building or office being controlled, or collectively for all interior regions.

In various embodiments of the system in FIG. 1, an auxiliary display 103a can be implemented using a special film such as, for example, but not limited to, a back projection film or a glass projection film, on a window or piece of glass and a projector 103b that can project the metaverse office space implementation onto the auxiliary display 103a and that can be used to control and interact with the overall system through the user input device 104 in both the metaverse office space and the real office space. Like the display 103, the auxiliary display 103a can be an interactive, that is, touchscreen, display, which not only outputs display information including graphical, photographic, video, and text information and that accepts user input via the keyboard 104a and a pointing device, such as the mouse 104b, but also, can be a touchscreen or other interactive display screen that can accept user inputs through a physical contact, for example, by the user's finger or a stylus, or an interaction, for example, by a light pen. The auxiliary display 103a can be implemented as a touchscreen using for example, but not limited to, a touch film or touch foil, such as Pro Touch™ from Screen Solutions International located in Rocklin, Calif. Regardless of whether the display 103 or the auxiliary display 103a are being used to display the meteverse office space, a real world video window can be opened in the display 103 or the auxiliary display 103a, to enable a video call between the user while in the metaverse and a caller. Similarly, the real world video window can also be of a monitored area, so the user can view the real world location from the metaverse.

In various embodiments, the processor 101 can be a stationary electronic device (such as, for example, a server, workstation, or desktop computer) or a portable electronic device (such as, for example, a laptop, tablet, smartphone, etc.). Processor 101 further includes the bus 101a connecting the processor 101 and the memory 102, the display 103, the user input device 104, the I/O interface 101d, and one or more communication interfaces. Generally, the I/O interface 101d is coupled to an I/O device using a wired or wireless connection via a local area communications network, and the local area communication interface is connected to an antenna (not shown) and/or coupled to a network (such as the Internet) using a wireless connection. The bus 101a is a communication system that transfers data between the processor 101, the memory 102, the user input device 103, the I/O interface 101d, and the communication interfaces, as well as other components. A power connector may also be coupled to the bus 101a and to a power supply (not shown). The processor 101 can include one or more general-purpose or application-specific microprocessors 101b to perform computation and control functions for the processor 101. The processor 101 can include a single integrated circuit, such as a micro-processing device, or multiple integrated circuit devices and/or circuit boards working in cooperation to accomplish the functions of the processor 101. In addition, the processor 101 can execute computer programs, such as an operating system 110, software application modules 200, 300, 400, 500, 600, 700, or data stored within the memory 102.

The memory 102 can store information and instructions for execution by the processor 101. The memory 102 can also contain various components for retrieving, presenting, modifying, and storing data. For example, the memory 102 can store software application modules, which are electronic files that contain executable software program instructions that provide special purpose functionality, so that, if executed by the processor 101, the executing software application modules configure the computer to be a special purpose computer to perform the specific algorithm functionality of the software application modules. The software application modules can include an operating system 110 that provides operating system functionality for the processor 101. The software application modules can also include special purpose software application modules or instructions that make up an integrated building and office automation control system software application 120 (for example, software application modules 200, 300, 400, 500, 600, and 700) to provide the building and office control functions of the integrated building and office automation control system 100 described herein, as well as other applications that cooperate with the building and office control instructions. For example, the memory 102 can include executable software instructions and data downloadable for execution by the local user devices 109 and the remote devices 108 such as, for example, but not limited to, a smartphone application (for example, an "app") via Amazon Web Services® cloud. Generally, the memory 102 can include a variety of non-transitory computer-readable media that can be accessed by the processor. In the various embodiments, the memory 102 can include a volatile medium, a nonvolatile medium, both volatile and nonvolatile mediums, a removable and non-removable medium, a communication medium, and a storage medium. The communication medium can include computer readable instructions, data structures, program modules, or other data in a modulated data signal such as a carrier wave or other transfer mechanism, and can include any other form of an information delivery medium known in the art. The storage medium can include a volatile memory (for example, random access memory ("RAM"), dynamic RAM ("DRAM"), static RAM ("SRAM"), synchronous dynamic random access memory ("SDRAM")), or a non-volatile memory (for example, read only memory ("ROM"), flash memory, cache memory, programmable read-only memory ("PROM"), erasable programmable read-only memory ("EPROM"), electrically erasable programmable read-only memory ("EEPROM")), registers, hard disk, a removable disk, a compact disk read-only memory ("CD-ROM"), or any other form of a storage medium known in the art.

Display 103 can be a liquid crystal display (LCD) of a computer, server, laptop, a tablet, or a similar device. Generally, the user input device 104 is a device configured to provide input to the processor 101, and is operably connected to the processor 101 using either a wireless connection or a wired connection. In some embodiments, the user input device 104 can include a local processor coupled to a communication interface that is configured to communicate with the processor 101 using the wired or wireless connection. For example, the user input device 104 can be an input device such as a touchscreen for display 103, a touchpad, a keypad or keyboard, etc. The display 103 can also include an audio output device, such as one or more audio speakers. The processor 101 can transmit an audio signal to a speaker (for example, an I/O device) through an audio interface (for example, the I/O interface 101d), which in turn outputs audio effects. In still other embodiments, the display 103 and the user input device 104 can be integrated and be wearable by the user. For example, this integrated display 103 and user input device 104 can include, but is not limited to, a pair of extended reality XR glasses or goggles with associated input devices, such as handheld controllers, data gloves, and motion trackers to track a user's eye or physical movements.

The processor 101 can include the I/O interfaces configured to transmit and/or receive data from I/O devices, which may be Internet of Things (IoT) devices, via a local area network 105. For example, in various embodiments, the processor 101 can be connected and provided in communication with a variety of building and office I/O devices including sensors 130, cameras 140, audio system 150, lighting 160, access controls 170, and environmental systems and controls 180. The I/O interfaces enable connectivity between the processor and I/O devices by encoding data to be sent from the processor to the I/O devices, and decoding data received from the I/O devices for the processor. Generally, data can be sent over wired and/or a wireless connections, such as, for example, local area network 105. In various embodiments, the local area network 105 can include one or more wireless communications interfaces, coupled to one or more antennas, such as WiFi, LiFi, cellular, Bluetooth®, cloud-based interface, or similar platforms. The I/O interfaces can also include one or more wired communications interfaces, such as USB or Ethernet. WiFi and LiFi are both wireless communication technologies to transmit data and position information between devices. WiFi uses wireless radio frequencies and LiFi uses light from LEDs, which enables LiFi connections to occur at speeds from 300 Mbps to 100+ Gbps, which are approximately 100 times faster than WiFi. Because LiFi uses light, it does not create a radio signature, but can be used to provide secure communications and wireless networks. This is because the area communications can occur can be explicitly defined by, for example, which light sources are to be used and their area of coverage and physical walls or partitions, since unlike WiFi radio signals light does not go through walls, the LiFi signal is contained within the space defined by the walls or partitions. In addition, special, proprietary hardware is needed to receive the LiFi signal, so even if unauthorized personnel are in a space with the LiFi signal, they will not only not be able to detect it, they will not be able to receive it.

The integrated building and office automation control system 100 can include, or be operatively coupled to, a variety of sensors 130 deployed throughout the building or office being controlled. An exemplary layout of the variety of sensors 130 is best seen in and described in relation to FIG. 3A (see, for example, item 301). Returning to FIG. 1, each of the sensors 130 can be provided in electronic or optical communication with the processor 101 via the local area network 105, with intervening communications subnetworks or adapter circuits and processes interposed there between as required. For example, the sensors 130 can include multiple temperature sensors 131 configured to detect and output an indication of temperature as measured in Fahrenheit or Celsius, multiple infrared (IR) sensors or detectors 132 configured to detect and output a signal indicating heat emanation, multiple lighting sensors 133 configured to determine an illumination level, such as a lighting intensity measured in foot-candles, lumens, or lux, humidity sensors 134 configured to detect and to output an indication of a relative humidity level, multiple motion sensors 135 configured to detect motion within the building or office being controlled, and multiple air quality sensors 136 configured to detect levels of gases, fumes, and odors within the ambient atmosphere, including, for example, but not limited to, detecting leaks of hazardous gases and materials, or the presence of viruses and/or pathogens. The air quality sensors 136 can include, but are not limited to, one or more particulate sensors and/or one or more air quality monitors from Piera Systems of Mississauga, Ontario, Canada. Similarly, the building/facility water quality can be measured using a Water Quality Multi Parameter Sensor from YSI Inc. of Yellow Springs, Ohio or from Seametrics of Kent, Wash. and controlled using a specially programmed computer such as, for example, but not limited to, a Raspberry Pi computer from Raspberry Pi of Cambridge, England, United Kingdom.

The integrated building and office automation control system 100 can include, or be operatively coupled to, a variety of cameras 140 deployed throughout the building or office being controlled. Each of the cameras 140 can be provided in electronic or optical communication with the processor 101 via the local area network 105, with intervening communications subnetworks or adapter circuits and processes interposed there between as required. For example, the cameras 140 can include multiple infrared (IR) cameras 141 and digital video cameras 142. The video cameras 140 can be in a fixed, non-moving position as well as being moveable about a fixed point of rotation and able to swivel/rotate in the x and y planes, that is, left and right and up and down. The cameras can also be configured to be motion activated, so if they detect an object in motion, they can automatically move the camera and/or lens to point the lens in the direction in which the motion was detected. In addition, the cameras can be configured to automatically track the object as it moves across the camera's motion detectable field of view.

The local area network 105 can also be coupled to a plurality of local user devices 109 for transmitting and receiving information to and from the processor 101 via the local network 105. The local area network 105 can also be coupled to one or more external servers 107 and to a plurality of remote user devices 108 via an external network 106 such as, for example, the Internet and World Wide Web, for transmitting and receiving information to and from the processor 101 via the local network 105. Accordingly, each local user device 109 and remote user device 108 may include one or more wireless communications interfaces, coupled to one or more antennas, such as WiFi, LiFi, cellular, Bluetooth®, cloud-based interface, or similar platforms, and can include one or more wired communications interfaces, such as USB or Ethernet, for communication via the local area network 105. The local user device 109 and the remote user device 108 can be a stationary electronic device (such as, for example, a server, a workstation, or a desktop computer) or a portable electronic device (such as, for example, a laptop, a tablet, a smartphone, or a pair of smart glasses or goggles).

The integrated building and office automation control system 100 can include, or be operatively coupled to, one or more audio systems 150 provided in electronic or optical communication with the processor 101 via the local area network 105. The audio systems 150 can also include one or more audio output devices, such as one or more audio speakers 151, and one or more audio input devices, such as one or more microphones 152, both of which are deployed throughout the building or office being controlled. The processor 101 can transmit, or cause to be transmitted from an external network or system, an audio signal to one or more of the speakers 151 through an audio interface, which in turn outputs audio soundwaves including voice, music, or sound effects including, for example, but not limited to, white noise, running water sounds, wave sounds, and rain sounds. Similarly, the processor 101 can receive, or cause to be received through the one or more microphones 152, sound including, for example, ambient sounds, voice communications, equipment sounds, occurring in the building or office being controlled. The integrated building and office automation control system and method 100 can be configured to control each of the speakers 151 and microphones 152 independently or in combination within one or more interior regions of the building or office being controlled, for example, without limitation, audio content or volume, at independent individual settings within each of the one or more interior regions, or collectively, that is, with common settings, within a group of two or more interior regions of the building or office being controlled, or collectively for all interior regions.

The integrated building and office automation control system 100 can include, or be operatively coupled to, one or more lighting systems 160 provided in electronic or optical communication with the processor 101 via the local area network 105. The lighting systems 160 can include controllable lights 161 and programmable lighting fixtures 162 deployed throughout the building or office being controlled. The processor 101 can transmit, or cause to be transmitted from an external network or system, control signals to one or more of the lights 161 or programmable lighting fixtures 162 to control light output such as intensity, luminosity, color, hue, or pulsation. The integrated building and office automation control system and method 100 can be configured to each of the lights 161 or programmable lighting fixtures 162 independently within one or more interior regions of the building or office being controlled, for example, without limitation, a lighting level within a particular interior region, at independent individual settings within each of the one or more interior regions, or collectively with common settings, within a group of two or more interior regions of the building or office being controlled, or collectively for all interior regions. In addition, the controllable lights 161 and programmable lighting fixtures 162 can be connected to the sensors 130 the processor 101 of the integrated building and office automation control system and method 100 can be configured as a special purpose processor (that is, computer) by the execution of software code to control the light systems 160 using inputs from the sensors 130. For example, this can include, but is not limited to, turning the lights on and off in the building or the office being controlled in specific locations, based on detected movement by the motion sensors 135. This can include, but is not limited to, turning the lights on and off and/or dimming or brightening the lights in one or more of the interior regions based on detecting motion, for example, a person walking into a detection range of the motion sensor 135 in a given one of the interior regions, or not detecting motion over a predetermined time period. The light systems 160 can include, but are not limited to, lighting systems from Intelligent Lighting Creations in Arlington Heights, Ill.

Furthermore, the processor 101 can be configured to adjust the interior region lighting based on the outside lighting level and time of day. However, in at least one embodiment, the interior region lighting adjustment may be programmed to not follow the outside sunlight level to avoid disorientation of people present in the interior region. Furthermore, the processor 101 can be configured to automatically adjust interior region window shade settings in smart windows to either partially or completely open or close the shades based on individual and/or combined variables, including, but not limited to, interior lighting levels, outside light levels, times of year, times of day, window orientations, and inside and/or outside temperatures. For example, because window orientations in a building may not be exactly on perfect East, West, North, and South alignments with the sun, the processor 101 can be configured to adjust the interior region window shade settings based on the actual orientation of each window in combination with the one or more of the above described other variables.

For example, for offices with Eastern facing windows, the processor 101 can be configured to automatically adjust the shades to different levels of openness based on the time of day, such as during the time after sunrise when the sun is shining directly into the offices through the eastern facing windows. As some specific examples, during winter months, the processor 101 can be configured to automatically adjust the level that the shades in these offices with eastern facing windows to be fully open from sunrise to a predetermined time before the facility is scheduled to open to help warm up the offices each morning. Alternatively, in the summer, the processor 101 can be configured to automatically adjust the eastern facing windows to be fully closed from sunrise to a predetermined time before the facility is scheduled to open to help keep the offices cool. In those months between winter and summer, the processor 101 can be configured to automatically adjust the eastern facing windows to be partially open as well as the upward angle or downward angle of slats in shades with slats. As a further example of one embodiment of the operation of the system, Table A below shows a partial logic diagram for how the processor 101 can be configured to control the window shades during four specific time periods over a 24 hour day in the winter, based on the above described conditions. Although not completely described here or in Table A, similar logic can be used to control window shades on windows facing in any direction during any season of the year. Of course, the level of openness of the shades will depend on the time of day, angle of sunlight hitting the windows, time of year, as well as the other factors described above. For ease of illustration, the logic flow below assumes that the sun rises exactly at a 90° angle to the Eastern facing windows in the building and the building is a perfect right angle square or rectangle with Northern facing windows and Southern facing windows being at 90° angles to the Eastern facing windows and Western facing windows. For the purposes of understanding the logic table in Table A, an outside slat edge of a slatted shade faces toward an inside face of a window to which it is mounted. Likewise, an inside slat edge of a slatted shade faces into a room and away from the inside face of a window to which the shade is mounted. In this exemplary embodiment, the shade slats are horizontal to the ground. Slightly different logic would be used for blinds with vertically oriented slats.

TABLE A

| Window Orientation | Winter - Sunrise - Office Opening | Winter - Office Opening to ≈ 12 pm | Winter - "Afternoon" ≈ 12 pm-5 pm | Winter - "Night" ≈ 5 pm - Sunrise the next morning |
|---|---|---|---|---|
| Eastern facing | 1. If solid shade, fully raised, so window is fully open to let in the sunlight and solar energy. 2. If slatted shade, either fully raised and open as with solid shade, OR fully lowered with the slats open horizontally at 90° relative to the window to permit a maximum amount of sunlight to enter the office. 3. The slatted shades, if not raised, can also have the angle of their slats continually adjusted over time to follow the rising sun, for example, the | 1. If solid shade, fully raised, so window is fully open to let in the sunlight and solar energy. 2. If slatted shade, either fully raised and open as with solid shade, OR fully lowered with the outside slat edges continually adjusted upwardly as the sun rises in the sky to permit a maximum amount of direct light to enter and help warm each office. | 1. If solid shade, fully or partially lowered to minimize heat loss. 2. If slatted shade, either fully or partially lowered and open as with solid shade, OR fully lowered with the outside slat edges continually adjusted downwardly as the sun is moving in the sky to permit a maximum amount of indirect light to enter, but minimize heat loss from each office. | 1. If solid shade, fully lowered, so window is fully closed to minimize heat loss. 2. If slatted shade, fully lowered and slats closed vertically with the inside slat edges adjusted upwardly relative to the window to minimize heat loss from the office. |

TABLE A-continued

| Window Orientation | Winter - Sunrise - Office Opening | Winter - Office Opening to ≈ 12 pm | Winter - "Afternoon" ≈ 12 pm-5 pm | Winter - "Night" ≈ 5 pm - Sunrise the next morning |
|---|---|---|---|---|
| | outside slat edges (that is, the edges adjacent the window glass) can be continually adjusted upwardly as the sun rises in the sky to permit a maximum amount of direct light to enter and help warm each office. | | | |
| Western facing | 1. If solid shade, fully lowered, so window is fully closed to minimize heat loss.<br>2. If slatted shade, fully lowered and slats closed vertically with the inside slat edges adjusted upwardly relative to the window to minimize heat loss from the office. | 1. If solid shade, fully or partially raised, so window is fully or partially open to maximize the indirect light from the outside.<br>2. If slatted shade, fully or partially raised and slats either closed or fully or partially raised. If the slats are fully open then they can be open horizontally at 90° relative to the window, or, if the slats are partially open then the outside slat edges can be adjusted upwardly relative to the window to minimize heat loss from and maximize the outside light entering the office. The outside slat edges can be continually adjusted throughout the morning to follow the sun as it rises in the sky to permit indirect light to enter while still minimizing heat loss. | 1. If solid shade, fully or partially open to maximize the amount of outside light and minimize heat loss.<br>2. If slatted shade, either fully or partially lowered and open as with solid shade, OR fully lowered with the outside slat edges continually adjusted downwardly as the sun is moving in the sky to permit a maximum amount of indirect light to enter, but minimize heat loss from each office. | 1. If solid shade, fully lowered, so window is fully closed to minimize heat loss.<br>2. If slatted shade, fully lowered and slats closed vertically with the inside slat edges adjusted upwardly relative to the window to minimize heat loss from the office. |
| Northern facing | 1. If solid shade, fully lowered, so window is fully closed to minimize heat loss.<br>2. If slatted shade, fully lowered and slats closed vertically with the inside slat edges adjusted upwardly relative to the window to | 1. If solid shade, fully or partially raised, so window is fully or partially open to maximize the indirect light from the outside.<br>2. If slatted shade, fully or partially raised and slats either closed or fully or partially raised. If the slats are | 1. If solid shade, fully or partially open to maximize the amount of outside light and minimize heat loss.<br>2. If slatted shade, either fully or partially lowered and open as with solid shade, OR fully lowered with the outside slat edges | 1. If solid shade, fully lowered, so window is fully closed to minimize heat loss.<br>2. If slatted shade, fully lowered and slats closed vertically with the inside slat edges adjusted upwardly relative to the |

TABLE A-continued

| Window Orientation | Winter - Sunrise - Office Opening | Winter - Office Opening to ≈ 12 pm | Winter - "Afternoon" ≈ 12 pm-5 pm | Winter - "Night" ≈ 5 pm - Sunrise the next morning |
|---|---|---|---|---|
| | minimize heat loss from the office. | fully open then they can be open horizontally at 90° relative to the window, or, if the slats are partially open then the outside slat edges can be adjusted upwardly relative to the window to minimize heat loss from and maximize the outside light entering the office. The outside slat edges can be continually adjusted throughout the morning to follow the sun as it rises in the sky to permit indirect light to enter while still minimizing heat loss. | continually adjusted downwardly as the sun is moving in the sky to permit a maximum amount of indirect light to enter, but minimize heat loss from each office. | window to minimize heat loss from the office. |
| Southern facing | 1. If solid shade, fully lowered, so window is fully closed to minimize heat loss. 2. If slatted shade, fully lowered and slats closed vertically with the inside slat edges adjusted upwardly relative to the window to minimize heat loss from the office. | 1. If solid shade, fully or partially raised, so window is fully or partially open to maximize the indirect light from the outside. 2. If slatted shade, fully or partially raised and slats either closed or fully or partially raised. If the slats are fully open then they can be open horizontally at 90° relative to the window, or, if the slats are partially open then the outside slat edges can be adjusted upwardly relative to the window to minimize heat loss from and maximize the outside light entering the office. The outside slat edges can be continually adjusted throughout the morning to follow the sun as it rises in the sky to permit indirect light to enter while still | 1. If solid shade, fully or partially open to maximize the amount of outside light and minimize heat loss. 2. If slatted shade, either fully or partially lowered and open as with solid shade, OR fully lowered with the outside slat edges continually adjusted downwardly as the sun is moving in the sky to permit a maximum amount of indirect light to enter, but minimize heat loss from each office. | 1. If solid shade, fully lowered, so window is fully closed to minimize heat loss. 2. If slatted shade, fully lowered and slats closed vertically with the inside slat edges adjusted upwardly relative to the window to minimize heat loss from the office. |

TABLE A-continued

| Window Orientation | Winter - Sunrise - Office Opening | Winter - Office Opening to ≈ 12 pm | Winter - "Afternoon" ≈ 12 pm-5 pm | Winter - "Night" ≈ 5 pm - Sunrise the next morning |
|---|---|---|---|---|
| | | minimizing heat loss. | | |

In addition to controlling the shades, if some or all of the windows can be automatically opened, the integrated building and office automation control system 100 can control the opening and closing of those windows to control the amount of sun light that enters through the windows and the heat loss or gain in the room in which the window(s) are located.

The integrated building and office automation control system 100 can include, or be operatively coupled to, one or more access control systems 170 provided in electronic or optical communication with the processor 101 via the local area network 105. The access control systems 170 be can operatively coupled to the cameras 140, speakers 151 and microphones 152 located adjacent access doors and can also include controllable or programmable access control devices such as, without limitation, access control cameras 171, electronically actuated door locks 172 having open/unlocked and closed/locked states, and biometric entry devices 173 such as, for example, retina-scanning, iris-scanning, fingerprint scanning, palm scanning, or other such physical or biological access control devices. The access control system 170 can include, but is not limited to, a Kisi cloud based access control system from Kisi Inc. of Brooklyn, N.Y. or an Openpath keyless door access control system from Openpath Security, Inc. of Culver City, Calif. In addition, these access control systems 170 can be implemented using multifactor authentication either with or without the access control cameras 171 and the biometric entry devices 173. The processor 101 can transmit, or cause to be transmitted from an external network or system, control signals to one or more of the access control systems 170 to enable entry, disable entry, lock, or selectively unlock or lock per individual person or for a predefined group of persons. The integrated building and office automation control system and method 100 can be configured to control each of the access control devices (171, 172, 173) of the access control systems 170 independently within one or more interior regions of the building or office being controlled, individually for each of the one or more interior regions, or collectively with common settings, within a group of two or more interior regions of the building or office being controlled, or collectively for all interior regions (for example, full building or office lockdown).

The integrated building and office automation control system 100 can include, or be operatively coupled to, environmental controls 180 provided in electronic or optical communication with the processor 101 and the sensors 130 via the local area network 105. The environmental controls 180 can include one or more controllable or programmable devices for controlling various environmental aspects of interior regions of the building or office being controlled, such as, for example, temperature or heating, cooling or air conditioning, fresh or recirculating air ventilation, and humidity. The environmental controls 180 can include, or be components of, a Heating, Ventilation, and Air Conditioning (HVAC) control system 181, an air quality control system 182, and a humidity control system 183 deployed throughout the building or office being controlled. The processor 101 can transmit, or cause to be transmitted from an external network or system, control signals to one or more of the environmental controls 180 to measure, control, adjust, and/or regulate environmental aspects of interior regions of the building or office being controlled, such as, for example, temperature or heating, cooling or air conditioning, fresh or recirculating air ventilation, and humidity. The integrated building and office automation control system and method 100 can be configured to control each of the environmental controls 180 independently within one or more interior regions of the building or office being controlled, for example, without limitation, independent individual settings within each of the one or more interior regions, or collectively with common settings, within a group of two or more interior regions of the building or office being controlled, or collectively for all interior regions. For example, the processor 101 can be configured to adjust HVAC settings based on interior region people density, for example, according to a heat map generated from measurements obtained by the temperature sensors 131. In addition, in various embodiments, processor 101 can determine, using biometric temperature sensing, when an individual gets too hot or too cold, and then adjust a local HVAC temperature set point for HVAC output in proximity to the individual, so as to avoid affecting HVAC levels for other people within the same or shared interior region.

In various embodiments, the HVAC system can include one or more disinfection systems including, for example, but not limited to, at least one Ultra Violet C (UVC) light disinfection system that can be installed at a height of 7 feet or more above the floor level of the physical office space to disinfect the upper airways ambient air in the physical office space and at least one UVA and/or UVB light disinfection system that can be installed inside the HVAC system air handler portion to disinfect the air as the air passes through the HVAC system. The UVC light disinfection system can also include sensors to track the dispersion of the UVC light. In addition to the UV light disinfection systems, one or more chemical disinfection systems can be installed including, but not limited to, an $H_2O_2$ (hydrogen peroxide) (DHP™) gas disinfection system to kill mold & viruses in the air and on all surfaces. The dry $H_2O_2$ gas disinfection system can be, for example, but not limited to, a Blade model, a Sphere model, and/or a Sentry model Synexis BioDefense System from Synexis Biodefense Systems of Overland Park, Kans., or an Air Disinfection Biosecurity unit from Pathogen Focus of Henderson, N.C. The UVC and the $H_2O_2$ gas disinfection systems can each be used while the office space is occupied.

In various embodiments, the memory 102 can include executable software application modules embodying programmed instructions that make up the integrated building and office automation control system software application 120 of the integrated building and office automation control system and method 100, which, when executed by the processor 101, configures the processor as a special purpose processor to perform operations associated with the integrated building and office automation control system software application 120. The integrated building and office automation control system software application 120 includes some or all of a comfort software application module 200, a control center software application module 300, a community interaction software application module 400, a concierge services software application module 500, an analytics software application module 600, and a metaverse software application module 700, which is a virtual implementation of the integrated building and office automation control system software application 120, as shown in FIG. 1, and as described in detail herein below. In addition to the above discussed software application modules, additional executable software application modules can be included to incorporate additional functionality to the integrated building and office automation control system and method 100.

Comfort Dashboard

Figure 2A:
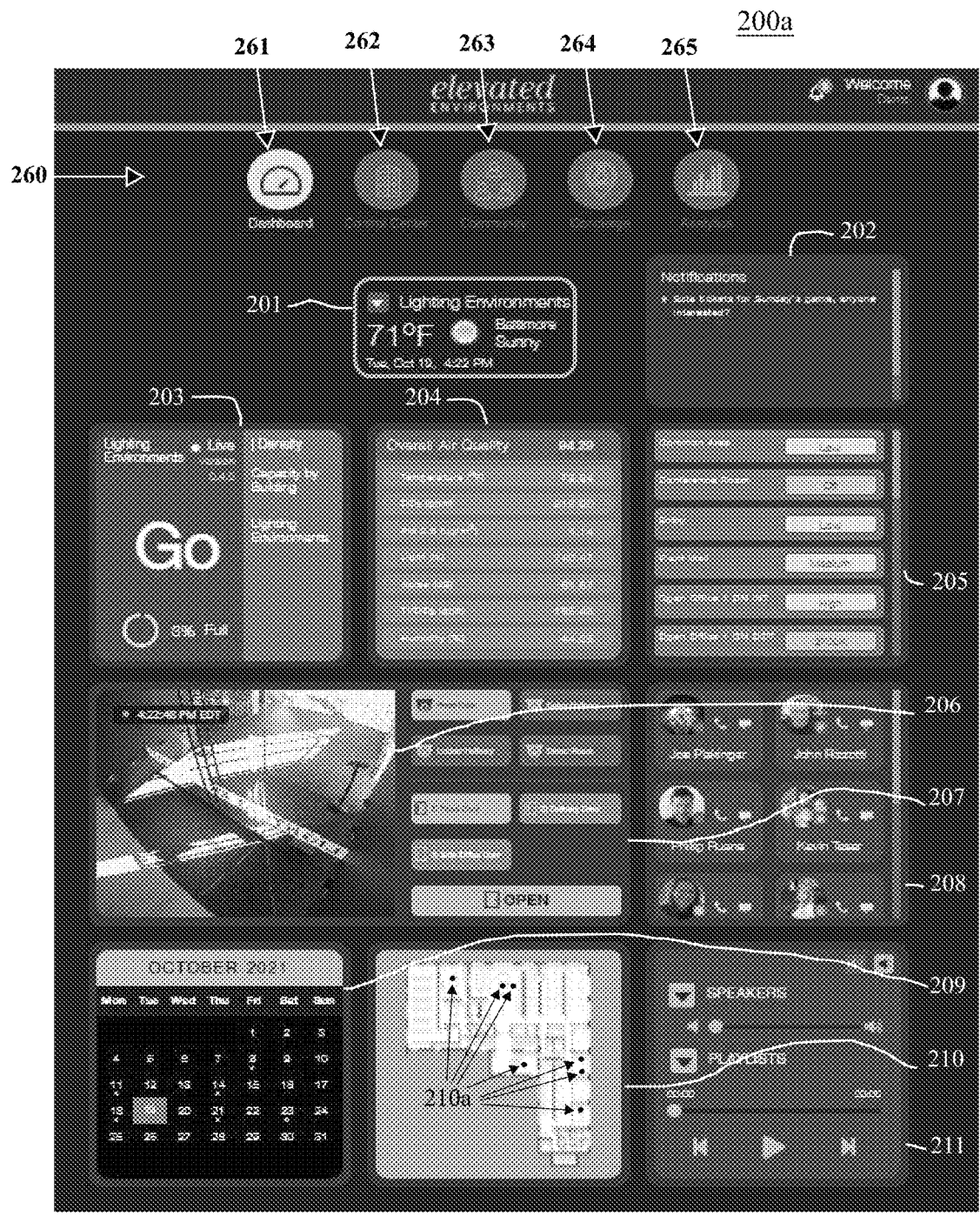
FIG. 2A illustrates a Graphical User Interface (GUI) interactive display screen output showing an interactive building comfort dashboard according to at least one embodiment of the disclosed subject matter.
Figures 1, 2A:
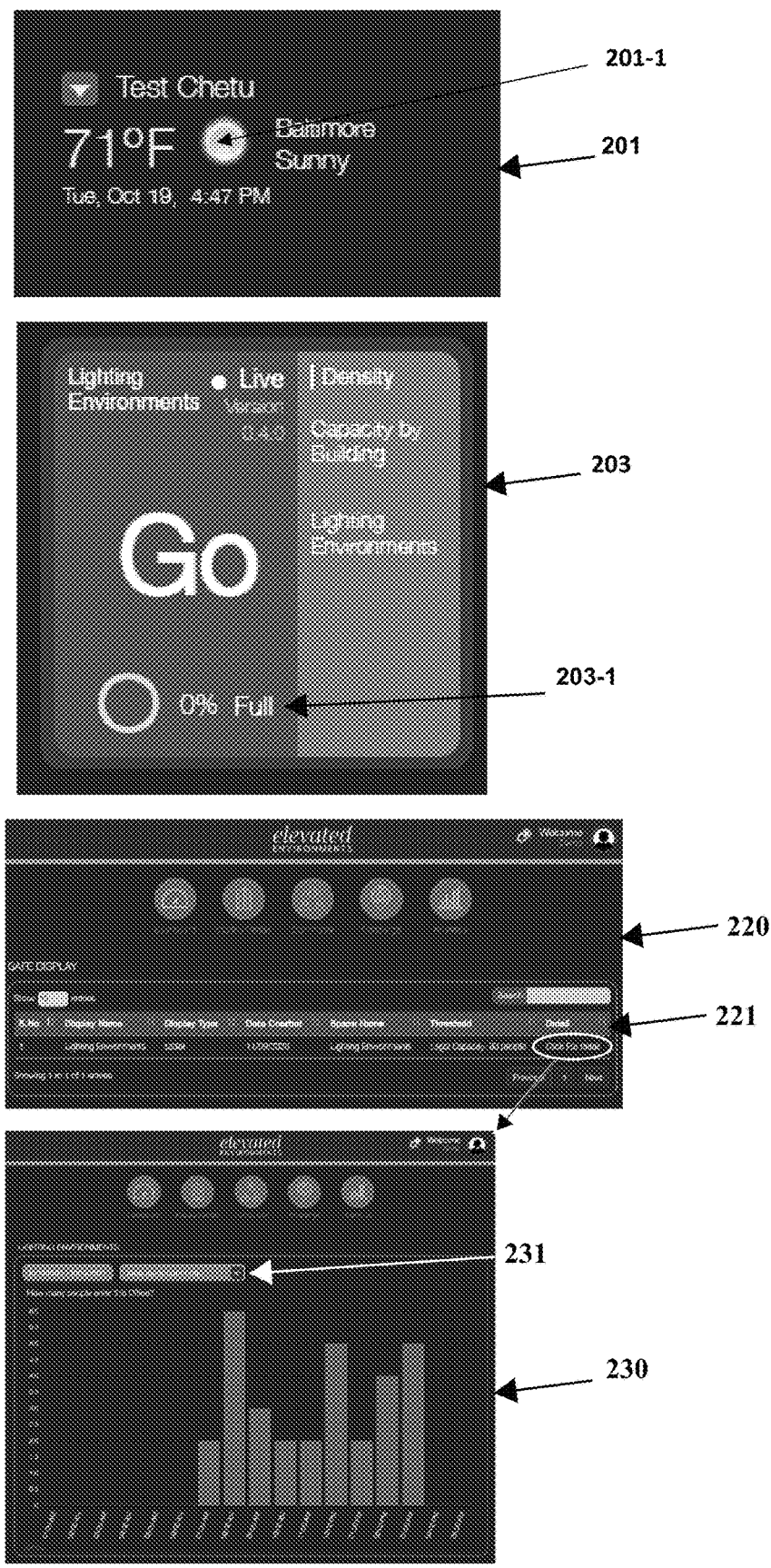

FIG. 2A is a Graphical User Interface (GUI) interactive display screen output generated by the comfort software application module 200 showing an interactive building comfort dashboard 200a with multiple information and control display panels for various systems, areas, and environmental conditions of the building or office being controlled according to at least one embodiment of the disclosed subject matter. In general, each of the information and control display panels provide information on a single environmental aspect, element, or location of or provide business-specific or local information for the building or office being controlled. Referring now to FIG. 2A, the comfort dashboard 200a can include a local weather display panel 201, a notifications display panel 202, an occupant density display panel 203, an overall air quality display panel 204, a room lighting control and status display panel 205, a remote camera display panel 206, an interactive access control and status display panel 207, an interactive community contact display panel 208, a calendar display panel 209, an interior region floor map display panel 210, and an audio control display panel 211. The local weather display panel 201 can be connected to various weather channels or reporting systems including, but not limited to, broadcast channels and a dedicated, onsite building weather station. An example notifications display panel 202 of the comfort dashboard 200a is shown in FIG. 2A-1. As shown in FIG. 2A-1, the notifications display panel 202 can include an indication of "Go/No Go" status, a numeric (for example, "40%" occupied) and/or graphical indication (for example, partially filled circle) of occupant density in the space, and a system version number. An example mobile application screenshot embodiment of a notifications display panel 202 of the comfort dashboard 200a is shown in FIG. 2E, as shown in FIG. 2E, the notifications display panel 202 can output text messages such as an Instagram status message ("Joe liked your photo") and system-generated messages output by the processor 101 (for example, "IT Closet Temperature Changed to 70° F./Current Set 67° F." and "Erin's office Humidity is 25% below the set limit/Current limit 40%-60%"). A row of comfort dashboard options 260 includes a dashboard button 261, a control center button 262, a community button 263, a concierge button 264, and an analytics button 265. As seen in FIG. 2A, the dashboard button 261 is highlighted to indicate that it has been selected and the panels 201-211 being displayed are related to the dashboard button 261.

In various embodiments, the processor 101 generates the comfort dashboard 200a using an inline frame format tagging such as, for example, iFrame integration, to embed HTML documents and information received from the external servers 107 and the sensors 130, cameras 140, audio system 150, lighting 160, access controls 170 and environmental controls 180 to provide the display panels 201 to 211, for example, as separate windows of an output HTML document or a web page such as the comfort dashboard 200a. The display panels output to the display 103 of FIG. 1, such as the exemplary display panels 201 to 211 as shown in FIG. 2A, can vary based on the status or control information requested by a user.

For example, if the user is: 1) a supervisory network administrator, the user can have unrestricted access to all of the component software application modules and features within each software application module of the comfort dashboard 200a for some or all of the building or office being controlled; 2) a non-supervisory network administrator, the user can also have unrestricted access, or slightly restricted access, to all of the component software application modules and features within each software application module for some or all of the building or office being controlled; 3) a business/building owner, can have unrestricted or slightly restricted access, to all of the component software application modules and features within each software application module for their office space only; 4) an employee, the user can have restricted access that can be specified by the supervisory network administrator, the network administrator, and/or the business/building owner for the space in which the user is located; and 5) a guest or visitor, the user can have very restricted access that can be specified by the supervisory network administrator, the network administrator, and/or the business/building owner for the space in which the user is located. Specifically, some or all of the features in one or more of the display panels in the comfort dashboard 200a can be set as "view only," so the user with this level of access can only see or view the information in the display panel or display panels with this access level, but not interact with or control the information. Alternatively, the user can also be given restricted use access, which is where the user, in addition to viewing, may be able to exercise some control over some or all of the information and features in the display panel or display panels with this access level. Still further, the user can have their access to one or more of the display panels blocked all together. In general, if a feature is set as view only for a user, some or all of the control options will be disabled, which generally can be shown by "graying-out" or "blanking-out" those features to indicate that they are not available to the user. Similarly, if features are set as restricted use, only those features not available to the user will be "grayed-out" or "blanked-out." Similarly, if features are set as blocked features, generally, they will be blacked-out (that is, removed, covered or obscured in the display panel), so the user cannot even see that they are available.

In addition, the comfort dashboard 200a of FIG. 2A, can be dynamically adjusted to provide different views to different users based on their individual levels of granted access rights. For example, but not limited to, employees who are operating in a "hoteling" mode, that is, who are not physically in the building/facility and are accessing the system remotely over the Internet 106. In addition, as features and display panels are enabled or disabled from the comfort dashboard 200a, the remaining display panels can be dynamically resized and/or rearranged on the comfort dashboard 200a so none of the display panels are blank or overlap each other to cover or hide any other display panel. For example, as seen in FIG. 2B, an example of a user comfort dashboard 200a' for a visitor with restricted access rights is shown with only those display panels to which the visitor has access resized, displayed, and rearranged in the user's comfort dashboard 200a' to prevent any of the information available to the visitor from being obscured. Although not shown, the same dynamic rearrangement and redisplay within individual display panels can be adjusted to reflect the individual user's access rights. For example, in an exemplary embodiment, all users can be permitted to view the camera picture at the front door, but not all can switch to any other cameras or control the opening or locking of the front door or any of the other doors. In this embodiment, for the users that can only view the picture in the remote camera display panel 206, all of the control options to the right of the picture in the interactive access control and status display panel 207, as seen in FIG. 2A and FIG. 2A-2, can be disabled and shown as being either being "grayed-out," removed, or completely obscured.

Furthermore, in at least one embodiment, comfort dashboard 200a can include animated representations for sensors, fans, etc., such as showing air blowing from an HVAC vent.

Figures 2, 2A:
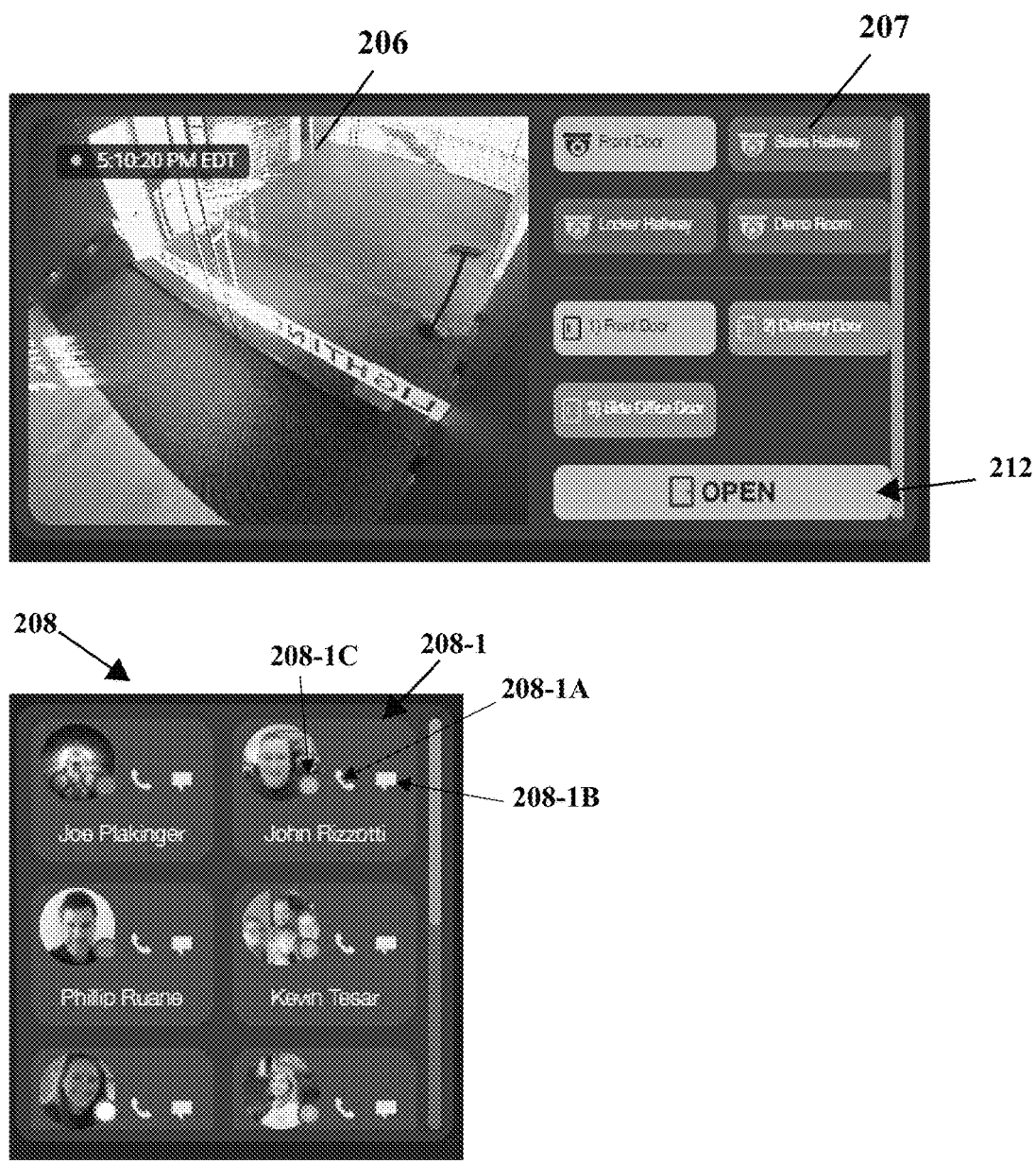
Figures 2, 2A, 3:
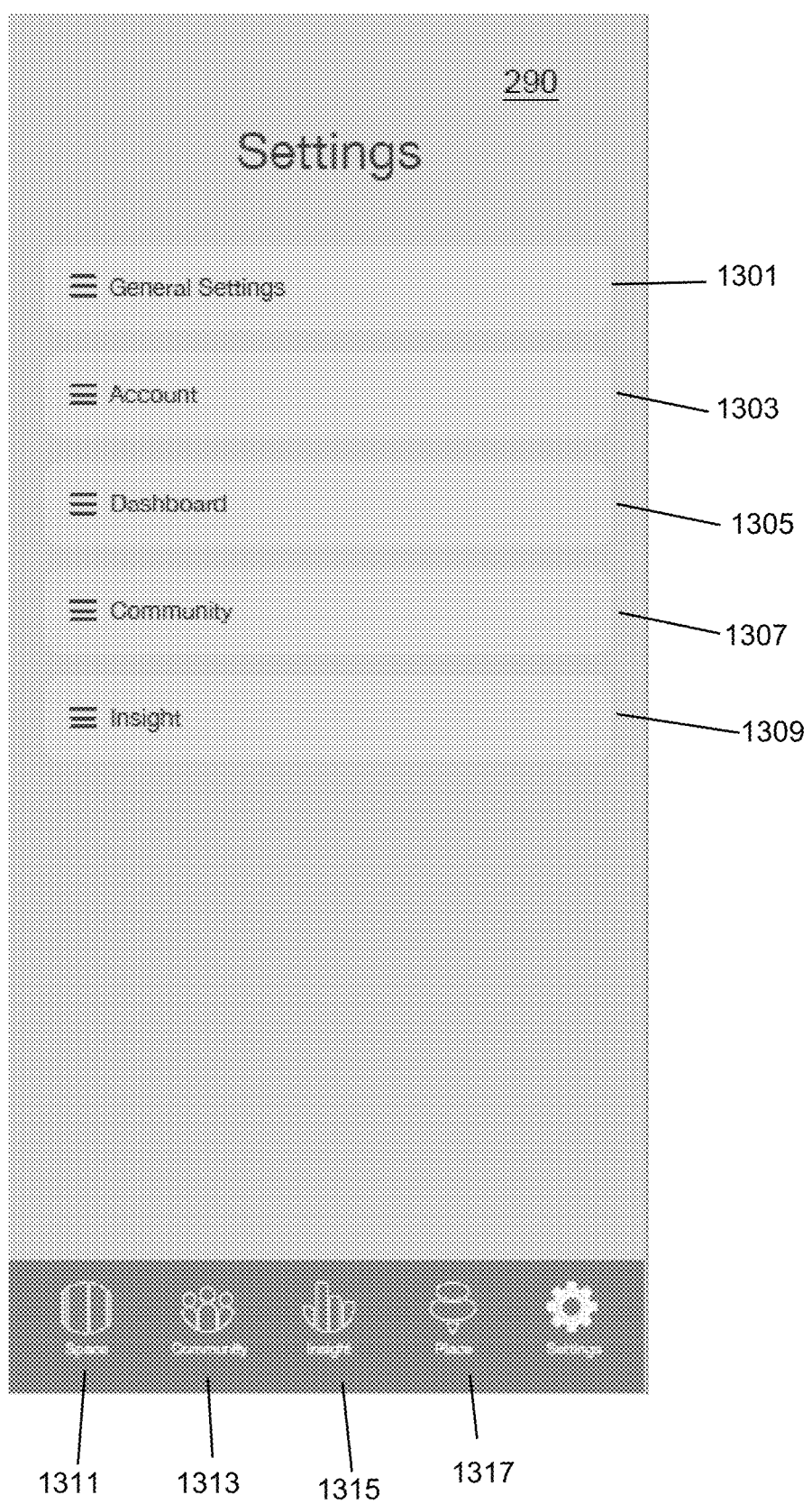
Figures 2, 2A, 3, 3A:
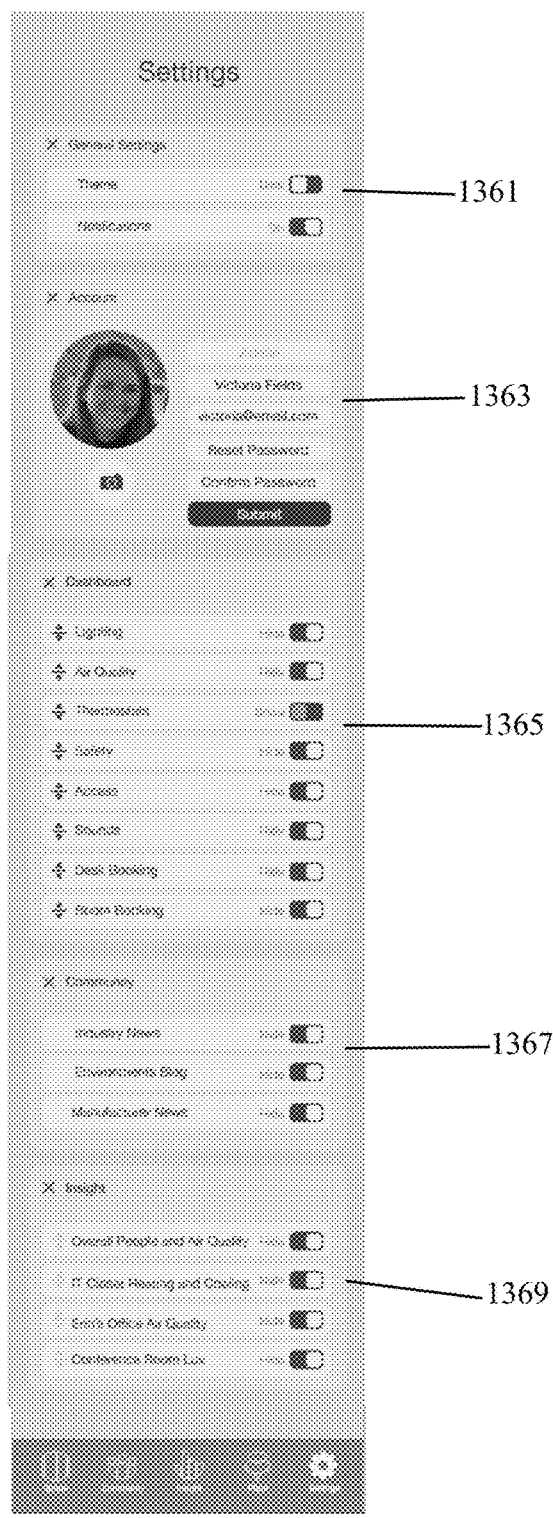
Figures 2, 2A, 3, 4:
Figures 2, 2A, 3, 4, 5:
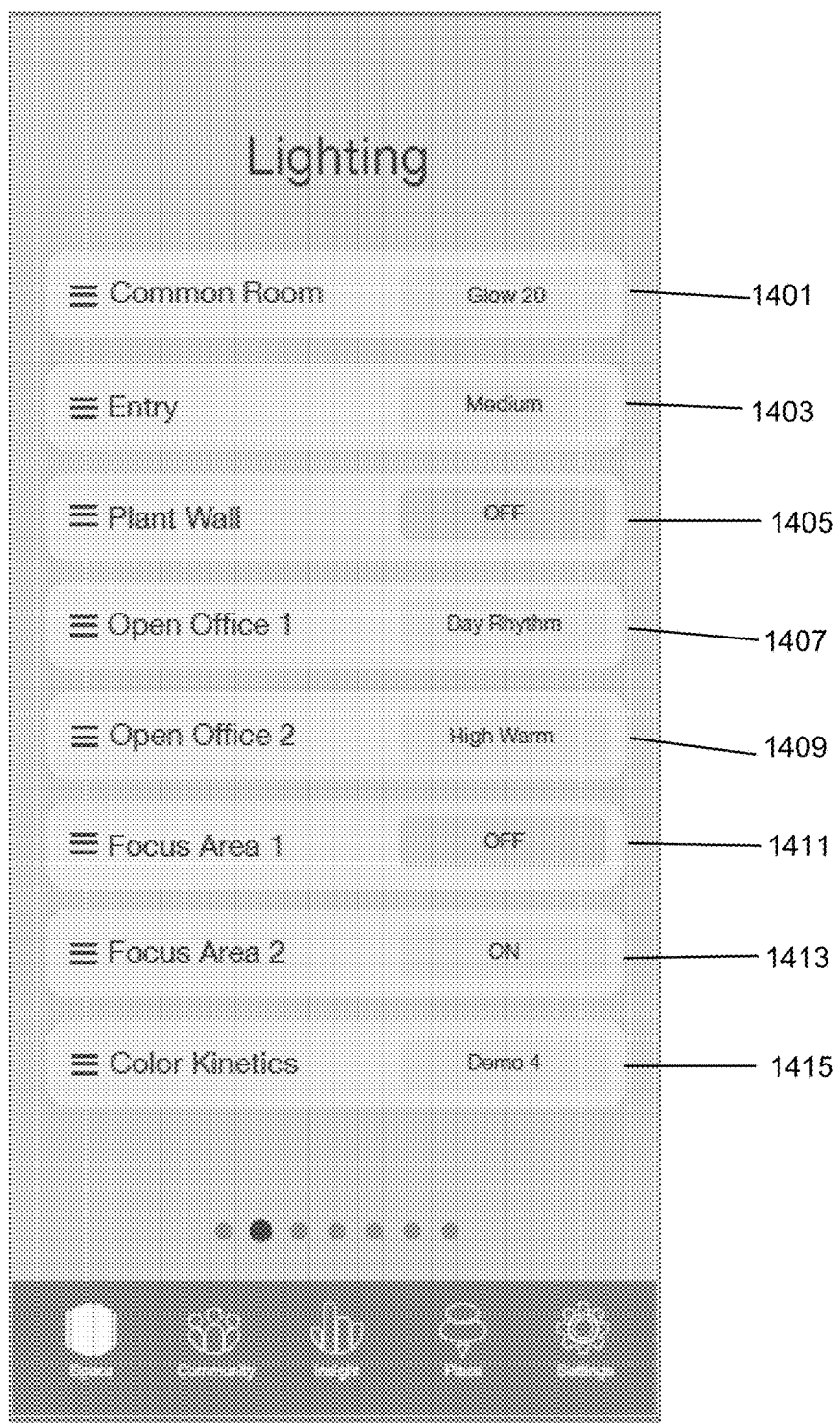
Figures 2, 2A, 3, 4, 5, 5A:
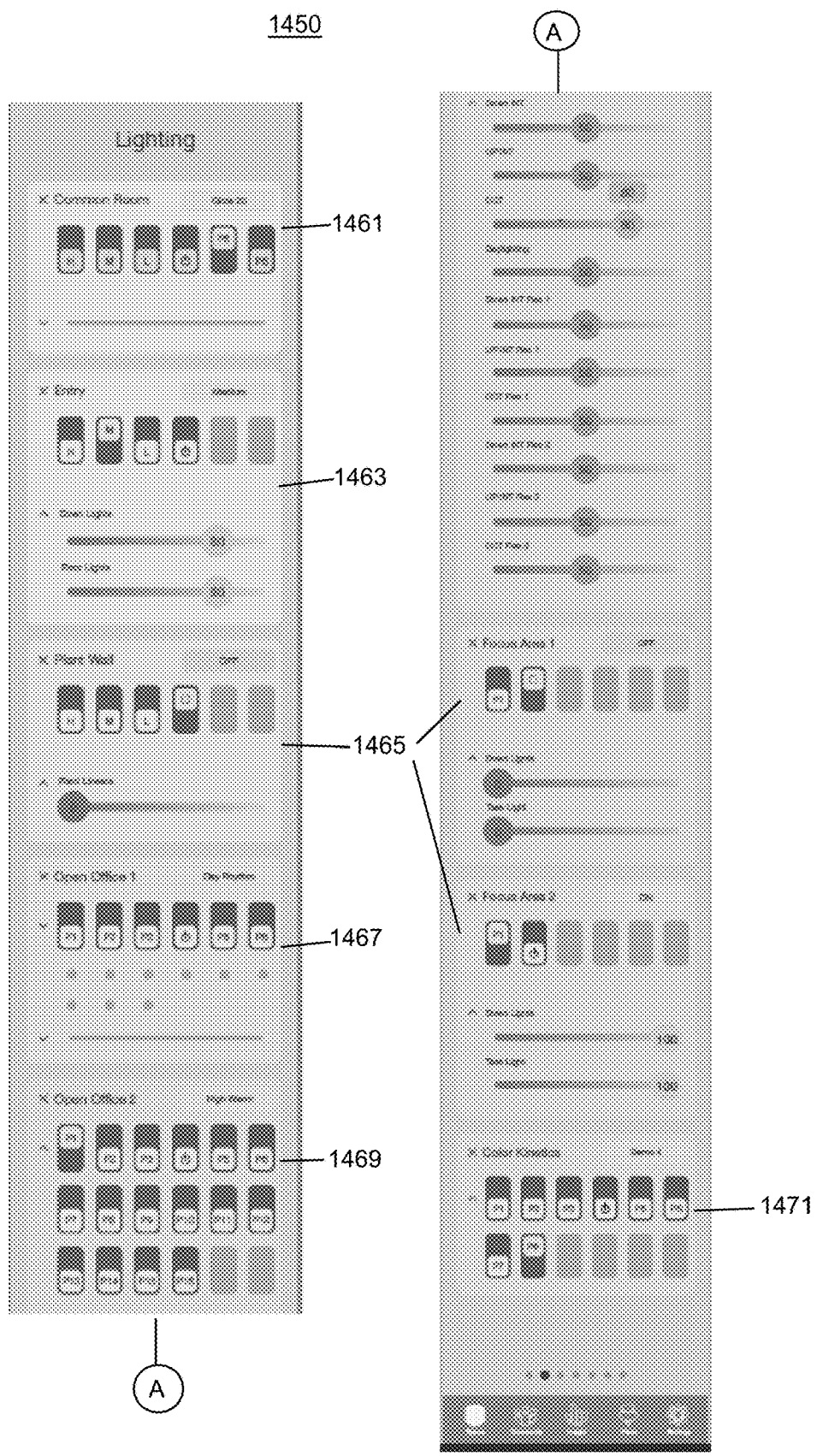
Figures 2, 2A, 3, 4, 5, 6:
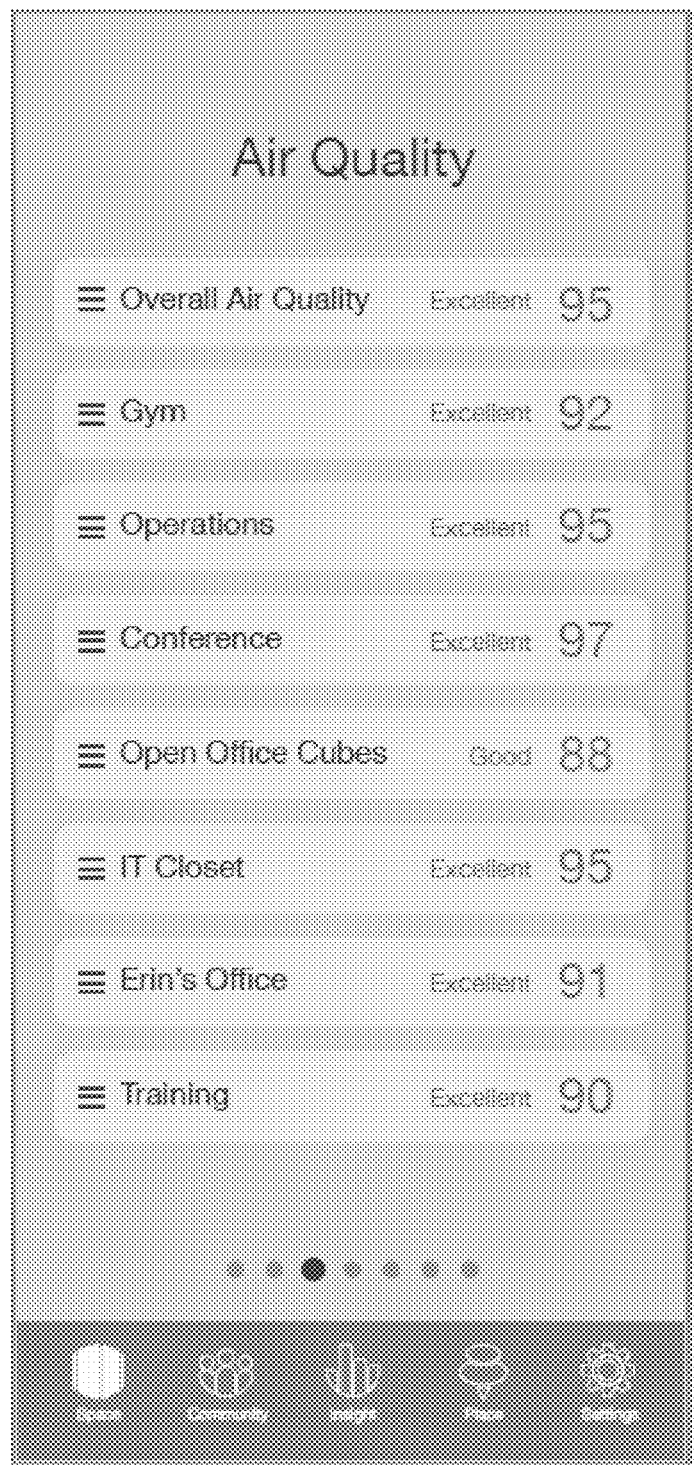
Figures 2, 2A, 3, 4, 5, 6, 6A:
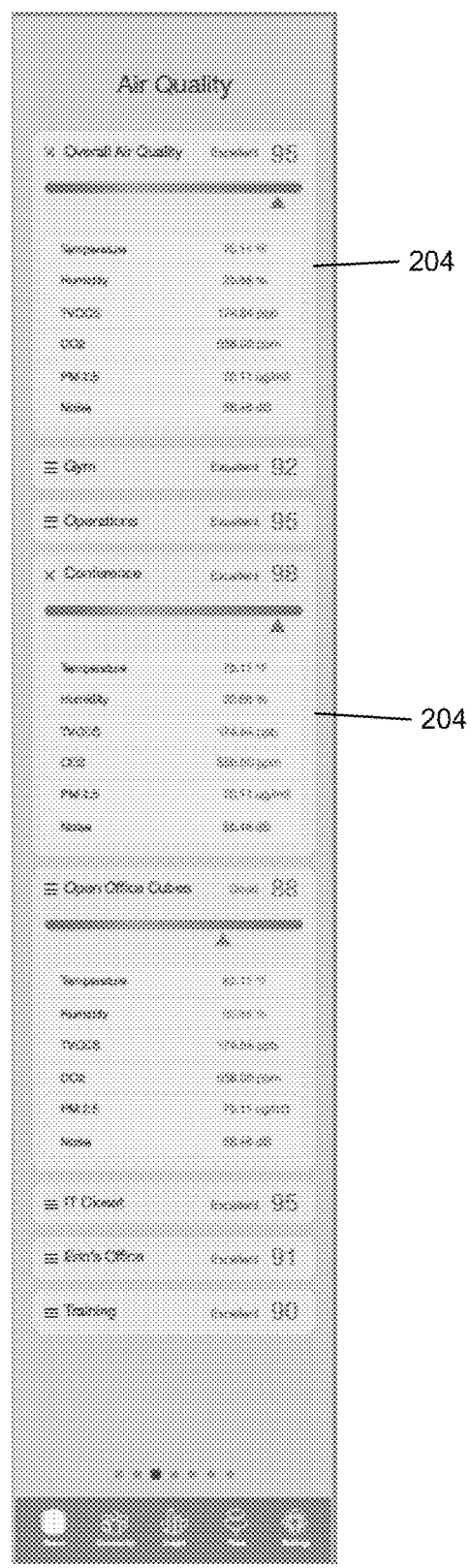
Figures 2, 2A, 3, 4, 5, 6, 7:
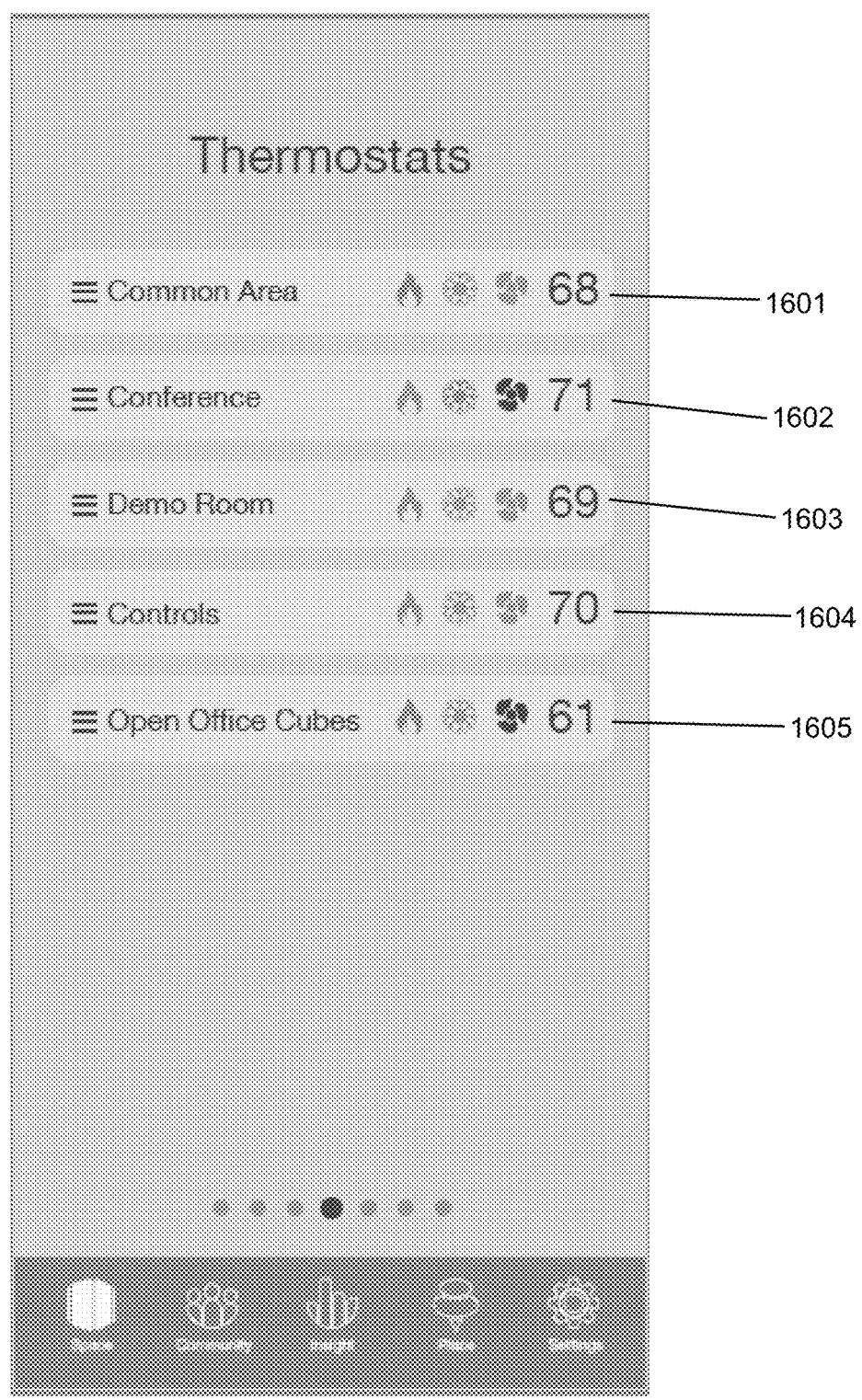
Figures 2, 2A, 3, 4, 5, 6, 7, 7A:
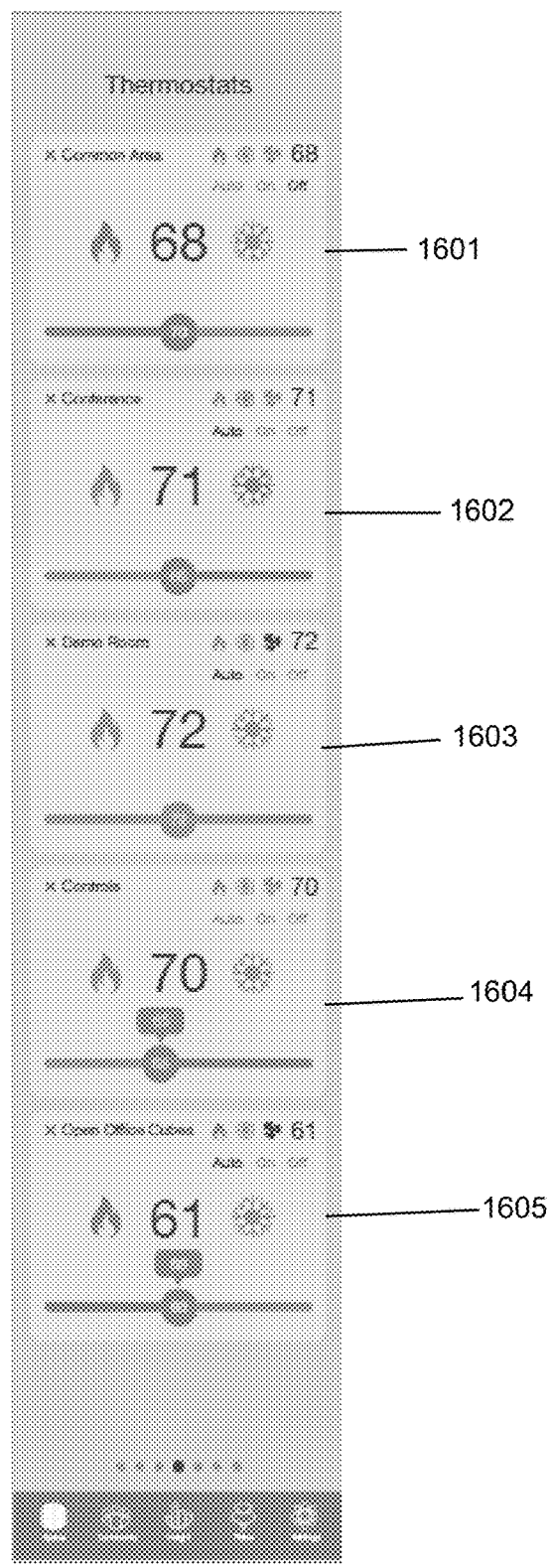
Figures 2, 2A, 3, 4, 5, 6, 7, 8:
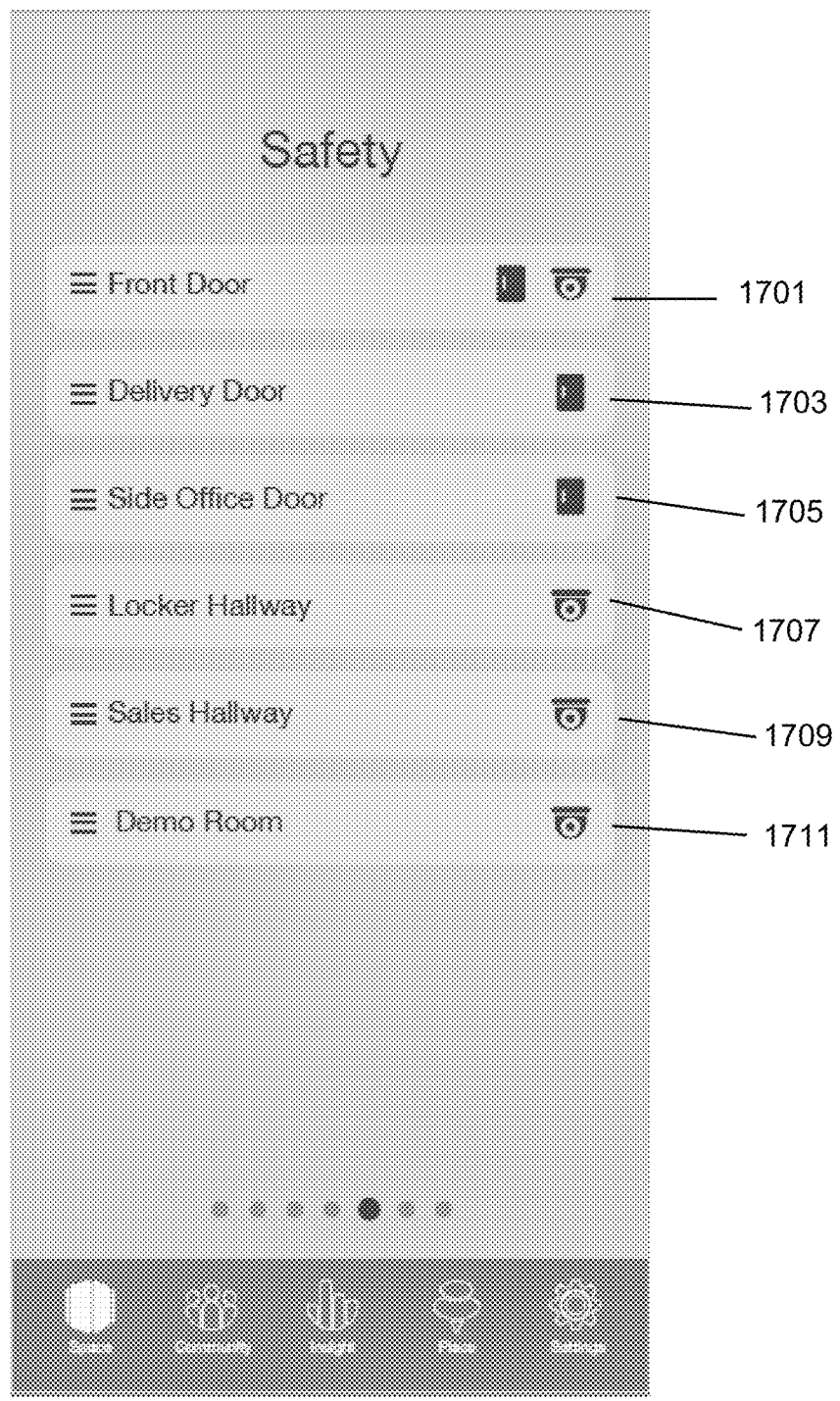
Figures 2, 2A, 3, 4, 5, 6, 7, 8, 8A:
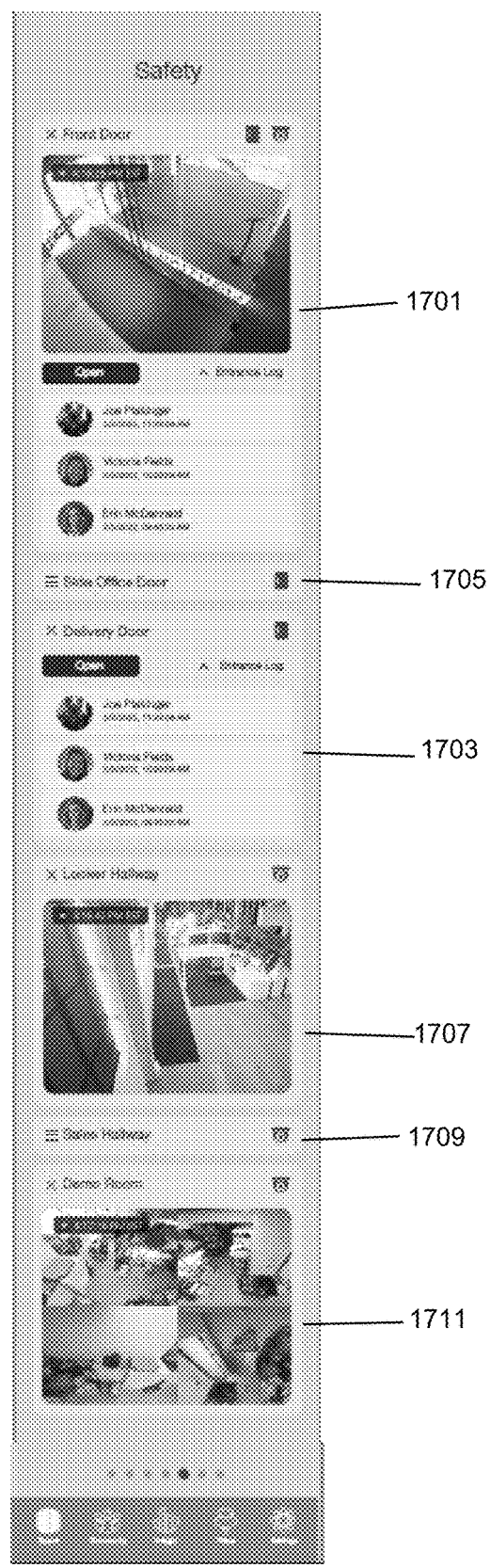
Figures 2, 2A, 3, 4, 5, 6, 7, 8, 9:
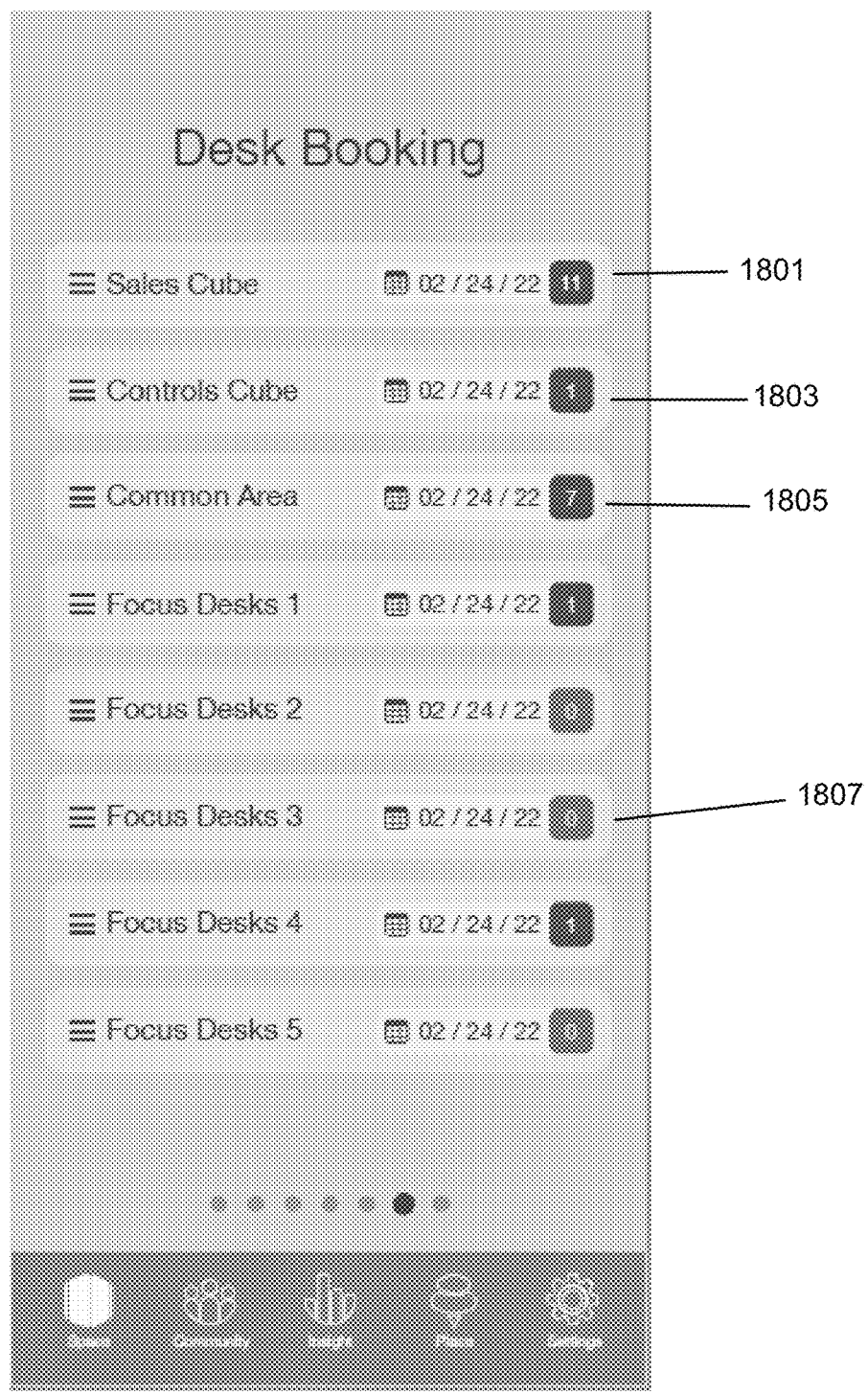
Figures 2, 2A, 3, 4, 5, 6, 7, 8, 9, 9A:
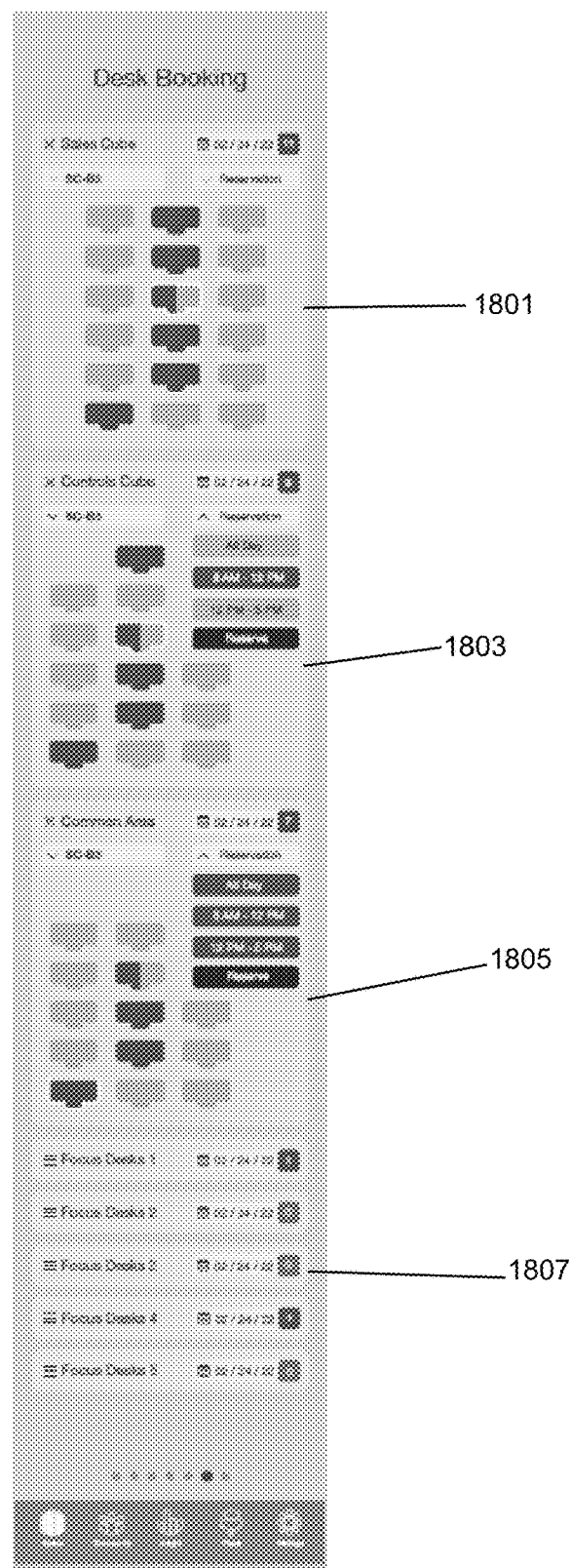
Figures 2, 2A, 3, 4, 5, 6, 7, 8, 9, 10:
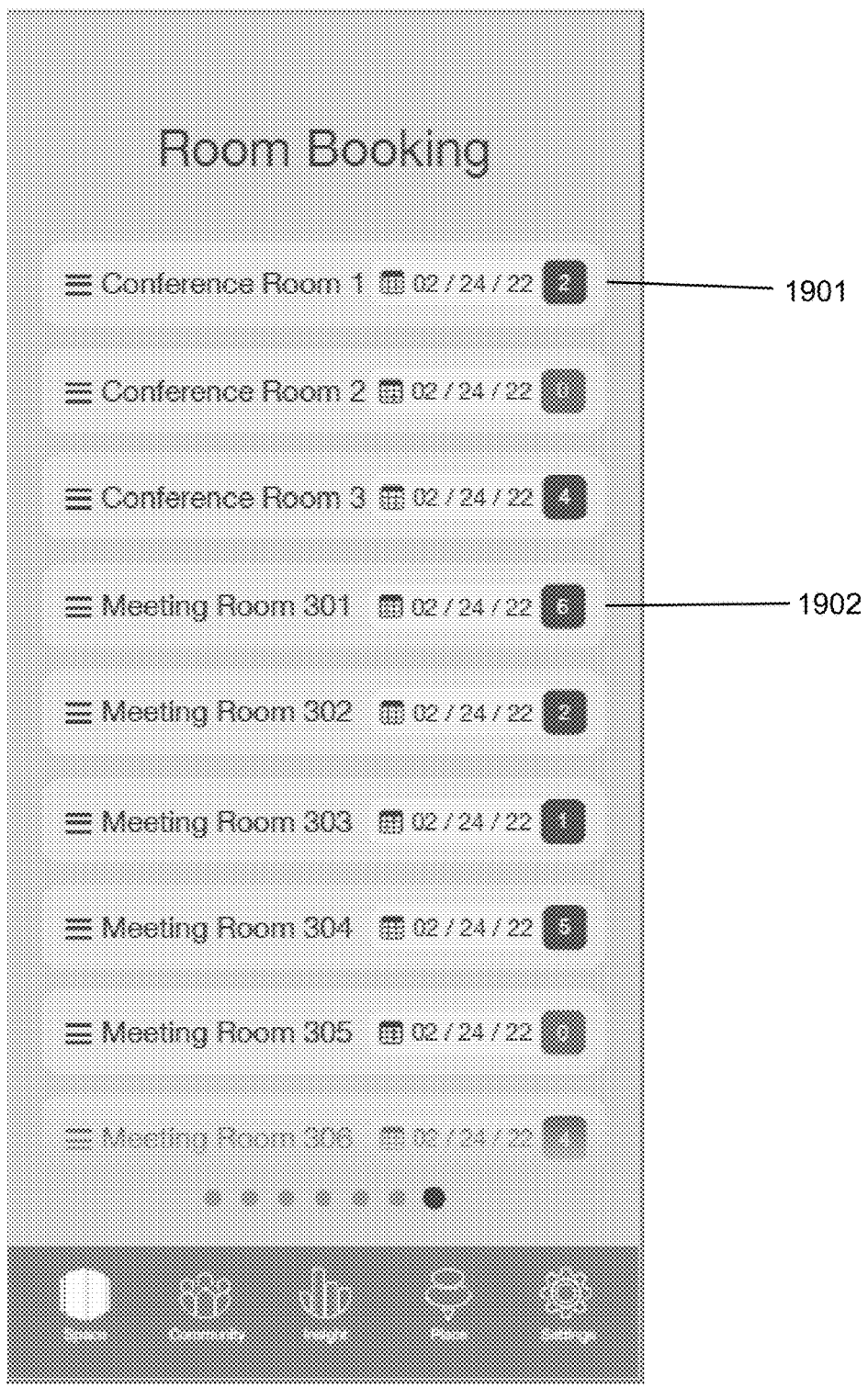
Figures 2, 2A, 3, 4, 5, 6, 7, 8, 9, 10, 10A:
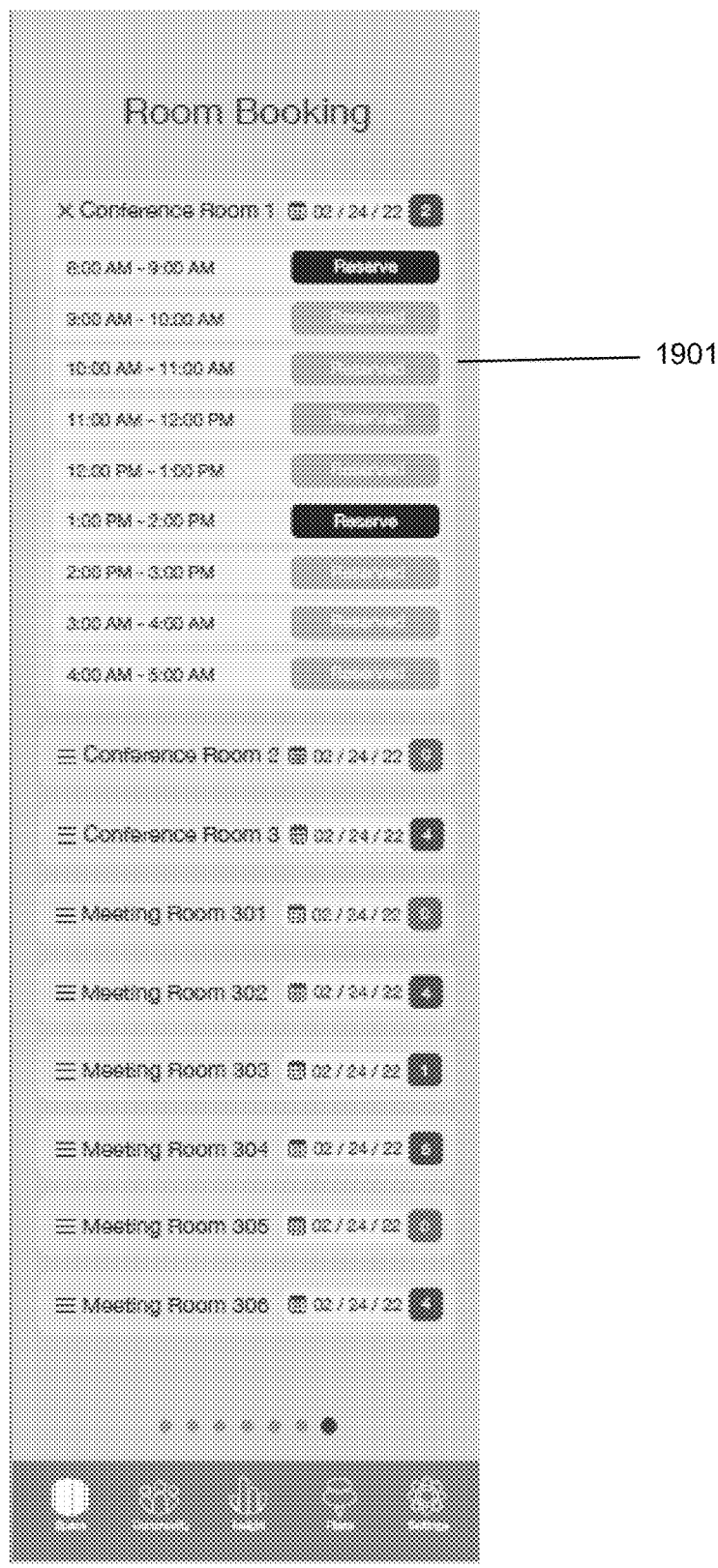
Figure 2B:
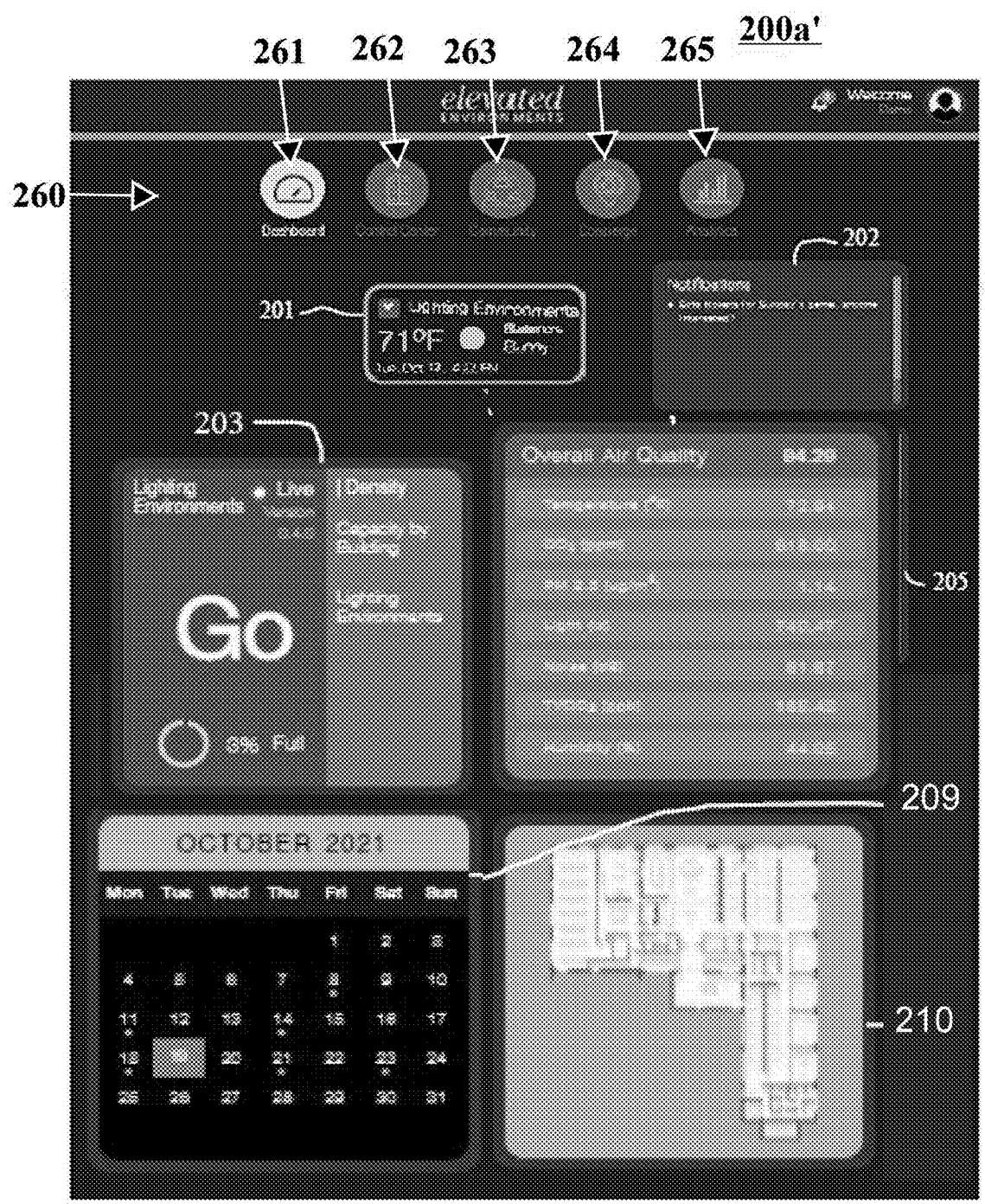
FIG. 2B illustrates a resized Graphical User Interface (GUI) interactive display screen output showing an interactive building comfort dashboard according to at least one embodiment of the disclosed subject matter.

FIGS. 2A-1 and 2A-2 illustrate detailed Graphical User Interface (GUI) interactive display screen output elements showing interactive displays of the interactive building comfort dashboard 200a according to at least one embodiment of the disclosed subject matter. In the local weather display panel 201, the local weather and time are displayed and a sun status icon 201-1, which can be an active link that upon being clicked on by a user, opens a predefined weather page in a new window. The occupant density display panel 203 can display live occupant density measurements 203-1 and a building capacity information panel 220 about the current building as well as other buildings, offices, and facilities connected to the integrated building control system. An example mobile application screenshot embodiment of an occupant density display panel 203 of the comfort dashboard 200a is shown in FIG. 2A-4. As shown in FIG. 2A-4, the an occupant density display panel 203 can include an indication of "Go/No Go" status, a numeric (for example, "40%" occupied) and/or graphical indication (for example, partially-filled circle) of occupant density in the space, and announcements relevant for events occurring in the space. When an active "Click for detail" item 221 in the building capacity information panel 220 is selected a detailed occupancy window 230 can be displayed which can graphically summarize the number of people in the office on an hourly basis over a selectable time range. The time range can be selected using a pull-down menu tab 231 and following selection of the time range, the detailed occupancy window 230 automatically resizes, rescales, and redisplays the graphical information.

In FIG. 2A-2, the remote camera display panel 206 selectively displays camera views of each access door to the building as well as the views from any interior cameras. The interactive access control and status display panel 207 can include selectable camera icons for each installed camera as well as an access control "open" button 212 that can individually or collectively open and/or lock the doors. In other embodiments, although not shown in FIG. 2A-2, but seen in FIG. 3H, multiple camera views can be displayed in the remote camera display panel 206 of FIG. 2A-2, which, when selected, can open an enlarged window view of the selected camera view over the other camera display panels. Alternatively, selecting one of the camera views can open a completely new page with the selected camera view. Also shown in FIG. 2A-2, an interactive community contact display panel 208 can include, for each of one or more persons, a telephone call button 208-1A which, when selected using the user input device 104, causes the processor 101 to initiate a telephone or IP-based telephony call to the person; a text button 208-1B which, when selected using the user input device 104, causes the processor 101 to send a text message to the person; and an availability or person indicator 208-1C which indicates an availability status for the person such as, for example, online and available, busy, or unavailable. The availability status indicator 208-1C can use different colors to indicate each availability status, for example, showing a pictorial representation of the associated user along with a status indicator showing if the user is available (for example, green status), not available or busy (for example, red), or not present or available (for example, white). Further, the system 100 and system components such as phones, VR goggles, VR gloves, which can be implemented with at least one sound or haptic feedback technology (that is, audio alerts and vibration alerts), for example, but not limited to, vibrations, electrical impulses, ultrasound, sound, and thermal feedback. The haptics can be used, for example, but not limited to: identifying when an incoming call is received by at least one of vibrating, emitting a sound or alarm, and emitting a light from a physical phone, smartphone, or tablet that is receiving the call; and highlighting using light or sound or vibrating/moving a digital representation of a phone in the metaverse that is receiving the call. Similarly, haptics can be used to identify to a user when they have entered into a controlled space to which they are not authorized to enter as well as to security personnel and other users that the user has entered into the controlled space. For example, if the user enters into a secure space their badge or cell phone can emit an alarm signal, vibrate differently than for a call, and/or flash a light. I addition, an alarm, light, and/or announcement can be made from devices in the controlled space in the real office space and in the metaverse office space. Still further, haptics can be used to alert the user to the approach or proximity of other users in the real office space as well as the approach or proximity of other users' avatars in the metaverse office space.

Figure 2C:
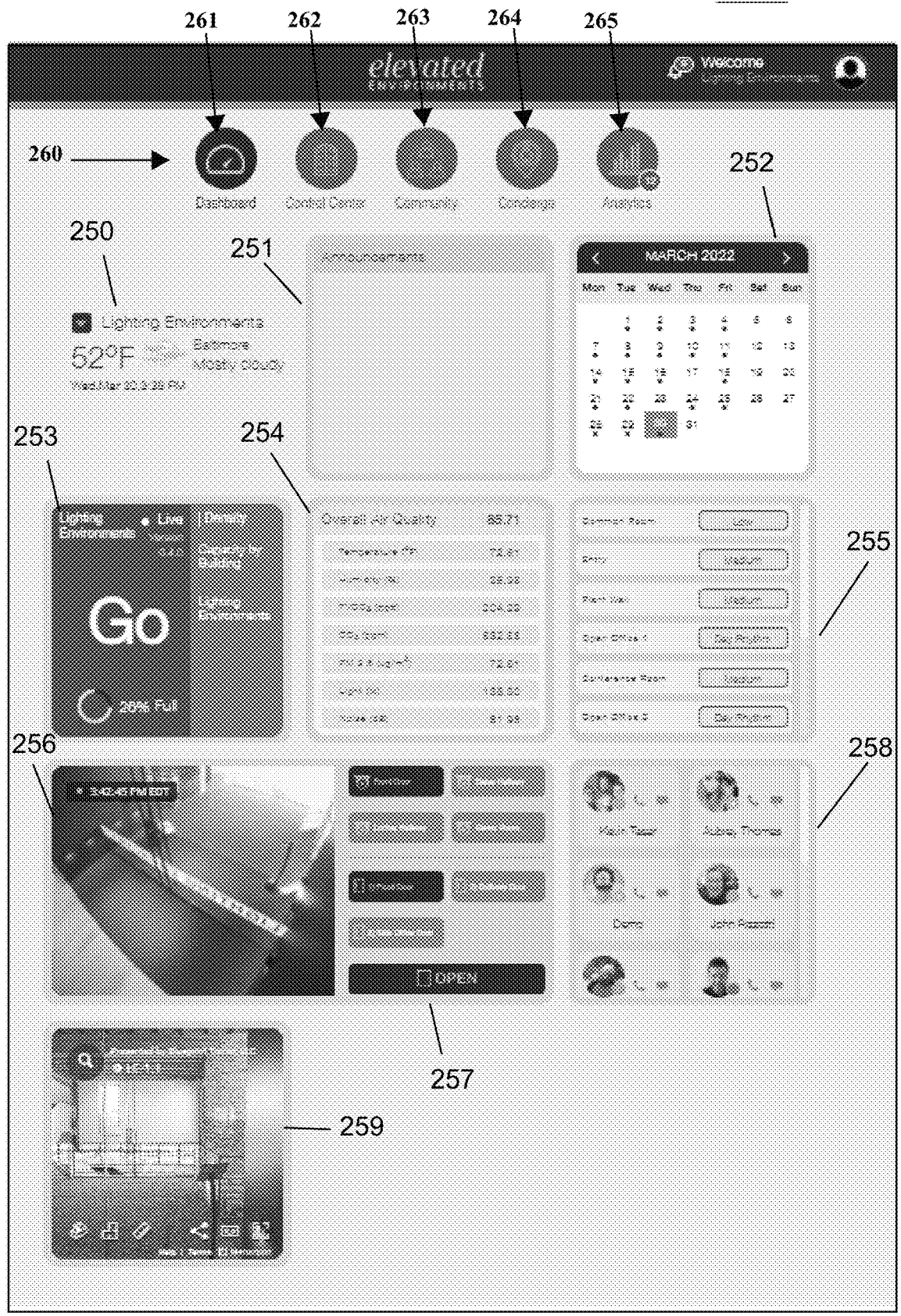
FIG. 2C illustrates another Graphical User Interface (GUI) interactive display screen output showing an interactive building comfort dashboard according to at least one alternative embodiment of the disclosed subject matter.
Figure 2E:
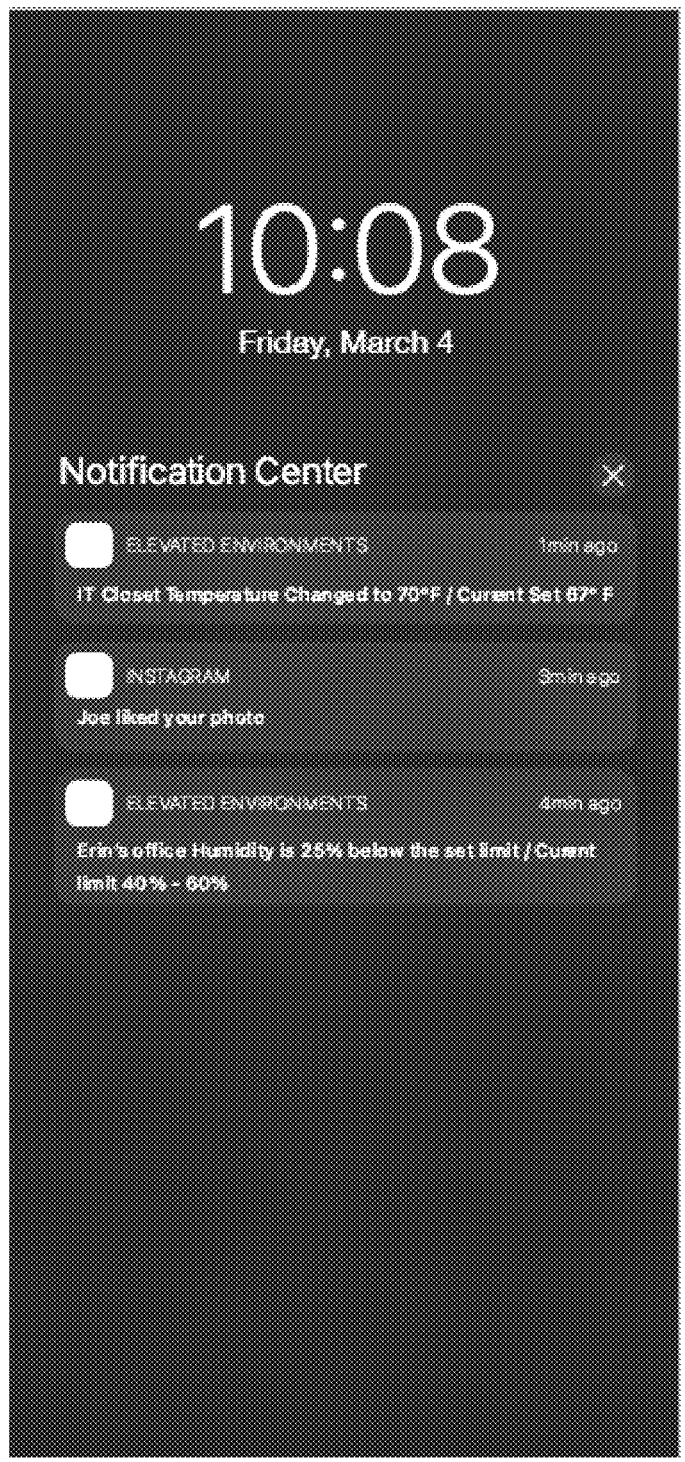
FIG. 2E is an example mobile application screenshot embodiment of a notifications display panel of the comfort dashboard according to various embodiments of the disclosed subject matter.

FIG. 2C illustrates an alternative Graphical User Interface (GUI) interactive display screen output showing an interactive building comfort dashboard 200b according to at least one alternative embodiment of the disclosed subject matter. In FIG. 2C, the alternative comfort dashboard 200b' can include a local weather display panel 250, an announcements, that is, a notifications, display panel 251, a calendar 252, an occupant density display panel 253, an overall air quality display panel 254, a room lighting control and status display panel 255, a remote camera display panel 256, an interactive access control and status display panel 257, an interactive community contact display panel 258, and a metaverse display panel 259. In various embodiments, the metaverse interactive display panel 259 can be a "metaport" or "metaportal" which provides a bridge to allow an occupant or guest to transition or port an avatar presence between the metaverse virtual representation of the space (as described elsewhere herein) and the actual physical space. The local weather display panel 250 can be connected to various weather channels or reporting systems including, but not limited to, broadcast channels and a dedicated, onsite building weather station. In various embodiments, the processor 101 generates the alternative comfort dashboard 200a using an inline frame format tagging such as, for example, iFrame integration, to embed HTML documents and information received from the external servers 107 and the sensors 130, the cameras 140, the audio system 150, the lighting 160, the access controls 170 and the environmental controls 180 to provide the display panels 201 to 211, for example, as separate windows of an output HTML document or a web page such as the comfort dashboard 200a. The display panels output to the display 103 of FIG. 1, such as the exemplary display panels 201 to 211 as shown in FIG. 2A, can vary based on the status or control information requested by a user.

FIG. 2D is a functional block diagram showing application and server interfaces in connection with the interactive building comfort dashboard 200a according to at least one embodiment. In FIG. 2D, in at least one embodiment, the processor 101 of the integrated building and office automation control system 100 can receive inline frame format tagged information such as, for example, iFrame integration tagged information, for embedded HTML documents and information received from external servers 107 using an API via the network 106 such as the Internet, and via the local area network 105, and output the received information using one or more individual display panels 201 to 211 within the interactive building comfort dashboard 200a in FIG. 2A.

For example, in various embodiments, the local weather display panel 201 can include the current outdoor temperature, a precipitation icon, and date and time, with a link to a weather webpage, such as the AccuWeather® webpage, as variously shown in FIGS. 2A and 2A-1. These displayed components of the local weather display panel 201 can be received by the processor 101 via an AccuWeather® Application Programming Interface (API) 1002 from an external server 107, such as an external weather information server or application 1001 via the network 106 such as the Internet, and via the local area network 105, as shown in FIG. 2B. For example, the external weather information server or application 1001 can provide an inline frame format tagged information such as, for example, iFrame integration tagged information, for embedded HTML documents and information received from the AccuWeather® forecasting service external server 1001. The processor 101 can then output the received current outdoor temperature, a precipitation icon, and date and time information using the local weather display panel 201 within the interactive building comfort dashboard 200a, as shown in FIG. 2A.

In various embodiments, a user can also interact with the building comfort dashboard 200a using a mobile application (that is, an application interface ("app" or "mobile app") for a mobile device such as, for example, an iPhone). A user can change various settings for the mobile application. For example, FIG. 2A-3 is an example mobile application screenshot embodiment of a settings panel 290 of the comfort dashboard 200a. As shown in FIG. 2A-3, a user can change general settings 1301, account settings 1303, dashboard settings 1305, community settings 1307, and insight settings 1309 using the settings panel 290. (In various embodiments, the "insight" link or button may have the same or similar functionality as the "analytics" operations as described herein.) Furthermore, a user may access and interact with "space" 1311 functions, "community" 1313 functions, "insight" 1315 functions, and "place" 1317 functions, as shown in FIG. 2A-3. The "space" functions may correspond with the "dashboard" functions as described herein. The "insight" functions may correspond with the "analytics" functions as described herein. The "place" functions may correspond with the "concierge" functions as described herein. Furthermore, FIG. 2A-3A is an example mobile application screenshot embodiment of an application settings panel 1350 according to various embodiments. As shown in FIG. 2A-3A, an "admin" user (for example, a user having administrative rights to the system) can change general settings 1361, account settings 1363, dashboard settings 1365, community settings 1367, and insight settings 1369 using the settings panel 1350. For example, an administrative user can choose general settings 1361 for mobile application displays to have a "dark" background (see, e.g., FIG. 2E) or not, or whether or not notifications are enabled to be received by the mobile application at a user's mobile device. Furthermore, an administrative user can enter or change account settings 1363 such as name, email address, and password information. For other settings, the administrative user can choose which settings are displayed on the mobile device and which are hidden (i.e., "hide"), as shown in FIG. 3A-2A.

Furthermore, in various embodiments, the notifications display panel 202 can provide for interoffice or inter-building or inter-metaverse electronic texting or chat or alerting among physically present occupants and remote virtual occupants of the building, office, or region thereof, as shown in FIGS. 2A and 2B. A smart building control system can be used to enable users in the physical environment to be alerted that someone in the virtual (that is, metaverse) environment is nearby/trying to interact digitally, and then allowing for the physical world to interact in an augmented way using smart glasses, a smartphone, or other means. The smart building control system can be used to enable users in the physical environment to conduct meetings with team members in the virtual environment (by projection or other means), creating the metaverse meeting room. In addition, the smart building control system also can be used to enable users in the virtual environment to know where users in the physical environment are located in real-time—having that digital twin of the office as it exists in real time. Further, the smart building control system can be used to enable users in the virtual environment to access and control the space in the physical environment, for example, but not limited to, controlling environmental conditions, ensuring that a conference room or office is set up for clients to arrive, and controlling access to the building or facility. Still further, the smart building control system can be used to enable users in the physical environment to control their avatar and status in the virtual environment without being immersed/logged into the virtual environment at the time. Still further, the smart building control system can be used to enable users in the physical environment to hear people they're interacting with in the virtual environment and vice versa in a way that mimics the physical, that is, if the people are in a room together virtually people outside of the room are not able to hear the people in the room. Still further, the smart building control system can be used to enable desk and room scheduling capabilities for those in the virtual environment so that collaborative conversations can be had virtually For example, office/desk reservations can be made directly by a user's avatar in the virtual environment, using, for example, but not limited to, a virtual computer terminal, a virtual kiosk, a virtual smartphone, and a virtual tablet. For example, in the various embodiments, a smart building control system such as, but not limited to, an Autani control system from Autani Building Systems of Columbia, Md. can be used to implement the above-described functionality.

An example mobile application screenshot embodiment of a desk-booking panel 1800 of the space functions 1311 (or comfort dashboard 200a) is shown in FIG. 2A-9. As shown in FIG. 2A-9, the desk-booking panel 1800 can include an interactive interface for a user to reserve a desk within a room, area, hallway, and region within the space as shown in FIG. 2A-9. For example, as shown in FIG. 2A-9, the desk booking panel 1800 can include an interactive interface for a user to reserve a desk within sales cube (cubicle) 1801, a controls cube (cubicle) 1803, a common area 1805, or a focus desk 1807. An example mobile application screenshot embodiment of a detailed desk-booking panel 1850 of the space functions 1311 (or comfort dashboard 200*a*) for these desk-booking areas is shown in FIG. 2A-9A. Referring now to FIG. 2A-9A, a detailed desk booking panel 1850 can provide a user with the ability to select a particular desk within a physical layout representation of available desks within a desk booking area, and also to specify a reservation period for reserving the desk (e.g., from 8:00 AM to 5:00 PM). Similarly, an example mobile application screenshot embodiment of a room-booking panel 1900 of the space functions 1311 (or comfort dashboard 200*a*) is shown in FIG. 2A-10. As shown in FIG. 2A-10, the room-booking panel 1900 can include an interactive interface for a user to reserve a room within an area, hallway, and region within the space as shown in FIG. 2A-10. For example, as shown in FIG. 2A-10, the room-booking panel 1900 can include an interactive interface for a user to reserve a conference room 1901 or a meeting room 1902. An example mobile application screenshot embodiment of a detailed room booking panel 1950 of the space functions 1311 (or comfort dashboard 200*a*) for these desk-booking areas is shown in FIG. 2A-10A. Referring now to FIG. 2A-10A, a detailed desk booking panel 1950 can provide a user with the ability to specify a reservation period for reserving the room (e.g., from 8:00 AM to 5:00 PM).

Text messages can be entered by a user or an administrator using the keyboard 104*a*, mouse 104*b*, local user device 109, or remote user device 108, and then are received by the processor 101. The processor 101 can output the text message or chat messages to the display 103, local user device 109, and remote user device 108, or can forward the text message or chat message to an external server 107, such as an external notification server or application 1003, via an external notification server or application API 1004 in FIG. 2D. The processor 101 can then receive a display-formatted text message or chat message from an external server 107, such as the external notifications server or application 1003, via the network 106 such as the Internet, and via the local area network 105. For example, the external notifications server or application 1003 can provide an inline frame format tagged information such as, for example, iFrame integration tagged information, for embedded HTML documents and information received from the external notifications server 1003. The processor 101 can then output the received text messages using the notifications display panel 202 within the interactive building comfort dashboard 200*a*, as shown in FIG. 2A.

In addition, in various embodiments, the occupant density display panel 203 can output an indication as a percentage of physical occupants per capacity per building, office, or region thereof, as shown in FIGS. 2A and 2A-1. In at least one embodiment, these displayed components of the occupant density display panel 204 can be determined by the processor 101 based on sensor data received from the sensors 130 deployed at the building or office being controlled, which sensors 130 may include a density sensor. The sensors 130 can be provided in electronic or optical communication with the processor 101 through a building firewall 1201 via the local area network 105, with intervening communications subnetworks or adapter circuits and processes interposed therebetween as required, as shown in FIG. 2D. The sensor 130 can include a density sensor, for example, the IR sensor 132, configured to detect and output an indication of a number of physical occupants in a space using heat or biological detection, such as an IR heat measurement. In at least one embodiment, the processor 101 can forward information received from the density sensor 132 via the local area network 105 to one of the external server 107, such as the density server 1105, via the network 106 (such as the Internet), for interpretation, normalization, and processing. The displayed components for the occupant density display panel 203 can be received by the processor 101 via an occupant density display panel API 1006 from one of the external servers 107, such as an external density server or application 1005, via the network 106 such as the Internet, and via the local area network 105, as shown in FIG. 2D. For example, the density server or application 1005 can provide as inline frame format tagged information such as, for example, iFrame integration tagged information, for embedded HTML documents and information received from the density external server 1005. The processor 101 can then output the received information using the occupant density display panel 203 within the interactive building comfort dashboard 200*a*, as shown in FIG. 2A. The processor 101 can also output the received occupant density information by time period, such as hourly, using the density time increment display panel 212 within interactive building comfort dashboard 200*a*, as shown in FIG. 2A-1. In at least one embodiment, one or more sensors 130 can be located at individual desks or workstations. In at least one embodiment, individual location of persons within the interior region may be tracked by company-issued ID cards, but individuals may be tracked by biometric characteristics, provided they have affirmatively consented in writing to the biometric tracking and the biometric tracking and system is in compliance with the applicable privacy laws of the jurisdiction in which each facility is located. The sensors 130 are normally arranged in a ceiling grid pattern (for example, but not limited to, a 10'×10' array or grid pattern). Sensors 130 can be individual or combined at individual nodes.

Furthermore, in various embodiments, the air quality display panel 204 can include an overall air quality score as well as a temperature (in Fahrenheit or Celsius), a carbon dioxide ($CO_2$) measurement (in parts per million (ppm)), a very fine particulate matter (for example, air pollution) measurement (PM 2.5 in micrograms per cubic meter ($\mu g/m^3$)), a light measure in lux (lx), a noise measurement (in decibels (dB)), a total volatile organic compounds (TVOCs) measurement (in parts per billion (ppb)), and a humidity measurement (in relative percentage), as shown in FIG. 2A. In at least one embodiment, these displayed components of the air quality display panel 204 can be determined by the processor 101 based on sensor data received from the sensors 130 deployed at the building or office being controlled. Each of the sensors 130 can be provided in electronic or optical communication with the processor 101 through a building firewall 1201 via the local area network 105, with intervening communications subnetworks or adapter circuits and processes interposed there between as required, as shown in FIG. 2D. The sensors 130 can include multiple temperature sensors 131 configured to detect and output an indication of temperature as measured in Fahrenheit or Celsius, infrared (IR) sensors or detectors 132 configured to detect and output a signal indicating heat emanation, lighting sensors 133 configured to determine an illumination level, such as a lighting intensity measured in foot-candles, lux or Angstroms, humidity sensors 134 configured to detect and to output an indication of a relative humidity level, and air quality sensors 136. In at least one embodiment, the processor 101 can forward information received from the sensors 130 via the local area network 105 to an external server 107, such as the external server 107, via the network 106 (such as the Internet), for interpretation, normalization, and processing. The displayed components for the air quality display panel 204 can be received by the processor 101 via an occupant density display panel API 1008 from the external server 107, such as an external air quality information server or application 1007, via the network 106 such as the Internet, and via the local area network 105, as shown in FIG. 2D. For example, the air quality information server or application 1007 can provide as inline frame format tagged information such as, for example, iFrame integration tagged information, for embedded HTML documents and information received from the Awair® air quality service external server 1007 available from Awair Inc. of San Francisco, Calif. The processor 101 can then output the received temperature, carbon dioxide, particulate matter, light measurement, noise measurement, total volatile organic compounds (TVOCs) measurement, and humidity information using the air quality display panel 204 within the interactive building comfort dashboard 200a, as shown in FIG. 2A. An example mobile application screenshot embodiment of an air quality display panel 1500 of the space functions 1311 (or comfort dashboard 200a) is shown in FIG. 2A-6. As shown in FIG. 2A-6, the air quality display panel 1500 can include overall air quality scores for various rooms, areas, and regions within the space. Furthermore, an example mobile application screenshot embodiments of an air quality detailed display panel 1550 of the space functions 1311 (or comfort dashboard 200a) is shown in FIG. 2A-6A. Referring now to FIG. 2A-6A, the air quality detailed display panel 1550 can include the overall air quality score as well as detailed air quality scores as presented in the air quality display panel 204 for various rooms, areas, and regions within the space.

In addition, in various embodiments, the room lighting control and status display panel 205 can be an interactive display configured to allow a user to control the lighting in an office, building, or region or area thereof, as shown in FIG. 2A. For example, using the interactive room lighting control and status display panel 205, a user can adjust the lighting intensity for particular areas or regions or rooms or individual offices of the office or building, or for the entire room, according to a plurality of levels. In FIG. 2A, the lighting for these spaces or locations within the space (for example, the entry way) can be set to low, medium, or high light levels, in addition to on and off positions. Each lighting level can be controlled by actuating, using an interactive display or a pointing device, a button corresponding to the desired lighting level. The lighting level can be more-finely adjusted using a slider control that varies the output light level from 0% to 100% within the chosen lighting level. The current lighting level percentage for a given space is shown on the interactive room lighting control and status display panel 205, for the particular areas or regions or rooms or individual offices of the office or building, or for the entire office or building.

In various embodiments, in response to receiving a user lighting control input from a user via the keyboard 104a, mouse 104b, local user device 109, or remote user device 108, the processor 101 can forward the lighting control information to an on-premises lighting control server, such as the lighting control server 1105, or, alternatively, to an external server 107, such as an external server or application 1009 or an Enlighted server 361, via an Application Programming Interface (API) 1010, as shown in FIG. 2D. In response to receiving the lighting control information, the lighting control server 1105, or, alternatively, the server or application 1009, can transmit commands to the associated lights 160 and programmable fixtures 161 to make the lighting adjustments entered by the user. The processor 101 can update lighting status indicators of the interactive room lighting control and status display panel 205 to reflect the new lighting adjustments, as shown in FIG. 2A. In at least one embodiment, the on-premises lighting control server 1105 and external server or application 1009 can be a Dynalite™ lighting control system provided by, for example, but not limited to, the Philips-Dynalite Corporation of Eindhoven, Netherlands. An example mobile application screenshot embodiment of a lighting control panel 1400 of the space functions 1311 (or comfort dashboard 200a) is shown in FIG. 2A-5.

As shown in FIG. 2A-5, the lighting control panel 1400 can include lighting controls for various rooms, areas, and regions within the space such as, for example, a common room 1401, an entry area 1403, features such as a plant wall 1405, offices such as open office 1 and open office 2, gathering or meeting areas such as focus area 1 and focus area 2, and programmed lighting features such as Color Kinetics 1415. Besides on and off settings, a user (or the processor 101, if automated via a sequence of programmed instructions) can select from among multiple pre-defined lighting settings in which one or more lighting 160 elements are placed in various combinations of settings to achieve different lighting effects. For example, FIG. 2A-5A is an example mobile application embodiment of a pre-defined lighting settings panel 1450 according to various embodiments. Referring now to FIG. 2A-5A, such pre-defined lighting settings can include "glow20" 1461, "medium" 1463, on and off 1465, "day rhythm" 1467, "high warm" 1469, and "Demo4" 1471 pre-defined lighting settings.

Furthermore, in various embodiments, the remote camera display 206 can display video or video data from one more video cameras 142 or Infrared (IR) cameras 141 for an office, building, or region or area thereof, as shown in FIG. 2A. In some embodiments, the remote camera display panel 206 can be an interactive display that allows the user to control the lens angle, zoom, and vertical and horizontal direction of the cameras 141 and 142. In various embodiments, in response to receiving a user camera control input from a user via the keyboard 104a, mouse 104b, local user device 109, or remote user device 108, the processor 101 can forward the camera control information to an on-premises camera control server, such as the camera control server 140, or, alternatively, to an external server 107, such as an external server or application 1011, via an external server or application API 1012, as shown in FIG. 2D. In response to receiving the camera control information, the camera control server 140, or, alternatively, the server or application 1011, can transmit commands to the associated video camera(s) 142 and IR camera(s) 141 to make the camera control and positioning adjustments entered by the user. In at least one embodiment, the on-premises camera control server 140 and external server or application 1011 can be the Verkada® camera system provided by, for example, but is not limited to, a model CD52 Dome Series from Verkada Inc. of San Mateo, Calif., or any of the R120, R200, R360, R400, 500 Series cameras from Rhombus Systems of Sacramento, Calif.

In addition, in various embodiments, the interactive access control and status display panel 207 can be an interactive display configured to allow a user to control access to an office, building, or region or area thereof, as shown in FIG. 2A. For example, using the interactive access control and status display panel 207, a user can control access control devices such as, without limitation, security cameras 171 and/or video cameras 142, microphones 152, electronically actuated door locks 172 having open/unlocked and closed/locked states, and biometric entry devices 173 such as, for example, retina-scanning, iris-scanning, fingerprint scanning, palm scanning, or other such physical or biological access control devices. Each access control can be controlled by actuating, using an interactive display or a pointing device, a button corresponding to the access control state (for example, on/off, open/closed, locked/unlocked). The processor 101 can transmit, or cause to be transmitted from an external network or system, control signals to one or more of the access control systems 170 to enable entry, disable entry, lock, or selectively unlock or lock per individual person or for a predefined group of persons. The integrated building and office automation control system and method 100 can be configured to control each of the access control devices of the access control systems 170 independently within one or more interior regions of the building or office being controlled, individually for each of the one or more interior regions, or collectively with common settings, within a group of two or more interior regions of the building or office being controlled, or collectively for all interior regions (for example, full building or office lockdown). In various embodiments, in response to receiving a user access control input from a user via the keyboard 104*a*, mouse 104*b*, local user device 109, or remote user device 108, the processor 101 can forward the access control information to an on-premises access control server, such as the access control server 170, or, alternatively, to an external server 107, such as an external server or application 1013, via an access control server API 1014, as shown in FIG. 2D. In response to receiving the access control information, the access control server 1107, or, alternatively, the server or application 1013, can transmit commands to the associated access controls 170 and security cameras 171 and/or video cameras 142, microphones 152, electronically actuated door locks 172, and biometric scanner or entry devices 173 to put into effect access control adjustments entered by the user. The processor 101 can update access status indicators of the interactive access control and status display panel 207 to reflect the new access states, as shown in FIG. 2A. In at least one embodiment, the on-premises access control server 170 and external server or application 1013 can be, for example, but is not limited to, the Paxton® access control system from Paxton Access Ltd. of Greenville, S.C.

Furthermore, in various embodiments, the interactive community contact display panel 208 can provide for inter-office or inter-building or inter-metaverse electronic voice or telephone communication and texting among physically-present occupants and remote virtual occupants of the building, office, or region thereof, as shown in FIGS. 2A and 2A-2. The interactive community contact display panel 208 can output a plurality of occupant icons 208-1, one for each physically-present occupant and each remote virtual occupant who are online and available for communication in association with the building, office, or region thereof, as shown in FIG. 2A-2. Each occupant icon 208-1 can include an interactive telephone icon 208-1A for initiating or answering a telephone or voice communication request between or among users, an interactive chat icon 208-1B for initiating or responding to a text message between or among users, and person icon 208-1C showing a pictorial representation of the associated user along with a status indicator showing if the user is available (for example, green status), not available or busy (for example, red), or not present or available (for example, white). For example, a user can select the telephone icon or the chat icon of the interactive community contact display panel 208 using the local user device 109, or using the remote user device 108, to initiate a telephone call or a text message. Upon receiving a control signal indicating a requested telephone call or text message, the processor 101 can issue a command to an external server 107, such as a calls/texts external server 1015, to establish a communication session between or among the initiating user and the recipient user(s), as shown in FIG. 2D. Alternatively, the control signal indicating a requested telephone call or text message, the processor 101 can be received, and the call or text session established, directly by the calls/texts external server 1015. The users can then communicate via voice/telephone and/or text message using the keyboard 104, local user device 109, or remote user device 108, under control of the calls/texts external server 1015, to be then received by the processor 101. The processor 101 can output the text message or chat messages to the display 103, local user device 109, and remote user device 108, or can forward the text message or chat message to the calls/texts external server 1017, via a calls/texts external server API 1016. The processor 101 may receive a display-formatted text message from the calls/texts external server 1015, via the network 106 such as the Internet, and via the local area network 105, as shown in FIG. 2D. Telephone or voice communication can be terminated by the user selecting the telephone icon of the occupant icon, in response to which the processor 101 can issue a command to an external server 107, such as the calls/texts external server 1015, to terminate the communication session between or among the initiating user and the recipient user(s). Alternatively, the control signal requesting termination of the telephone call or text message can be received, and the call or text session terminated, directly by the calls/texts external server 1015. The processor 101 can then output the received text messages using the interactive community contact display panel 208 within the interactive building comfort dashboard 200*a*, as shown in FIG. 2A. In at least one embodiment, the calls/texts external server 1015 can be a Microsoft Teams® server.

In addition, in various embodiments, the calendar display panel 209 can output the current calendar month including the days of the week and their dates for the month, as shown in FIG. 2A. These displayed components of the calendar display panel 209 can be received by the processor 101 via an external calendar server or application API 1018 from an external server 107, such as an external calendar server or application 1017 via the network 106 such as the Internet, and via the local area network 105, as shown in FIG. 2D. For example, the external calendar server or application 1017 can provide as inline frame format tagged information such as, for example, iFrame integration tagged information, for embedded HTML documents and information received from the calendar external server 1017. The processor 101 can then output the received calendar information using the calendar display panel 209 within the interactive building comfort dashboard 200*a*, as shown in FIG. 2A. In at least one embodiment, the calendar external server 1017 can be a Microsoft Office™ Outlook® server.

Furthermore, in various embodiments, the interior region floor map display panel 210 can output a scaled floor plan or floor map for one or more regions or interior spaces of the office or building, as shown in FIG. 2A. The interior region floor map display panel 210 can indicate the physical location of a variety of features within the office or building. For example, the interior region floor map display panel 210 can include a plurality of visual indicators or icons overlaid on the floor map showing the locations of the sensors 130 (including one or more of the temperature sensors 131, Infrared (IR) sensors 132, light sensors 133, humidity sensors 134, motion sensors 135, and air quality sensors 136), cameras 140 (including one or more of the Infrared (IR) cameras 141 and the video cameras 142), audio system 150 (including one or more of the speakers 151 and the microphones 152), elements of the lighting 160 (including one or more of the lights 161 and programmable lighting fixtures 162), access controls 170 (including one or more of the security cameras 171, door locks 172, and biometric access controls 173), and environmental controls 180. Using the keyboard 104a or mouse 104b, the user can select which room or region of the office or building is displayed using the interior region floor map display panel 210, as well as which of the sensors 130, cameras 140, audio systems 150, lighting 160, access controls 170, and environmental controls 180 whose icons are displayed on the interior region floor map display panel 210 for the associated room or region of the office or building. The interior region floor map display panel 210 can also include a visual indicator showing the locations within the associated room or region of the office or building of the physically-present occupants, as shown in FIG. 2A. In some embodiments, the interior region floor map display panel 210 can also include visual indicators 210a showing the virtual locations within the associated room or region of the office or building of each of the occupants of the building, office, or region thereof. The visual indicators 210a output by the interior region floor map display panel 210 can have different visual attributes for easy identification of the type of feature being represented. Examples of such visual attributes can include, for example, color, shape, and size; for example, video cameras 142 can be shown as blue camera icons; lights 161 can be shown as red squares; microphones 152 can be shown as yellow microphone icons, door locks 172 can be shown as purple triangles, physically-present occupants can be shown as green circles or green person silhouettes, and so on.

In at least one embodiment, each physically-present occupant can be shown in the interior region floor map display panel 210 using an icon with one or more unique individual attributes so that particular individuals can be easily identified. In some embodiments in which the interior region floor map display panel 210 also includes visual indicators showing the locations within the associated room or region of the office or building of the virtual occupants, the virtual occupants can also be shown in the interior region floor map display panel 210 using an icon with one or more unique individual attributes. For example, in various embodiments, each of the virtual occupants and physical occupants can be represented using a unique three-dimensional avatar associated with the particular occupant. The characteristics of each avatar may be set or selected by the individual represented by the avatar. The avatar may include features or attributes similar to one or more corresponding actual physiological features of the actual occupant (for example, brown hair). The physically-present occupants may be shown using an icon that has at least one visual attribute common to all physically-present occupants. Similarly, the virtual occupants may be shown using an icon that has at least one visual attribute common to all virtual occupants, so that virtual occupants can be easily distinguished from physical occupants in reference to the interior region floor map display panel 210. In various embodiments, avatars can traverse the interior region(s) and can chat with each other, meet and interact via chat and motion signs in the interior region(s). In at least one embodiment, the system 100 uses the "Ready Player Me" metaverse library of avatar functions and the NVIDIA™ metaverse library of avatar functions. In various embodiments, avatars are "moved" throughout the interior region or workspace by a user operating a keyboard and mouse, gloves, and/or A/R or V/R goggles.

In various embodiments, in response to receiving a user floor map request input from a user via the keyboard 104a and/or mouse 104b, local user device 109, or remote user device 108, the processor 101 can forward the floor map request information to an external server 107, such as an external floor plan server or application 1019, via an external floor plan server or application API 1020. In response to receiving the floor plan request information, the external floor plan control server or application 1019 can transmit floor plan display information to the processor 101 to output the floor plan requested by the user. For example, the external floor plan control server or application 1019 can provide as inline frame format tagged information such as, for example, iFrame integration tagged information, for embedded HTML documents and information received from the floor plan control server or application 1019. The processor 101 can update the visual location and status indicators of the interior region floor map display panel 210 to reflect changes in status, such as a change in the presence or absence of an occupant, or the open/closed state of a door lock 172. In various embodiment, the interactive interior region or workspace display is constructed using a wireframe representation in Unity® software in which features such the sensors 130 are a layer in the space.

In addition, in various embodiments, the audio control display panel 211 can be an interactive display configured to allow a user to control the audio input and output in an office, building, or region or area thereof, as shown in FIG. 2A. For example, using the audio control display panel 211, a user can select a playlist for music or podcast, or audio associated with a Web-based meeting, or audio associated with a corresponding video broadcast or television channel; adjust the volume level for particular areas or regions or rooms or individual offices of the office or building, or for the entire room, according to a plurality of levels; and control the playback, stop, and backwards and forward track associated with the playlist, as shown in FIG. 2A. Each audio setting can be controlled by actuating, using an interactive display or a pointing device, a button corresponding to the desired setting. The volume level can be more-finely adjusted using a slider control that varies the volume level from 0% to 100% for an associated speaker 151 or for a group of speakers 151. The current volume level or a given space can be shown on the audio control display panel 211, for the particular areas or regions or rooms or individual offices of the office or building, or for the entire room. In various embodiments, in response to receiving a user audio control input from a user via the keyboard 104a, mouse 104b, local user device 109, or remote user device 108, the processor 101 can forward the volume control information to an on-premises audio control server, or, alternatively, to an external server 107, such as an external audio server or application 1021, via an external audio server or API 1022, as shown in FIG. 2D. In response to receiving the lighting control information, the audio server or application 1021, can transmit streamed or live audio signals to the speakers 151 in accordance with the audio control adjustments entered by the user. The processor 101 can update audio status indicators of the audio control display panel 211 to reflect the new audio adjustments, as shown in FIG. 2A. In at least one embodiment, the external audio server or application 1021 and the speakers 151 can be provided by, for example, but is not limited to, model number One SL from Sonos, Inc. of Santa Barbara, Calif.

Control Center

FIG. 3A illustrates a Graphical User Interface (GUI) interactive display screen output generated by the building control center software application module 300 showing an interactive building control center dashboard 300a according to at least one embodiment. As seen in FIG. 3A, the control center button 262 is highlighted to indicate that it has been selected and the information displayed below is related to the control center button 262. A row of control center dashboard options 280 includes a comfort button 281, a safety button 282, an occupants button 283, and an assets button 284. As seen in FIG. 3A, the control center button 262, the comfort button 281, and an all devices button 281-1 are highlighted to indicate that they have been selected and the information displayed below are related to the combination of selected buttons. In addition to the all devices button 281-1, a lighting and shades button 281-2, and an air quality & thermostats button 281-3 are included and selection of each causes information and controls specific to those buttons to be displayed in the interactive building control center dashboard 300a display. In FIG. 3A, based on a user's selection, the interactive building control center dashboard 300a can be configured to output one or more interactive comfort display panels, one or more safety display panels, one or more display panels associated with occupants of the office or building, or one or more display panels associated with assets of the office or building. As an example of the interactive comfort display panels, the interactive building control center dashboard 300a can include the interior region floor map display panel 210 as described herein, outputting a scaled floor plan or floor map 301 for one or more regions or interior spaces of the office or building. In various embodiments, the interactive building control center dashboard 300a can be configured by a user to include visual attributes for all devices contained in an interior region of the building or office as shown on the floor plan 301 with respect to FIG. 3A, lighting and shade devices and status for the interior region as shown with respect to the lighting control display panel 207 described herein, air quality status for the region as shown with respect to the air quality display panel 204 described herein, and sound devices and status as shown with respect to the audio display panel 211 as described herein. Examples of such visual attributes can include, for example, color, shape, and size, so, for example, sensors can be shown as small red circles 130 that are spaced generally equidistantly apart from each other and can be single or multi-purpose sensors 130 to collect various environmental information. Other devices can include, but are not limited to, video cameras 142 that can be shown as blue icons with a "C"; lights 161 that can be shown as large red circles with a variable yellow halo to represent the light output level of each of the lights 161; speakers 151 can be shown as dark blue circles with a light blue silhouette of a side view of a speaker; microphones 152 can be shown as semi-circular orange icons, doors 172 can be shown as blue rectangles, air quality sensors/thermostats 131, 136 can be shown as a small dark green circle inside of a larger light green circle.

FIG. 3A-1 illustrates another embodiment of the GUI interactive display screen output of FIG. 3A showing an interactive building control center dashboard 300a' screen for detailing all air quality sensor positions within the monitored space according to at least one embodiment of the disclosed subject matter. In the at least one embodiment in FIG. 3A-1, the air quality and thermostat button 281-3 is selected and an active air quality summary and menu window 310 with a floor plan option 330 selected is shown adjacent the floor map 301. As seen in this embodiment, a sound button 281-4 is also included and selection of the sound button 281-4 causes information and controls specific to the sound system equipment in the monitored space to be displayed in the interactive building control center dashboard 300a' display. The active air quality summary and menu window 310 includes information (that is, metrics) on an overall air quality score 302, a temperature bar 303, a carbon dioxide ($CO_2$) bar 304 in parts per million (ppm), a Particle Matter 2.5 (PM 2.5) bar 305 in micrograms per cubic meter ($\mu g/m^3$) of air, a light intensity bar 306 measured in lumens (lx), a noise bar 307 measured in decibels (dB), a Total Volatile Organic Compounds (TVOCs) bar 308 measured in parts per billion (ppb), and a humidity bar 309 measured in percent humidity (%). Each of the above metrics can be selected by the user to access additional underlying details for each measurement. This is best seen and described below in relation to FIGS. 3A-2 to 3A-4. The floor plan 301 is shown with icons indicating the locations of each air quality/environment sensor 311, which can include, but are not limited to, a thermostat, a gas/fume sensor, and a humidity sensor. A thermostats option 331 and a metrics option 332 are also provided. When the thermostats option 331 is selected, the display in the interactive building control center dashboard 300a' screen switches to show specific details and controls to be used to control each thermostat 311. Similarly, when the metrics option 332 is selected, the display in the interactive building control center dashboard 300a' screen switches to show specific details and controls to be used to review the metrics for the building environment and systems.

FIG. 3A-2 illustrates individual control elements of the GUI interactive display screen output of FIG. 3A dashboard 300a showing the active air quality summary and menu window 310 and some resulting alternative display details based on selecting different options within the active air quality summary and menu window 310 according to at least one embodiment of the disclosed subject matter. As seen in 3A-2 selecting the temperature bar 303 causes a temperature menu window 310A to display with individual temperatures for each air quality/environment sensor 311 location such as, for example, a gym, a conference room, sales cubes, etc. Similarly, selecting the $CO_2$ bar 303 causes a $CO_2$ menu window 310B to display with individual $CO_2$ measurements for each air quality/environment sensor 311 location such as, for example, the gym, the conference room, the sales cubes, etc. Similarly, selecting the PM 2.5 bar 305 causes a PM 2.5 menu window 310C to display with individual PM 2.5 measurements for each air quality/environment sensor 311 location such as, for example, the gym, the conference room, the sales cubes, etc.

FIG. 3A-3 illustrates further individual control elements of the GUI interactive display screen output of FIG. 3A dashboard 300a showing the active air quality summary and menu window 310 and resulting alternative display details based on selecting different options within the air quality control menu 310 according to at least one embodiment of the disclosed subject matter. As seen in FIG. 3A-3 selecting the light bar 306 causes a light menu window 310D to display with individual light levels for each air quality/environment sensor 311 location such as, for example, the gym, the conference room, the sales cubes, etc. Similarly, selecting the noise bar 307 causes a noise menu window 310E to display with individual noise measurements for each air quality/environment sensor 311 location such as, for example, the gym, the conference room, the sales cubes, etc. Similarly, selecting the $TVOC_s$ bar 308 causes a $TVOC_s$ menu window 310F to display with individual V measurements for each air quality/environment sensor 311 location such as, for example, the gym, the conference room, the sales cubes, etc.

FIG. 3A-4 illustrates still further individual control elements of the GUI interactive display screen output of FIG. 3A dashboard 300a showing an air quality control menu 310 and resulting alternative display details based on selecting different options within the air quality control menu 310 according to at least one embodiment of the disclosed subject matter. As seen in FIG. 3A-4 selecting the humidity bar 309 causes a humidity menu window 310D to display with individual light levels for each air quality/environment sensor 311 location such as, for example, the gym, the conference room, the sales cubes, etc. In FIG. 3A-4, a lighting control menu 320 is shown from with selectable control bars for predefined and controlled areas of the building such as, for example, a common area bar 321, at least one conference room bar 322, an entry bar 323, a plant wall 324, at least one office bar 325, and a scroll bar 328 to move up and down the list of selectable control bars. Each of the selectable control bars in the lighting control menu 320 include a selectable status indicator that describes the current lighting level for that area, for example, a common area status indicator 321A. When the common area status indicator 321A is selected, the associated common area bar 321 expands within the lighting control menu 320 to display multiple predefined lighting level control slider buttons 321A-1 including a high level button, a medium level button, a low level button, and an on/off button. When the conference room status indicator 322A is selected, the associated conference room bar 322 expands within the lighting control menu 320 to display multiple predefined lighting level control slider buttons 322A-1 including a high-level button, a medium-level button, a low-level button, and an on/off button. When a status indicator for a specific bar is selected that bar expands and any other expanded bar(s) can automatically be unexpanded or they can remain expanded, depending on how the user has set their specific preferences.

Figure 3A:
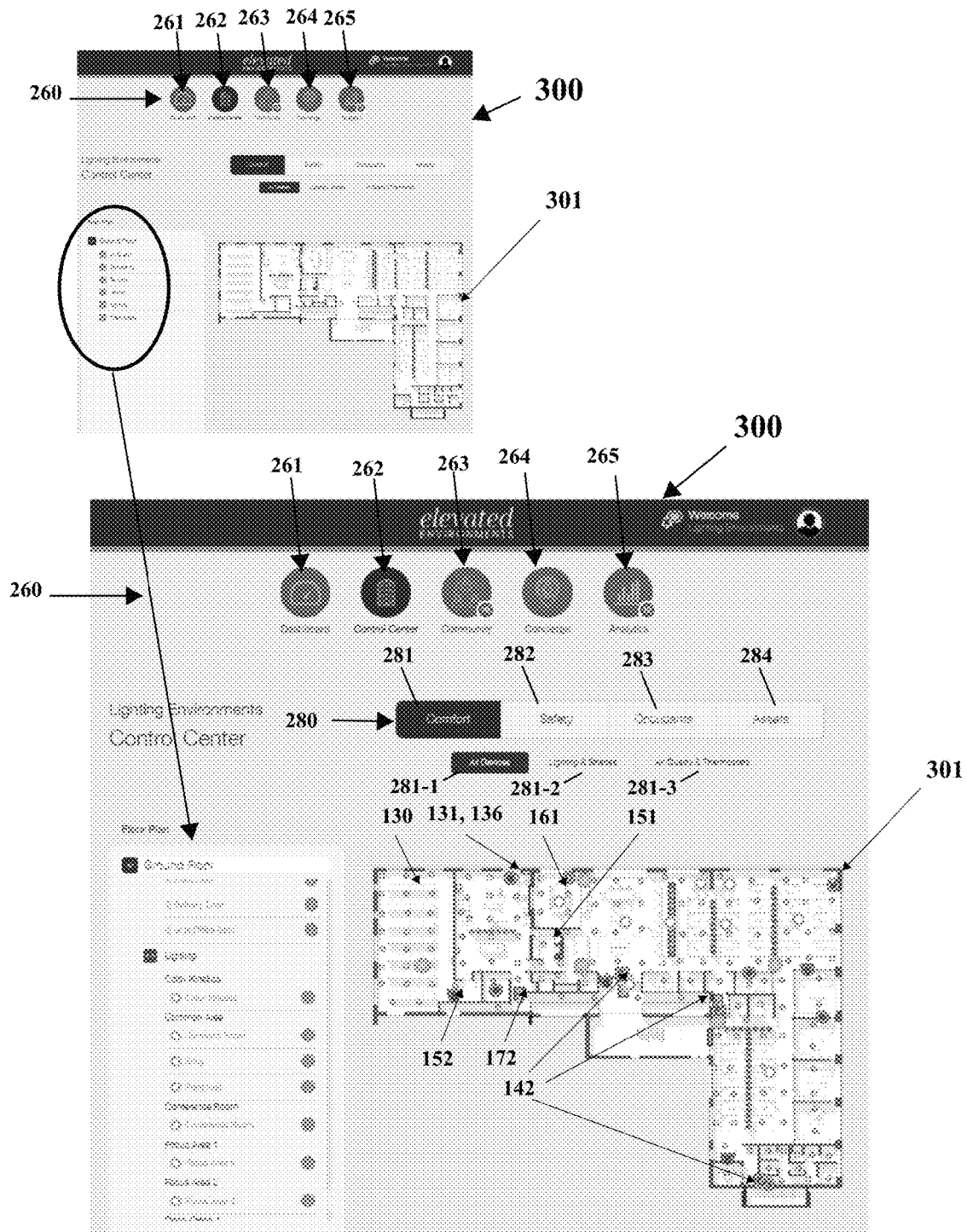
Figures 1, 3A:
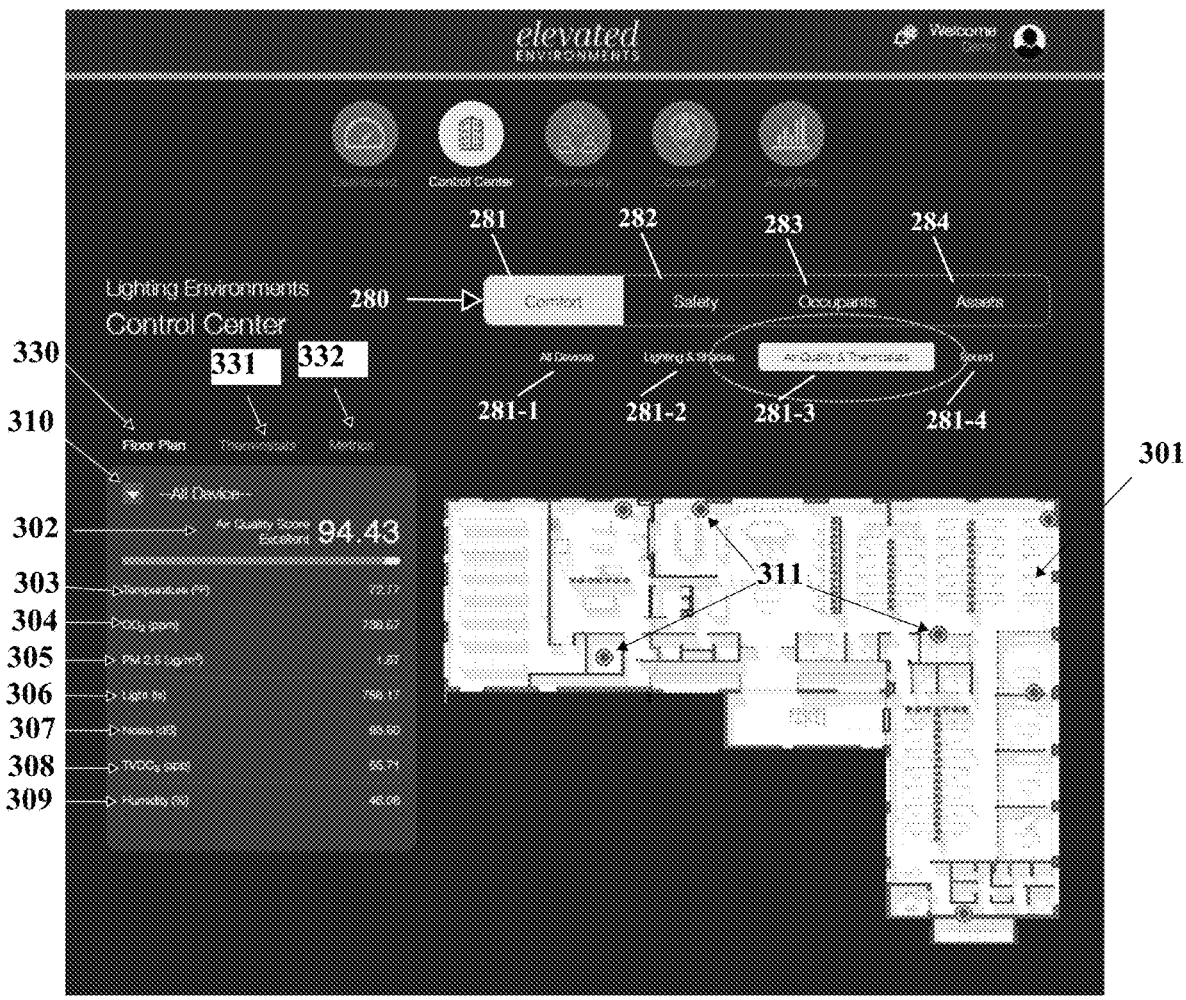
Figures 2, 3A:
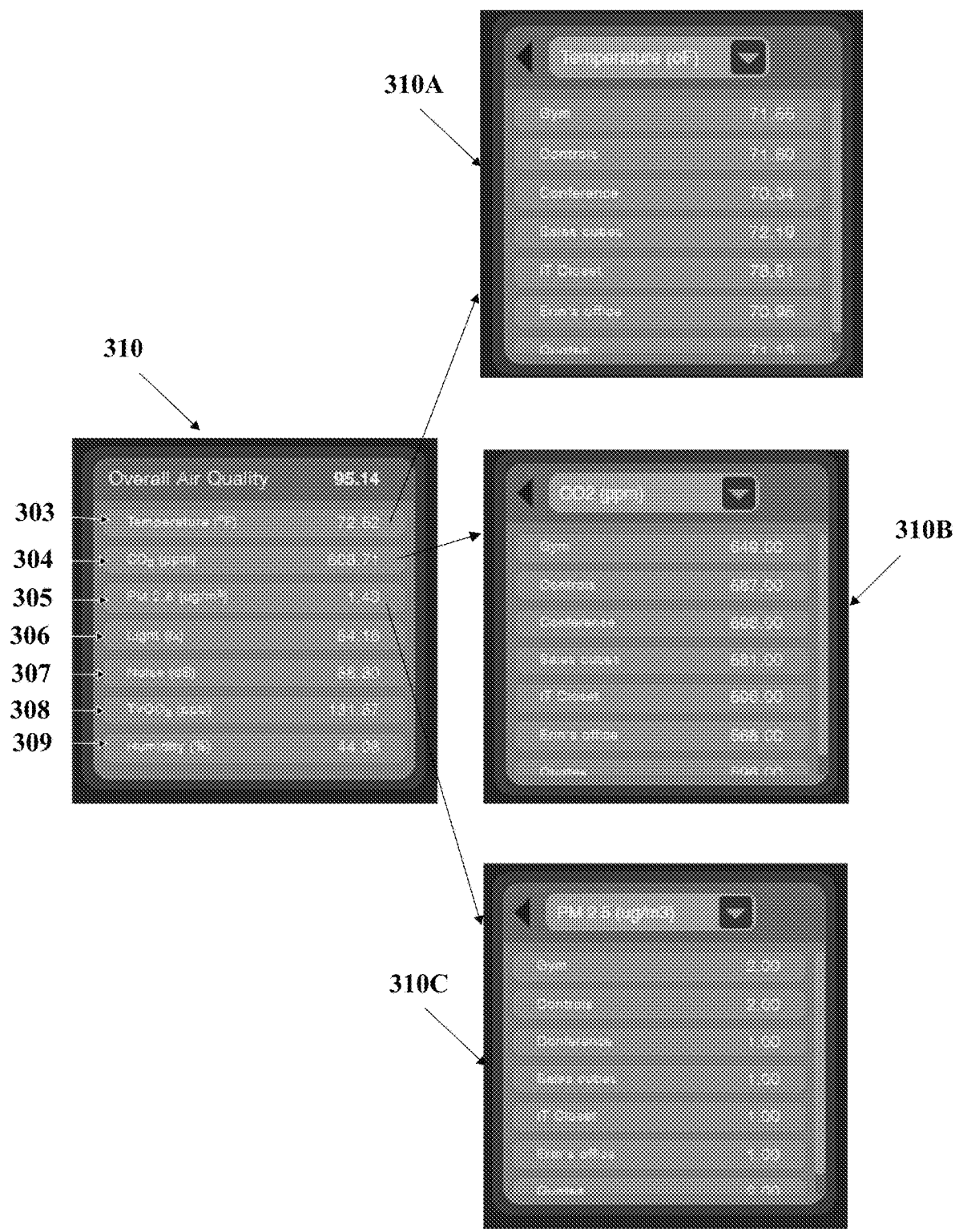
Figures 3, 3A:
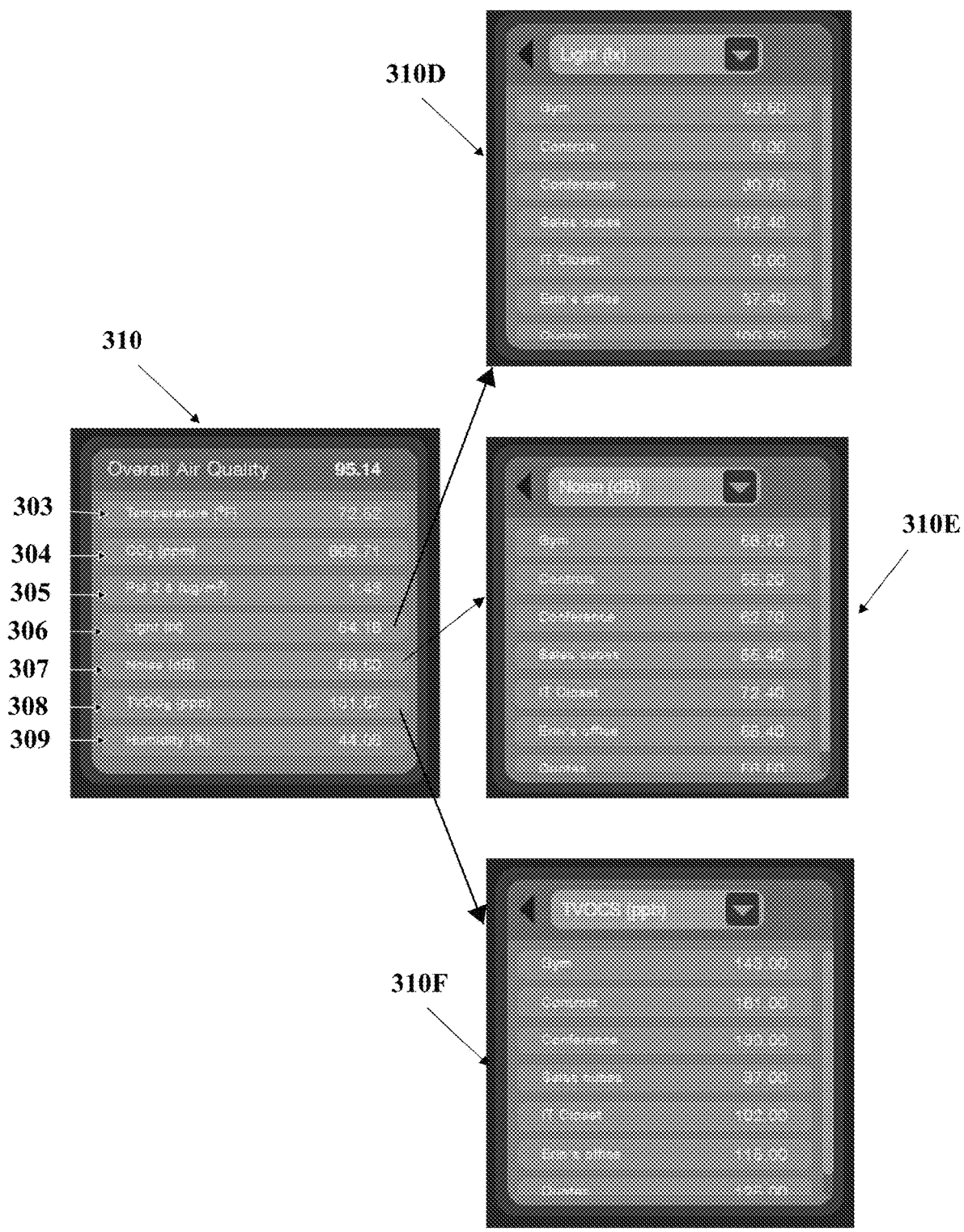
Figures 3, 3A, 4:
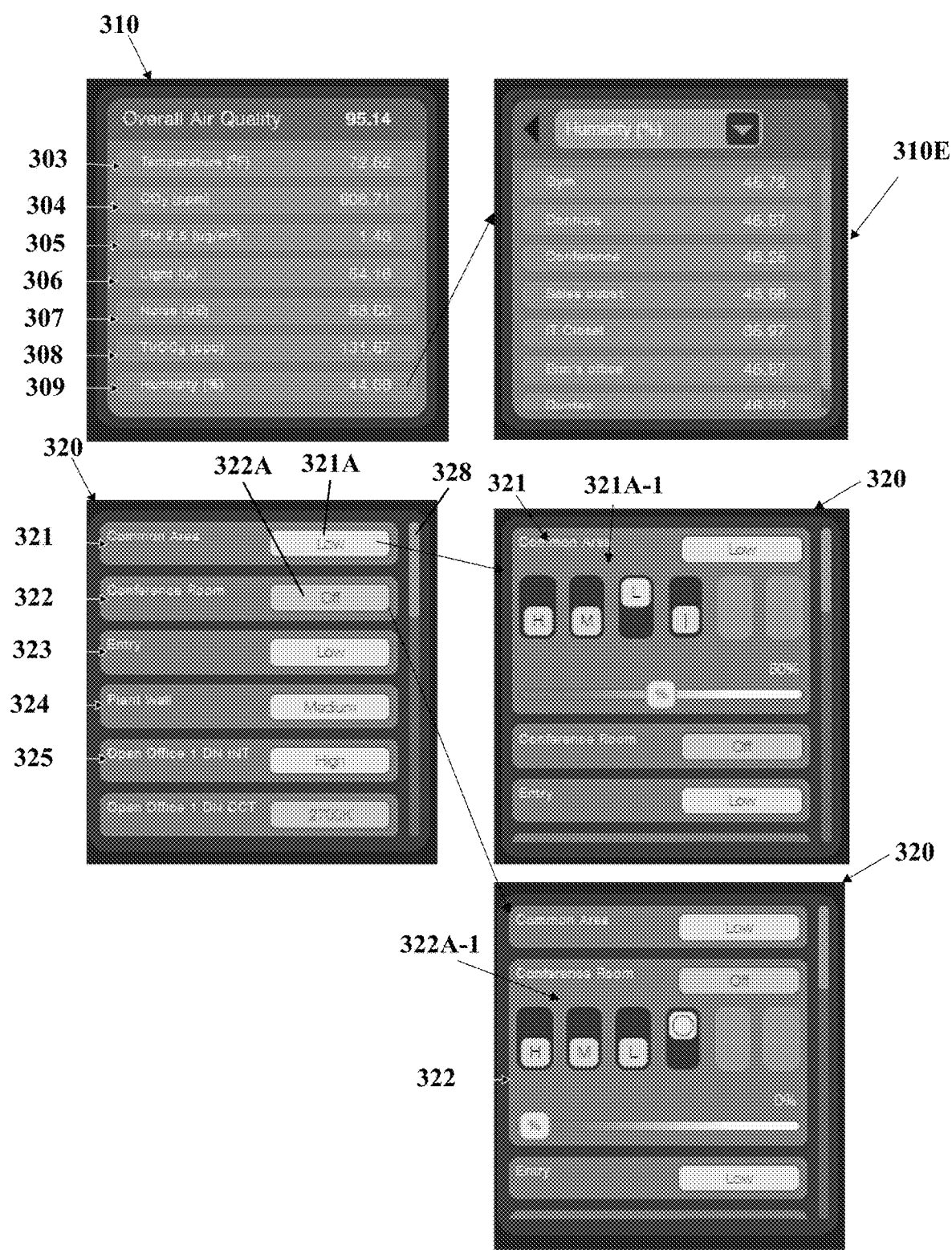
Figure 3B:
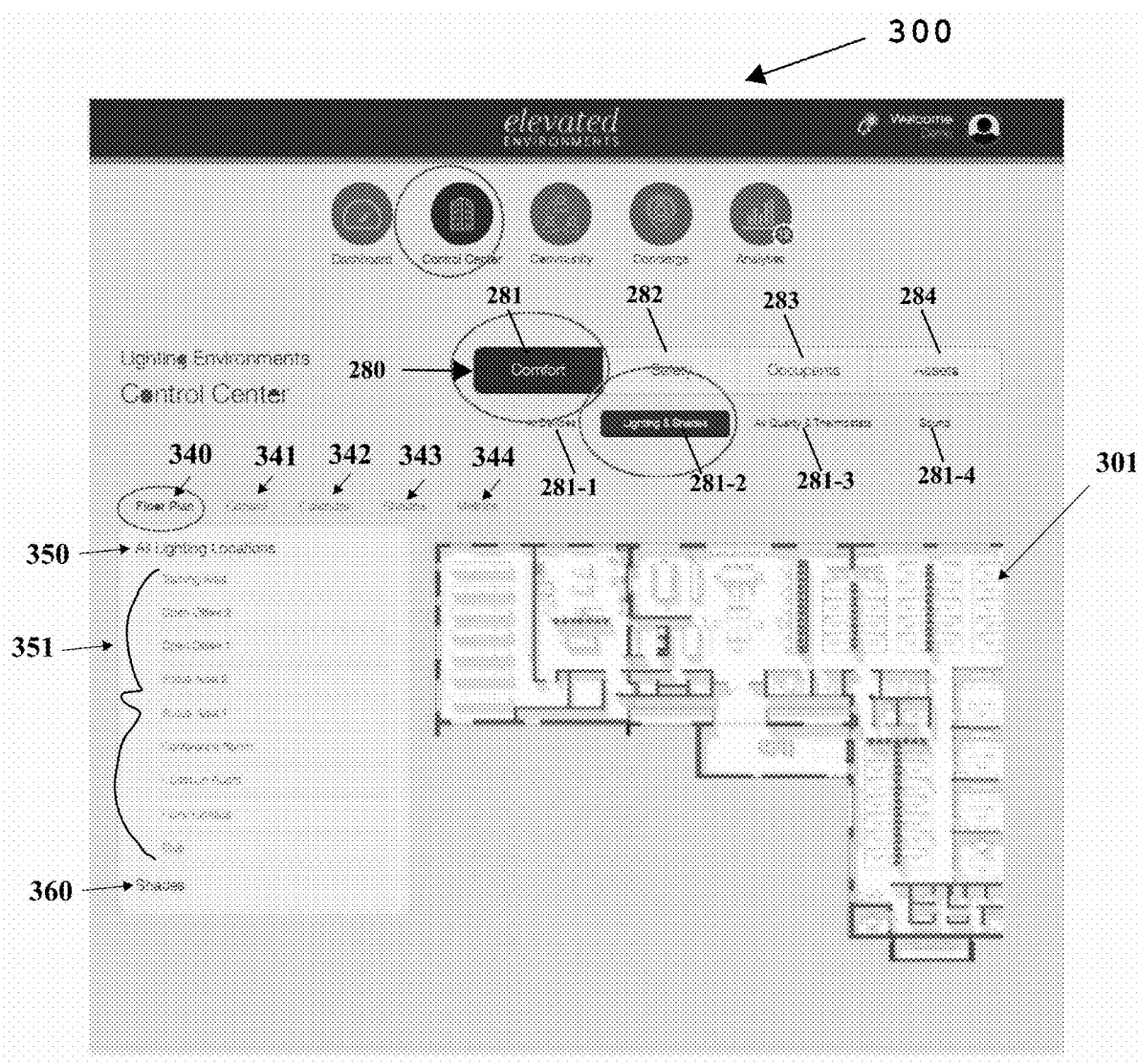
FIG. 3B illustrates the GUI interactive display screen output showing the interactive building control center floor plan screen of FIG. 3A configured for managing the lighting within the monitored space according to at least one embodiment of the disclosed subject matter.

FIG. 3B illustrates the GUI interactive display screen output showing the lighting and shades button 281-2 selected and the interactive building control center dashboard 300a floor plan screen of FIG. 3A reconfigured for managing the lighting within the monitored space according to at least one embodiment of the disclosed subject matter. In FIG. 3B, a floor plan button 340 is highlighted to show it has been selected and selectable lighting control options 350 for all of the lighting locations under control of the system are displayed below the floor plan option 330 and next to the floor plan 301. For example, individual selectable lighting locations 351 can include, but are not limited to, offices, conference rooms, common areas, hallways, closets, bathrooms, kitchens, etc. A selectable shades option 360 is also included and when selected, although for clarity the details are not shown, provides a listing of controllable windows and windows with controllable shades. In addition to the floor plan option 340, a control option 341, a calendar option 342, a shades option 343, and a metrics option 344 are also included and when selected, information and controls specific to each are formatted and displayed. For example, when the control option 341 is selected, the floor plan 301 can be replaced with a set of predefined toggles to control lighting levels from low, medium, to high in the monitored facility, as well as, with a set of variable sliders to control lighting levels from low to high in the monitored facility. These two options are further described below in relation to FIG. 3C.

Figure 3C:
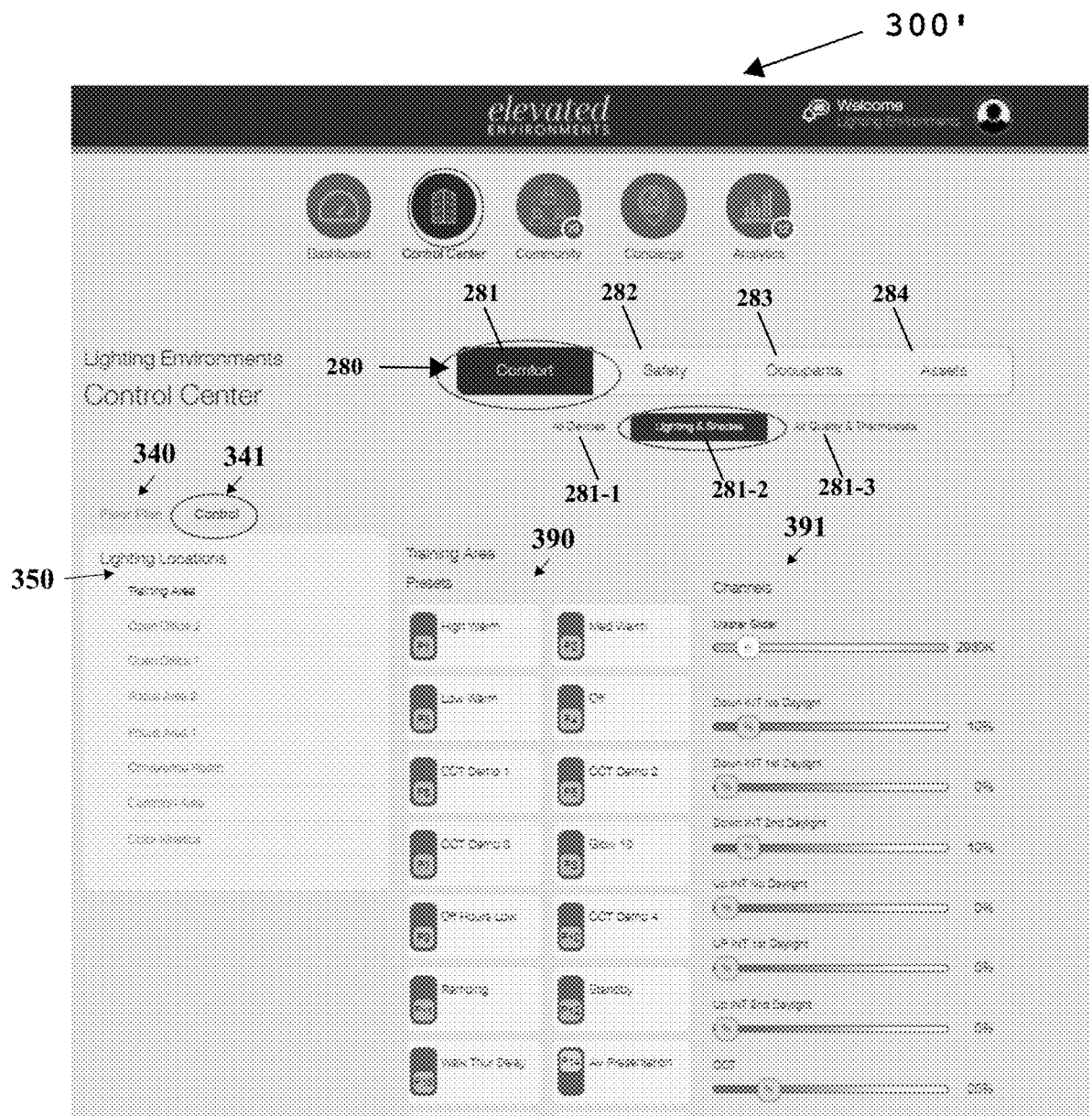
FIG. 3C illustrates the GUI interactive display screen output showing the interactive building control center control screen of FIG. 3A configured for managing the lighting within the monitored space according to at least one embodiment of the disclosed subject matter.

FIG. 3C illustrates the GUI interactive display screen output still showing the lighting and shades 281-2 button selected with a control button 341 highlighted to show it too has been selected and the interactive building control center dashboard 300a' control screen of FIG. 3B as a reconfigured as a interactive building control center dashboard 300a' control screen for managing the lighting within the monitored space according to at least one embodiment of the disclosed subject matter. In FIG. 3C, the floor plan 301 of FIG. 3B can be replaced with a set of predefined toggles 390 to control lighting levels from low, medium, to high in some or all of the space within the monitored facility, as well as, with a set of variable sliders 391 to control lighting levels from low to high in the monitored facility. The sliders can be configured to control all aspects of the lighting to include, but not limited to, intensity, warmth, and color.

Figure 3D:
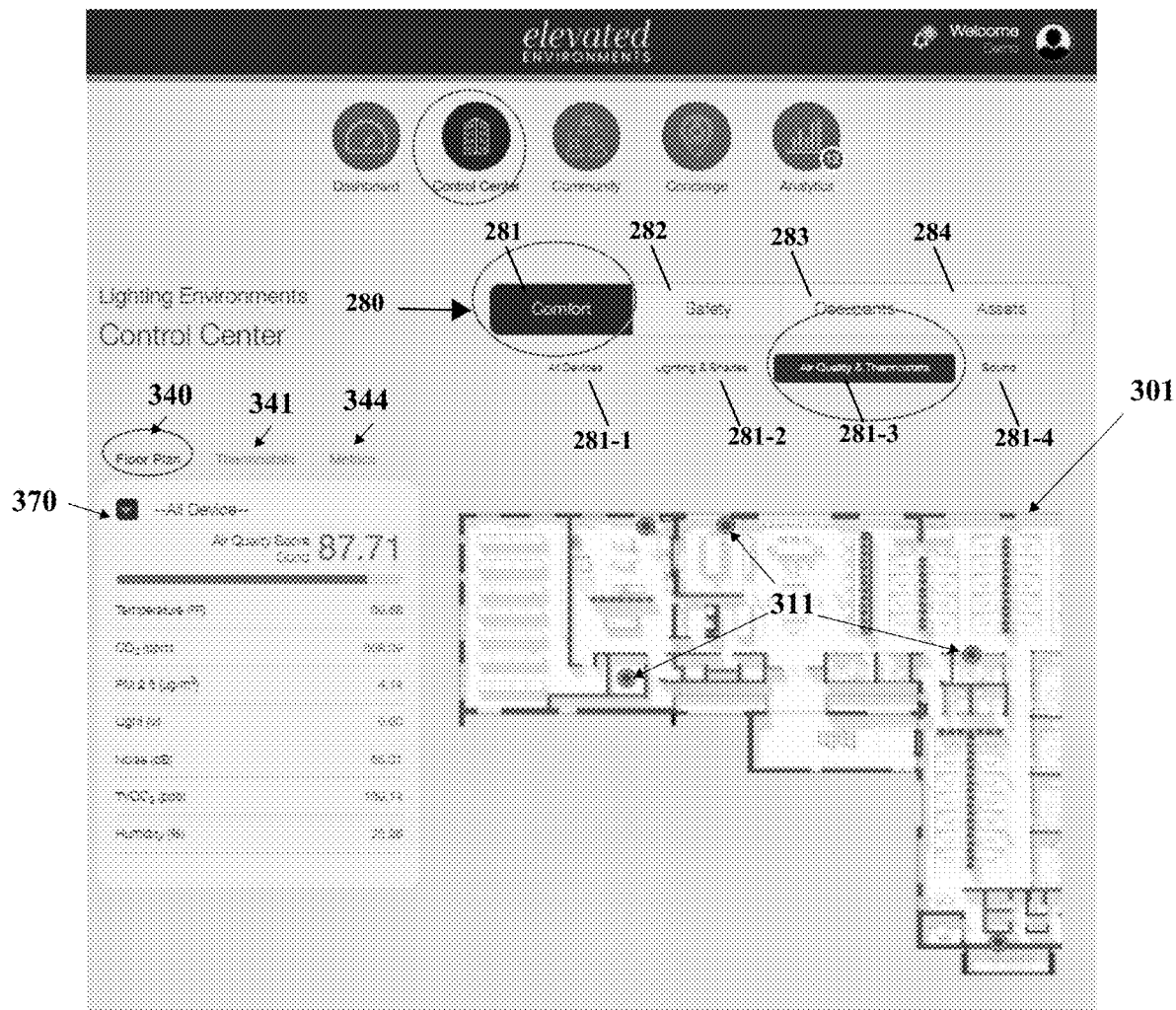
FIG. 3D illustrates the GUI interactive display screen output showing the interactive building control center floor plan screen of FIG. 3A configured for managing the air quality and temperature within the monitored space according to at least one embodiment of the disclosed subject matter.

FIG. 3D illustrates the GUI interactive display screen output showing the air quality and thermostats button 281-3 selected and the interactive building control center dashboard 300a floor plan screen of FIG. 3C reconfigured for managing the air quality and thermostats within the monitored space according to at least one embodiment of the disclosed subject matter. In FIG. 3D, the floor plan button 340 is highlighted to show it has been selected and selectable air quality and thermostats control metrics and options 370 for all of the lighting locations under control of the system are displayed below the floor plan option 340 and next to the floor plan 301 of the monitored space. Operation and use of the features of this display are described in relation to FIG. 3A-1 above.

Figure 3E:
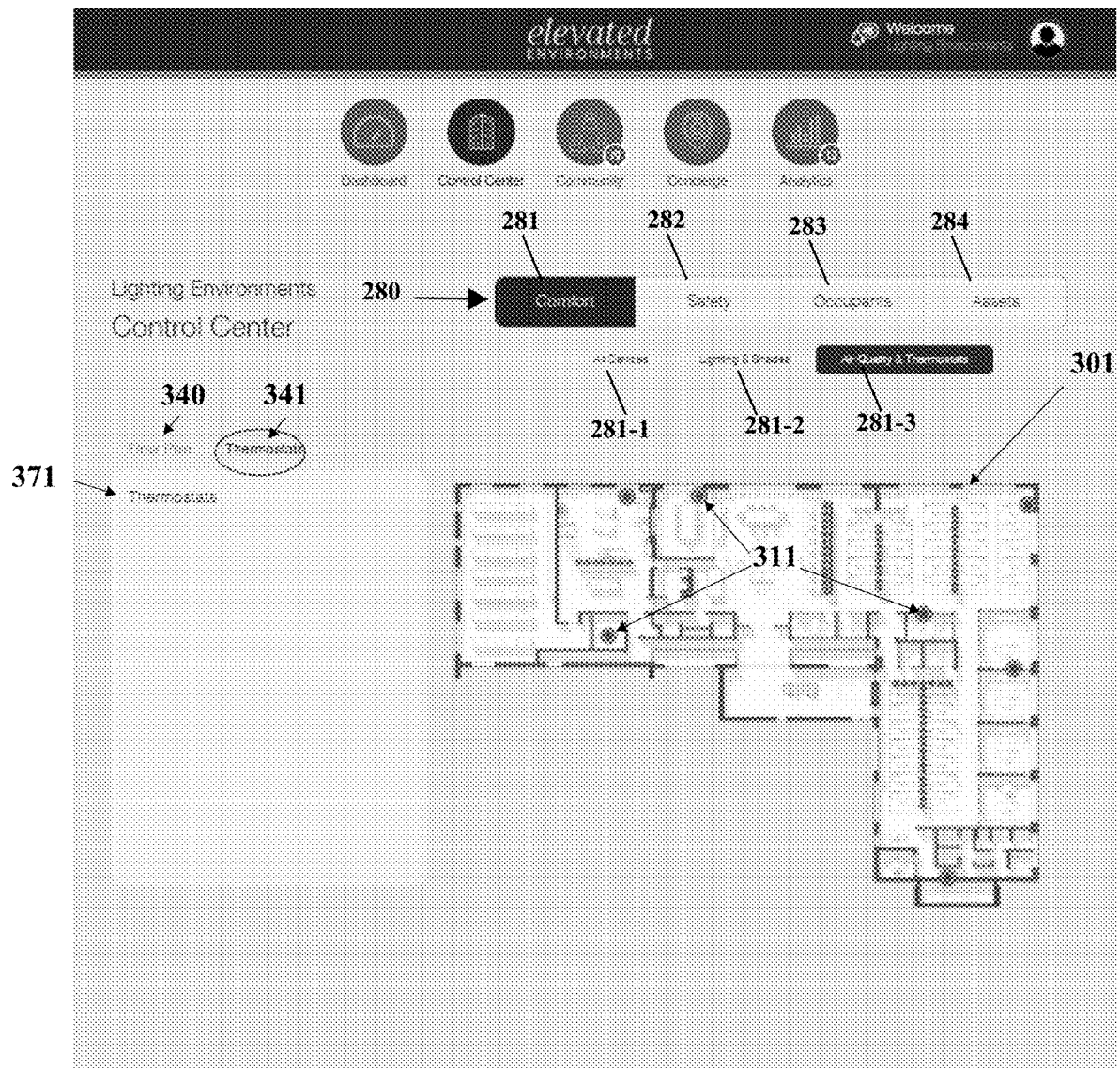
FIG. 3E illustrates the GUI interactive display screen output showing the interactive building control center thermostat control screen of FIG. 3A configured for managing the air quality and temperature within the monitored space according to at least one embodiment of the disclosed subject matter.

FIG. 3E illustrates the GUI interactive display screen output showing the interactive building control center dashboard 300a' thermostat control screen of FIG. 3D reconfigured for managing the air quality and temperature within the monitored space according to at least one embodiment of the disclosed subject matter. In FIG. 3E, the thermostat button 341 is highlighted to show it has been selected and selectable thermostat controls and options 371 for all of the lighting locations under control of the system are displayed below the floor plan option 340 and next to the floor plan 301 of the monitored space over which the positions of the thermostats 311 are overlaid. An example mobile application screenshot embodiment of a thermostat control panel 1600 of the space functions 1311 (or comfort dashboard 200a) is shown in FIG. 2A-7. As shown in FIG. 2A-7, the thermostat control panel 1600 can include heating, cooling, fan speed and on/off, and temperature set point controls for various rooms, areas, and regions within the space such as, for example, a common area or room 1601, conference rooms 1602, a demonstration room or area 1603, control rooms 1604, and offices such as open offices or cubicles 1605. Other rooms, regions, and areas for which heating, cooling, fan speed, may be provided include gathering or meeting areas such as a focus area for example, without limitation. An example mobile application screenshot embodiment of a detailed thermostat control panel 1650 of the space functions 1311 (or comfort dashboard 200a) for these thermostat controls is shown in FIG. 2A-7A.

Figure 3F:
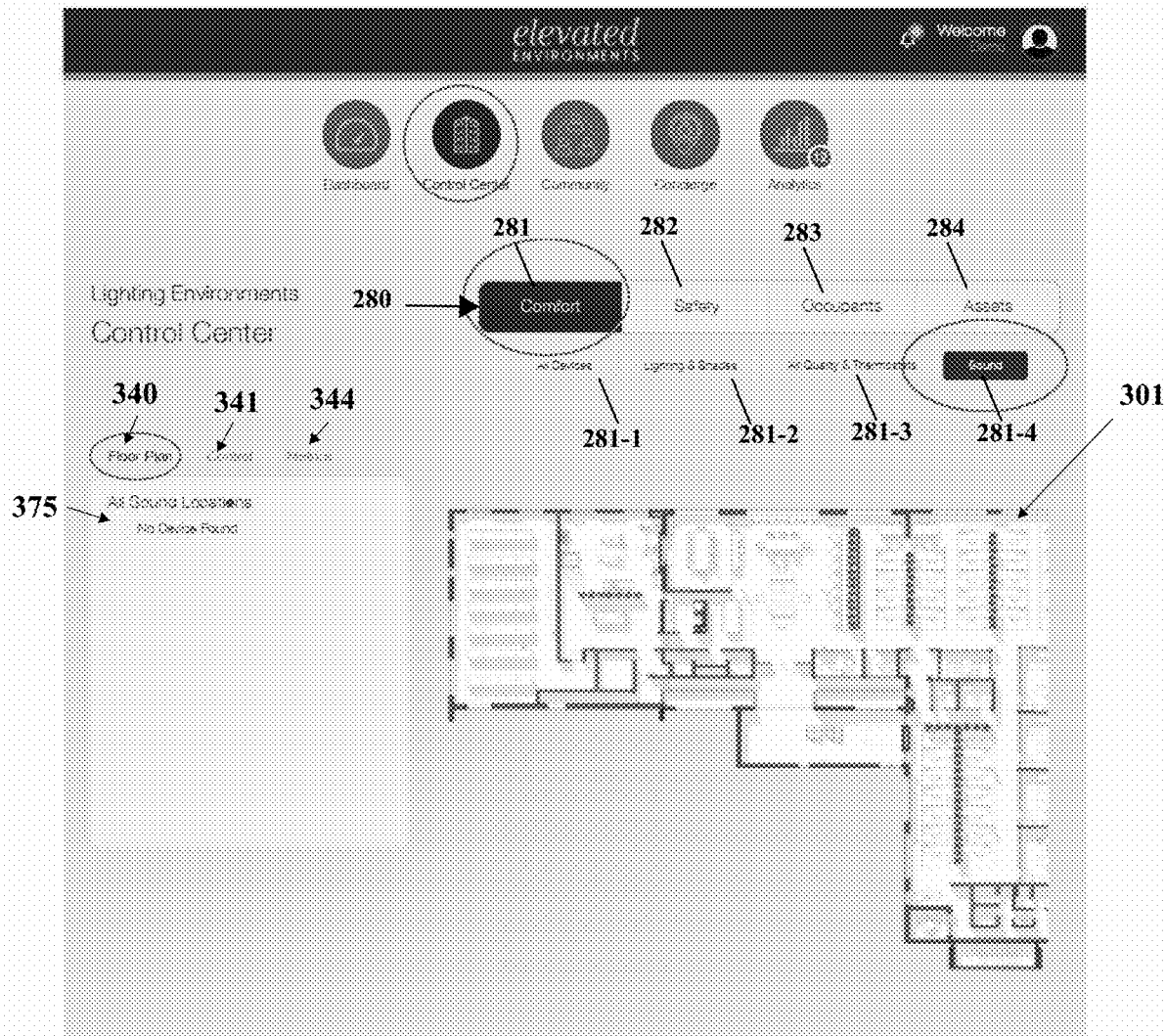
FIG. 3F illustrates the GUI interactive display screen output showing the interactive building control center floor plan screen of FIG. 3A configured for managing the sound system within the monitored space according to at least one embodiment of the disclosed subject matter.
Figure 3G:
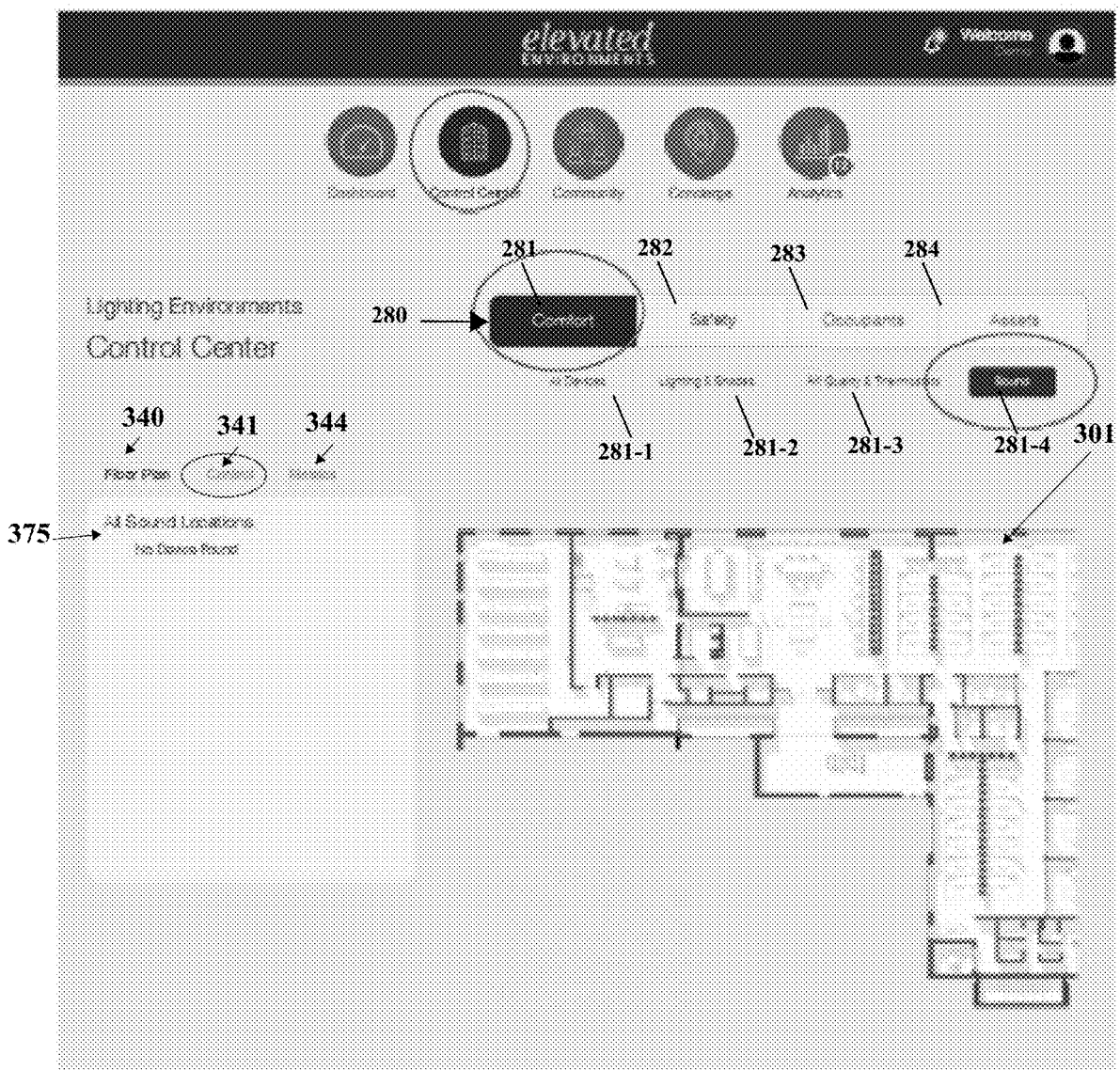
FIG. 3G illustrates the GUI interactive display screen output showing the interactive building control center control screen of FIG. 3A configured for managing the sound system within the monitored space according to at least one embodiment of the disclosed subject matter.

FIG. 3F illustrates the GUI interactive display screen output showing the sound button 281-4 selected and the interactive building control center dashboard 300a floor plan screen of FIG. 3C reconfigured for managing the sound system elements within the monitored space according to at least one embodiment of the disclosed subject matter. In FIG. 3F, the floor plan button 340 is highlighted to show it has been selected and sound controls and options 375 for all of the lighting locations under control of the system are displayed below the floor plan option 340 and next to the floor plan 301 of the monitored space. Examples of the sound information include, but are not limited to, sound levels, speaker volume levels, quality, treble, bass, and tone; and the sound controls include, but are not limited to, control of speakers, sound systems, measurement of ambient noise and creation of white noise FIG. 3G illustrates the GUI interactive display screen output showing the interactive building control center dashboard 300a control screen of FIG. 3F reconfigured for managing the sound system within the monitored space according to at least one embodiment of the disclosed subject matter. In FIG. 3G1, the control button 341 is highlighted to show it has been selected and sound controls and options 375 for all of the sound locations under control of the system are displayed below the floor plan option 340 and next to the floor plan 301 of the monitored space. Examples of the sound information include, but are not limited to, sound levels, speaker volume levels, quality, treble, bass, and tone; and the sound controls include, but are not limited to, control of speakers, sound systems, measurement of ambient noise and creation of white noise. Although not shown as being selected, the metrics button 344, if selected, causes the screen to be reconfigured with the floor plan 301 replaced with the different sound metrics associated with the sound system, which can be organized by specific offices, areas, and regions within the monitored space.

Figure 3H:
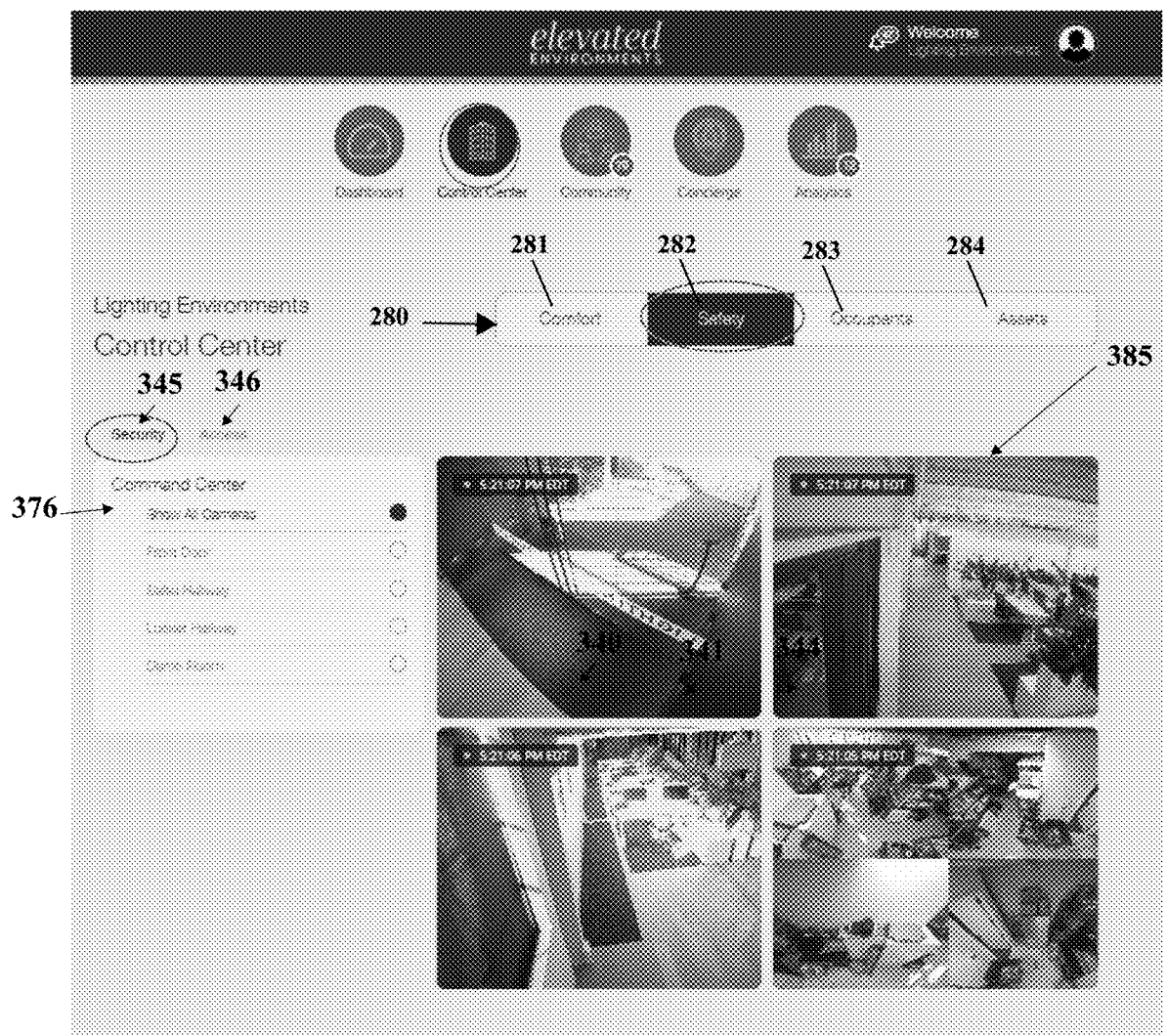
FIG. 3H illustrates the GUI interactive display screen output showing the interactive building control center security screen of FIG. 3A configured for managing the access to the monitored space according to at least one embodiment of the disclosed subject matter.
Figure 31:
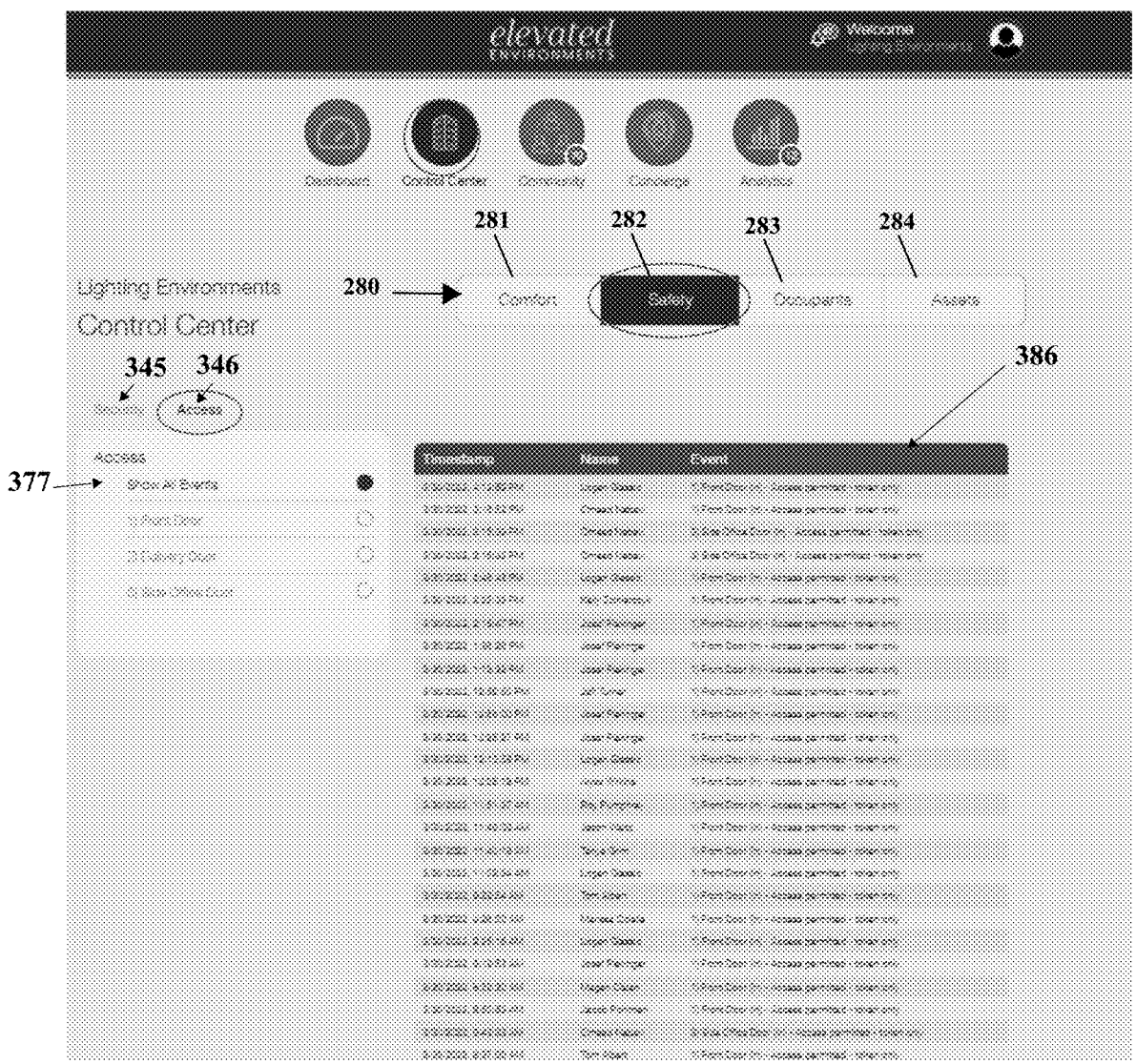

FIG. 3H illustrates the GUI interactive display screen output showing the safety button 282 selected and the interactive building control center dashboard 300a floor plan screen of FIG. 3B reconfigured for managing the safety of and access to the monitored space according to at least one embodiment of the disclosed subject matter. In FIG. 3H, the security button 345 is highlighted to show it has been selected and selectable access options 376 for all of the camera and access locations under control of the system are displayed below the security option 345 and next to images 385 from the selected cameras that are located in the monitored space. The selectable access options 376 for all of the camera and access locations include, but are not limited to, whether to display one to all of the camera images, locking and opening door locks, controlling the zoom and focus of individual cameras, heat mapping, and security use. In addition, external cameras can be installed (or internal cameras can be aimed through windows to view the areas outside the windows) to monitor: external building surroundings, parking area(s), a card entry access for a parking area or a garage, for possible vehicle and license recognition, for suspicious behavior identification, etc. This monitoring can be performed on a 24 hour 7 day a week basis, as well as on an as needed basis, and recordings of the monitoring can be saved and stored. For example, while the cameras can always be on and running, the recording of the area/scene in front of the camera can be continuous or limited to instances when the camera detects motion in the area/scene in front of the camera. Depending on the needs and applicable laws, the recordings can be permanently saved and stored on a secure medium and/or temporarily and securely stored on a reusable medium, which is reused over a predefined time period. For example, this predefined time period can be defined to be over a number of minutes, hours, days, weeks, and months. A security camera software program, which can include artificial intelligence (AI) and biometric functionalities, can be used to monitor, recognize, identify, and alert when predetermined security risk levels have been determined to be exceeded by the images obtained by the security cameras. Regardless of the capabilities of the camera systems and related software, compliance with local, state, and/or federal laws is required. This compliance may include a requirement for notification to individuals who come into the field of view of the cameras. The notification include, posting a notice that they are under surveillance and that recordings are being made of them as well as requiring written notification and an affirmative written acceptance of the obtaining and storing of the captured images, which may include biometric information. An example mobile application screenshot embodiment of a safety control panel 1700 of the space functions 1311 (or comfort dashboard 200a) is shown in FIG. 2A-8. As shown in FIG. 2A-8, the safety control panel 1700 can include access and security camera controls for various doors, entry/exit means, rooms, areas, hallways, and regions within the space as shown in FIG. 2A-8. For example, as shown in FIG. 2A-8, the safety control panel 1700 can include access and security camera controls and status for a front door 1701, a delivery 1703, a side office door 1705, a locker hallway 1707, a sales hallway 1709, and a demo room 1711. An example mobile application screenshot embodiment of a detailed safety control panel 1750 of the space functions 1311 (or comfort dashboard 200a) for these access and security camera controls and status controls is shown in FIG. 2A-8A.

FIG. 3I illustrates the GUI interactive display screen output showing the interactive building control center dashboard 300a access log screen of FIG. 3H reconfigured for managing the access to the monitored space according to at least one embodiment of the disclosed subject matter. In FIG. 3I, the access button 346 is highlighted to show it has been selected and selectable access options 377 for each of the access locations under control of the system are displayed below the security option 345 and next to a time-stamped access list 386 for each of the access locations to the monitored space. The selectable access options 376 for all of the camera and access locations include, but are not limited to, whether to display access events for one to all of the access locations. The information in the timestamped access list 386 can include, but are not limited to, date and time of access, name of the person accessing, and an event description to include which access location was used, was access permitted or denied, and the access method, for example, badge, token, manual, etc.

Figure 3J:
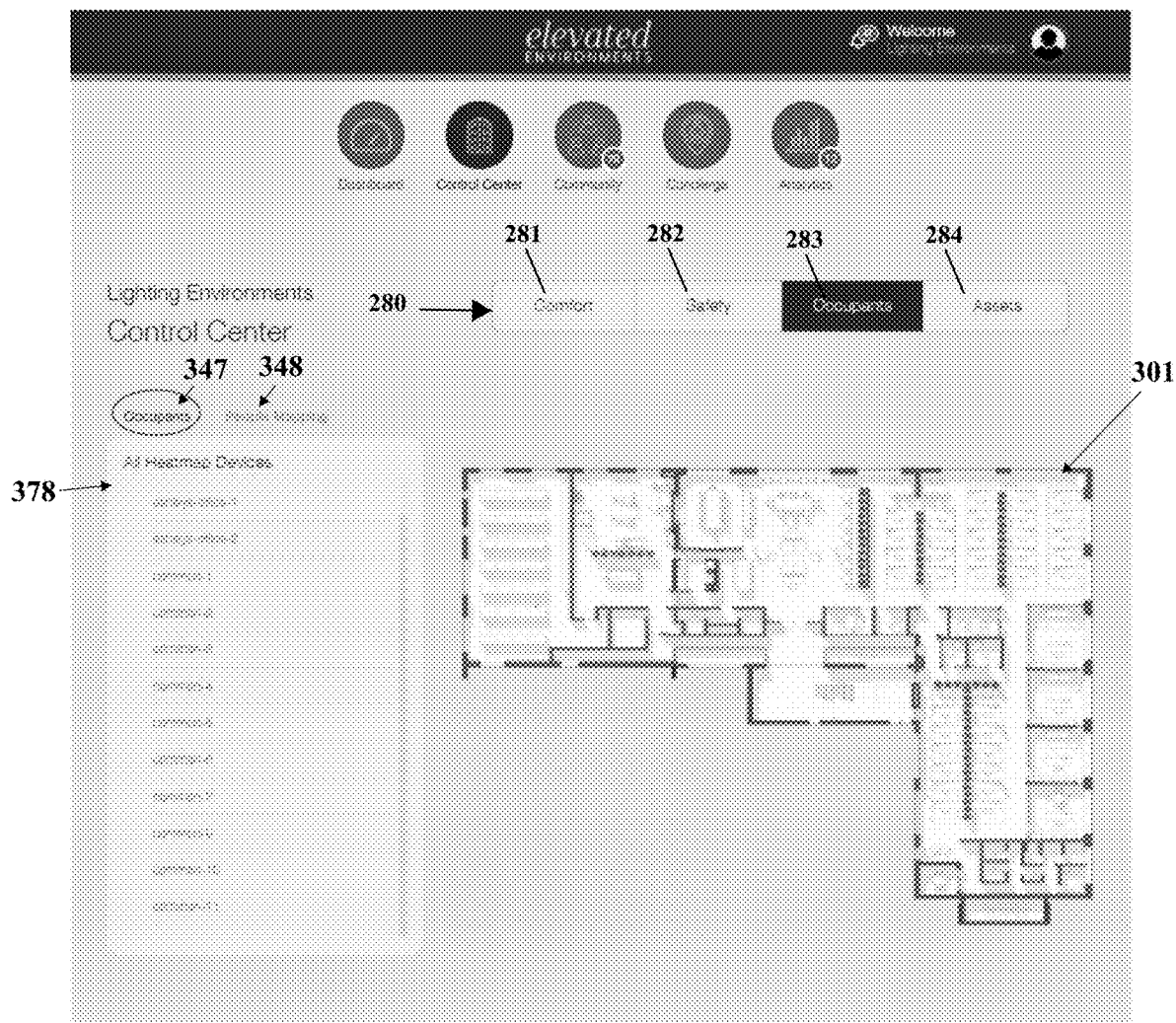
FIG. 3J illustrates the GUI interactive display screen output showing the interactive building control center occupant screen of FIG. 3A configured for managing the occupants within the monitored space according to at least one embodiment of the disclosed subject matter.

FIG. 3J illustrates the GUI interactive display screen output showing the occupants button 283 selected and the interactive building control center dashboard 300a floor plan screen of FIG. 3B reconfigured for managing the occupancy of the monitored space according to at least one embodiment of the disclosed subject matter. In FIG. 3J, the occupants button 347 is highlighted to show it has been selected and selectable occupancy options 378 for areas of the facility under control of the system are displayed below the occupants button 347 and next to the floor plan. The selectable occupancy options 378 for all of the monitored locations include, but are not limited to, viewing heat maps for all or some of the areas in the floor plan 301, a number of people in each of the areas and a total for the entire facility, and a percent occupancy rate based on a predefined maximum occupancy amount. Because the heat sensors are detecting and mapping heat distributions across the facility, they are also detecting heat from equipment such as printers, coffee makers, and copiers, as well as sun shining through windows and heating surfaces, fires, etc., so determining the occupancy from the heat mapping information alone can provide inaccurate results, if the specific heat signature of the equipment is not taken into consideration when using just the heat mapping information. In addition, use of air content levels and vibraphones can be used independently or in combination with the heat mapping information to help determine occupancy and also detecting signs of life during emergencies, for example, fires, earthquakes, etc., when camera coverage of a given space is not available.

Figure 3K:
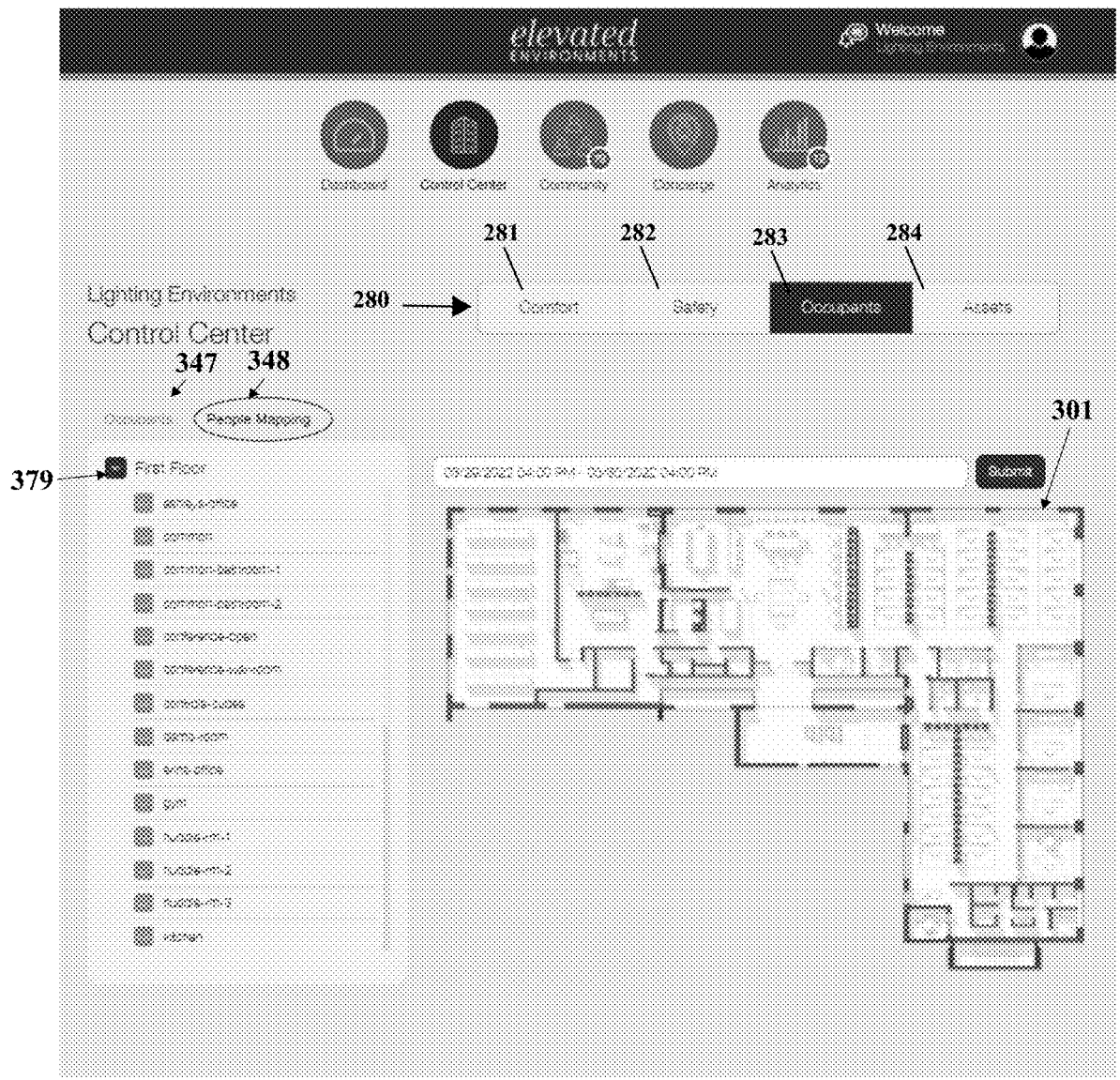
FIG. 3K illustrates the GUI interactive display screen output showing the interactive building control center access log screen of FIG. 3A configured for managing the logs of occupant access to the monitored space according to at least one embodiment of the disclosed subject matter.

FIG. 3K illustrates the GUI interactive display screen output showing the interactive building control center dashboard 300a access log screen of FIG. 3J reconfigured for managing the access to the monitored space according to at least one embodiment of the disclosed subject matter. In FIG. 3K, the people mapping button 348 is highlighted to show it has been selected and selectable people mapping options 379 for each of the locations in the facility under control of the system are displayed below the occupants option 347 and next to the floor plan 301. The people mapping options 379 can include multiple floor options for facilities with multiple floors, so selecting the icon next to the "First Floor" label opens a drop down menu with a selectable list of all of the available floors. If a different floor is selected from what is currently being displayed, the system automatically reconfigures, resizes, and displays the new location information in the people mapping options 379 for the selected floor. Simultaneously with the reconfiguration of the people mapping options 379, the floor plan 301 is replaced with a floor plan for the newly selected floor. The selectable people mapping options 379 for all of the locations can include, but are not limited to, offices, cubicles, conference rooms, open areas, hallways, closets, copy/work rooms, computer/server/communications rooms, kitchens, gyms, bathrooms, etc. Selecting one, some, or all of the locations on the displayed floor can display the location of the occupancy sensor in the location as well as indications for any occupants of the location. The detection of an occupant can be accomplished using a badge with a detectable identification device, for example, but not limited to, a radio frequency identification (RFID) chip, and a Bluetooth® enabled chip. As described above in relation to FIG. 3H, the system can also use facial recognition and biometrics to identify and authenticate individuals approved to enter the facility provided the system complies with any notification and authorization requirements of all applicable, local, state, and federal laws in which the facility is located.

Figure 3L:
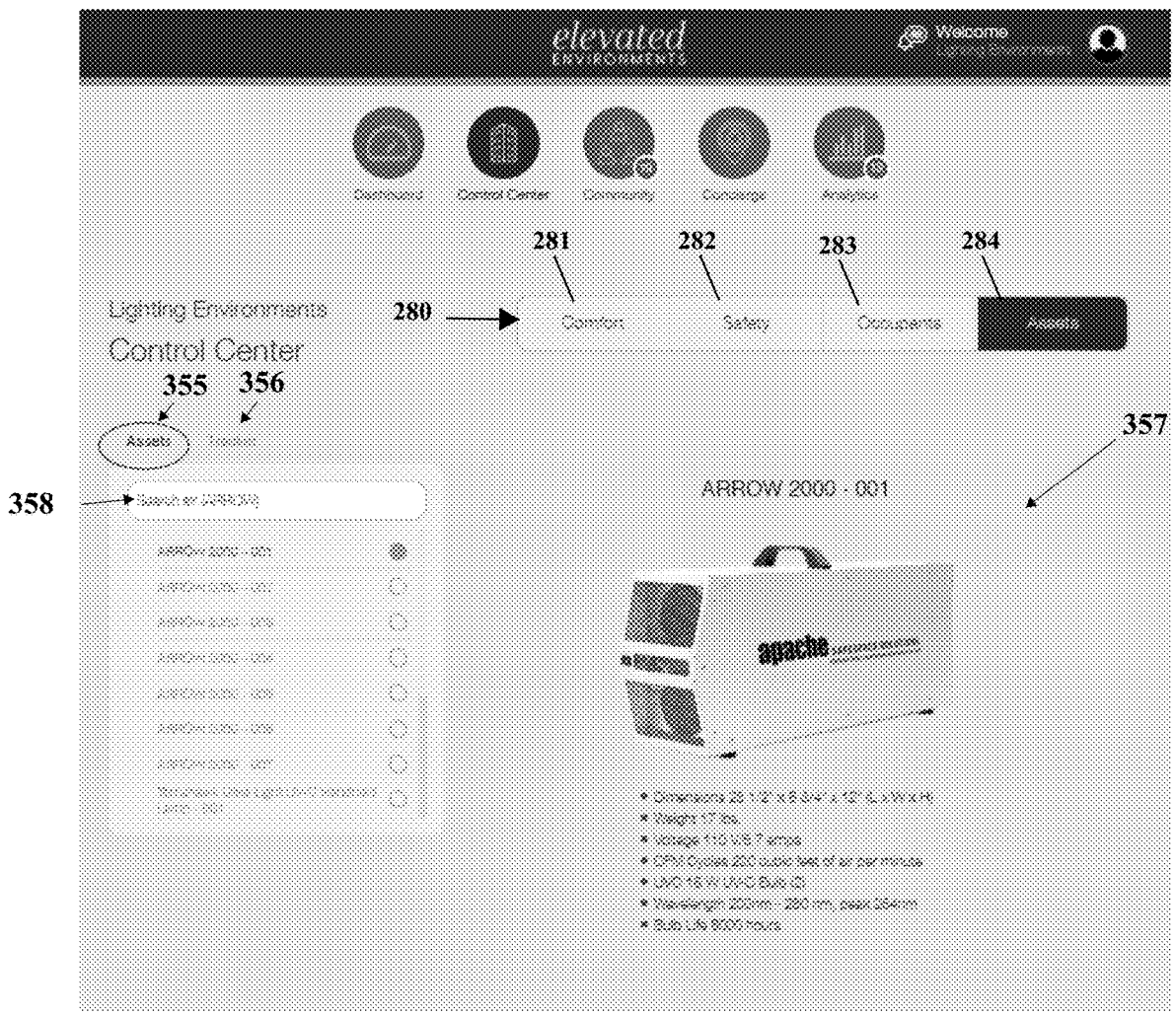
FIG. 3L illustrates the GUI interactive display screen output showing the interactive building control center assets screen of FIG. 3A configured for managing the system assets within the monitored space according to at least one embodiment of the disclosed subject matter.

FIG. 3L illustrates the GUI interactive display screen output showing the assets menu button 284 selected on the interactive building control center dashboard 300a screen of FIG. 3B reconfigured for managing the assets used in the monitored space according to at least one embodiment of the disclosed subject matter. In FIG. 3L, the assets button 355 is highlighted to show it has been selected and selectable assets options 358 used in the various areas of the facility under control of the system are displayed below the assets button 355 and next to an image area 357 in which an image of a selected asset can be displayed. The selectable assets options 358 includes a searchable field in which descriptive terms can be entered to search for specific assets. The selectable assets options 358 for all of the monitored locations include, but are not limited to, cameras, heat sensors, air quality sensors, motion detectors, air filtration devices, air sterilization devices, and surface sterilization devices.

Figure 3M:
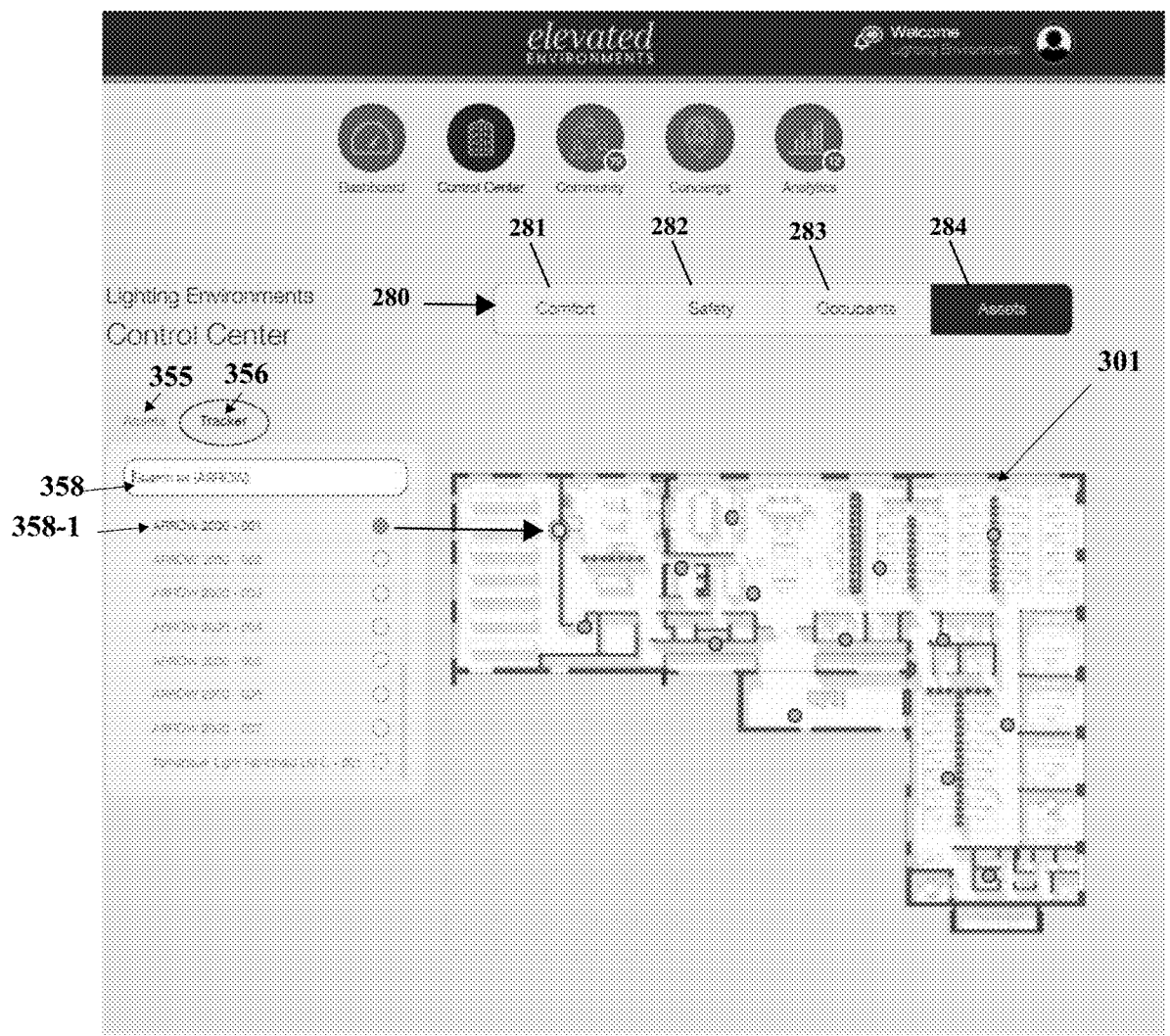
FIG. 3M illustrates the GUI interactive display screen output showing the interactive building control center asset tracker log screen of FIG. 3A configured for managing the system assets within the monitored space according to at least one embodiment of the disclosed subject matter.

FIG. 3M illustrates the GUI interactive display screen output showing the interactive building control center dashboard 300a assets screen of FIG. 3L reconfigured for managing the assets located in the monitored space according to at least one embodiment of the disclosed subject matter. In FIG. 3M, a tracker button 356 is highlighted to show it has been selected and the selectable asset options 358 for each of the locations in the facility under control of the system are displayed below the assets option 355 and next to the floor plan 301. In addition, the floor plan 301 is shown with the available selectable assets options 379 overlaid over the floor plan 301. As seen in FIG. 3M, a first asset 358-1 has been selected and its name has been highlighted as well as a circle associated with the name is turned solid. Simultaneously with the selection and highlighting of the asset's name being highlighted, a corresponding circle in the overlay changes its appearance, which can include, but is not limited to, changing its color, its size, adding a separate indicator to show the circle—this can include placing a border around the circle, making the circle larger, making the circle flash or pulse.

In addition, in FIG. 3M, the asset options 358 can include multiple floor options for facilities with multiple floors, so selecting an icon next to a "current floor" label opens a drop down menu with a selectable list of all of the available floors. If a different floor is selected from what is currently being displayed, the system automatically reconfigures, resizes, and displays the new floor plan with the asset options 358 for the newly selected floor. Simultaneously with the reconfiguration of the asset options 358, the floor plan 301 is replaced with a floor plan for the newly selected floor and a new overlay of the assets located on the new floor is overlaid over the new floor plan 301.

Figure 3N:
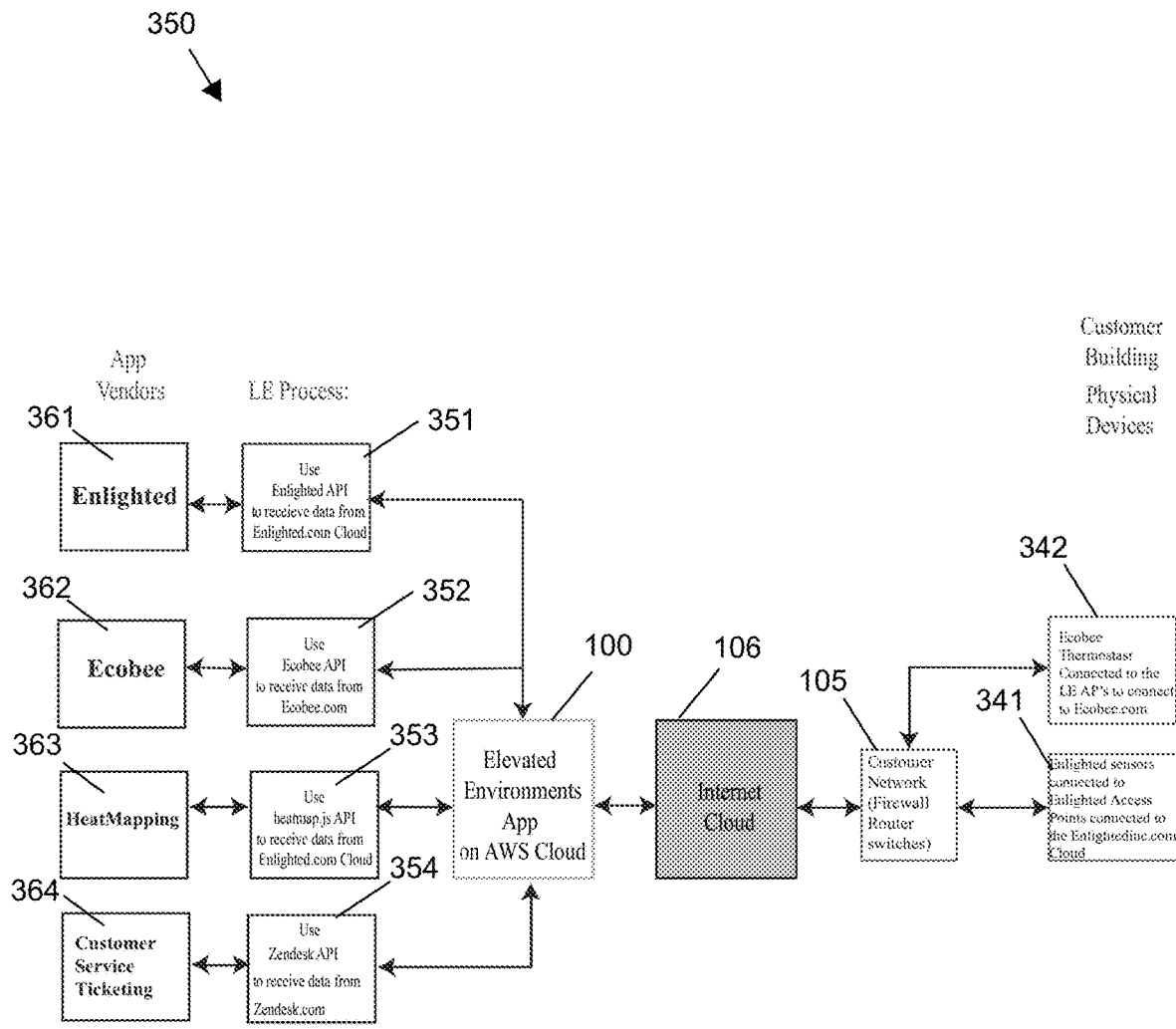
FIG. 3N is a functional block diagram showing application and server interfaces in connection with the interactive building control center according to at least one embodiment of the disclosed subject matter.

FIG. 3N is a functional block diagram showing application and server interfaces in connection with the interactive building control center dashboard 300a according to at least one embodiment. In FIG. 3N, the integrated building and office automation control system 100 is communicatively coupled via the Internet 106 to the customer network 1201 being monitored and controlled. The integrated building and office automation control system 100 is communicatively coupled via multiple application programming interfaces (APIs) to multiple application vendors. For example, in the embodiment of FIG. 3N, the integrated building and office automation control system 100 can be coupled to: an Enlightedinc.com website 361 via an Enlightedinc.com website API or link 351 for requesting and receiving data from the Enlightedinc.com website 361 through one or more Enlighted, Inc. sensors 341; an Ecobee.com website 362 via an Ecobee.com website API or link 352 for requesting and receiving data from the Ecobee.com website 362 through one or more Ecobee thermostats 342; a heat mapping application 363 via a heat mapping API or link 353, for example, but not limited to, a heatmap.js API from https://www.patrick-wied.at/static/heatmapjs/for requesting and receiving data from the Enlightedinc.com website 361; and a customer service ticketing system/website 364 via a customer a customer service system API or link 354 to track and manage customer to requests for service from, for example, but not limited to, a Zendesk.com website.

In general, the interactive building control center dashboard 300a is not available to all users of the integrated building and office automation control system 100, for example, access may only be available to users who are employees of the business based on their granted level of access, such as, for example, administrative staff, information technology personnel, security personnel, managers, and officers of the business.

Community

Figure 4A:
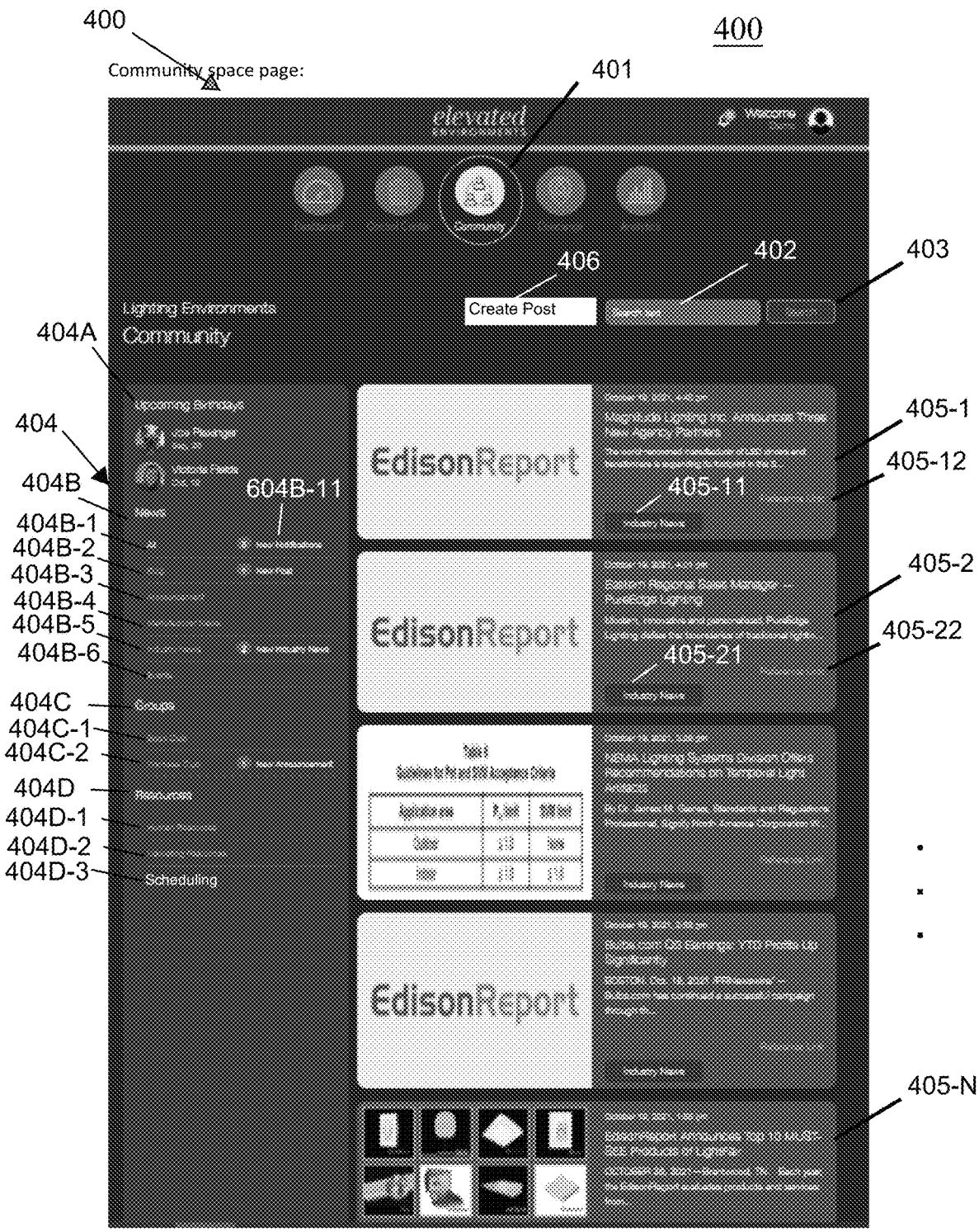
FIG. 4A illustrates a Graphical User Interface (GUI) interactive display screen output showing an interactive building community according to at least one embodiment of the disclosed subject matter.
Figures 1, 4A:

FIG. 4A illustrates a Graphical User Interface (GUI) interactive display screen output generated by the community software application module 400 showing an interactive building community dashboard 400a according to at least one embodiment. Referring now to FIG. 4A, when the "Community" icon 401 is selected, the interactive building community dashboard 400a is displayed with multiple graphical information display panels including, for example: a search text entry box 402 and an associated search button 403 configured to receive a search input request and search the system for relevant information responsive to the search input request; an upcoming events display panel 404 including, for example, upcoming an employee birthday section 404A, active links to news items 404B, active links to social groups 404C, and active links to company resources 404D; multiple news article display panels 405-1 to 405-N showing titles and summary information for each article for a variety of news stories from a variety of sources; and a create post button 406 to allow users to create and send posts, which can include text, photos, videos, and graphics. Levels of distribution of the created posts are based on each user's assigned level of access. For example, an employee can delete their own posts, but cannot delete other users' posts. In general, the system administrator assigns the levels of access and can prevent some or all users from posting and/or commenting on other user's posts. For example, in the news items 404B section, there are multiple links to different news items, for example, an all news items link 404B-1, a blog link 404B-2, an announcement link 404B-3, a manufacturer news link 404B-4, an industry news link 404B-5, and an events link 404B-6. In addition, to the right of each link a notice of new and unread items, for example, a new notifications notice link 404B-11. Clicking on the all link 404B-1 will open all of the news items and clicking on the new notifications notice link 404B-11 will similarly open the news items, but with the new, unread news items presented first. Similarly, clicking on the social groups 404C links, for example, a book club link 404C-1 or a wellness club link 404C-2 will open pages related to each area, respectively. Likewise, clicking on the resources 404D links, for example, a human resources link 404D-1, a marketing resources link 404D-2, or a scheduling link 404D-3 will open pages related to each area, respectively. The human resources link 404D-1 can be a link to an employee experience software system, for example, but not limited to, an Interact employee experience software system from Interact Software of New York, N.Y. The marketing resources link 404D-2 can be a link to a marketing software system, for example, but not limited to, a customer management software system from Hubspot of Cambridge, Mass. The scheduling link 404D-3 can be a link to an office space software scheduling system, for example, but not limited to, a booking software system from TEEM of Salt Lake City, Utah. An example mobile application screenshot embodiment of a resources display panel 2100 of the community functions 1313 (or community software dashboard 400a) is shown in FIG. 4A-2. As shown in FIG. 4A-2, the mobile application resources display panel 2100 can include an interactive display for a user to select one item of information from among multiple text articles or descriptions available for viewing using the mobile device. For example, referring now to FIG. 4A-2, a user can select human resource information such as benefit information 2101, compliance information 2103, Covid-19 resource information 2105, labor (regulations) posters 2107, and a payroll application such as, for example, Paylocity™. The user can also select other such resource for other resource areas such as marketing 2111, wellness 2113, sales 2115, and other company or organization documents 2117. Furthermore, an example mobile application screenshot embodiment of resources display panel 2100 of the community functions 1313 (or community software dashboard 400a) is shown in FIG. 4A-2A.

Figures 1A, 4A:
Figures 2, 4A:
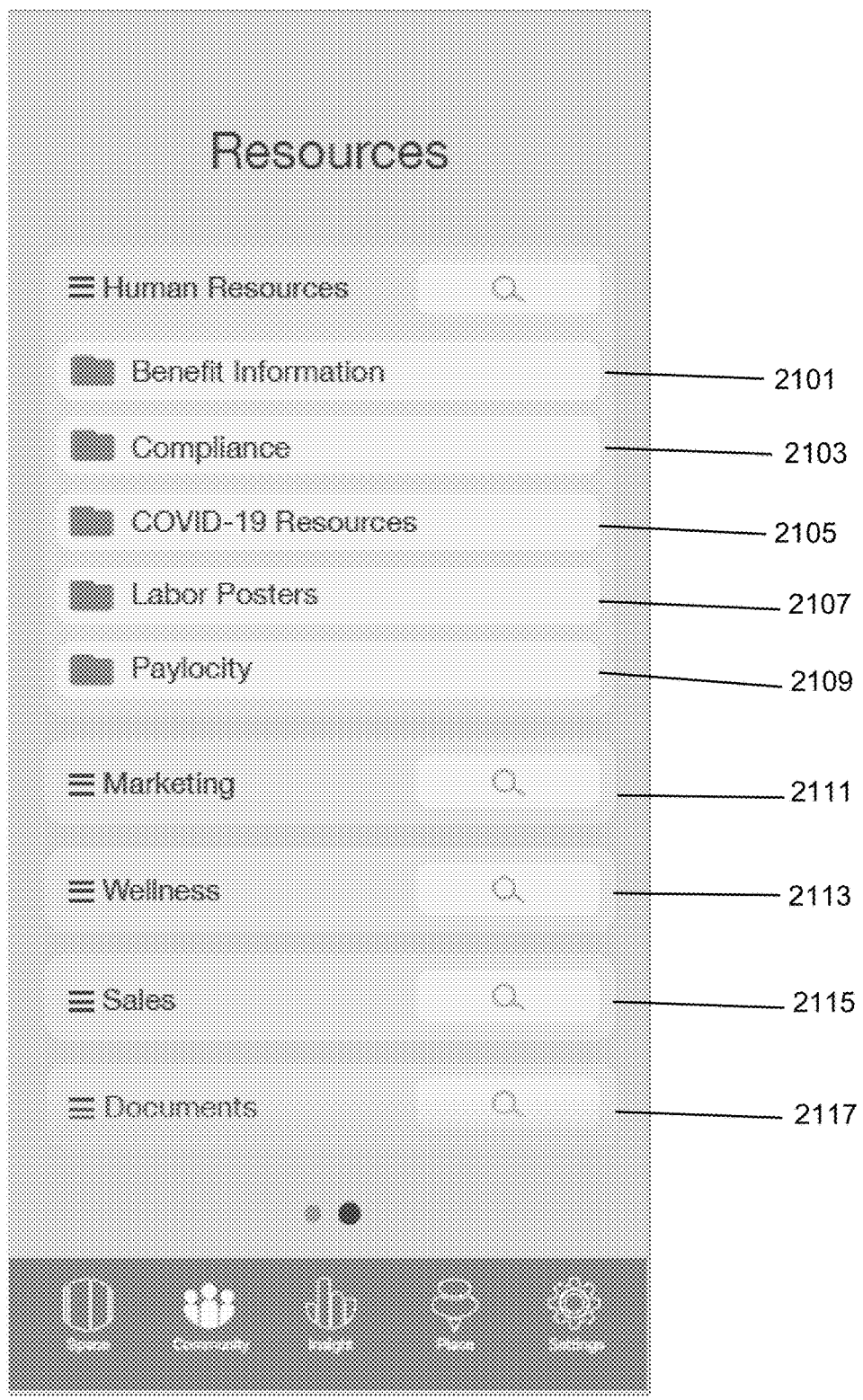
Figures 2A, 4A:
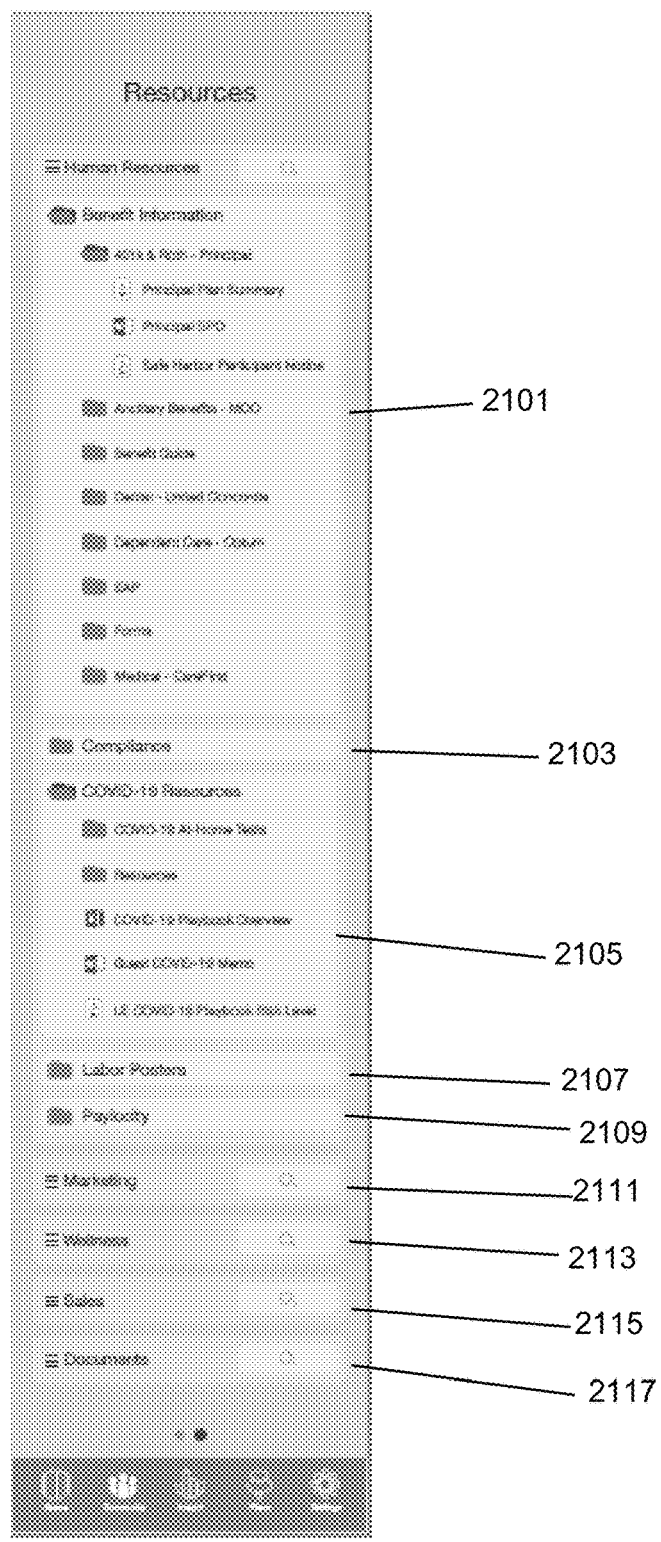

Still referring to FIG. 4A, each of the multiple news article display panels 405-1 to 405-N includes a label to identify which news source the panel is associated with, for example, in a first news article display panel 405-1, the news source label 405-11 is for "Industry News", so it can be accessed through the industry news link 404B-5 or by selecting a reference link 405-12 on the first news article display panel 405-1. Similarly, in a second news article display panel 405-2, the news source label 405-21 is also for "Industry News", so it too can be accessed through the industry news link 404B-5 or by selecting a reference link 405-22 on the second news article display panel 405-12. An example mobile application screenshot embodiment of a news article display panel 2000 of the community functions 1313 (or community software dashboard 400a) is shown in FIG. 4A-1. As shown in FIG. 4A-1, the mobile application news article display panel 2000 can include an interactive display for a user to be notified of and/or select one or more news articles 2001 available for viewing using the mobile device, and can include a brief summary for each article and/or can include the first lines of content of each article, for the user to scroll through and view. Upon user selection of an article 2001 for viewing using the news article display panel 2000, the user may be presented with the complete article for viewing, as shown in the example mobile application screenshot embodiment of an article viewing panel 2050 of the community functions 1313 (or community software dashboard 400a) as shown in FIG. 4A-1A. Referring now to FIG. 4A-1A, the article-viewing panel 2050 can provide a user with the ability to select and scroll among multiple screen pages of a particular selected article 2001.

Of course, the embodiment in FIG. 4A is merely one example of the contents of the interactive building community dashboard 400a, and other embodiments can contain more, less, and/or different items.

Figure 4B:
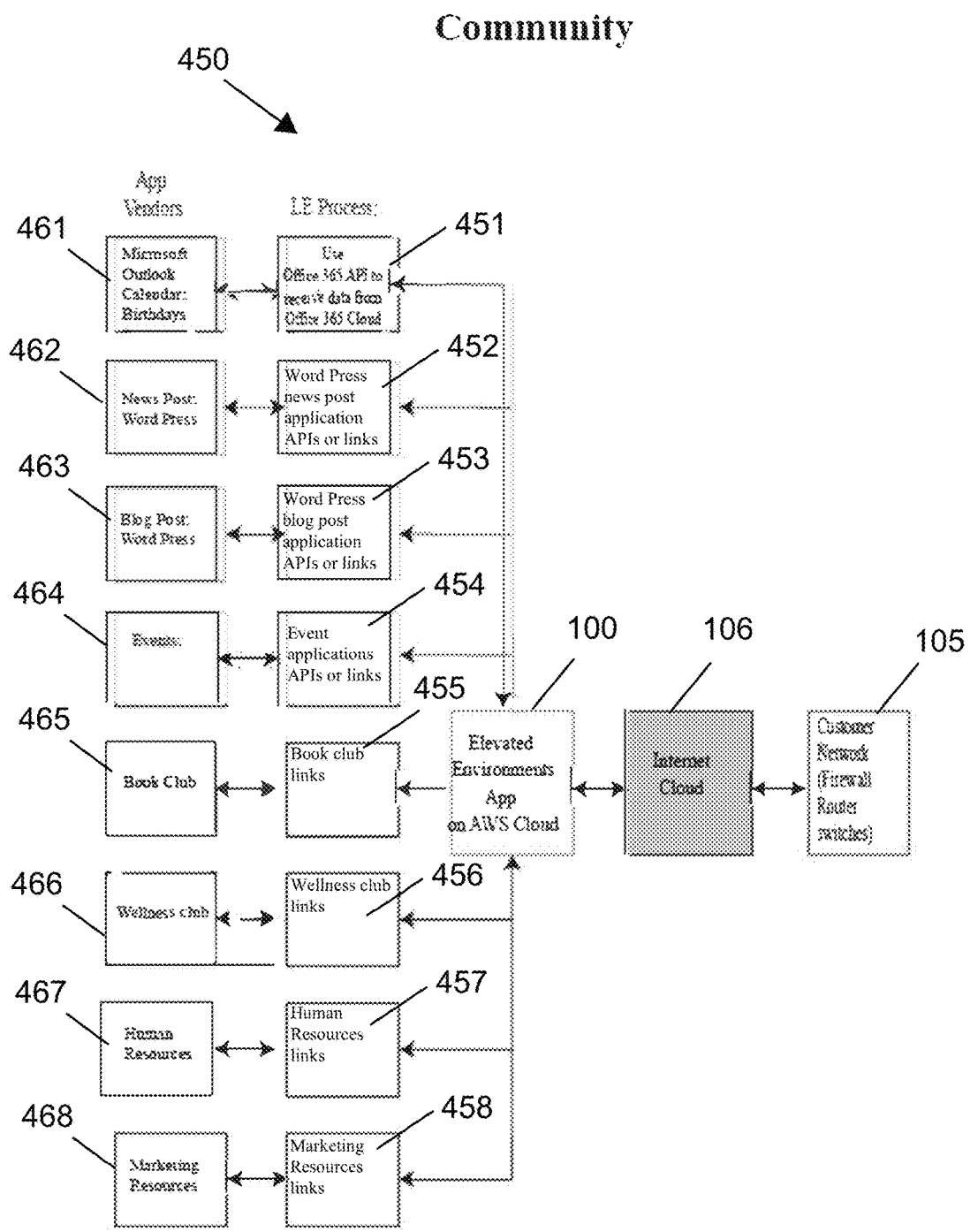
FIG. 4B is a functional block diagram showing application and server interfaces in connection with the interactive building community according to at least one embodiment of the disclosed subject matter.

FIG. 4B is a functional block diagram 450 showing application and server interfaces in connection with the interactive building community dashboard 400a according to at least one embodiment. In FIG. 4B, the integrated building and office automation control system 100 is communicatively coupled via the Internet 106 to the customer network 1201 being monitored and controlled. The integrated building and office automation control system 100 is communicatively coupled via multiple APIs to multiple application vendors. For example, in the embodiment of FIG. 4A the integrated building and office automation control system application 100 is coupled to: a calendar application 461 such as a Microsoft® Outlook calendar 461 via a Microsoft® Office 365 API 451 for requesting and receiving data regarding employee birthdays; a news post application 462 such as a Word Press news post application 462 via one or more Word Press news post application APIs or links 452 for requesting and receiving news posts from the news post websites; a blog post application 463 such as a Word Press blog post application 463 via one or more Word Press blog post application APIs or links 453 for requesting and receiving blog posts from the listed blog post websites; an events application 464 via one or more events application APIs or links 454 for requesting and receiving data from the events application websites; a book club application 465 via one or more book club links 455 for requesting and receiving information from the book club blogs/websites; a wellness club application 466 via one or more wellness club links 456 for requesting and receiving data from the wellness club applications/websites; a human resources application 467 via one or more human resources applications links 457 for requesting and receiving data from the human resources applications websites; and a marketing application 468 via one or more marketing applications links 458 for requesting and receiving data from the marketing applications websites.

In general, the interactive building community dashboard 400a is available to all users of the integrated building and office automation control system 100, regardless of their level of access. However, there are certain options and links that may only be available to users based on their granted level of access, such as, for example, employees, managers, and officers of the business, for example, the human resources application 464 and the marketing resources application 466.

Concierge Services

Figure 5A:
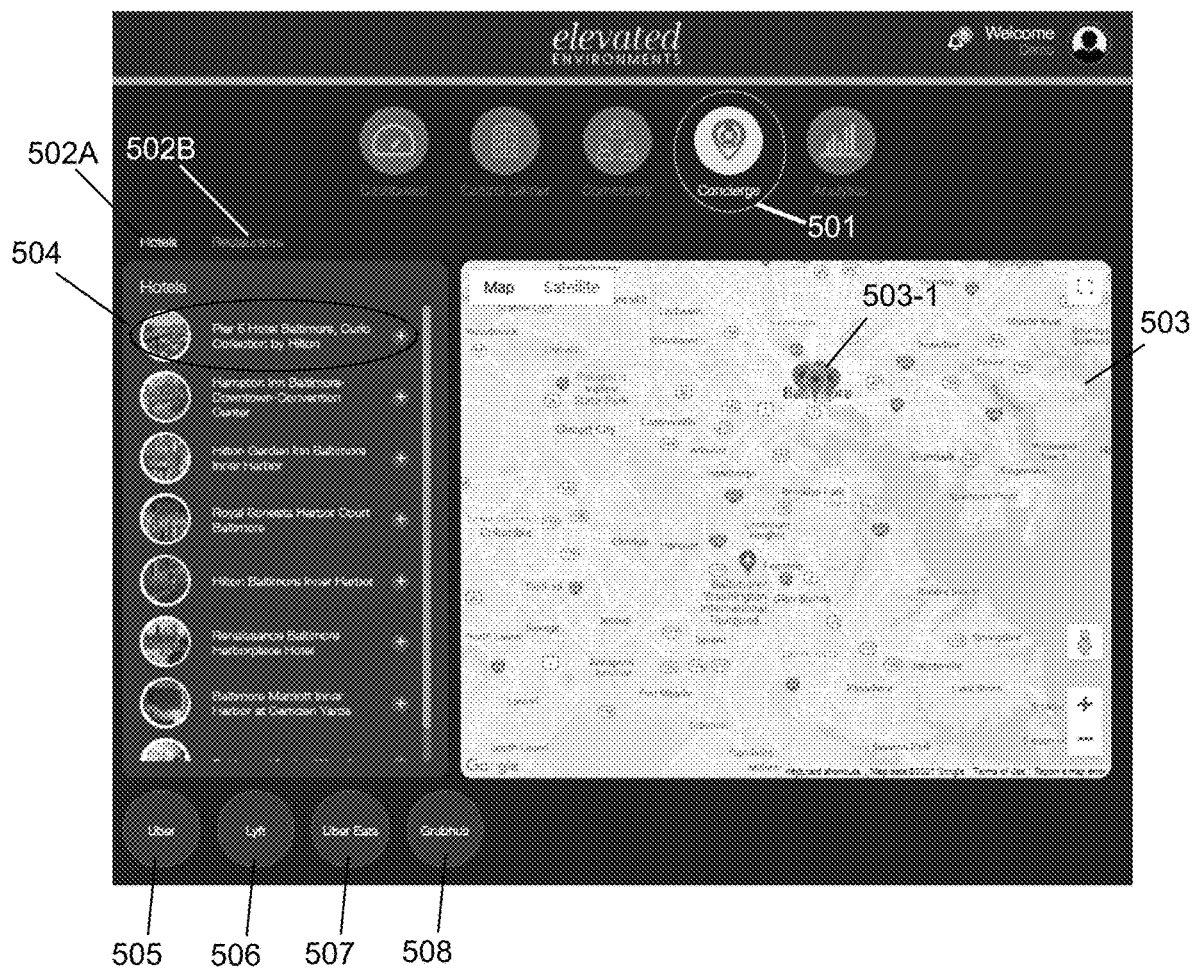
Figures 1, 5A:
Figures 2, 5A:
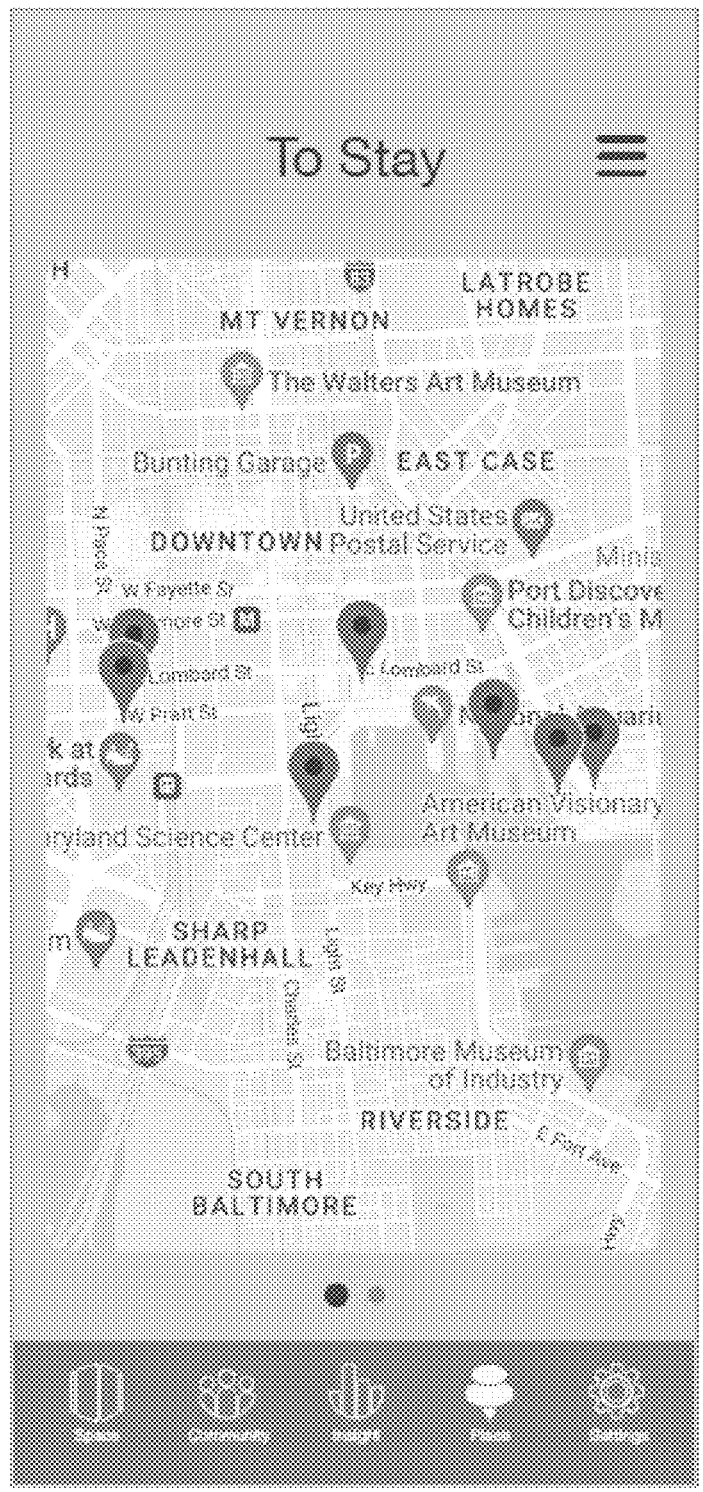
Figures 3, 5A:
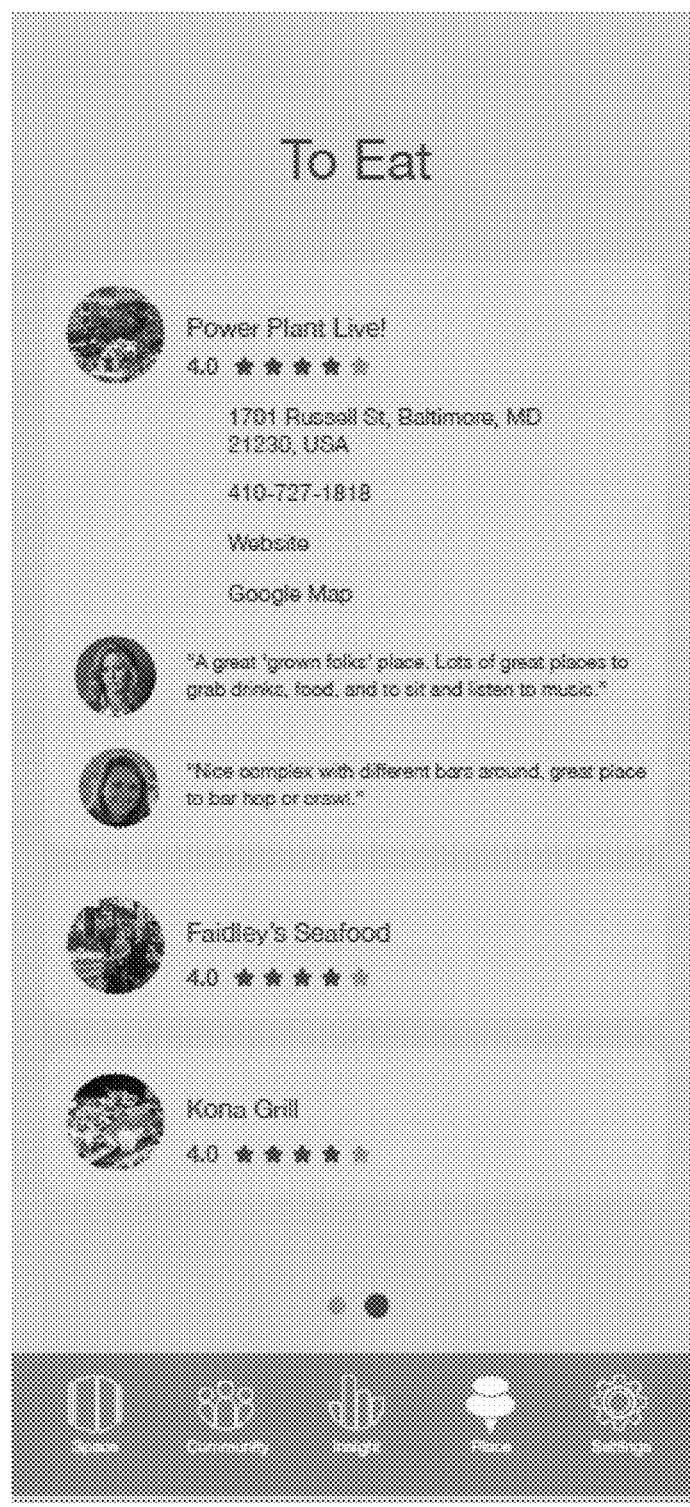
Figures 4, 5A:
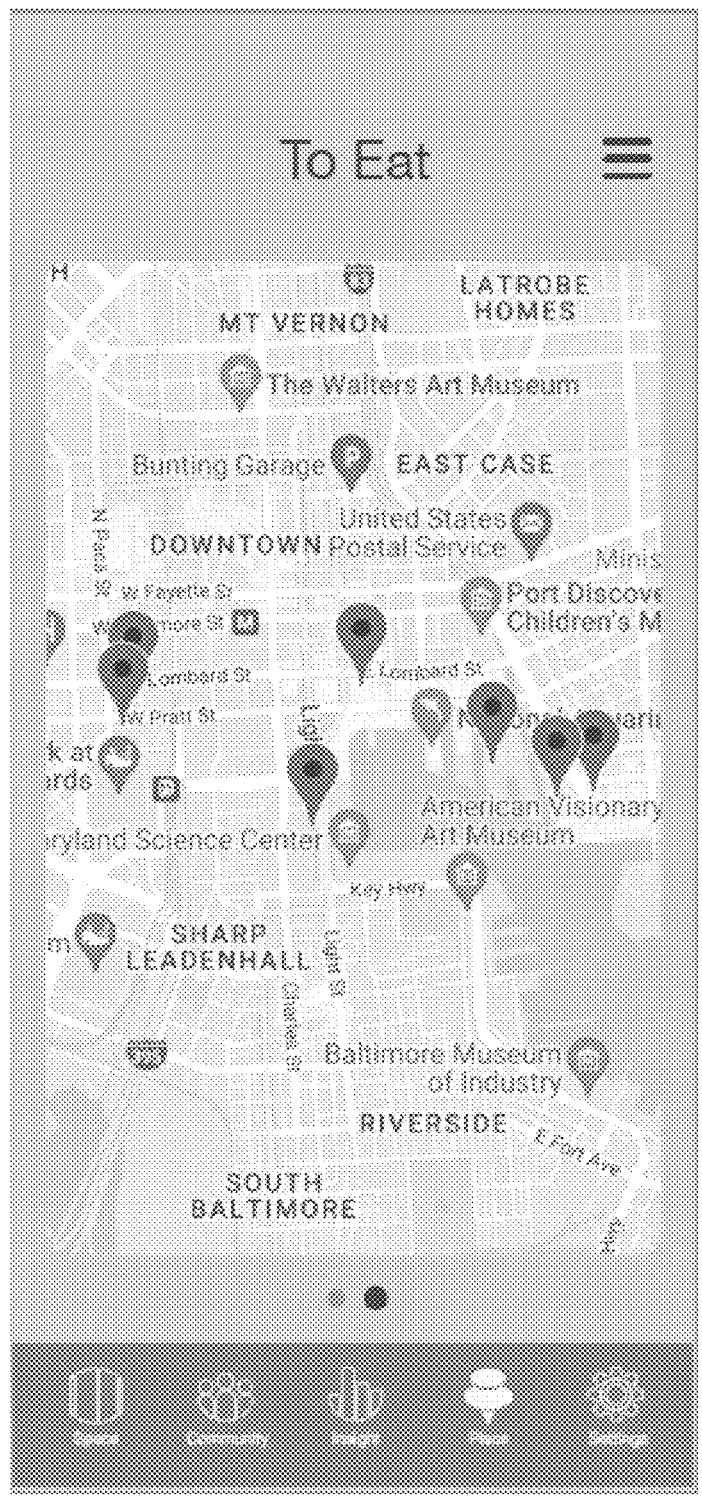
Figure 5B:
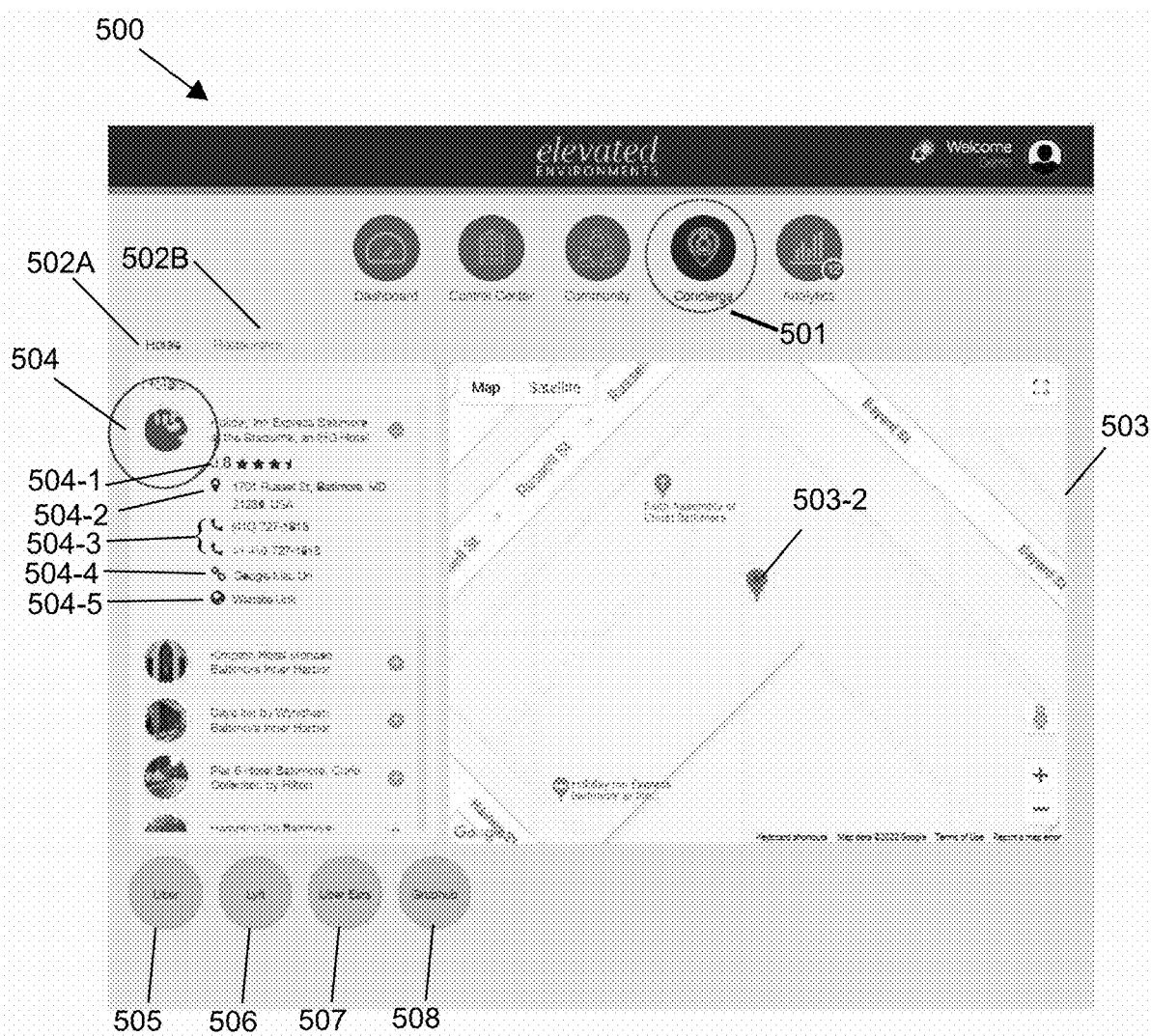
FIG. 5B illustrates the GUI interactive display screen output that can be displayed after selecting a service option from the interactive building concierge services page according to at least one embodiment of the disclosed subject matter.

FIG. 5A illustrates a Graphical User Interface (GUI) interactive display screen output generated by the concierge services software application module 500 showing an interactive building concierge services dashboard 500a according to at least one embodiment. In FIG. 5A, when the Concierge icon 501 is selected, the interactive building concierge services dashboard 500a is displayed with multiple graphical information display panels including, for example: a toggleable hotel and restaurant box 502 in which listings of local hotels and restaurants and their contact information is provided. A hotels button 502A is shown as having been selected and a listing of some of the local hotels and motels is displayed in the hotel and restaurant box 502. Adjacent to the hotels button 502A is a restaurants button 502B, which when selected, displays a listing of some of the local restaurants in the hotel and restaurant box 502 and a map display 503 of the area surrounding the building is presented with multiple pins 503-1 to indicate the locations of the listed hotels. If an individual hotel icon is selected, for example, a first hotel icon 504 in the hotel and restaurant box 502 is selected, as shown in FIG. 5B, the first hotel icon 504 expands to provide specific contact details for the hotel, and the map display 503 is updated and resized to show the location of the hotel with a single location pin 503-2. In embodiments, the detailed hotel information includes active links to some or all of the detailed information, including, for example, one or more phone numbers 504-1 for the hotel, one or more links to an interactive map for the hotel location, such as Google Maps 504-2, and one or more website and/or social media site links 504-4, 504-5 for the hotel.

Figure 5C:
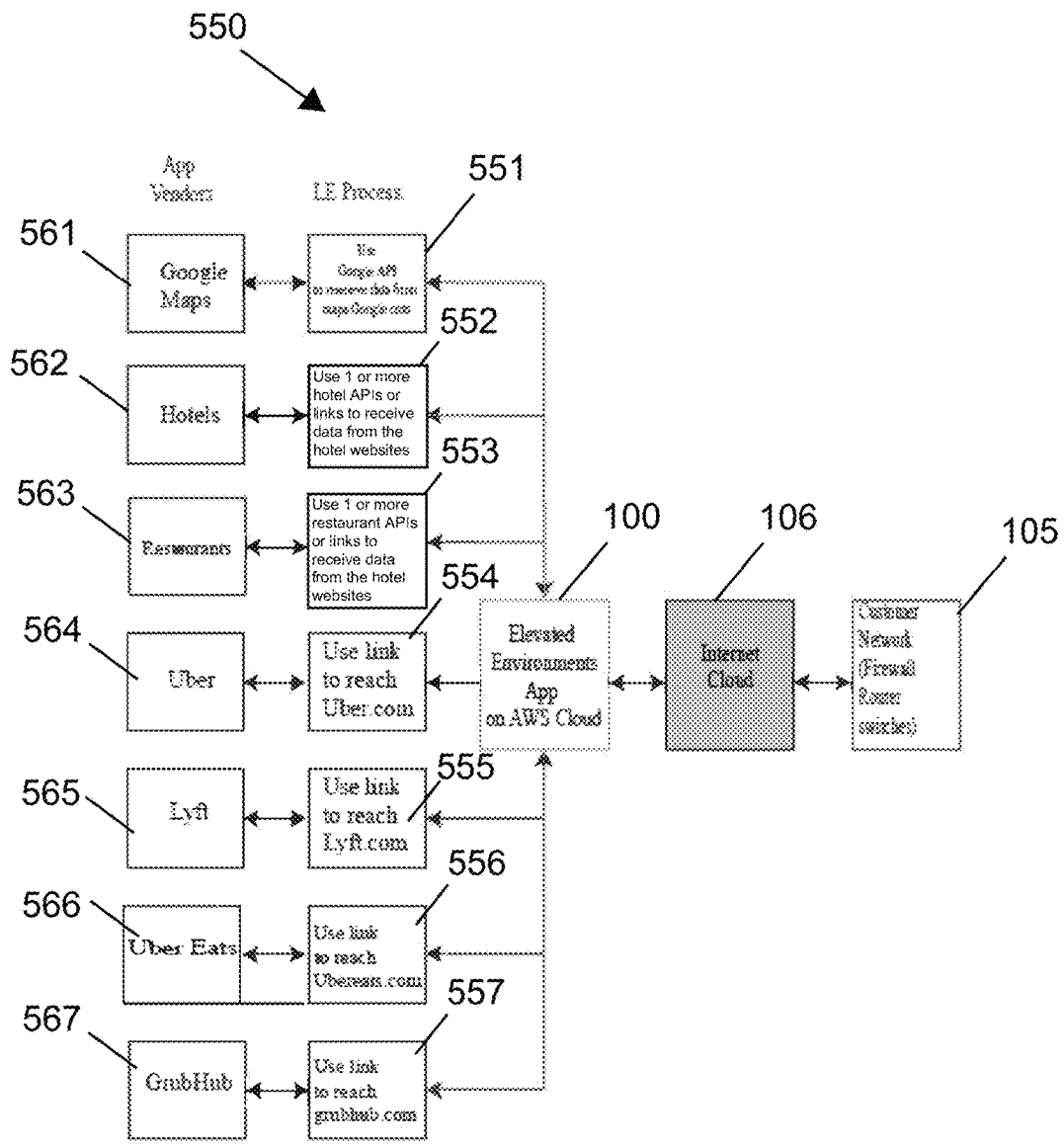
FIG. 5C is a functional block diagram showing application and server interfaces in connection with the interactive building concierge services according to at least one embodiment of the disclosed subject matter.

Returning to FIG. 5A, the interactive building concierge services dashboard 500a can include additional active link buttons for other services such as, for example, an Uber car service link 505, a Lyft car service link 506, an Uber Eats food delivery link 507, and a GrubHub food delivery link 508. Although not shown in FIG. 5A, the interactive building concierge services dashboard 500a can also include one or more additional active link buttons for still other services and facilities, such as, one or more taxi services, car rental services, entertainment venues, fitness facilities, drug stores, grocery stores, and the like. FIG. 5C is a functional block diagram 550 showing application and server interfaces in connection with the interactive building concierge services dashboard 500a according to at least one embodiment. In FIG. 5C, the integrated building and office automation control system 100 is communicatively coupled via the Internet 106 to the customer network 1201 being monitored and controlled. The integrated building and office automation control system 100 is communicatively coupled via multiple application programming interfaces (APIs) to multiple application vendors. For example, in the embodiment of FIG. 5A the integrated building and office automation control system 100 is coupled to: a Google Maps application 561 via a Google API 551 for requesting and receiving data from maps.google.com; a hotels application 562 via one or more hotel APIs or links 552 for requesting and receiving data from the listed hotel websites; a restaurant application 563 via one or more restaurant APIs or links 553 for requesting and receiving data from the listed restaurant websites; an Uber application 564 via an Uber link 554 for requesting and receiving data from the Uber website; a Lyft application 565 via a Lyft link 555 for requesting and receiving data from the Lyft website; an Uber Eats application 566 via an Uber Eats link 556 for requesting and receiving data from the Uber Eats website; an Grubhub application 567 via a Grubhub link 557 for requesting and receiving data from the Grubhub website.

FIG. 5B illustrates the GUI interactive display screen output that can be displayed after selecting the first hotel icon 504 from the interactive building concierge services dashboard 500a in FIG. 5A according to at least one embodiment of the disclosed subject matter. In FIG. 5B, the selected first hotel icon 504 is shown as being expanded in order to provide information of the first hotel icon's 504 quality rating 504-1, street address 504-2, active links to telephone and fax numbers 504-3, which the user can dial directly by clicking on the desired number, a link to the map URL 504-4 showing the location of the hotel in an electronic map, such as, for example, but not limited to Google Maps, and the link to the hotel's website 504-5. Simultaneously with the selection of the first hotel icon 504 the map display 503 is resized, updated, and an image of the selected hotel's position on the map display 503 is redisplayed with the hotel's location pin 503-2 shown on the map display. An example mobile application screenshot embodiment of hotel selection control panel 2310 of the place functions 1317 (or concierge services dashboard 500a) is shown in FIG. 5A-1. As shown in FIG. 5A-1, the hotel selection control panel 2310 can include online review information to assist the user in hotel selection. An example mobile application screenshot embodiment of hotel location display 2320 of the place functions 1317 (or concierge services dashboard 500a) is shown in FIG. 5A-2. As shown in FIG. 5A-2, the hotel location display 2320 can include the map URL 504-4 showing the location of the hotel in an electronic map, such as, for example, but not limited to Google Maps, and the link to the hotel's website 504-5, to assist the user in hotel selection.

FIG. 5C is a functional block diagram 550 showing application and server interfaces in connection with the concierge services dashboard 500a according to at least one embodiment. In FIG. 5C, the integrated building and office automation control system 100 is communicatively coupled via the Internet 106 to the customer network 1201 being monitored and controlled. The integrated building and office automation control system 100 is communicatively coupled via multiple APIs to multiple application vendors. For example, in the embodiment of FIG. 5A the integrated building and office automation control system application 100 is coupled to: one or more mapping applications 561 such as, for example, but not limited to, a Google® Maps application 561 via, for example, but not limited to, a Google® API 551 for requesting and receiving maps and data regarding specific, requested locations; one or more hotel applications 562 such as a direct hotel or a third party booking application 562 via one or more hotel booking application APIs or links 552 for requesting receiving reservation availability, cost information, and reservation-making capability from the hotel websites; one or more restaurant applications 563 such as one or more direct restaurant booking or one or more third party restaurant booking application 563 via one or more restaurant booking application APIs or links 553 for requesting and receiving reservation availability, menu & cost information, and reservation-making capability from the restaurant websites; one or more car service applications 564, 565 via one or more car service application APIs or links 554, 555 for requesting and ordering car service pickups; one or more food delivery service applications 566, 567 via one or more food delivery service links 556, 557 for ordering food for delivery from one or more food delivery service websites. An example mobile application screenshot embodiment of restaurant selection control panel 2330 of the place functions 1317 (or concierge services dashboard 500a) is shown in FIG. 5A-3. As shown in FIG. 5A-3, the restaurant selection control panel 2330 can include online review information to assist the user in restaurant or food selection. An example mobile application screenshot embodiment of restaurant location display 2340 of the place functions 1317 (or concierge services dashboard 500a) is shown in FIG. 5A-4. As shown in FIG. 5A-4, the restaurant location display 2340 can include the map URL 504-4 showing the location of the restaurant in an electronic map, such as, for example, but not limited to Google® Maps, and the link to the restaurant's website, to assist the user in restaurant or food selection.

In general, the interactive building concierge services dashboard 500a is available to all users of the integrated building and office automation control system 100, regardless of their level of access. However, there are certain options and links that may only be available to users based on their granted level of access, such as, for example, employees, managers, and officers of the business.

Analytics

Figure 6A:
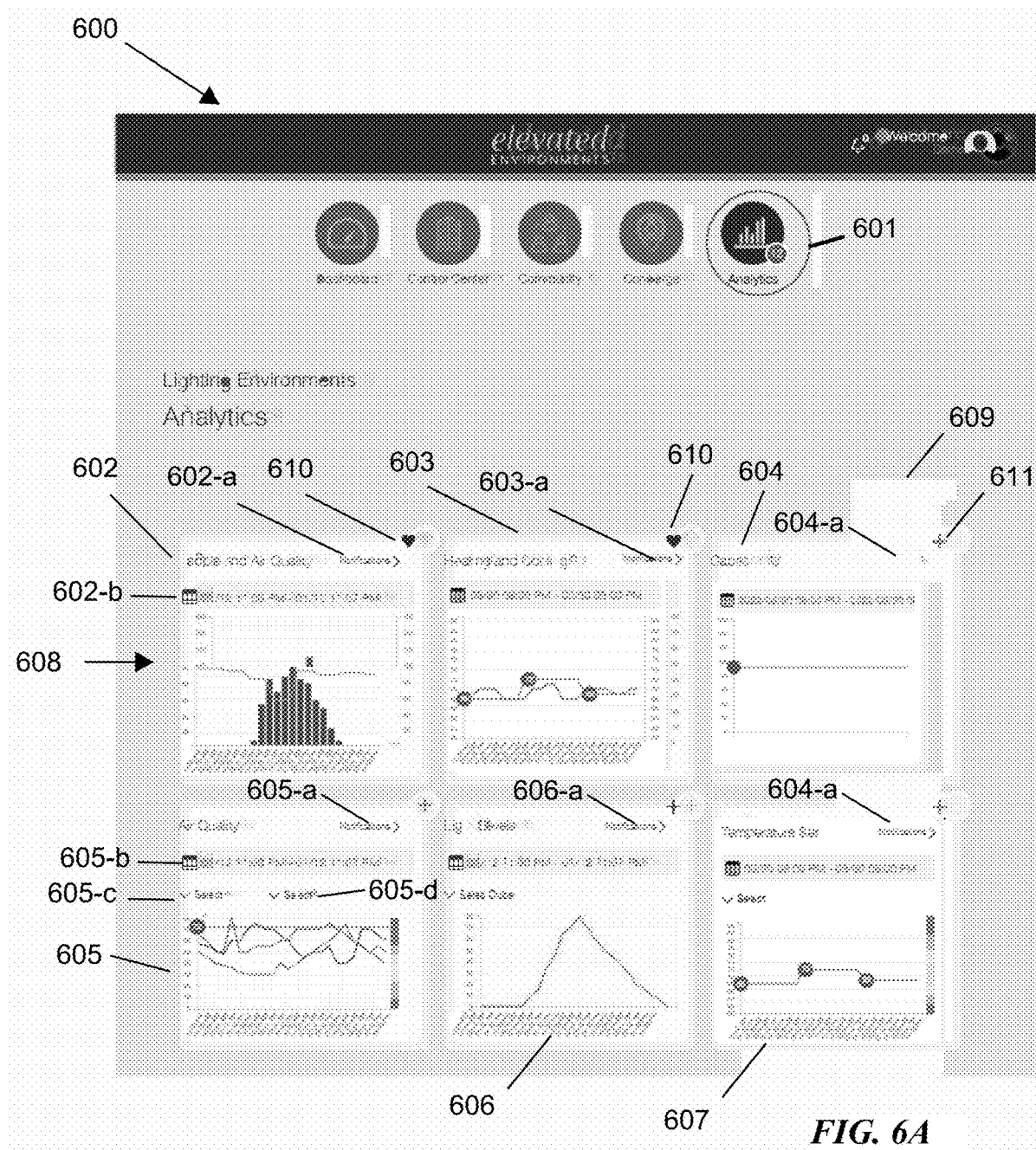
Figures 1, 6A:
Figures 1A, 6A:
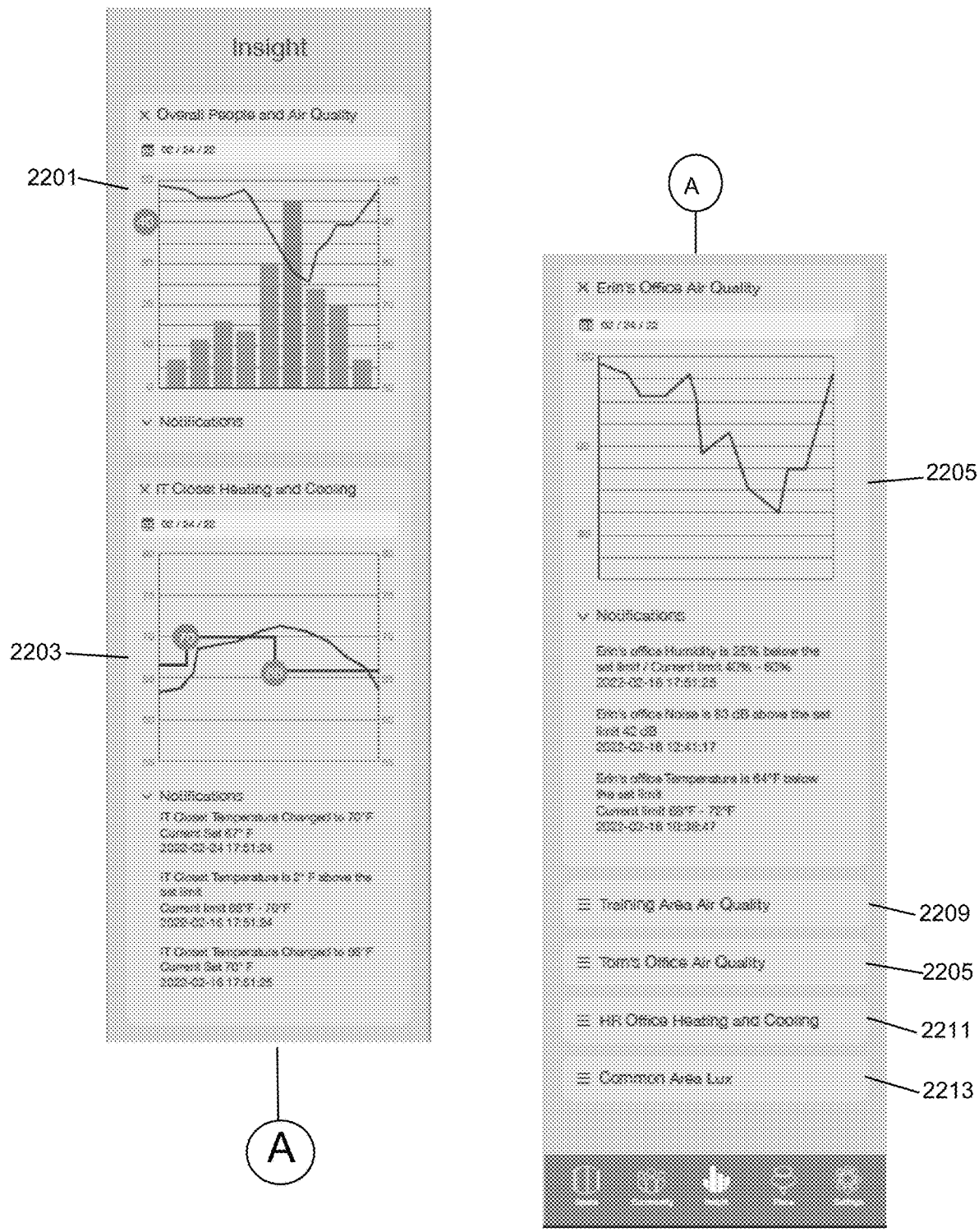
Figure 6B:
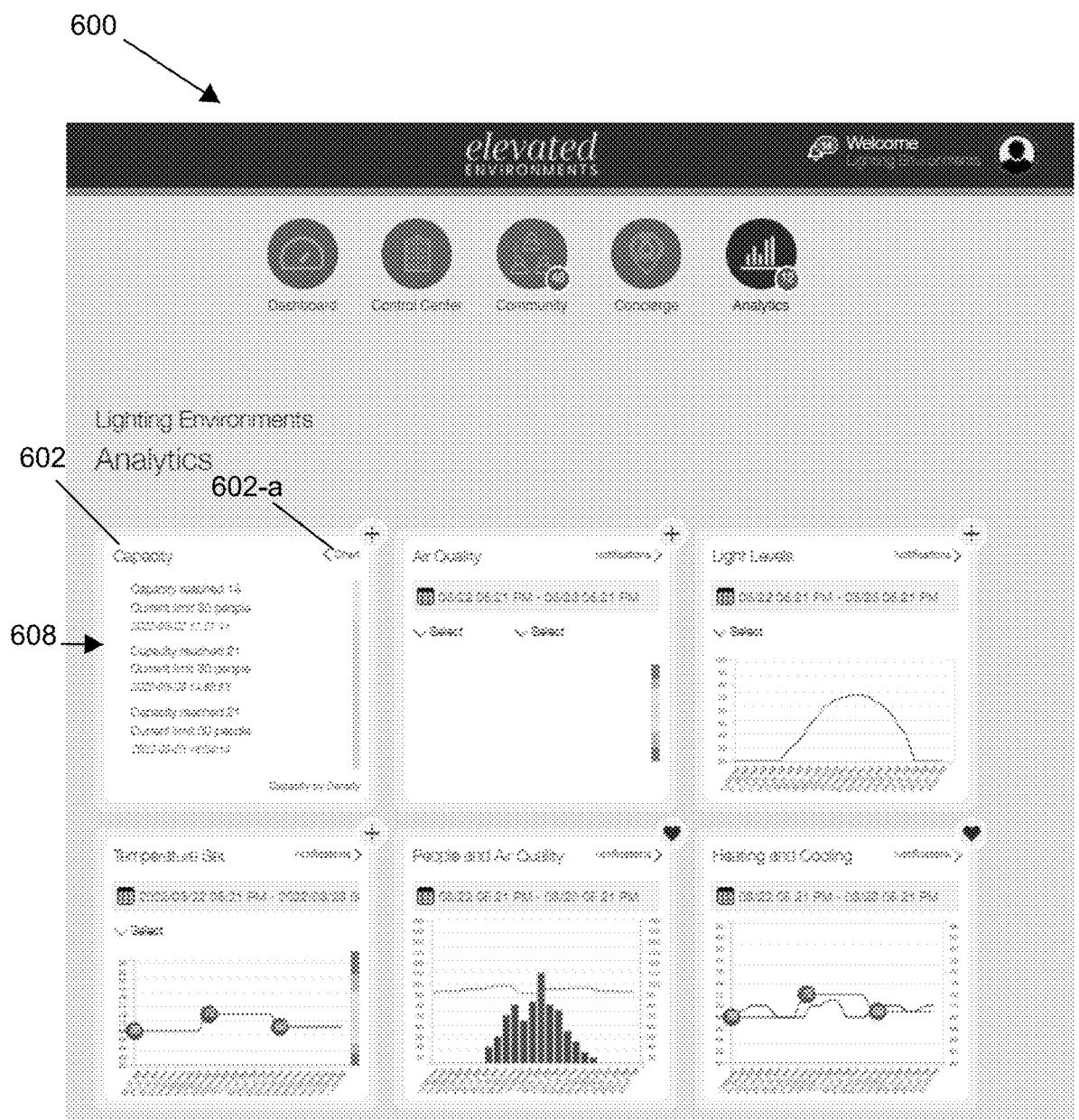
FIG. 6B illustrates the GUI interactive display screen output of FIG. 6A-1 showing another view of the interactive building analytics page according to at least one embodiment of the disclosed subject matter.
Figure 6C:
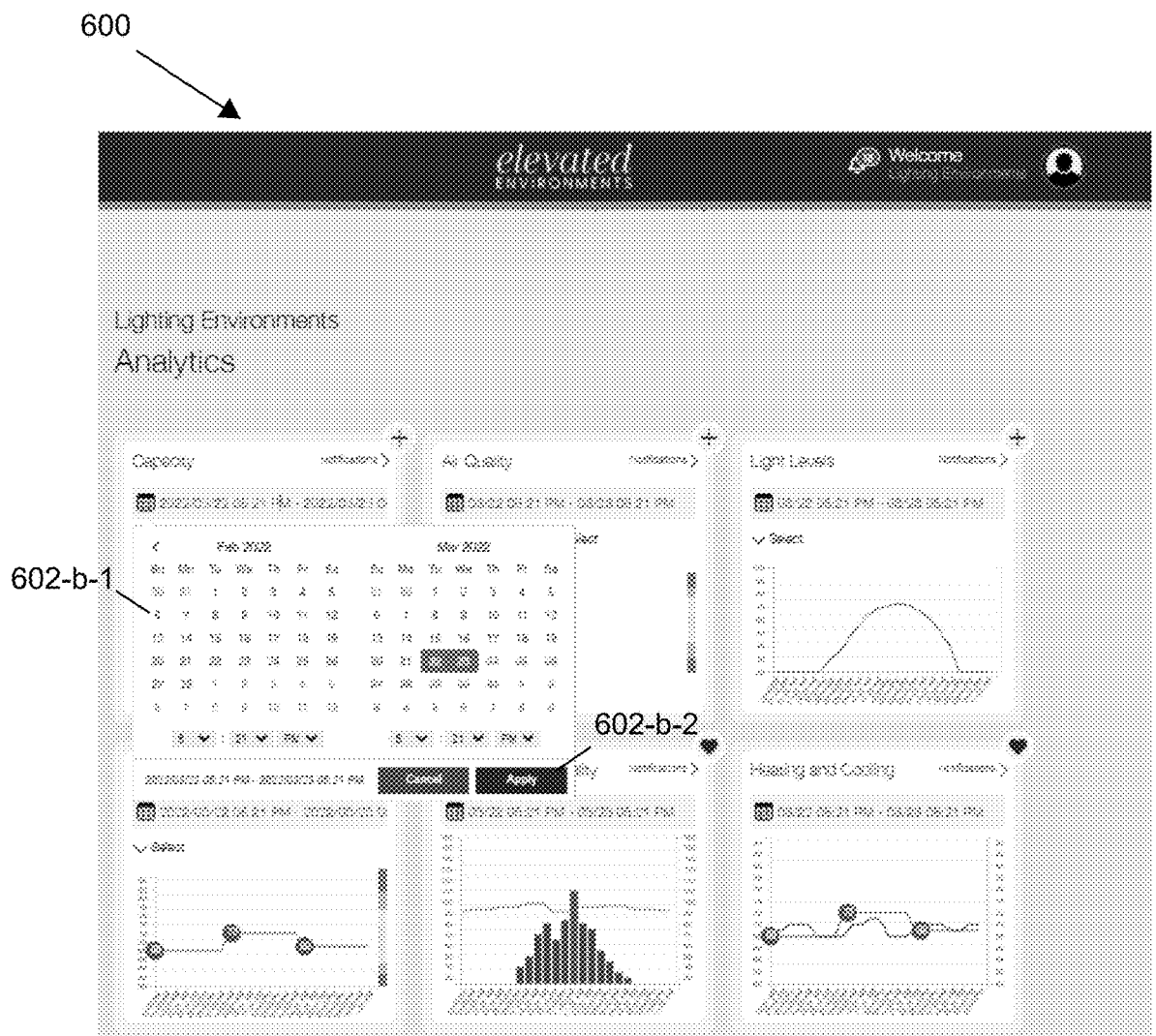
FIG. 6C illustrates the GUI interactive display screen output of FIG. 6A-1 showing yet another view of the interactive building analytics page according to at least one embodiment of the disclosed subject matter.
Figure 6D:
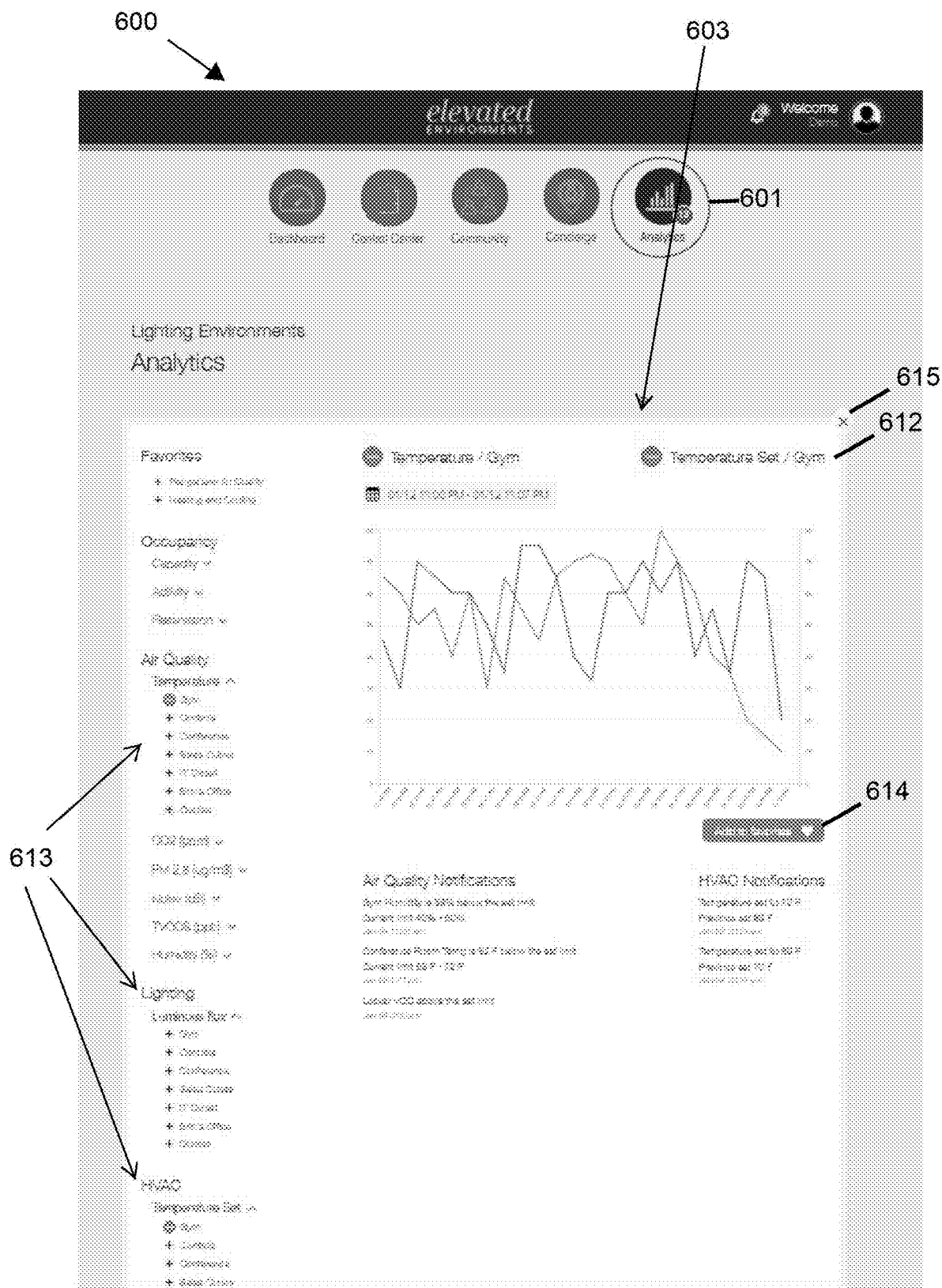
FIG. 6D illustrates a Graphical User Interface (GUI) interactive display screen showing a detailed view of a selected one of the multiple analytic windows of building metrics of the interactive building analytics page according to at least one embodiment of the disclosed subject matter.

FIGS. 6A to 6D illustrate a Graphical User Interface (GUI) interactive display screen output generated by the analytics software application module 600 showing an interactive building analytics dashboard 600a according to at least one embodiment. In general, the interactive building analytics dashboard 600a includes multiple graphical information display panels and a user's ability to access, view, calculate, and use the analytics data is based on the user's assigned level of access. As seen in FIG. 6A, when the Analytics icon 601 is selected, the interactive building analytics dashboard 600a is displayed with multiple graphical information display panels including, for example, a people and air quality display panel 602 showing overall air quality over time and occupant loading, a heating and cooling display panel 603 showing heating and cooling output over time, a capacity display panel 604 showing the number of occupants over time, an air quality display 605 showing air quality metrics over time, a light levels display panel 606 showing a light level over time, and a temperature set display panel 607 showing a set point value over time, as shown in FIG. 6A. Thus, as seen in FIGS. 6A to 6D, when the Analytics icon 601 has been selected, the interactive building analytics dashboard 600a is presented with the current analytics shown in a variety of graphical views for various aspects of the specific building or office being monitored. Each of the graphical information display panels 602-607 is dynamically updated on a predefined time period, for example, in "real time," so as soon as new information is received and the updated results can be calculated, or on a set time period such as every 10 seconds, every minute, every 5 minutes, every 10 minutes, etc. As the results change from update to update, the individual graphical information display panels 602-607 are updated and automatically resized, as necessary, for example, but not limited to, the x and y scale sizes, depending on the change in the displayed analytic values. Also, one or more of the graphical information display panels 602-607 can be active so, if an active graphical information display panel is selected using, for example, an interactive chart button 609 or by double clicking on a specific graphical information display panel, for example, the heating and cooling display panel 603, as seen in FIG. 6D, the GUI can display a graph in an increased size with additional details 612 about the heating and cooling display panel 603, while the other graphical information display panels 602, 603-607 are resized, repositioned, and partially displayed as active summaries 613 alongside of the selected graphical information display panel 612 in FIG. 6D. An example mobile application screenshot embodiment of an insights control panel 2200 of the insight functions 1315 (or analytics software dashboard 600a) is shown in FIG. 6A-1. As shown in FIG. 6A-1, the insights control panel 2200 can include analytical information for various parameters (such as, for example, lighting, HVAC, air quality) for rooms, areas, hallways, and regions within the space as shown in FIG. 6A-1. For example, as shown in FIG. 6A-1, the insights control panel 2200 can include analytic or insight information for overall people and air quality 2201, IT closet heating and cooling 2203, individual office air quality 2205, conference room lux 2207, training area air quality 2209, HR (human resources or other function) heating and cooling 2211, and common area lux 2213. An example mobile application screenshot embodiment of a detailed insights control panel 2250 of the insight functions 1315 (or or analytics software dashboard 600a) for these insights is shown in FIG. 6A-1A. As shown in FIG. 6A-1A, the detailed insights control panel 2250 can include graphical information as well as timestamped status information for particular events occurring for various parameters.

In addition, returning to FIG. 6A, each of the multiple graphical information display panels 602-607 includes a "Notifications>" toggle button, which, when selected, automatically replaces the chart with a scrollable list of notifications of the specific information related to the selected graphical information display panels 602-607. As seen in FIG. 6B, when a capacity notification toggle button 602-a is selected, the graphic results in the air quality display panel 602 are replaced by a scrollable list of notifications organized, generally, in a chronological date and time order, which can be organized as either most recent to oldest or oldest to most recent. As seen in FIG. 6B, after selecting the capacity notification toggle button 602-a and the notification information is displayed, the capacity notification toggle button 602-a has changed to read "<Chart>", which when selected will redisplay the graphic results in the air quality display panel 602, as in FIG. 6A, and the capacity notification toggle button 602-a will change back to read "Notifications>". Returning to FIG. 6B, although not explicitly shown, all or a selected number of the display panels can be "toggled" to simultaneously display scrollable notification information.

In FIG. 6C, each of the multiple graphical information display panels 602-607 also includes a time drop down selection button 602-b, which when selected opens a pop-up calendar 602-b-1 from which a time ranges over which the analytic results are to be displayed can be selected. The pop-up calendar 602-b-1 can be displayed above some or all of the multiple graphical information display panels 602-607 to enable the selection of the time range (that is, period) for which the results are to be displayed. In embodiments, a global default time range can be predefined, for example, but not limited to, increments of a moving 24 hour range, so if a single day range is selected and the current time is 4 pm on a Tuesday, the data can be displayed for the prior 24 hours starting at 4:00 pm on the prior day, i.e., Monday. Once the desired time period is selected, an "Apply" button 602-*b*-2 can be selected and the graphical information for the selected time range is automatically resized (that is, scaled) to fit and be displayed in the air quality display panel 602. In some or all of the multiple graphical information display panels 602-607, one or more "vSelect" pull-down menu buttons 605-*c*, 605-*d* that permit the selection of which types of environmental information 605-*c* and/or for which physical locations 605-*d* the types of environmental information are to be displayed. For example, the types of environmental information 605-*c* can include, but are not limited to, temperature, $CO_2$ levels (ppm), Particulate Matter (PM) 2.5 $\mu g/m^3$, light (lx), noise, (dB), $TVOC_S$ (ppb), and humidity (%); and the physical locations 605-*d* can include, but are not limited to, meeting/conference rooms, offices, reception area, open office cubes, kitchen, storage rooms, Information Technology (IT) equipment (for example, servers and communications equipment) rooms, common areas, gym/exercise facilities, rest rooms, hallways, stairwells, mechanical/HVAC rooms, dedicated computer rooms, and exterior doorways.

Returning to FIG. 6A, as certain analytic values exceed or fall below predefined levels, real time alerts can be displayed to show the user the bad condition. These alerts can include, but are not limited to, warning sounds, SMS text messages, email messages, automated calls, highlighting the values in question on the display screen by showing them in a bold font, in a warning color such as red, and/or having the values blink. In one or more embodiments, the email messages can be automatically generated, sent, presented and/or read using a literary format such as, for example, but not limited to, a Superhuman email client from Superhuman of San Francisco, Calif. The specific graphical information display panel 602-607 in which the alerting values are located also can be automatically moved by the system and method 100 to a more prominent position on the GUI such as the top left position and the other graphical information display panels 602-607 can be automatically repositioned as a result. Alternatively, the specific graphical information display panel in which the alerting values are located can be redisplayed in a separate alert window that opens over top of the other graphical information display panel 602-607 in the GUI. The separate alert window for the alerting graphical information display panel can have an increased size for easier readability similar to that seen in FIG. 6D. This will generally occur when there is an emerging issue or problem detected with one of the systems and/or environmental conditions being monitored. When this occurs, the alert window will generally obscure the windows and information below it in the dashboard 600*a* to make sure the user takes notice and decides whether any action needs to be taken. Once the alert condition has been acknowledged or dealt with, it is determined not to be an issue, or at any time the alert window can be cleared by the user to return the GUI to displaying the user's regular graphical information display panels 602-607.

Furthermore, in FIG. 6A, a heart icon 610 is shown at the upper right corner of the first two graphical information display panels 602, 603 in a first row 608 of the graphical information display panels. The heart icon 610 is used to identify those graphical information display panels 602 designated as "favorites" of the user. The upper right corner of the other graphical information display panels 602-607 include a "+" icon 611, which is an active button that the user can select to designate that specific window to be a "favorite" of the user. When the "+" icon 611 is selected by the user, it changes to a heart icon 610. In embodiments, when the "+" icon 611 is selected on one of the graphical information display panels 602-607, depending on the user's or a predefined setting, the selected graphical information display panel is placed in order with the other favorite graphical information display panel. In some embodiments, the graphical information display panels 602, 603 that are designated as the user's favorites can be listed first in the display, that is, they start in the left-most position and go to the right in the first row 608. As a result, when one of non-favorite graphical information display panels 602-607 is selected to be a favorite, its position within the GUI is automatically updated to place it adjacent the other favorite graphical information display panels 602, 603. The exact order can be manually set by the user or automatically by the system in a predefined order, for example, first selected is first, last selected is last, last selected is first, etc.

In FIG. 6D, the selected information panel display window 612 of the one or more information panel display windows 602 in FIG. 6A are active and, if they are selected, in FIG. 6D, the GUI can display the information from the graphical information display panels 602 in an increased size, including, graphs, values, and related environmental, system, and contextual information. An active Add to Favorites button 614 is shown below the graphical information display panel 612 and, if selected, marks the graphical information display panel 612 as a favorite of the user. An active exit button 615 is provided that, if selected, returns to the interactive building analytics dashboard 600*a* of FIG. 6B.

Further, in FIG. 6D, the other graphical information display panels 602, 603-607 that were not selected can be resized, repositioned, and partially displayed as active summaries 613 alongside of the selected information panel display window 612. These active summaries 613 can be selected by the user and when selected, they are automatically displayed as the selected graphical information display panel 612 and the prior selected information panel display window 612 is removed and is resized, repositioned, and partially displayed as one of the active summaries 613 alongside of the newly selected information panel display window 612.

Figure 6E:
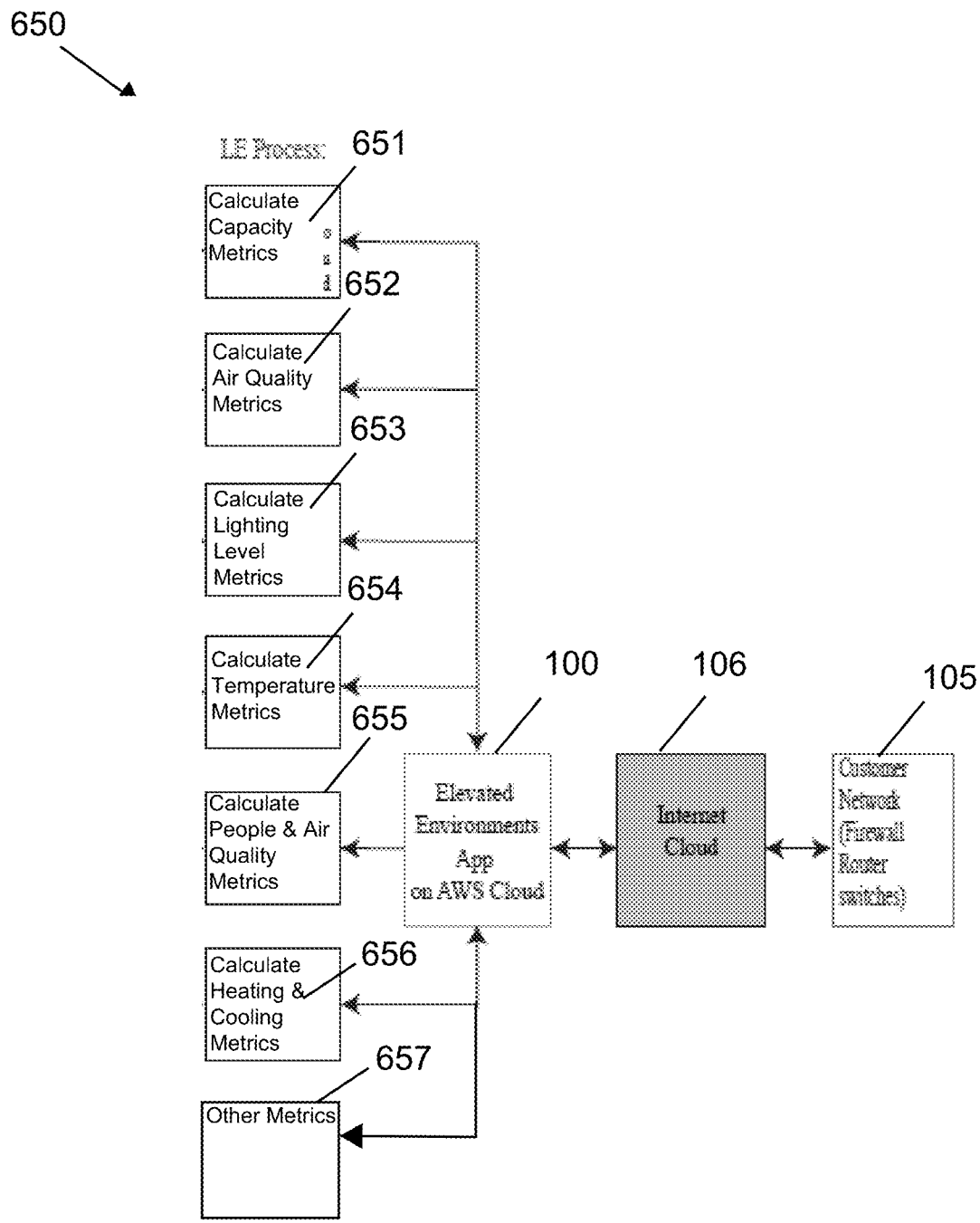
FIG. 6E is a functional block diagram showing application and server interfaces in connection with the interactive building analytics page according to at least one embodiment of the disclosed subject matter.

FIG. 6E is a functional block diagram showing application and server interfaces in connection with the interactive building analytics dashboard 600*a* according to at least one embodiment. In FIG. 6E, the integrated building and office automation control system 100 is communicatively coupled via the Internet 106 to the customer network 1201 being monitored and controlled. The integrated building and office automation control system 100, although shown to not be communicatively coupled third-party application vendor software, it can be communicatively coupled via multiple APIs to multiple application vendors. In FIG. 6E the integrated building and office automation control system application 100 is coupled to an occupancy analytics application 651 for receiving data regarding the time and number of people in the specific location(s) and calculating and charting specific occupancy rates as described above in regard to the capacity display panel 604 of FIG. 6A. The integrated building and office automation control system application 100 is also coupled to an air quality analytics application 652 for receiving sensor data regarding the air quality over time in each of the monitored location(s) and calculating and charting specific air quality metrics as described above in regard to the air quality display panel 605 of FIG. 6A. The integrated building and office automation control system application 100 is also coupled to a lighting level analytics application 653 for receiving sensor data regarding the lighting levels over time in each of the monitored location(s) and calculating and charting specific lighting level metrics as described above in regard to the lighting level display panel 606 of FIG. 6A. The integrated building and office automation control system application 100 is further coupled to a temperature analytics application 654 for receiving sensor data regarding the set temperature levels over time in each of the monitored location(s) and calculating and charting specific temperature level metrics as described above in regard to the temperature set display panel 607 of FIG. 6A. The integrated building and office automation control system application 100 is still further coupled to a people and air quality analytics application 655 for receiving sensor data regarding the time and number of people in the specific location(s) and the air quality over time in each of the monitored location(s) and calculating and charting specific air quality metrics over time and based on the measured occupancy as described above in regard to the people and air quality metrics display panel 602 of FIG. 6A. The integrated building and office automation control system application 100 is further coupled to a heating and cooling analytics application 656 for receiving sensor data regarding the measured temperature levels over time in each of the monitored location(s) and calculating and charting specific heating and cooling level metrics as described above in regard to the heating and cooling display panel 603 of FIG. 6A. The integrated building and office automation control system application 100 is further coupled to another analytics application 657 for receiving sensor data regarding measured environmental levels over time in each of the monitored location(s) and calculating and charting a variety of new and/or combined level metrics as described above in regard to the heating and cooling display panel 603 of FIG. 6A.

In at least one embodiment, the analytics software module 600 of the integrated building and office automation control system 100 may include a machine learning or artificial intelligence capability configured to determine event priority by the processor 101 executing a machine-learning algorithm which updates the plurality of stored predefined events to calculate the assigned priority with an accuracy that increases with successive executions of the machine-learning algorithm. The metadata may also be shared via network interface such as, for example, the WorldWideWeb. In an embodiment, the artificial intelligence capability can include receiving a set of input data files which are uploaded to or received from the processor 101 from the one or more external sources and/or a user. The processor 101 may determine the validity of the input data, classify the input data, and generate metadata using the input data.

FIGS. 7A to 7F are flowcharts illustrating an integrated building control method 700 in accordance with various embodiments of the disclosed subject matter. The method 700 can be implemented through both the GUI and the metaverse implementations described herein. Referring now to FIG. 7, the integrated building control method 700 can commence at a step 701 at which the processor 101 can be configured to generate and output the interactive building comfort dashboard 200a to a user via a Graphical User Interface (GUI) using the display 103 based on an assigned access level of the user. The method can then proceed to a step 703 at which the processor 101 is configured to control temperature, humidity, lighting level, and audio for each of a plurality of interior regions of said building in response to inputs received from the user via the GUI and at least one of the active display panels, or to a step 704 at which the processor 101 is configured to automatically control temperature, humidity, lighting level, and audio for each of a plurality of interior regions of said building according to one or more pre-defined settings (see, e.g., FIGS. 2A-3 and 2A-5).

The method can then proceed to a step 705, at which the method can then optionally proceed to a metaverse step 707 at which time the processor 101 is configured to detect, represent, and track a location of each of one or more occupants of each said plurality of interior regions using a unique identifier associated with the physical occupant and output the unique identifier representation to the user via a floor plan display panel in the GUI. For example, in various embodiments, an occupant or guest may transition an avatar presence between the metaverse virtual representation of the space (as described elsewhere herein) and the actual physical space metaverse via the metaport "bridge" provided by interactive display panel 259 (see FIG. 2C). Additional details regarding this step 707 are described further herein in connection with FIG. 8.

The method can then proceed to a step 709, at which the processor 101 is configured to output, via the GUI, a community display region identifying each said one or more physical occupants and each said one or more virtual occupants. The method can then proceed to a step 711, at which the method can then optionally proceed to step 713 at which the processor 101 is configured to initiate a text-based chat session with (among or between) one of the physical occupants or one of the virtual occupants in response to receiving a chat request input from a user via the community display region of the GUI. Continuing on to FIG. 7B, the method can then proceed to a step 715, at which the method can then optionally proceed to step 717 at which the processor 101 is configured to initiate a voice-based communication session with one of the physical occupants or one of the virtual occupants in response to receiving a call request input from a user via the community display region of the GUI.

The method can then proceed to a step 719, at which the method can then optionally proceed to step 721 at which the processor 101 is configured to output one or more online articles using the community display region of the GUI.

The method can then proceed to a step 723, at which the method can then optionally proceed to step 725 at which the processor 101 is configured to obtain from an external server one of a list of local hotels and a list of local restaurants. The method can then proceed to a step 727, at which the method can then optionally proceed to step 729 at which the processor 101 is configured to output the list of local hotels or the list of local restaurants using a concierge display region of the GUI. The method can then proceed to a step 731, at which the method can then optionally proceed to step 733 at which the processor 101 is configured to, upon receiving a user request via GUI selection of an associated hypertext transfer protocol (HTTP) link, obtain and output, using the concierge display region, a map showing a location of each hotel contained in the list of local hotels or of each local restaurant contained in the list of local restaurants. The method can then proceed to a step 735, at which the method can then optionally proceed to step 737 at which the processor 101 is configured to upon receiving a user request via GUI selection of an associated hypertext transfer protocol (HTTP) link, outputting a request to an external server to open a food delivery service application. Continuing on to FIG. 7C, the method can then proceed to a step 739, at which the method can then optionally proceed to step 741 at which the processor 101 is configured to display an interactive Hypertext Transfer Markup Language (HTML) page in the concierge display region associated with a food delivery request for the food delivery service application. The method can then proceed to a step 743, at which the method can then optionally proceed to step 745 at which the processor 101 is configured to enter information received via user input into fields of said interactive HTML page in the concierge display region associated with food delivery request for the food delivery service application. The method can then proceed to step 747 at which the processor 101 is configured to send the interactive HTML page associated with the food delivery request, including the entered information, to the food delivery service application.

The method can then proceed to a step 749, at which the method can then optionally proceed to step 751 at which the processor 101 is configured to, upon receiving a user request via GUI selection of an associated hypertext transfer protocol (HTTP) link, outputting a request to an external server to open a ridesharing application. The method can then proceed to a step 753, at which the processor 101 is configured to output a display for an interactive Hypertext Transfer Markup Language (HTML) page in the concierge display region associated with a ridesharing request for the ridesharing application. The method can then proceed to a step 755, at which the processor 101 is configured to enter information received via user input into fields of said interactive HTML page in the concierge display region associated with the ridesharing request for the ridesharing application. Continuing on to FIG. 7D, the method can then proceed to a step 757, at which the processor 101 is configured to send the interactive HTML page associated with the ridesharing request, including the entered information, to the ridesharing application.

The method can then proceed to a step 759, at which the processor 101 is configured to optionally retrieve from a plurality of sensors a plurality of values each associated with one or more of temperature 760, humidity 761, and lighting level 762 for each interior region of the building, office, or region thereof. The method can then proceed to a step 763, at which the processor 101 is configured to timestamp and store these values, and then on to steps 764, 765, and 766 at which the processor 101 is configured to calculate, using the stored values, one or more of an average temperature, an average humidity, and an average lighting level, for one or more of the interior regions of said building of a plurality of interior regions of the building or office in response to inputs received from a user via the GUI. The method can then proceed to a step 767, at which the processor 101 is configured to calculate, using said plurality of stored values, one or more of a histogram of temperature every hour for each 24 hour period, a histogram of humidity every hour for each 24 hour period, and a histogram of lighting level every hour for each 24 hour period for one or more of the interior regions of the building in response to inputs received from a user via the GUI. The method can then proceed to a step 768, at which the processor 101 is configured to output, using an analytics display region of the GUI, one or more of said average temperature, said average humidity, and said average lighting level. The method can then proceed to a step 769, at which the processor 101 is configured to output, using said analytics display region of the GUI, a graphical representation of one or more of the histograms of temperature, said histogram of humidity, and said histogram of lighting level.

Figure 7A:
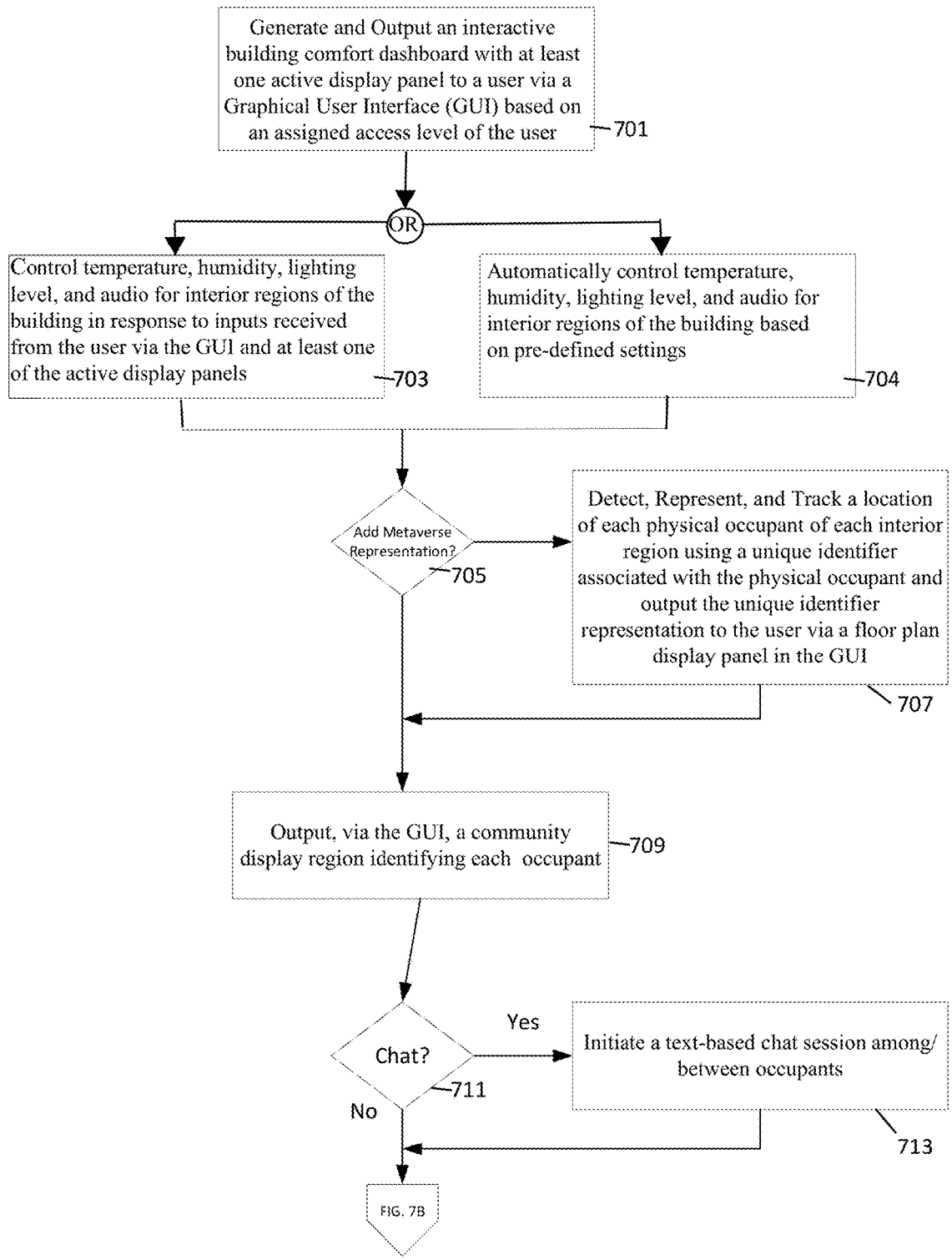
Figure 7B:
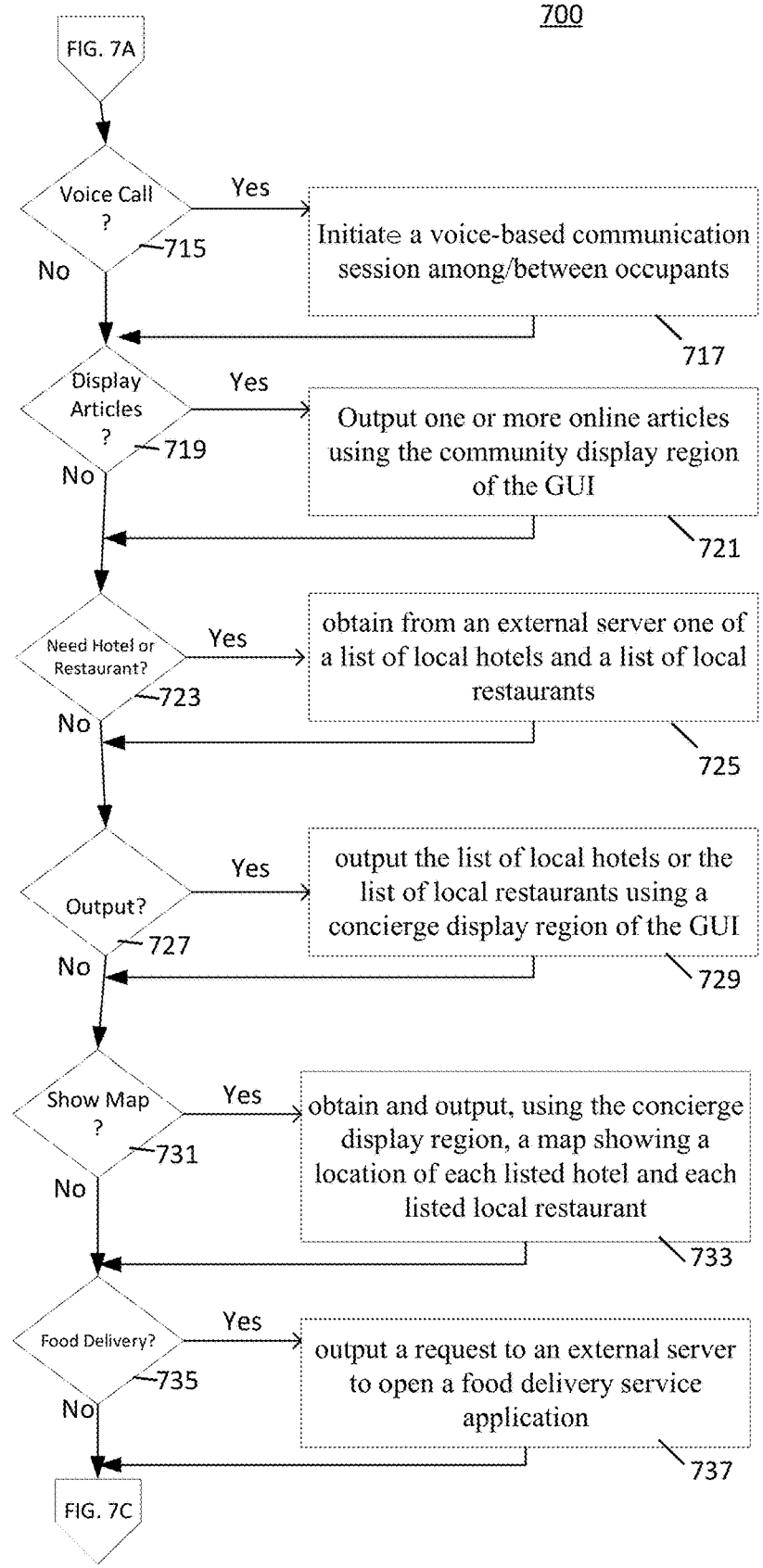
Figure 7C:
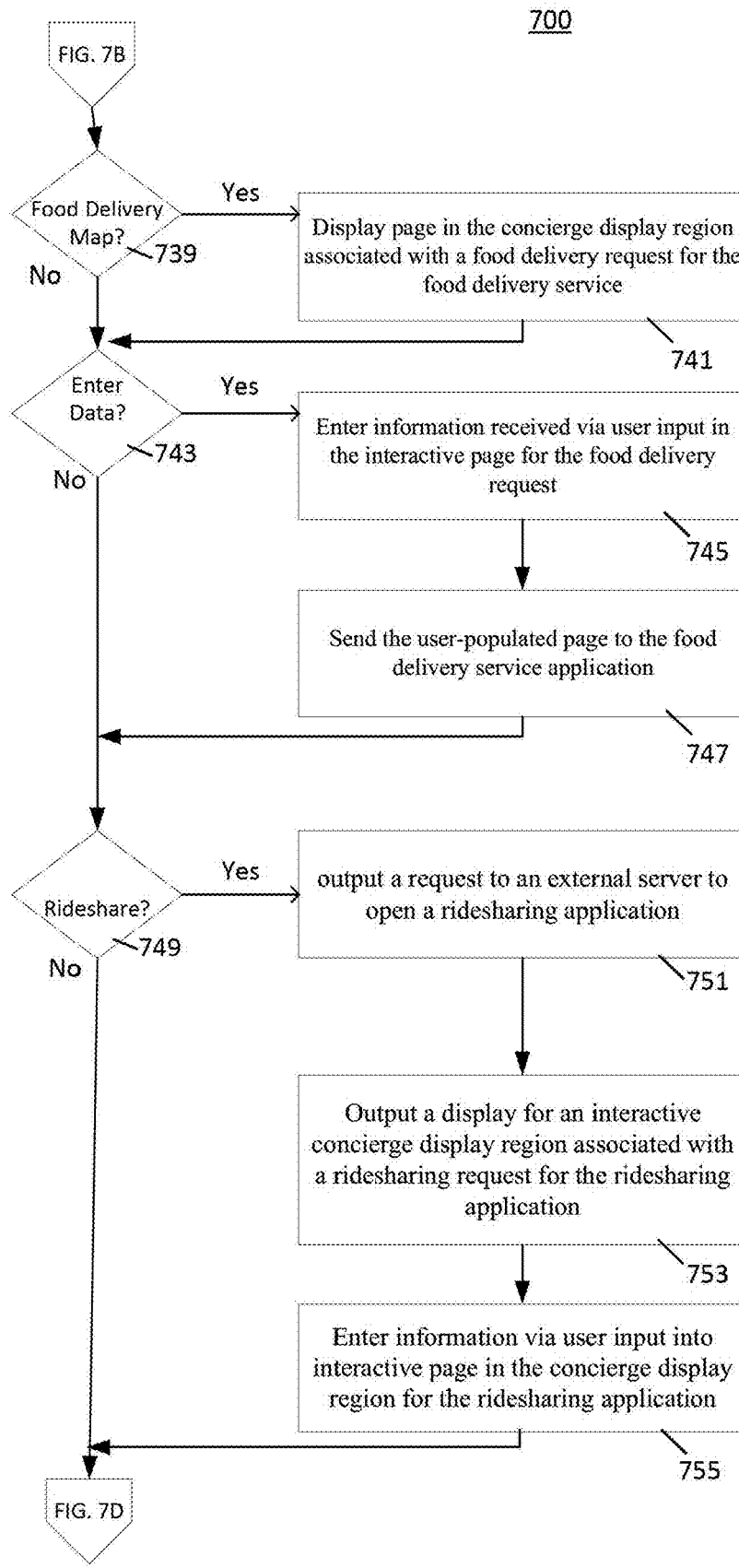
Figure 7D:
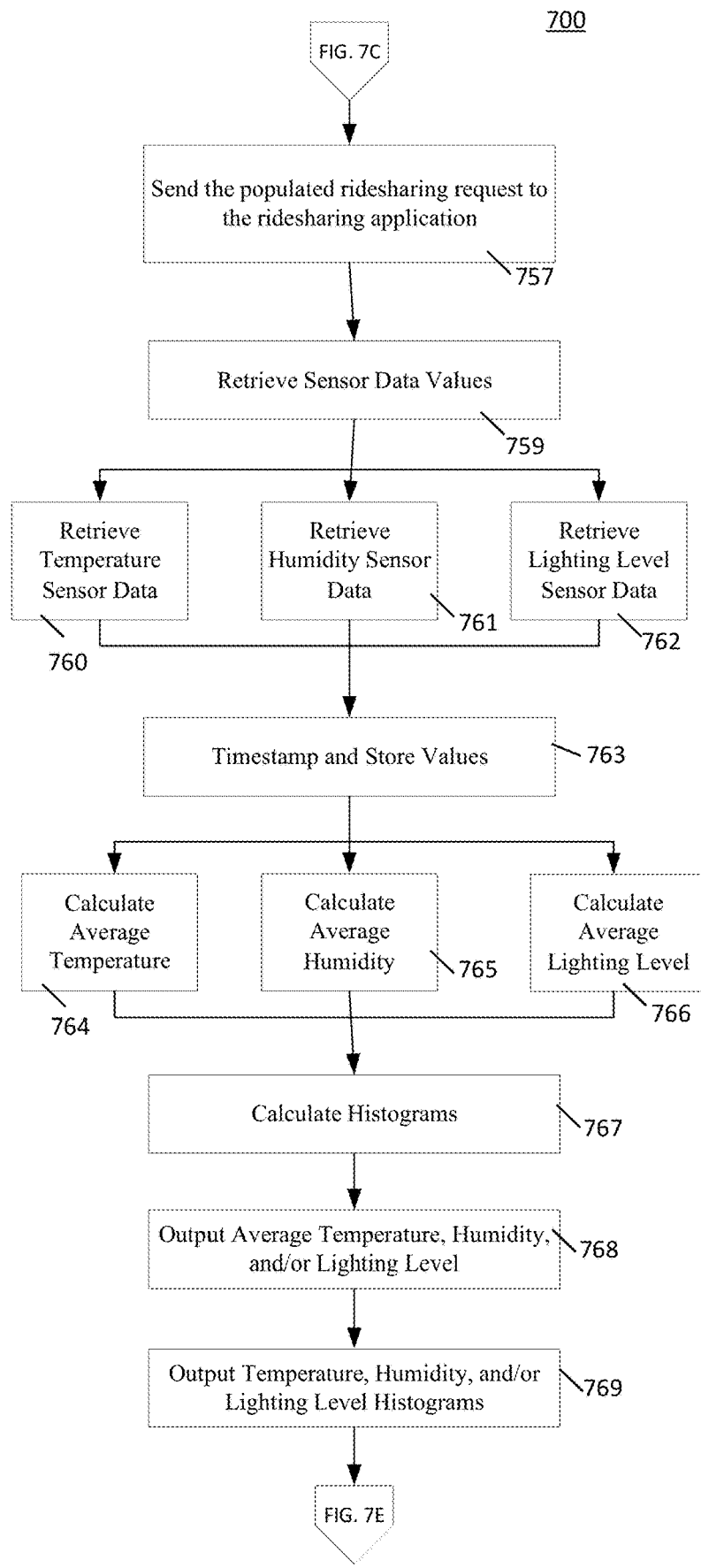
Figure 7E:
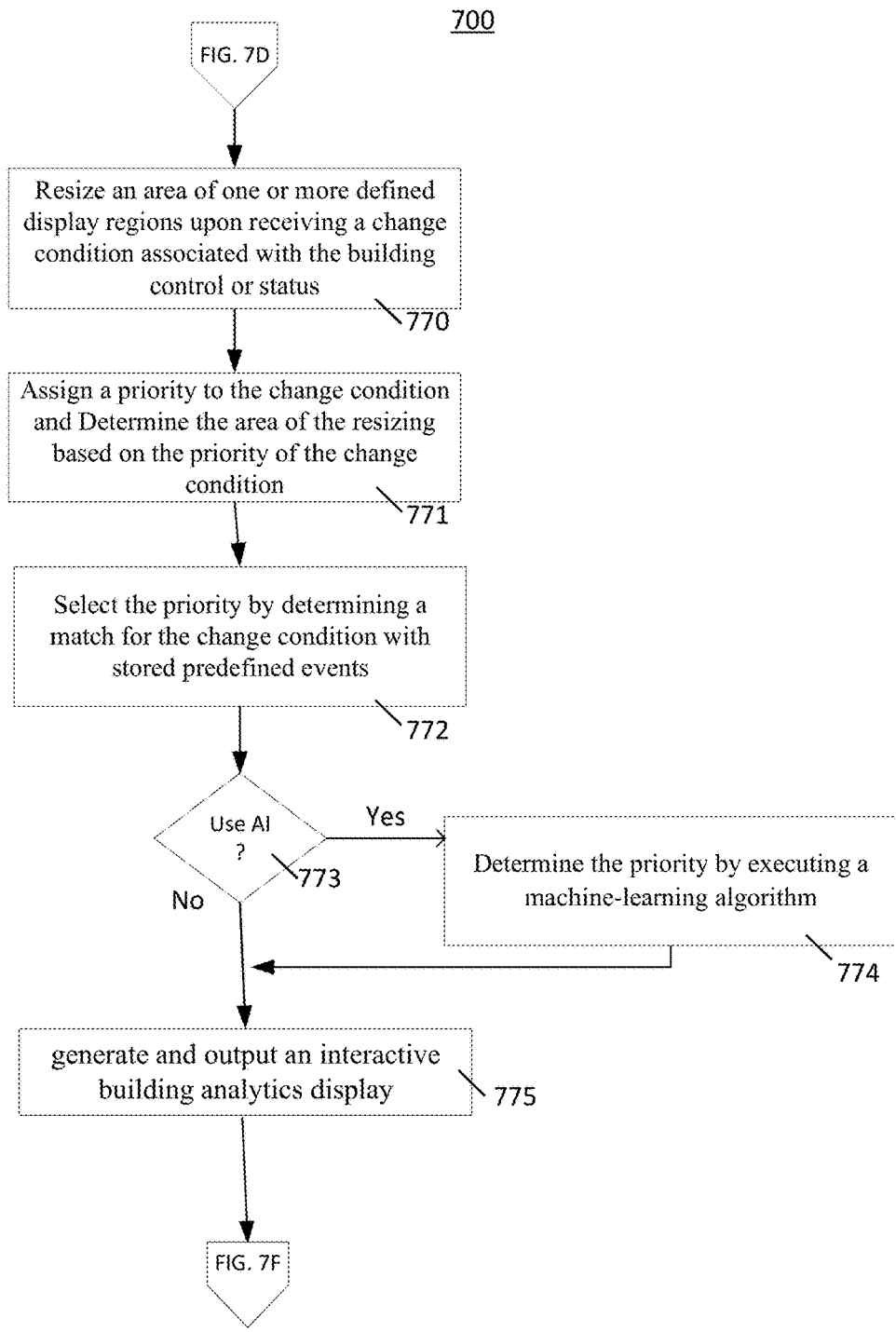
Figure 7F:
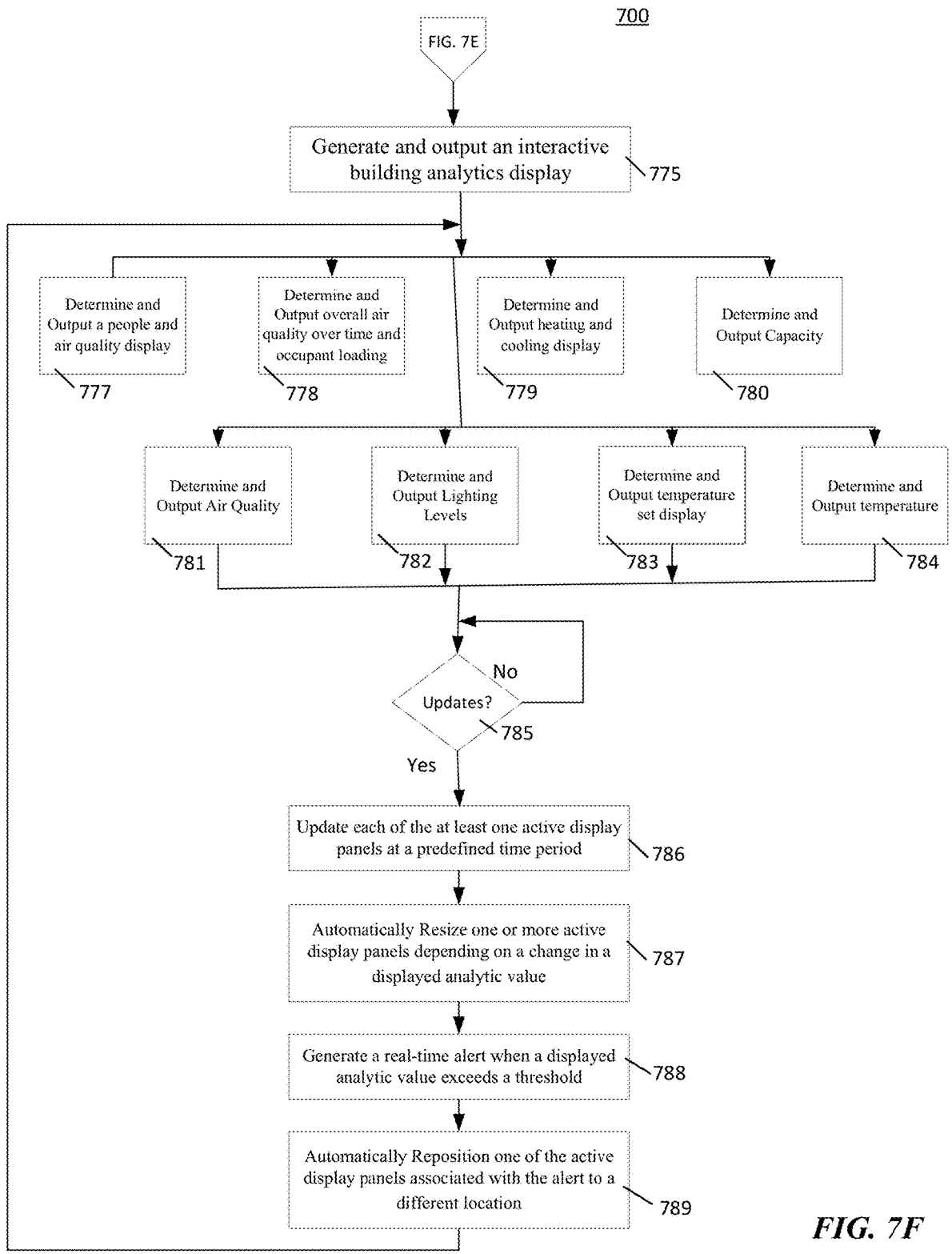
Figure 8:
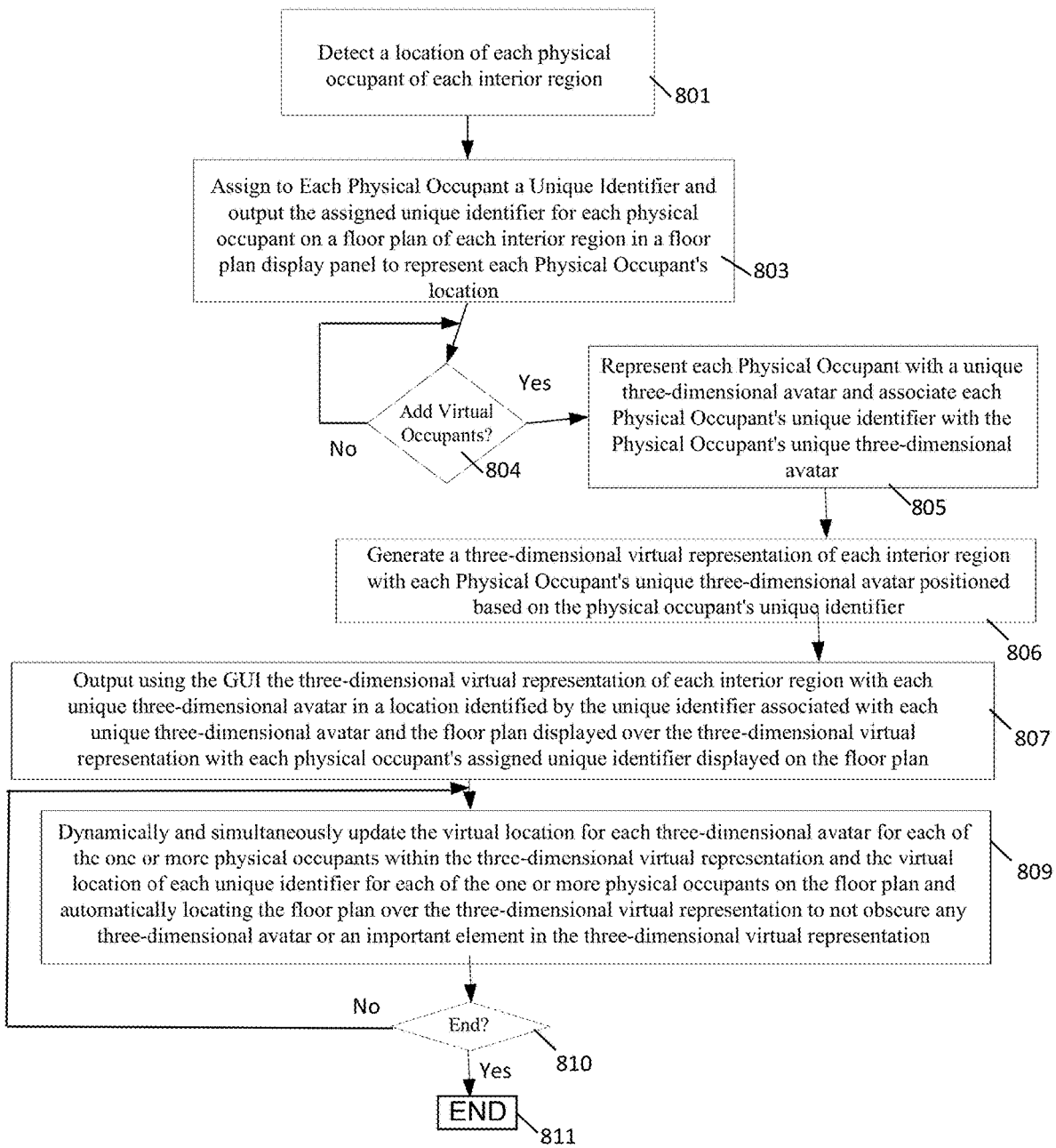

Continuing on to FIG. 7E, the method can then proceed to a step 770, at which the processor 101 is configured to resize an area of one or more defined display regions upon receiving a change condition associated with the building control or status, in which the defined output display regions of the GUI are each associated with a building control or status. The method can then proceed to a step 771, at which the processor 101 is configured to assign a priority to the change condition, and determine the area of the resizing is based on the priority of the change condition. The method can then proceed to a step 772, at which the processor 101 is configured to select the priority by determining a match for said change condition with one of a plurality of stored predefined events. The method can then proceed to a step 773, at which the method can then optionally proceed to step 774 at which the processor 101 is configured to determine the priority by executing a machine-learning algorithm which updates said plurality of stored predefined events to calculate said assigned priority with an accuracy that increases with successive executions of said machine-learning algorithm.

The method can then proceed to a step 775, at which the processor 101 is configured to generate and output an interactive building analytics display with at least one active graphical display panel to the user via the GUI based on an assigned access level of the user. The method can then proceed to a steps 777 to 784, at which the processor 101 is optionally configured to determine and output one or more of a people and air quality display panel at 777 showing overall air quality over time and occupant loading 778, a heating and cooling display panel at 779 showing heating and cooling output over time, a capacity display panel at 780 showing the number of occupants over time, an air quality display panel at 781 showing air quality metrics over time, a light levels display panel at 782 showing a light level over time, a temperature set display panel 783 showing a set point value over time, and a temperature display panel 784 showing an actual temperature over time. The method can then proceed to a step 785, at which the processor 101 is configured to update each of the at least one active display panels at a predefined time period, and then to step 786 at which the processor 101 is configured to automatically resize one or more of the at least one active display panels depending on a change in a displayed analytic value as the displayed analytic values change from update to update. The method can then proceed to a step 787, at which the processor 101 is configured to display one or more of the at least one active display panels with an increased size with respect to a size of other display panels. The method can then proceed to a step 788, at which the processor 101 is configured to generate a real-time alert, for example, but not limited to, an SMS text message or an email, when a displayed analytic value exceeds a threshold; and, the method can then proceed to a step 789, at which the processor 101 is configured to automatically reposition one of the active display panels associated with the alert to a different location within the interactive building analytics display.

FIG. 8 is a flowchart illustrating a metaverse method step 707 in accordance with various embodiments of the disclosed subject matter. Referring now to FIG. 8, the metaverse method 707 can comprise detecting, representing, and tracking a location of each of one or more physical occupants of each said plurality of interior regions using a unique identifier associated with the physical occupant and output the unique identifier representation to the user via a floor plan display panel in the GUI. For example, the metaverse method 707 can commence at a step 801 in which the processor 101 detects one of more physical occupants and their locations in each of a plurality of interior regions of the building or office. The metaverse method 707 can then proceed to step 803, at which the processor 101 can assign to each physical occupant a unique identifier to represent each physical occupant on a floor plan of each interior region using the unique identifier in the floor plan display panel 210. The metaverse method 707 can then determine 804 whether the user wants to associate a virtual occupant for one or more of the one of more physical occupants. If it is not determined 804 to add one or more virtual occupants the method 707 returns to step 804. If it is determined 804 to add one or more virtual occupants, the method 707 can proceed to step 805, at which the processor 101 can represent each physical occupant with a unique three-dimensional avatar and associate each Physical Occupant's unique identifier with the physical occupant's unique three-dimensional avatar. After step 805, the metaverse method 707 can then proceed to step 806, at which the processor 101 can generate a three-dimensional virtual representation of each interior region with each Physical Occupant's unique three-dimensional avatar positioned based on the physical occupant's unique identifier. After step 806, the metaverse method 707 can then proceed to step 807, at which the processor 101 can output using the GUI the three-dimensional virtual representation of each interior region with each unique three-dimensional avatar in a location identified by the unique identifier associated with each unique three-dimensional avatar and the floor plan displayed over the three-dimensional virtual representation with each physical occupant's assigned unique identifier displayed on the floor plan.

The metaverse method 707 can then proceed to step 809, at which the processor 101 can dynamically and simultaneously update the virtual location for each three-dimensional avatar for each of the one or more physical occupants within the three-dimensional virtual representation and the virtual location of each unique identifier for each of the one or more physical occupants on the floor plan and automatically locating the floor plan over the three-dimensional virtual representation to not obscure any three-dimensional avatar or an important element in the three-dimensional virtual representation. For example, in various embodiments, the metaverse method 707 can comprise the processor 101 outputting the unique identifier of each occupant by outputting using the GUI the floor plan as a two dimensional virtual representation of the plurality of interior regions of the building. Each floor plan can include indications of the locations of each of the physical and/or virtual occupants at the physical location within the floor plan, and each of the one or more remote virtual occupants at the virtual location within the floor plan, and each of the one or more remote virtual occupants located within the interior region. The step 809 can also include generating and outputting a three-dimensional simulated representation of at least one of the interior regions including each avatar representation of each of the one or more physical occupants at the on-premise location within the three-dimensional simulated representation, and each of the one or more remote virtual occupants at virtual location within the three-dimensional simulated representation. The metaverse method 707 can then proceed to step 810, at which the processor 101 can determine whether to end or continue the method. If step 810 determines to continue, then the metaverse method 707 can then return to step 809. If step 810 determines not to continue, then the metaverse method 707 can then proceed to step 811, at which the processor 101 can end the metaverse method 707.

The metaverse method 707 according to various embodiments can provide for interaction among virtual and/or physical occupants within a simulated representation of an interior region as shown in, for example, but not limited to FIGS. 9A to 9F. For example, the processor 101 can be configured to allow users in the physical environment to be alerted that someone in the virtual environment is nearby/trying to interact digitally. The processor 101 can then allow for the physical world to interact in an augmented way using smartglass/a smartphone, VR device, AR device, or other such means.

The processor 101 can also be configured to allow users in the physical environment to conduct meetings with team members in the virtual environment (by projection or other means), thus creating a metaverse meeting room. For example, the processor 101 can be configured to provide desk and room scheduling capabilities for those in the virtual environment to conduct collaborative conversations virtually.

The processor 101 can also be configured to allow users in the virtual environment to know where users in the physical environment are located real time, that is, thus providing a digital twin of the office as it exists in real time.

The processor 101 can also be configured to allow users in the virtual environment to access and control the space in the physical environment. For example, a virtual administrator can control lighting, HVAC, services, equipment demonstrations, and access control for a physical space, such as a conference room, to ensure that the conference room or office is set up for clients to arrive, etc. The processor 101 can also be configured to control lighting, HVAC, services, equipment demonstrations, and access control for a virtual space, such as a virtual conference room, to thereby provide a virtual showroom for a vendor or supplier to demonstrate function and operation of vendor or supplier equipment to a potential customer, and to be able to interact, converse, and chat with a customer or potential customer, without the customer having to physically travel to attend an in-person meeting at a physical office space of the vendor/supplier.

In at least one embodiment, the processor 101 can be configured to allow a user in the physical environment to control his or her avatar and status in the virtual environment without being immersed/logged into the virtual environment at the time.

The processor 101 can also be configured to allow users in the physical environment to hear people they're interacting with in the virtual environment and vice versa in a way that mimics the physical, such as, for example, virtual occupants whose avatars are located in a room together within the virtual simulated environment can converse or chat amongst themselves, while virtual occupants located outside the meeting room boundary are not able to hear or converse with any virtual occupant inside the meeting room.

Figure 9A:
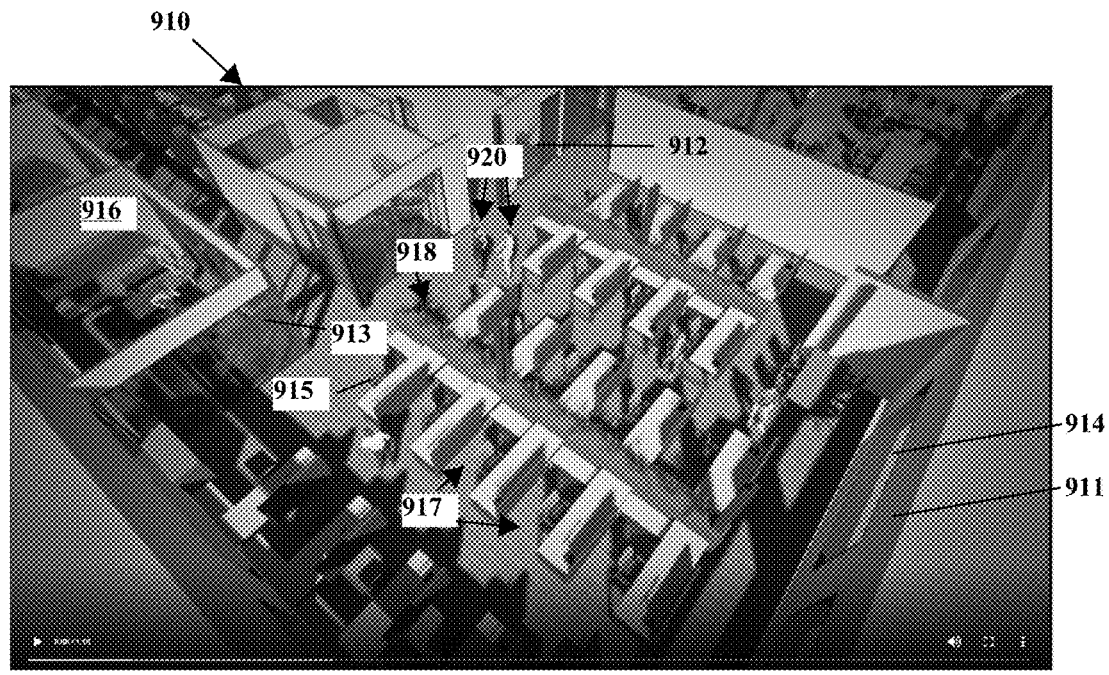
Figure 9B:
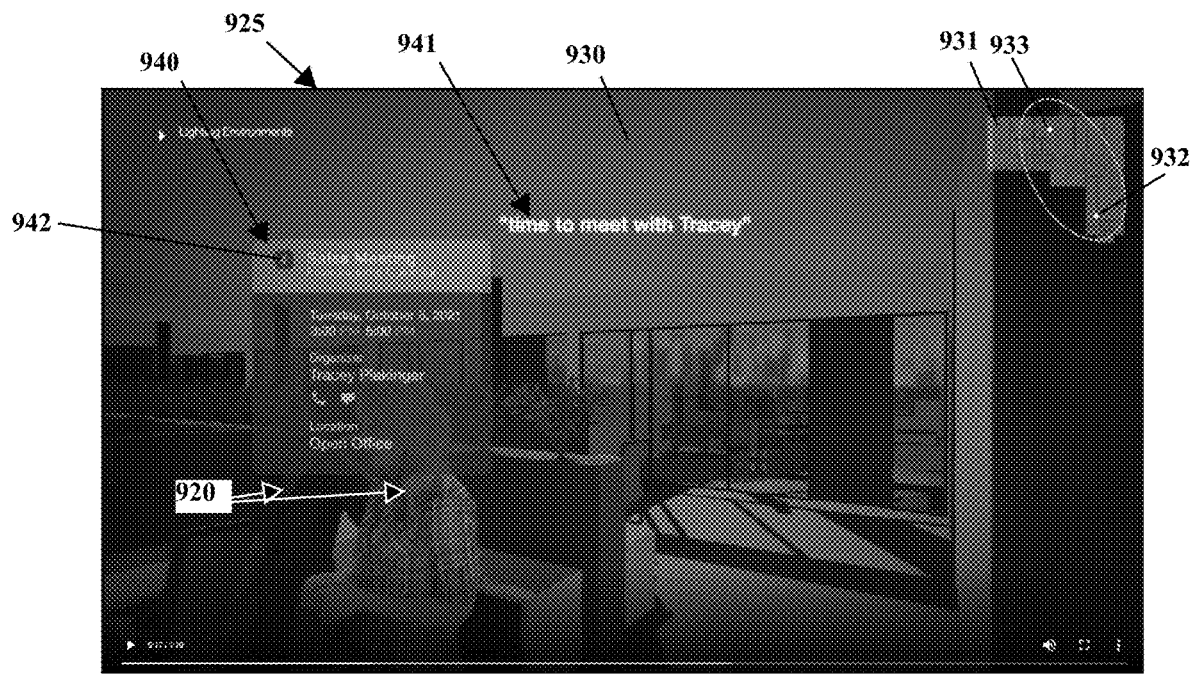

FIGS. 9A to 9F show images from an executable software program, which, when executed by a processor, operates to provide a metaverse or virtual implementation of a building, facility, and/or office space along with an integrated building control system to control and manage the building, in accordance with various embodiments of the disclosed subject matter. For example, in accordance with at least one embodiment, in FIG. 9A, an exemplary high resolution, 3-dimensional (3D), and fully interactive virtual representation of an actual office space 910 is shown to include, for example, but not limited to: all walls 911; interior doors 912;

exterior doors; interior windows 913; exterior windows 914; furniture 915; appliances; offices 916; cubicles 917; conference/meeting rooms; open space; kitchens/pantries; plants 918; and other furnishings; office environmental controls such as, but not limited to, thermostats, light switches, door access locks, and window/shade controls; and personal avatars 920 for occupants of the actual office space. Although a ceiling is not shown in the top perspective view of the office space 910, in at least one embodiment, an overlay of the locations of the sensors located in the ceiling can be displayed over top of the office space 910. In addition, in at least one embodiment, when a user is virtually "in" and interacting with the office space 910 using a user avatar, the ceiling can be "seen" from below (this is best seen in FIG. 9B), so all of the sensors located in the ceiling can be displayed, if desired. In at least one embodiment, the 3D interactive virtual representation of the office space can be obtained by performing a 3D scanning operation of the actual office space using one or more sensors 130, or cameras 142, 171. The 3D interactive virtual representation can comprise a number of viewpoints taken within a 360-degree (360°) view about one or more vantage points within the office space, as shown in FIGS. 9A to 9E, for example, and each separate vantage point may be associated with one or more sensor nodes such as, but not limited to, heat sensors, air quality sensors, and light sensors; and one or more controllable devices or objects, such as, but not limited to, a thermostat, a light switch, a phone, a computer, a piece of furniture, a decorative item, a plant, and a coffee maker. In the case of multiple vantage points, a user may "navigate" between and among successive vantage points within the virtual representation using, for example, the input device 104.

In FIG. 9B, a virtual view 925 of the office space 910 from a user avatar standing perspective is shown and includes a ceiling 930. As shown in FIG. 9B, the ceiling 930 does not shown the locations of any ceiling sensors, but they can be enabled by an affirmative selection by the user. If the user selects the ceiling sensors to be displayed, the ceiling sensors will not be displayed to any other users operating in the environment unless they have also selected to view the ceiling sensors. In FIG. 9B, the user experiences the virtual office space in the same proportions that they would in the actual office. For example, if a user is 5 feet 10 inches tall when standing in real life, they will view and perceive the virtual office from that same height while standing. Similarly, when the user's avatar sits down in a chair, a table, or elsewhere, they will perceive the virtual office from the height they would be while sitting in the actual office on an actual chair or an actual table. An overlay of an office locator floorplan 931 is shown in an unobtrusive location so as not to obscure any important elements of the metaverse office, for example, but not limited to, the upper right hand corner of the office view in FIG. 9B, which can show the locations of some or all of the people in the office. In FIG. 9B, the office locator floorplan 931 is only showing the location of the user's avatar 932 and the avatar of another user 933 with whom the user has an upcoming meeting for which a meeting reminder 940 is displayed over a non-essential portion of the virtual view 925 of the office space 910 and provides the details of the meeting and with whom the user is to meet. Alternatively, and/or in addition to the meeting reminder 940, a conversational reminder 941 can also be displayed to the user, which here is the message "time to meet with Tracey" and provided in an upper portion of the virtual view 925, so it is readily apparent to the user. These reminders 940, 941 can be removed from the virtual view 925 by clicking on a close icon 942 or left on. If the reminders 940, 941 are not removed, they remain overlaid on the virtual view 925 as the user moves through the virtual office to get to the meeting location.

Figure 9C:
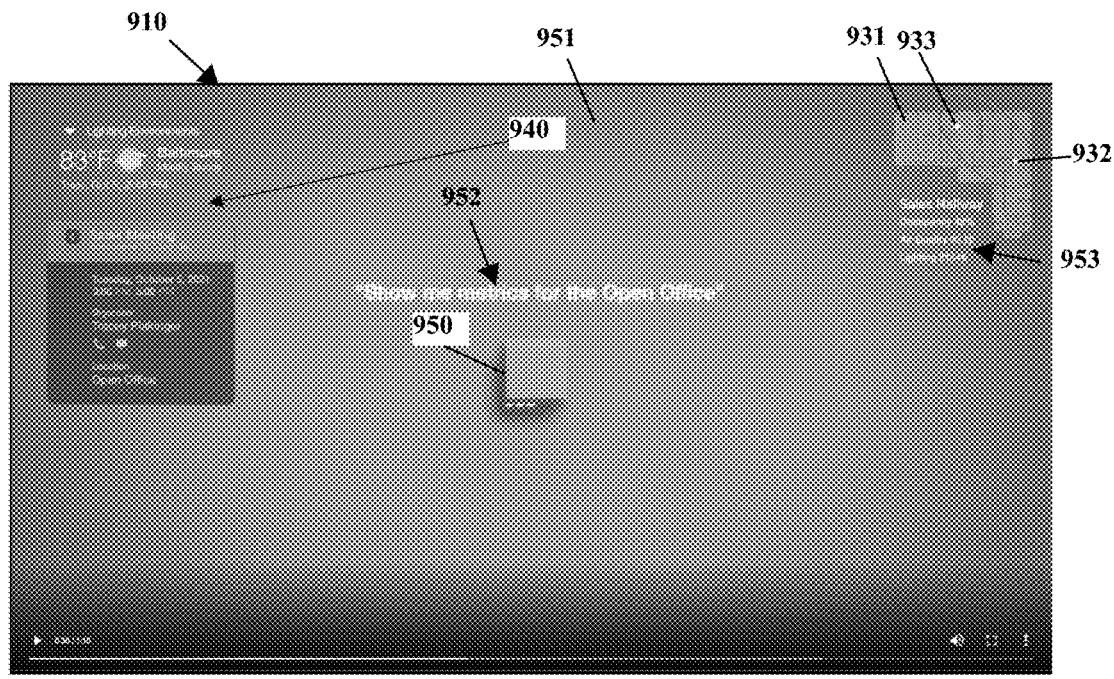

As seen in FIG. 9C, as the user moves through the virtual office space 910, the user can interact with the environmental controls as the controls are encountered. The locations of the environmental controls mimic the actual locations in the real life office. For example, but not limited to, as seen in FIG. 9C, the user has encountered and is directly viewing a thermostat 950 on a wall 951. As noted above, the meeting notice reminder 942 is still on the screen for viewing by the user, so it was not closed by the user, but it has been automatically resized and moved to a location over the wall 951 so as not to obscure any important elements on the wall 951. A command 952 from the user to "Show me the metrics for the Open Office" has been received and displayed over the thermostat 950. The command 952 can be entered, for example, but not limited to, through a voice command, by directly typing the command through a keyboard connected to the system, or by activating a predefined command menu and selecting the specific command 952. Also, the office locator floorplan 931 is still shown in the upper right hand corner of the screen 910 and now shows the current location of the user's avatar 932, which is now in the Sales Hallway, which is closer to the avatar of the other user 933 than it was in FIG. 9B. In addition, in FIG. 9C, a text portion 953 describing the current location of the user within the office as well as the metrics for that location can be displayed adjacent to the office locator floorplan 931. In general, this text portion 953 can be updated as the user avatar continues to move through the office.

Figure 9D:
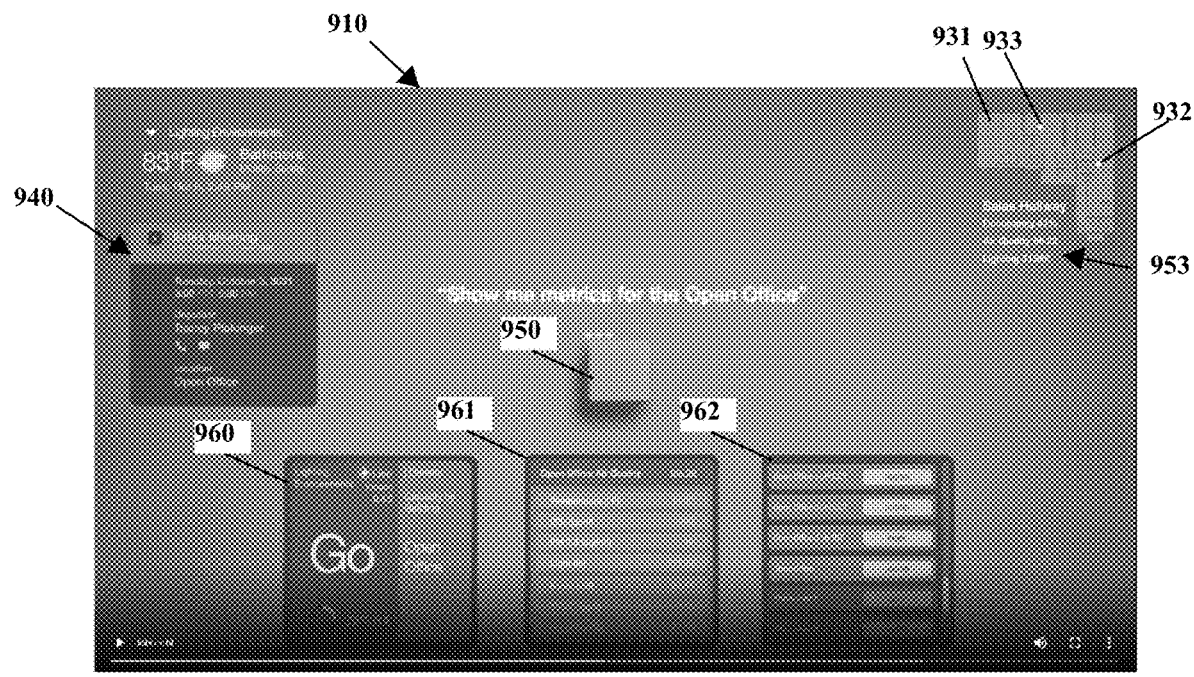

In FIG. 9D, one or more active control boxes 960, 961, 962 can be displayed below the thermostat 950 and the one or more active control boxes 960, 961, 962 are operationally equivalent to those shown and described above in relation to the GUI and FIGS. 1 to 6E, so the user can perform the same tasks through the use of the metaverse version of the office as the user could do in real life. In some instances, the user can actually perform some tasks that the user could not do in real life. For example, but not limited to, moving immediately from one side of the office to another side, without virtually walking from the one side to the other side. This can be done when the user avatar position is not tied to and tracking the user's actual location within the office space 910.

Figure 9E:
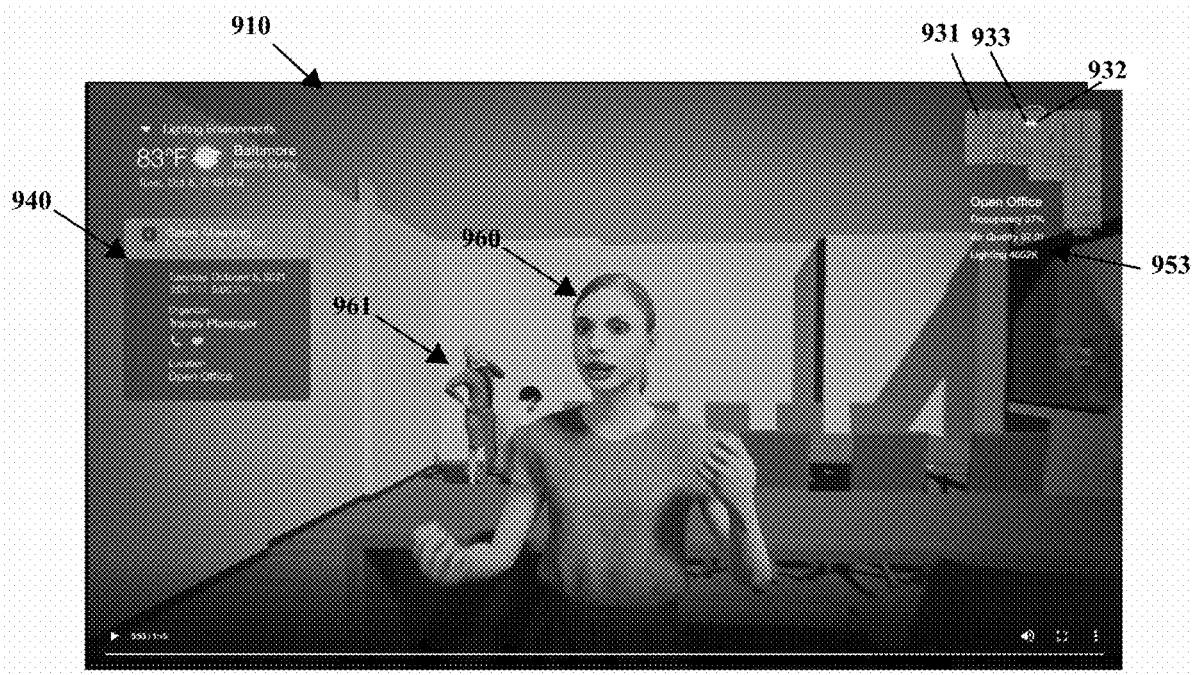

In FIG. 9E, the user, that is, the user's avatar, is shown in the "Open Office" for a meeting with the other user. The text portion 953 describing the current location of the user within the office as well as the metrics for that location have been updated for the user's current location in the Open Office. In addition, a personal avatar 960 for the other user with whom the user is to meet is shown in the field of view of the user. The meeting can take place totally virtually between the user and the other user in the metaverse and any other users whose avatars 961 might also be in the Open Office cannot hear the meeting, unless they were also invited to the meeting.

Figure 9F:
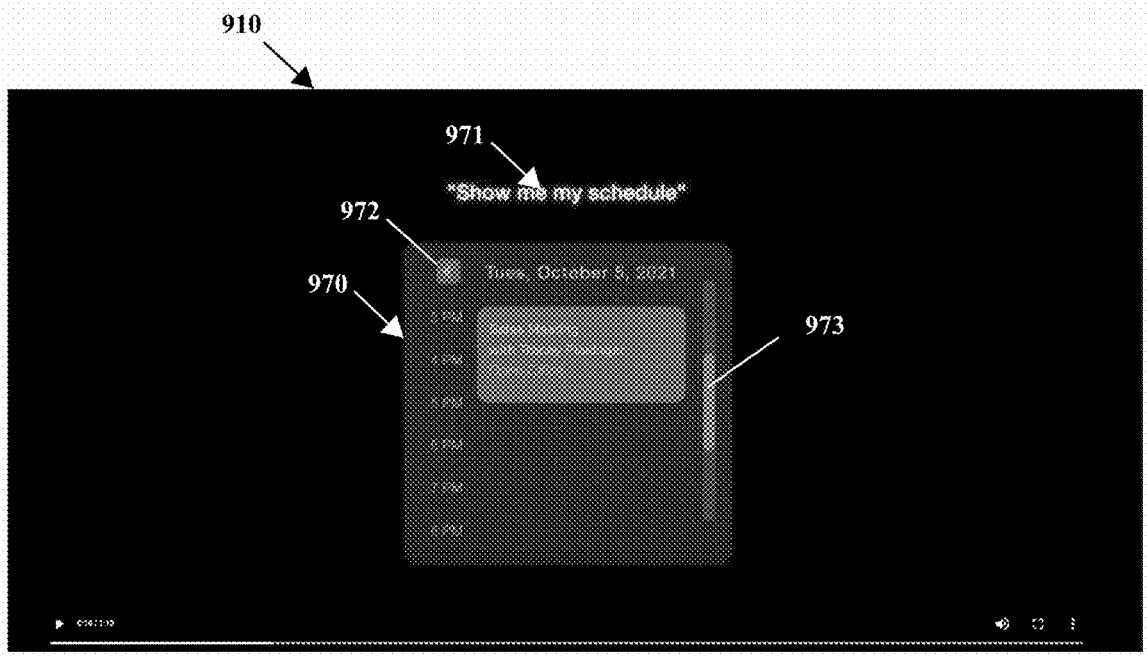
Figure 10:
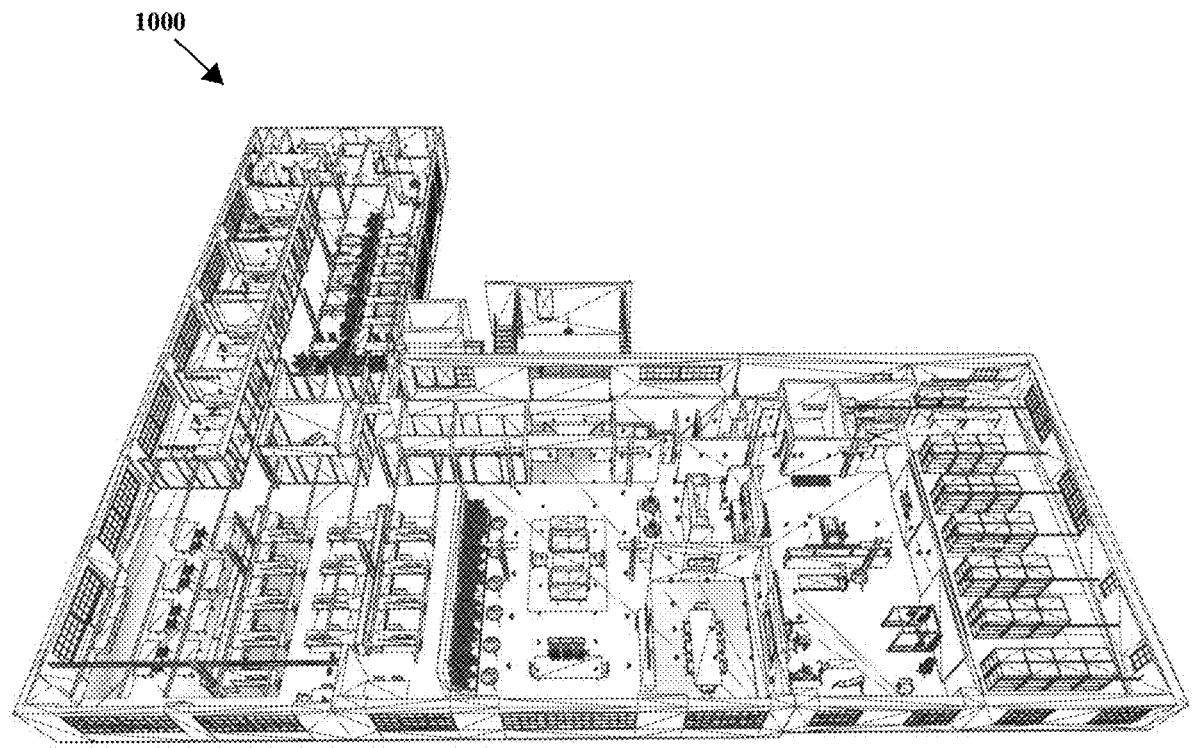

In FIG. 9F, the user can enter voice commands using a microphone, such as, for example, "Show me my schedule", and a calendar box 970 can be displayed with the current day's schedule shown over the office space 910. The calendar box 970 includes a list of the user's scheduled meetings and activities for the day organized by time. The calendar box 970 can include a selection button 972, which when selected opens a calendar for a longer time frame, for example, 1 week, 1 month, 2 months, etc., from which the user can select a different day's schedule. The calendar box 970 also can include a scroll bar 973, which when clicked on and held can be moved up and down to change the displayed time window in the calendar box 970.

FIG. 10 is an alternative resolution representation of the high-resolution metaverse office space representation of FIG. 9A, which here is shown as a wireframe representation of the office space 1000, in accordance with various embodiments of the disclosed subject matter. Still other representations can include a low resolution and a medium resolution representations where the surface and/or finish details of the elements in the office space are presented to users in the low resolution and the medium resolution. These lower resolution representations can be useful for system administrators to perform system control and maintenance functions and for prototyping new elements and features due to faster response times by reducing the rendering and display times of the environment.

In various embodiments, human resources (HR) and Payroll functions can be implemented through the interactive building control center dashboard 300a GUI and/or metaverse implementation. For example, some HR functions can include, but are not limited to, secure reporting of: unfair treatment of employees by managers and other employees; allegations of racism, allegations of sexism; disputes with other employees; personal and family medical conditions; personal and family issues; unsafe working conditions; safety concerns; lack of compliance with applicable laws, regulations, and company policies; and requesting vacation or personal leave time off. In addition, secure virtual meetings can be scheduled and performed through the integrated building and office automation control system software application 120 on the integrated building and office automation control system 100. This functionality can be implemented to ensure secure reporting channels directly from the reporting employee to HR without being reviewed, monitored, or blocked by management. This can include one or more secure communication paths, such as, but not limited to, secure email, secure SMS messaging, secure phone, and secure video calling. This same functionality can be provided in the virtual reality, that is, the metaverse, implementation. Payroll functions can include, but are not limited to, dealing with: compensation issues; correcting errors in employee records; tax and withholding issues; overtime questions and issues; changes in employee status (for example, marriage, divorce, birth/adoption of a new child, death); garnishments; and misclassification of employee status. As with the HR functionality, the payroll functionality can be implemented using the one or more secure communication paths described above.

In various embodiments, the physical and virtual systems can implement a panic button feature to enable a complete or partial building or facility lockdown in an emergency. As described above, the panic button feature can include one or more fixed-location physical panic buttons and one or more virtual panic buttons that can be activated by physically pressing one of the panic buttons located in the actual building or facility or by selecting or "clicking on" one of the virtual representations of the panic buttons. In addition to mimicking each of the actual panic buttons in the physical environment, in the virtual/metaverse environment additional virtual panic buttons can be included to provide extra options to activate a lockdown, if the physical panic buttons are inaccessible or disabled during an emergency situation. The virtual panic buttons can be accessed through any device that can connected to the virtual/metaverse environment including, for example, but not limited to, a smartphone, tablet, computer, and dedicated electronic button. In the various embodiments, the physical panic buttons can be implemented as portable panic buttons that can be carried by selected or all of the employees in the building or facility. This can include, for example, but not limited to, a personal panic button gadget carried by a person that requires the button to be physically pressed to be activated, a personal voice activated panic gadget carried by a person that can be activated by physically pressing it or by issuing a predefined panic command, and one or more stationary voice activated panic gadgets that can be affixed around the building or facility to ensure at least one of them can be activated in an emergency situation.

An integrated building and office automation control method comprising (that is, including): generating and outputting an interactive building comfort dashboard for a building with at least one active display panel to a user via a Graphical User Interface (GUI) based on an assigned access level of the user; controlling temperature, humidity, lighting level, and audio for each of a plurality of interior regions of said building in response to inputs received from the user via the GUI and the at least one active display panel; detecting, representing, and tracking a physical location of each of one or more physical occupants of each said plurality of interior regions using a unique identifier associated with each of the one or more physical occupants and outputting each said unique identifier to a virtual location on a floor plan of said plurality of interior regions via a floor plan display panel in the GUI to represent the physical location of each of the one or more physical occupants in each said plurality of interior regions; representing each of the one or more physical occupants using a unique three-dimensional avatar and associating each physical occupant's unique identifier with the physical occupant's unique three-dimensional avatar; generating a three dimensional virtual representation of the plurality of interior regions of the building, the three dimensional virtual representation of the plurality of interior regions of the building comprising each said unique three-dimensional avatar of each said one or more physical occupants at said virtual location of each of the one or more physical occupants within said floor plan in the floor plan display panel at the virtual location within said three dimensional virtual representation of the plurality of interior regions of the building; outputting using the GUI the three-dimensional virtual representation of the plurality of interior regions including each said three-dimensional avatar of each said one or more physical occupants at said virtual location for each said one or more physical occupants within said three-dimensional virtual representation with the floor plan displayed over a portion of said three-dimensional virtual representation; and dynamically and simultaneously updating the virtual location for each said three-dimensional avatar for each of said one or more physical occupants within said three-dimensional virtual representation and the virtual location of each said unique identifier for each of said one or more physical occupants on the floor plan, and automatically locating the floor plan over said three-dimensional virtual representation to not obscure any said three-dimensional avatar or an important element in said three-dimensional virtual representation.

An integrated building and office automation control method comprising (that is, including): generating and outputting an interactive building comfort dashboard with at least one active display panel to a user via a Graphical User Interface (GUI) based on an assigned access level of the user; controlling temperature, humidity, lighting level, and audio for each of a plurality of interior regions of said building in response to inputs received from the user via the GUI and at least one of the active display panels; detecting, representing, and tracking a location of each of one or more physical occupants of each said plurality of interior regions using a unique identifier associated with said physical occupant and outputting said unique identifier representation to the user via a floor plan display panel in the GUI; representing each of the one or more remote virtual occupants using a unique three-dimensional avatar associated with said remote virtual occupant; outputting using said GUI a three dimensional virtual representation of the plurality of interior regions of the building, each said floor map comprising indications of each said avatar representation of each said one or more physical occupants at said on-premise location within said floor map, and each of said one or more remote virtual occupants at said virtual location within said floor map, and each of said one or more remote virtual occupants located within said interior region; and generating and outputting a three-dimensional simulated representation of at least one of said interior regions including each said avatar representation of each said one or more physical occupants at said on-premise location within said three-dimensional simulated representation, and each of said one or more remote virtual occupants at said virtual location within said three-dimensional simulated representation.

An integrated building and office automation control method including: generating and outputting an interactive building comfort dashboard for a building with at least one active display panel to a user via a Graphical User Interface (GUI) based on an assigned access level of the user; controlling temperature, humidity, lighting level, and audio for each of a plurality of interior regions of said building in response to inputs received from the user via the GUI and at least one of the active display panels; generating and outputting an interactive building analytics display with at least one active graphical display panel to the user via the GUI based on an assigned access level of the user, wherein the at least one active display panel comprises one or more of a people and air quality display panel showing overall air quality over time and occupant loading, a heating and cooling display panel showing heating and cooling output over time, a capacity display panel showing the number of occupants over time, an air quality display showing air quality metrics over time, a light levels display panel showing a light level over time, and a temperature set display panel showing a set point value over time, and a temperature display panel showing an actual temperature over time; updating each of the at least one active display panels at a predefined time period; automatically resizing one or more of the at least one active display panels depending on a change in a displayed analytic value as the displayed analytic values change from update to update; displaying one or more of the at least one active display panels with an increased size with respect to a size of other display panels; and generating a real-time alert when a displayed analytic value exceeds a threshold; and automatically repositioning one of the active display panels associated with the alert to a different location within the interactive building analytics display.

An integrated building and office automation control system comprising: a server comprising at least one processor; and a memory storing a program for execution by the at least one processor, the program including instructions which, when executed by the processor, cause the processor to generate and output an interactive building comfort dashboard for a building with at least one active display panel to a user via a Graphical User Interface (GUI) based on an assigned access level of the user; control temperature, humidity, lighting level, and audio for each of a plurality of interior regions of said building in response to inputs received from the user via the GUI and the at least one active display panel; detect, represent, and track a physical location of each of one or more physical occupants of each said plurality of interior regions using a unique identifier associated with each of the one or more physical occupants and outputting each said unique identifier to a virtual location on a floor plan of said plurality of interior regions via a floor plan display panel in the GUI to represent the physical location of each of the one or more physical occupants in each said plurality of interior regions; represent each of the one or more physical occupants using a unique three-dimensional avatar and associate each physical occupant's unique identifier with the physical occupant's unique three-dimensional avatar; generate a three dimensional virtual representation of the plurality of interior regions of the building, the three dimensional virtual representation of the plurality of interior regions of the building comprising each said unique three-dimensional avatar of each said one or more physical occupants at a virtual location of each of the one or more physical occupants within said floor plan in the floor plan display panel at the virtual location within said three-dimensional representation of the plurality of interior regions of the building; output using the GUI a three-dimensional virtual representation of at least one of the plurality of interior regions including each said three dimensional avatar of each said one or more physical occupants at said virtual location for each of the one or more physical occupants within said three-dimensional virtual representation with the floor plan displayed over a portion of said three-dimensional virtual representation; dynamically and simultaneously update the virtual location for each said three-dimensional avatar for each of said one or more physical occupants within said three-dimensional virtual representation and the virtual location of each said unique identifier for each of said one or more physical occupants on the floor plan, and automatically locate the floor plan over said three-dimensional virtual representation to not obscure any said three-dimensional avatar or an important element in said three-dimensional virtual representation.

An integrated building and office automation control method including: generating and outputting an interactive building comfort dashboard with at least one active display panel to a user via a Graphical User Interface (GUI) based on an assigned access level of the user; controlling temperature, humidity, lighting level, and audio for each of a plurality of interior regions of said building in response to inputs received from the user via the GUI and at least one of the active display panels; generating and outputting an interactive building analytics display with at least one active graphical display panel to the user via the GUI based on an assigned access level of the user, wherein the at least one active display panel comprises one or more of a people and air quality display panel showing overall air quality over time and occupant loading, a heating and cooling display panel showing heating and cooling output over time, a capacity display panel showing the number of occupants over time, an air quality display showing air quality metrics over time, a light levels display panel showing a light level over time, and a temperature set display panel showing a set point value over time, and a temperature display panel showing an actual temperature over time; updating each of the at least one active display panels at a predefined time period; automatically resizing one or more of the at least one active display panels depending on a change in a displayed analytic value as the displayed analytic values change from update to update; displaying one or more of the at least one active display panels with an increased size with respect to a size of other display panels; generating a real-time alert when a displayed analytic value exceeds a threshold; and automatically repositioning one of the active display panels associated with the alert to a different location within the interactive building analytics display.

An integrated building and office automation control system comprising: a server comprising at least one processor; and a memory storing a program for execution by the at least one processor, the program including instructions which, when executed by the processor, cause the processor to generate and output an interactive building comfort dashboard for a building with at least one active display panel to a user via a Graphical User Interface (GUI) based on an assigned access level of the user; control temperature, humidity, lighting level, and audio for each of a plurality of interior regions of said building in response to inputs received from the user via the GUI and at least one of the active display panels; generate and output an interactive building analytics display with at least one active graphical display panel to the user via the GUI based on an assigned access level of the user, wherein the at least one active display panel comprises one or more of a people and air quality display panel showing overall air quality over time and occupant loading, a heating and cooling display panel showing heating and cooling output over time, a capacity display panel showing the number of occupants over time, an air quality display showing air quality metrics over time, a light levels display panel showing a light level over time, and a temperature set display panel showing a set point value over time, and a temperature display panel showing an actual temperature over time; update each of the at least one active display panels at a predefined time period; automatically resize one or more of the at least one active display panels depending on a change in a displayed analytic value as the displayed analytic values change from update to update; display one or more of the at least one active display panels with an increased size with respect to a size of other display panels; generate a real-time alert when a displayed analytic value exceeds a threshold; and automatically reposition one of the active display panels associated with the alert to a different location within the interactive building analytics display.

An integrated building and office automation control system including: a server comprising at least one processor; and a memory storing a program for execution by the at least one processor, the program including instructions which, when executed by the processor, cause the processor to generate and output an interactive building comfort dashboard with at least one active display panel to a user via a Graphical User Interface (GUI) based on an assigned access level of the user; control temperature, humidity, lighting level, and audio for each of a plurality of interior regions of said building in response to inputs received from the user via the GUI and at least one of the active display panels; detect, represent, and track a location of each of one or more physical occupants of each said plurality of interior regions using a unique identifier associated with said physical occupant and outputting said unique identifier representation to the user via a floor plan display panel in the GUI; represent each of the one or more remote virtual occupants using a unique three-dimensional avatar associated with said remote virtual occupant; output, using said GUI, a three dimensional virtual representation of the plurality of interior regions of the building, each said floor map comprising indications of each said avatar representation of each said one or more physical occupants at said on-premise location within said floor map, and each of said one or more remote virtual occupants at said virtual location within said floor map, and each of said one or more remote virtual occupants located within said interior region; and generate and output a three-dimensional simulated representation of at least one of said interior regions including each said avatar representation of each said one or more physical occupants at said on-premise location within said three-dimensional simulated representation, and each of said one or more remote virtual occupants at said virtual location within said three-dimensional simulated representation.

An integrated building and office automation control system including: a server comprising at least one processor; and a memory storing a program for execution by the at least one processor, the program including instructions which, when executed by the processor, cause the processor to generate and output an interactive building comfort dashboard with at least one active display panel to a user via a Graphical User Interface (GUI) based on an assigned access level of the user; control temperature, humidity, lighting level, and audio for each of a plurality of interior regions of said building in response to inputs received from the user via the GUI and at least one of the active display panels; generate and output an interactive building analytics display with at least one active graphical display panel to the user via the GUI based on an assigned access level of the user, wherein the at least one active display panel comprises one or more of a people and air quality display panel showing overall air quality over time and occupant loading, a heating and cooling display panel showing heating and cooling output over time, a capacity display panel showing the number of occupants over time, an air quality display showing air quality metrics over time, a light levels display panel showing a light level over time, and a temperature set display panel showing a set point value over time, and a temperature display panel showing an actual temperature over time; update each of the at least one active display panels at a predefined time period; automatically resize one or more of the at least one active display panels depending on a change in a displayed analytic value as the displayed analytic values change from update to update; display one or more of the at least one active display panels with an increased size with respect to a size of other display panels; generate a real-time alert when a displayed analytic value exceeds a threshold; and automatically reposition one of the active display panels associated with the alert to a different location within the interactive building analytics display.

A non-transitory computer-readable medium upon which is embodied a sequence of programmed instructions which, when executed by a processor, cause the processor to perform integrated building and office automation control operations including: generating and outputting an interactive building comfort dashboard for a building with at least one active display panel to a user via a Graphical User Interface (GUI) based on an assigned access level of the user; controlling temperature, humidity, lighting level, and audio for each of a plurality of interior regions of said building in response to inputs received from the user via the GUI and the at least one active display panel; detecting, representing, and tracking a physical location of each of one or more physical occupants of each said plurality of interior regions using a unique identifier associated with each of the one or more physical occupants and outputting each said unique identifier to a virtual location on a floor plan of said plurality of interior regions via a floor plan display panel in the GUI to represent the physical location of each of the one or more physical occupants in each said plurality of interior regions; representing each of the one or more physical occupants using a unique three-dimensional avatar and associating each physical occupant's unique identifier with the physical occupant's unique three-dimensional avatar; generating a three dimensional virtual representation of the plurality of interior regions of the building, the three dimensional virtual representation of the plurality of interior regions of the building comprising each said unique three-dimensional avatar of each said one or more physical occupants at a virtual location of each said one or more physical occupants within said floor plan in the floor plan display panel at the virtual location within said three dimensional virtual representation of the plurality of interior regions of the building; outputting using the GUI the three-dimensional virtual representation of at least one of the plurality of interior regions including each said unique three-dimensional avatar of each said one or more physical occupants at said virtual location for each said one or more physical occupants within said three-dimensional virtual representation with the floor plan displayed over a portion of said three-dimensional virtual representation of the plurality of interior regions of the building; dynamically and simultaneously updating the virtual location for each said three-dimensional avatar for each of said one or more physical occupants within said three-dimensional virtual representation and the virtual location of each said unique identifier for each of said one or more physical occupants on the floor plan, and automatically locating the floor plan over said three-dimensional virtual representation to not obscure any said three-dimensional avatar or an important element in said three-dimensional virtual representation.

A non-transitory computer-readable medium upon which is embodied a sequence of programmed instructions which, when executed by a processor, cause the processor to perform integrated building and office automation control operations including: generating and outputting an interactive building comfort dashboard with at least one active display panel to a user via a Graphical User Interface (GUI) based on an assigned access level of the user; controlling temperature, humidity, lighting level, and audio for each of a plurality of interior regions of said building in response to inputs received from the user via the GUI and at least one of the active display panels; detecting, representing, and tracking a location of each of one or more physical occupants of each said plurality of interior regions using a unique identifier associated with said physical occupant and outputting said unique identifier representation to the user via a floor plan display panel in the GUI; representing each of the one or more remote virtual occupants using a unique three-dimensional avatar associated with said remote virtual occupant; outputting using said GUI a three dimensional virtual representation of the plurality of interior regions of the building, each said floor map comprising indications of each said avatar representation of each said one or more physical occupants at said on-premise location within said floor map, and each of said one or more remote virtual occupants at said virtual location within said floor map, and each of said one or more remote virtual occupants located within said interior region; and generating and outputting a three-dimensional simulated representation of at least one of said interior regions including each said avatar representation of each said one or more physical occupants at said on-premise location within said three-dimensional simulated representation, and each of said one or more remote virtual occupants at said virtual location within said three-dimensional simulated representation.

A non-transitory computer-readable medium upon which is embodied a sequence of programmed instructions which, when executed by a processor, cause the processor to perform integrated building and office automation control operations including: generating and outputting an interactive building comfort dashboard for a building with at least one active display panel to a user via a Graphical User Interface (GUI) based on an assigned access level of the user; controlling temperature, humidity, lighting level, and audio for each of a plurality of interior regions of said building in response to inputs received from the user via the GUI and at least one of the active display panels; generating and outputting an interactive building analytics display with at least one active graphical display panel to the user via the GUI based on an assigned access level of the user, wherein the at least one active display panel comprises one or more of a people and air quality display panel showing overall air quality over time and occupant loading, a heating and cooling display panel showing heating and cooling output over time, a capacity display panel showing the number of occupants over time, an air quality display showing air quality metrics over time, a light levels display panel showing a light level over time, and a temperature set display panel showing a set point value over time, and a temperature display panel showing an actual temperature over time; updating each of the at least one active display panels at a predefined time period; automatically resizing one or more of the at least one active display panels depending on a change in a displayed analytic value as the displayed analytic values change from update to update; displaying one or more of the at least one active display panels with an increased size with respect to a size of other display panels; generating a real-time alert when a displayed analytic value exceeds a threshold; and automatically repositioning one of the active display panels associated with the alert to a different location within the interactive building analytics display.

A non-transitory computer-readable medium upon which is embodied a sequence of programmed instructions which, when executed by a processor, cause the processor to perform integrated building and office automation control operations including: generating and outputting an interactive building comfort dashboard with at least one active display panel to a user via a Graphical User Interface (GUI) based on an assigned access level of the user; controlling temperature, humidity, lighting level, and audio for each of a plurality of interior regions of said building in response to inputs received from the user via the GUI and at least one of the active display panels; generating and outputting an interactive building analytics display with at least one active graphical display panel to the user via the GUI based on an assigned access level of the user, wherein the at least one active display panel comprises one or more of a people and air quality display panel showing overall air quality over time and occupant loading, a heating and cooling display panel showing heating and cooling output over time, a capacity display panel showing the number of occupants over time, an air quality display showing air quality metrics over time, a light levels display panel showing a light level over time, and a temperature set display panel showing a set point value over time, and a temperature display panel showing an actual temperature over time; updating each of the at least one active display panels at a predefined time period; automatically resizing one or more of the at least one active display panels depending on a change in a displayed analytic value as the displayed analytic values change from update to update; displaying one or more of the at least one active display panels with an increased size with respect to a size of other display panels; generating a real-time alert when a displayed analytic value exceeds a threshold; and automatically repositioning one of the active display panels associated with the alert to a different location within the interactive building analytics display.

While the disclosed subject matter has been described in conjunction with a number of embodiments, it is evident that many alternatives, modifications and variations would be or are apparent to those of ordinary skill in the applicable arts. Accordingly, the applicant intends to embrace all such alternatives, modifications, equivalents, and variations that are within the spirit and scope of the disclosed subject matter described herein.

What is claimed is:

1. An integrated building and office automation control method comprising:
    generating and outputting an interactive building comfort dashboard for a building with at least one active display panel to a user via a Graphical User Interface (GUI) based on an assigned access level of the user;
    controlling temperature, humidity, lighting level, and audio for each of a plurality of interior regions of said building in response to inputs received from the user via the GUI and the at least one active display panel;
    detecting, representing, and tracking a physical location of each of one or more physical occupants of each said plurality of interior regions using a unique identifier associated with each of the one or more physical occupants and outputting each said unique identifier to a virtual location on a floor plan of said plurality of interior regions via a floor plan display panel in the GUI to represent the physical location of each of the one or more physical occupants in each said plurality of interior regions;
    representing each of the one or more physical occupants using a unique three-dimensional avatar and associating each physical occupant's unique identifier with the physical occupant's unique three-dimensional avatar;
    generating a three dimensional virtual representation of the plurality of interior regions of the building, the three dimensional virtual representation of the plurality of interior regions of the building comprising each said unique three-dimensional avatar of each said one or more physical occupants at said virtual location of each of the one or more physical occupants within said floor plan in the floor plan display panel at the virtual location within said three dimensional virtual representation of the plurality of interior regions of the building;
    outputting using the GUI the three-dimensional virtual representation of the plurality of interior regions including each said three-dimensional avatar of each said one or more physical occupants at said virtual location for each said one or more physical occupants within said three-dimensional virtual representation with the floor plan displayed over a portion of said three-dimensional virtual representation; and
    dynamically and simultaneously updating the virtual location for each said three-dimensional avatar for each of said one or more physical occupants within said three-dimensional virtual representation and the virtual location of each said unique identifier for each of said one or more physical occupants on the floor plan, and automatically locating the floor plan over said three-dimensional virtual representation to not obscure any said three-dimensional avatar or an important element in said three-dimensional virtual representation.

2. The integrated building and office automation control method of claim 1, further comprising:
    outputting, via said GUI, a community display region identifying each said one or more physical occupants and each said one or more virtual occupants;
    initiating a text-based chat session with one of said physical occupants or one of said virtual occupants in response to receiving a chat request input from a user via the community display region of the GUI;
    initiating a voice-based communication session with one of said physical occupants or one of said virtual occupants in response to receiving a call request input from a user via the community display region of the GUI; and
    outputting one or more online articles using the community display region of the GUI.

3. The integrated building and office automation control method of claim 1, further comprising:
    obtaining from an external server one of a list of local hotels and a list of local restaurants;
    outputting said list of local hotels or said list of local restaurants using a concierge display region of the GUI;
    upon receiving a user request via GUI selection of an associated hypertext transfer protocol (HTTP) link, obtaining and outputting, using the concierge display region, a map showing a location of each hotel contained in said list of local hotels or of each local restaurant contained in said list of local restaurants;
    upon receiving a user request via GUI selection of an associated hypertext transfer protocol (HTTP) link, outputting a request to an external server to open a food delivery service application;
    displaying an interactive Hypertext Transfer Markup Language (HTML) page in the concierge display region associated with a food delivery request for the food delivery service application;
    entering information received via user input into fields of said interactive HTML page in the concierge display region associated with food delivery request for the food delivery service application; and
    sending said interactive HTML page associated with the food delivery request, including the entered information, to the food delivery service application.

4. The integrated building and office automation control method of claim 1, further comprising:
    retrieving from a plurality of sensors a plurality of values each associated with one or more of said temperature, said humidity, and said lighting level for each of
    timestamping and storing said plurality of values;
    calculating, using said plurality of stored values, one or more of an average temperature, an average humidity, and an average lighting level, and audio for one or more of said interior regions of said building of a plurality of interior regions of said building in response to inputs received from a user via the GUI;
    calculating, using said plurality of stored values, one or more of a histogram of temperature every 5 seconds to 5 minutes of every hour for each 24 hour period, a histogram of humidity every hour for each 24 hour period, and a histogram of lighting level every hour for each 24 hour period for one or more of said interior regions of said building of a plurality of interior regions of said building in response to inputs received from a user via the GUI;

outputting, using an analytics display region of the GUI, one or more of said average temperature, said average humidity, and said average lighting level; and outputting, using said analytics display region of the GUI, a graphical representation of one or more of said histogram of temperature, said histogram of humidity, and said histogram of lighting level.

5. The integrated building and office automation control method of claim 1, wherein the GUI comprises a plurality of defined output display regions each associated with a building control or status, wherein the method further comprises resizing an area of one or more of said plurality of defined display regions upon receiving a change condition associated with said building control or status;

wherein the method further comprises assigning a priority to said change condition, wherein said area of said resizing is based on said priority of said change condition, and wherein said priority is selected by the processor by determining a match for said change condition with one of a plurality of stored predefined events.

6. The integrated building and office automation control method of claim 5, wherein said priority is determined by the processor executing a machine-learning algorithm which updates said plurality of stored predefined events to calculate said assigned priority with an accuracy that increases with successive executions of said machine-learning algorithm.

7. An integrated building and office automation control method comprising:

generating and outputting an interactive building comfort dashboard for a building with at least one active display panel to a user via a Graphical User Interface (GUI) based on an assigned access level of the user;

controlling temperature, humidity, lighting level, and audio for each of a plurality of interior regions of said building in response to inputs received from the user via the GUI and at least one of the active display panels;

generating and outputting an interactive building analytics display with at least one active graphical display panel to the user via the GUI based on an assigned access level of the user, wherein the at least one active display panel comprises one or more of a people and air quality display panel showing overall air quality over time and occupant loading, a heating and cooling display panel showing heating and cooling output over time, a capacity display panel showing the number of occupants over time, an air quality display showing air quality metrics over time, a light levels display panel showing a light level over time, and a temperature set display panel showing a set point value over time, and a temperature display panel showing an actual temperature over time;

updating each of the at least one active display panels at a predefined time period;

automatically resizing one or more of the at least one active display panels depending on a change in a displayed analytic value as the displayed analytic values change from update to update;

displaying one or more of the at least one active display panels with an increased size with respect to a size of other display panels;

generating a real-time alert when a displayed analytic value exceeds a threshold; and automatically repositioning one of the active display panels associated with the alert to a different location within the interactive building analytics display.

8. The integrated building and office automation control method of claim 7, further comprising:

detecting, representing, and tracking a physical location of each of one or more physical occupants of each said plurality of interior regions using a unique identifier associated with each of the one or more physical occupants and outputting each said unique identifier to a virtual location on a floor plan of said plurality of interior regions via a floor plan display panel in the GUI to represent the physical location of each of the one or more physical occupants in each said plurality of interior regions;

representing each of the one or more physical occupants using a unique three-dimensional avatar and associating each physical occupant's unique identifier with the physical occupant's unique three-dimensional avatar;

generating a three dimensional virtual representation of the plurality of interior regions of the building, the three dimensional virtual representation of the plurality of interior regions of the building comprising each said unique three-dimensional avatar of each said one or more physical occupants at said virtual location of each of the one or more physical occupants within said floor plan in the floor plan display panel at the virtual location within said three dimensional virtual representation of the plurality of interior regions of the building outputting using the GUI the three-dimensional virtual representation of the plurality of interior regions including each said three-dimensional avatar of each said one or more physical occupants at said virtual location for each said one or more physical occupants within said three-dimensional virtual representation with the floor plan displayed over a portion of said three-dimensional virtual representation; and dynamically and simultaneously updating the virtual location for each said three-dimensional avatar for each of said one or more physical occupants within said three-dimensional virtual representation and the virtual location of each said unique identifier for each of said one or more physical occupants on the floor plan, and automatically locating the floor plan over said three-dimensional virtual representation to not obscure any said three-dimensional avatar or an important element in said three-dimensional virtual representation.

9. The integrated building and office automation control method of claim 7, further comprising:

outputting, via said GUI, a community display region identifying each said one or more physical occupants and each said one or more virtual occupants;

initiating a text-based chat session with one of said physical occupants or one of said virtual occupants in response to receiving a chat request input from a user via the community display region of the GUI;

initiating a voice-based communication session with one of said physical occupants or one of said virtual occupants in response to receiving a call request input from a user via the community display region of the GUI; and outputting one or more online articles using the community display region of the GUI.

10. The integrated building and office automation control method of claim 7, further comprising:

obtaining from an external server one of a list of local hotels and a list of local restaurants;

outputting said list of local hotels or said list of local restaurants using a concierge display region of the GUI; and upon receiving a user request via GUI selection of an associated hypertext transfer protocol (HTTP) link, obtaining and outputting, using the concierge display region, a map showing a location of each hotel contained in said list of local hotels or of each local restaurant contained in said list of local restaurants;

upon receiving a user request via GUI selection of an associated hypertext transfer protocol (HTTP) link, outputting a request to an external server to open a food delivery service application;

displaying an interactive Hypertext Transfer Markup Language (HTML) page in the concierge display region associated with a food delivery request for the food delivery service application;

entering information received via user input into fields of said interactive HTML page in the concierge display region associated with food delivery request for the food delivery service application; and sending said interactive HTML page associated with the food delivery request, including the entered information, to the food delivery service application.

11. An integrated building and office automation control system comprising:
a server comprising at least one processor; and
a memory storing a program for execution by the at least one processor, the program including instructions which, when executed by the processor, cause the processor to
generate and output an interactive building comfort dashboard for a building with at least one active display panel to a user via a Graphical User Interface (GUI) based on an assigned access level of the user;
control temperature, humidity, lighting level, and audio for each of a plurality of interior regions of said building in response to inputs received from the user via the GUI and the at least one active display panel;
detect, represent, and track a physical location of each of one or more physical occupants of each said plurality of interior regions using a unique identifier associated with each of the one or more physical occupants and outputting each said unique identifier to a virtual location on a floor plan of said plurality of interior regions via a floor plan display panel in the GUI to represent the physical location of each of the one or more physical occupants in each said plurality of interior regions;
represent each of the one or more physical occupants using a unique three-dimensional avatar and associate each physical occupant's unique identifier with the physical occupant's unique three-dimensional avatar;
generate a three dimensional virtual representation of the plurality of interior regions of the building, the three dimensional virtual representation of the plurality of interior regions of the building comprising each said unique three-dimensional avatar of each said one or more physical occupants at a virtual location of each of the one or more physical occupants within said floor plan in the floor plan display panel at the virtual location within said three-dimensional representation of the plurality of interior regions of the building;

output using the GUI a three-dimensional virtual representation of at least one of the plurality of interior regions including each said three dimensional avatar of each said one or more physical occupants at said virtual location for each of the one or more physical occupants within said three-dimensional virtual representation with the floor plan displayed over a portion of said three-dimensional virtual representation;

dynamically and simultaneously update the virtual location for each said three-dimensional avatar for each of said one or more physical occupants within said three-dimensional virtual representation and the virtual location of each said unique identifier for each of said one or more physical occupants on the floor plan, and automatically locate the floor plan over said three-dimensional virtual representation to not obscure any said three-dimensional avatar or an important element in said three-dimensional virtual representation.

12. The integrated building and office automation control system of claim 11, wherein the instructions further cause the processor to:
output, via said GUI, a community display region identifying each said one or more physical occupants and each said one or more virtual occupants;
initiate a text-based chat session with one of said physical occupants or one of said virtual occupants in response to receiving a chat request input from a user via the community display region of the GUI;
initiate a voice-based communication session with one of said physical occupants or one of said virtual occupants in response to receiving a call request input from a user via the community display region of the GUI; and
output one or more online articles using the community display region of the GUI.

13. The integrated building and office automation control system of claim 11, wherein the instructions further cause the processor to:
obtain from an external server one of a list of local hotels and a list of local restaurants;
output said list of local hotels or said list of local restaurants using a concierge display region of the GUI; and
upon receiving a user request via GUI selection of an associated hypertext transfer protocol (HTTP) link, obtain and output, using the concierge display region, a map showing a location of each hotel contained in said list of local hotels or of each local restaurant contained in said list of local restaurants.

14. The integrated building and office automation control system of claim 11, wherein the instructions further cause the processor to:
retrieve from a plurality of sensors a plurality of values each associated with one or more of said temperature, said humidity, and said lighting level for each of the plurality of interior regions of said building;
timestamp and store said plurality of values;
calculate, using said plurality of stored values, one or more of an average temperature, an average humidity, and an average lighting level, and audio for one or more of said interior regions of said building of a plurality of interior regions of said building in response to inputs received from a user via the GUI;
calculate, using said plurality of stored values, one or more of a histogram of temperature every hour for each 24 hour period, a histogram of humidity every hour for each 24 hour period, and a histogram of lighting level every hour for each 24 hour period for one or more of said interior regions of said building of a plurality of interior regions of said building in response to inputs received from a user via the GUI;
output, using an analytics display region of the GUI, one or more of said average temperature, said average humidity, and said average lighting level; and
output, using said analytics display region of the GUI, a graphical representation of one or more of said histogram of temperature, said histogram of humidity, and said histogram of lighting level.

15. The integrated building and office automation control system of claim 11,
wherein the GUI comprises a plurality of defined output display regions each associated with a building control or status,
wherein the processor is further configured to resize an area of one or more of said plurality of defined display regions upon receiving a change condition associated with said building control or status,
wherein the processor is further configured to assign a priority to said change condition,
wherein said area of said resizing is based on said priority of said change condition, and
wherein said priority is selected by the processor by determining a match for said change condition with one of a plurality of stored predefined events.

16. The integrated building and office automation control system of claim 15,
wherein said priority is determined by the processor executing a machine-learning algorithm which updates said plurality of stored predefined events to calculate said assigned priority with an accuracy that increases with successive executions of said machine-learning algorithm.

17. An integrated building and office automation control system comprising:
a server comprising at least one processor; and
a memory storing a program for execution by the at least one processor, the program including instructions which, when executed by the processor, cause the processor to
generate and output an interactive building comfort dashboard for a building with at least one active display panel to a user via a Graphical User Interface (GUI) based on an assigned access level of the user;
control temperature, humidity, lighting level, and audio for each of a plurality of interior regions of said building in response to inputs received from the user via the GUI and at least one of the active display panels;
generate and output an interactive building analytics display with at least one active graphical display panel to the user via the GUI based on an assigned access level of the user, wherein the at least one active display panel comprises one or more of a people and air quality display panel showing overall air quality over time and occupant loading, a heating and cooling display panel showing heating and cooling output over time, a capacity display panel showing the number of occupants over time, an air quality display showing air quality metrics over time, a light levels display panel showing a light level over time, and a temperature set display panel showing a set point value over time, and a temperature display panel showing an actual temperature over time;
update each of the at least one active display panels at a predefined time period;
automatically resize one or more of the at least one active display panels depending on a change in a displayed analytic value as the displayed analytic values change from update to update;
display one or more of the at least one active display panels with an increased size with respect to a size of other display panels;
generate a real-time alert when a displayed analytic value exceeds a threshold; and
automatically reposition one of the active display panels associated with the alert to a different location within the interactive building analytics display.

18. The integrated building and office automation control system of claim 17, wherein the instructions further cause the processor to:
detect, represent, and track a physical location of each of one or more physical occupants of each said plurality of interior regions using a unique identifier associated with each of the one or more physical occupants and outputting each said unique identifier to a virtual location on a floor plan of said plurality of interior regions via a floor plan display panel in the GUI to represent the physical location of each of the one or more physical occupants in each said plurality of interior regions;
represent each of the one or more physical occupants using a unique three-dimensional avatar and associate each physical occupant's unique identifier with the physical occupant's unique three-dimensional avatar;
generate a three dimensional virtual representation of the plurality of interior regions of the building, three dimensional virtual representation of the plurality of interior regions of the building comprising each said unique three-dimensional avatar of each said one or more physical occupants at a virtual location of each of the one or more physical occupants within said floor plan in the floor plan display panel at the virtual location within said three dimensional virtual representation of the plurality of interior regions of the building;
output using the GUI a three-dimensional virtual representation of at least one of said plurality of interior regions including each said unique three-dimensional avatar of each said one or more physical occupants at said virtual location for each of the one or more physical occupants within said three-dimensional virtual representation with the floor plan displayed over a portion of said three-dimensional virtual representation; and
dynamically and simultaneously update the virtual location for each said three-dimensional avatar for each of said one or more physical occupants within said three-dimensional virtual representation and the virtual location of each said unique identifier for each of said one or more physical occupants on the floor plan and automatically locate the floor plan over said three-dimensional virtual representation to not obscure any said three-dimensional avatar or an important element in said three-dimensional virtual representation.

19. The integrated building and office automation control system of claim 17, wherein the instructions further cause the processor to:
output, via said GUI, a community display region identifying each said one or more physical occupants and each said one or more virtual occupants;
initiate a text-based chat session with one of said physical occupants or one of said virtual occupants in response to receiving a chat request input from a user via the community display region of the GUI;

initiate a voice-based communication session with one of said physical occupants or one of said virtual occupants in response to receiving a call request input from a user via the community display region of the GUI; and output one or more online articles using the community display region of the GUI.

20. The integrated building and office automation control system of claim 17, wherein the instructions further cause the processor to:

obtain from an external server one of a list of local hotels and a list of local restaurants;

output said list of local hotels or said list of local restaurants using a concierge display region of the GUI; and upon receiving a user request via GUI selection of an associated hypertext transfer protocol (HTTP) link, obtain and output, using the concierge display region, a map showing a location of each hotel contained in said list of local hotels or of each local restaurant contained in said list of local restaurants;

upon receiving a user request via GUI selection of an associated hypertext transfer protocol (HTTP) link, output a request to an external server to open a food delivery service application;

display an interactive Hypertext Transfer Markup Language (HTML) page in the concierge display region associated with a food delivery request for the food delivery service application;

enter information received via user input into fields of said interactive HTML page in the concierge display region associated with food delivery request for the food delivery service application; and send said interactive HTML page associated with the food delivery request, including the entered information, to the food delivery service application.

21. A non-transitory computer-readable medium upon which is embodied a sequence of programmed instructions which, when executed by a processor, cause the processor to perform integrated building and office automation control operations comprising:

generating and outputting an interactive building comfort dashboard for a building with at least one active display panel to a user via a Graphical User Interface (GUI) based on an assigned access level of the user;

controlling temperature, humidity, lighting level, and audio for each of a plurality of interior regions of said building in response to inputs received from the user via the GUI and the at least one active display panel;

detecting, representing, and tracking a physical location of each of one or more physical occupants of each said plurality of interior regions using a unique identifier associated with each of the one or more physical occupants and outputting each said unique identifier to a virtual location on a floor plan of said plurality of interior regions via a floor plan display panel in the GUI to represent the physical location of each of the one or more physical occupants in each said plurality of interior regions;

representing each of the one or more physical occupants using a unique three-dimensional avatar and associating each physical occupant's unique identifier with the physical occupant's unique three-dimensional avatar;

generating a three dimensional virtual representation of the plurality of interior regions of the building, the three dimensional virtual representation of the plurality of interior regions of the building comprising each said unique three-dimensional avatar of each said one or more physical occupants at a virtual location of each said one or more physical occupants within said floor plan in the floor plan display panel at the virtual location within said three dimensional virtual representation of the plurality of interior regions of the building;

outputting using the GUI the three-dimensional virtual representation of at least one of the plurality of interior regions including each said unique three-dimensional avatar of each said one or more physical occupants at said virtual location for each said one or more physical occupants within said three-dimensional virtual representation with the floor plan displayed over a portion of said three-dimensional virtual representation of the plurality of interior regions of the building;

dynamically and simultaneously updating the virtual location for each said three-dimensional avatar for each of said one or more physical occupants within said three-dimensional virtual representation and the virtual location of each said unique identifier for each of said one or more physical occupants on the floor plan, and automatically locating the floor plan over said three-dimensional virtual representation to not obscure any said three-dimensional avatar or an important element in said three-dimensional virtual representation.

22. The non-transitory computer-readable medium of claim 21, wherein the instructions further cause the processor to perform operations comprising:

outputting, via said GUI, a community display region identifying each said one or more physical occupants and each said one or more virtual occupants;

initiating a text-based chat session with one of said physical occupants or one of said virtual occupants in response to receiving a chat request input from a user via the community display region of the GUI;

initiating a voice-based communication session with one of said physical occupants or one of said virtual occupants in response to receiving a call request input from a user via the community display region of the GUI; and outputting one or more online articles using the community display region of the GUI.

23. The non-transitory computer-readable medium of claim 21, wherein the instructions further cause the processor to perform operations comprising:

obtaining from an external server one of a list of local hotels and a list of local restaurants;

outputting said list of local hotels or said list of local restaurants using a concierge display region of the GUI; and upon receiving a user request via GUI selection of an associated hypertext transfer protocol (HTTP) link, obtaining and outputting, using the concierge display region, a map showing a location of each hotel contained in said list of local hotels or of each local restaurant contained in said list of local restaurants.

24. The non-transitory computer-readable medium of claim 21, wherein the instructions further cause the processor to perform operations comprising:

retrieving from a plurality of sensors a plurality of values each associated with one or more of said temperature, said humidity, and said lighting level for each of timestamping and storing said plurality of values;

calculating, using said plurality of stored values, one or more of an average temperature, an average humidity, and an average lighting level, and audio for one or more of said interior regions of said building of a plurality of interior regions of said building in response to inputs received from a user via the GUI;

calculating, using said plurality of stored values, one or more of a histogram of temperature every hour for each 24 hour period, a histogram of humidity every hour for each 24 hour period, and a histogram of lighting level every hour for each 24 hour period for one or more of said interior regions of said building of a plurality of interior regions of said building in response to inputs received from a user via the GUI;

outputting, using an analytics display region of the GUI, one or more of said average temperature, said average humidity, and said average lighting level; and outputting, using said analytics display region of the GUI, a graphical representation of one or more of said histogram of temperature, said histogram of humidity, and said histogram of lighting level.

25. The non-transitory computer-readable medium of claim 21, wherein the instructions further cause the processor perform operations comprising:

wherein the GUI comprises a plurality of defined output display regions each associated with a building control or status;

resizing an area of one or more of said plurality of defined display regions upon receiving a change condition associated with said building control or status;

assigning a priority to said change condition, wherein said area of said resizing is based on said priority of said change condition, and wherein said priority is selected by the processor by determining a match for said change condition with one of a plurality of stored predefined events.

26. The non-transitory computer-readable medium of claim 25, wherein the instructions further cause the processor to perform operations comprising:

wherein said priority is determined by the processor executing a machine-learning algorithm which updates said plurality of stored predefined events to calculate said assigned priority with an accuracy that increases with successive executions of said machine-learning algorithm.

27. A non-transitory computer-readable medium upon which is embodied a sequence of programmed instructions which, when executed by a processor, cause the processor to perform integrated building and office automation control operations comprising:

generating and outputting an interactive building comfort dashboard for a building with at least one active display panel to a user via a Graphical User Interface (GUI) based on an assigned access level of the user;

controlling temperature, humidity, lighting level, and audio for each of a plurality of interior regions of said building in response to inputs received from the user via the GUI and at least one of the active display panels;

generating and outputting an interactive building analytics display with at least one active graphical display panel to the user via the GUI based on an assigned access level of the user, wherein the at least one active display panel comprises one or more of a people and air quality display panel showing overall air quality over time and occupant loading, a heating and cooling display panel showing heating and cooling output over time, a capacity display panel showing the number of occupants over time, an air quality display showing air quality metrics over time, a light levels display panel showing a light level over time, and a temperature set display panel showing a set point value over time, and a temperature display panel showing an actual temperature over time;

updating each of the at least one active display panels at a predefined time period;

automatically resizing one or more of the at least one active display panels depending on a change in a displayed analytic value as the displayed analytic values change from update to update;

displaying one or more of the at least one active display panels with an increased size with respect to a size of other display panels;

generating a real-time alert when a displayed analytic value exceeds a threshold; and automatically repositioning one of the active display panels associated with the alert to a different location within the interactive building analytics display.

28. The non-transitory computer-readable medium of claim 27, wherein the instructions further cause the processor to perform operations comprising:

detecting, representing, and tracking a physical location of each of one or more physical occupants of each said plurality of interior regions using a unique identifier associated with each of the one or more physical occupants and outputting each said unique identifier to a virtual location on a floor plan of said plurality of interior regions via a floor plan display panel in the GUI to represent the physical location of each of the one or more physical occupants in each said plurality of interior regions;

representing each of the one or more physical occupants using a unique three-dimensional avatar and associating each physical occupant's unique identifier with the physical occupant's unique three-dimensional avatar;

generating a three dimensional virtual representation of the plurality of interior regions of the building, the three dimensional virtual representation of the plurality of interior regions of the building comprising each said unique three-dimensional avatar of each said one or more physical occupants at said virtual location of each of the one or more physical occupants within said floor plan in the floor plan display panel at the virtual location within said three dimensional virtual representation of the plurality of interior regions of the building;

outputting using the GUI the three-dimensional virtual representation of the plurality of interior regions including each said three-dimensional avatar of each said one or more physical occupants at said virtual location for each said one or more physical occupants within said three-dimensional virtual representation with the floor plan displayed over a portion of said three-dimensional virtual representation; and dynamically and simultaneously updating the virtual location for each said three-dimensional avatar for each of said one or more physical occupants within said three-dimensional virtual representation and the virtual location of each said unique identifier for each of said one or more physical occupants on the floor plan, and automatically locating the floor plan over said three-dimensional virtual representation to not obscure any said three-dimensional avatar or an important element in said three-dimensional virtual representation.

29. The non-transitory computer-readable medium of claim 27, wherein the instructions further cause the processor to perform operations comprising:

outputting, via said GUI, a community display region identifying each said one or more physical occupants and each said one or more virtual occupants;

initiating a text-based chat session with one of said physical occupants or one of said virtual occupants in response to receiving a chat request input from a user via the community display region of the GUI;

initiating a voice-based communication session with one of said physical occupants or one of said virtual occupants in response to receiving a call request input from a user via the community display region of the GUI; and outputting one or more online articles using the community display region of the GUI.

30. The non-transitory computer-readable medium of claim 27, wherein the instructions further cause the processor to perform operations comprising:

obtaining from an external server one of a list of local hotels and a list of local restaurants;

outputting said list of local hotels or said list of local restaurants using a concierge display region of the GUI; and upon receiving a user request via GUI selection of an associated hypertext transfer protocol (HTTP) link, obtaining and outputting, using the concierge display region, a map showing a location of each hotel contained in said list of local hotels or of each local restaurant contained in said list of local restaurants;

upon receiving a user request via GUI selection of an associated hypertext transfer protocol (HTTP) link, outputting a request to an external server to open a food delivery service application;

displaying an interactive Hypertext Transfer Markup Language (HTML) page in the concierge display region associated with a food delivery request for the food delivery service application;

entering information received via user input into fields of said interactive HTML page in the concierge display region associated with food delivery request for the food delivery service application; and sending said interactive HTML page associated with the food delivery request, including the entered information, to the food delivery service application.

* * * * *